US010822574B2

(12) United States Patent
DiCosimo et al.

(10) Patent No.: US 10,822,574 B2
(45) Date of Patent: Nov. 3, 2020

(54) GLUCAN FIBER COMPOSITIONS FOR USE IN LAUNDRY CARE AND FABRIC CARE

(71) Applicant: DUPONT INDUSTRIAL BIOSCIENCES USA, LLC, Wilmington, DE (US)

(72) Inventors: Robert DiCosimo, Chadds Ford, PA (US); Qiong Cheng, Wilmington, DE (US); Rakesh Nambiar, West Chester, PA (US); Jayme L. Paullin, Claymont, DE (US); Mark S. Payne, Wilmington, DE (US); Zheng You, Hoffman Estates, IL (US)

(73) Assignee: DUPONT INDUSTRIAL BIOSCIENCES USA, LLC, Wilmington, DE (US)

( * ) Notice: Subject to any disclaimer, the term of this patent is extended or adjusted under 35 U.S.C. 154(b) by 0 days.

(21) Appl. No.: 15/765,558

(22) PCT Filed: Nov. 7, 2016

(86) PCT No.: PCT/US2016/060839
§ 371 (c)(1),
(2) Date: Apr. 3, 2018

(87) PCT Pub. No.: WO2017/083229
PCT Pub. Date: May 18, 2017

(65) Prior Publication Data
US 2019/0136153 A1 May 9, 2019

Related U.S. Application Data

(60) Provisional application No. 62/255,217, filed on Nov. 13, 2015.

(51) Int. Cl.
C11D 3/22 (2006.01)
C11D 3/386 (2006.01)
C11D 11/00 (2006.01)
C08B 37/00 (2006.01)
C11D 7/26 (2006.01)
C08L 5/00 (2006.01)

(52) U.S. Cl.
CPC .......... C11D 3/225 (2013.01); C08B 37/0009 (2013.01); C08L 5/00 (2013.01); C11D 3/222 (2013.01); C11D 3/386 (2013.01); C11D 3/38645 (2013.01); C11D 7/268 (2013.01); C11D 11/0017 (2013.01)

(58) Field of Classification Search
CPC ..... C11D 3/225; C11D 11/0017; C11D 3/386; C11D 3/38645; C08B 37/0009
USPC ......................................................... 514/59
See application file for complete search history.

(56) References Cited

U.S. PATENT DOCUMENTS

| 2,709,150 | A | 5/1955 | Carlson et al. |
| 2,776,925 | A | 1/1957 | Julian et al. |
| 3,844,890 | A | 10/1974 | Nakao et al. |
| 4,435,307 | A | 3/1984 | Barbesgaard et al. |
| 4,462,917 | A | 7/1984 | Conway |
| 4,464,270 | A | 8/1984 | Hollenbeak et al. |
| 4,477,360 | A | 10/1984 | Almond |
| 4,501,886 | A | 2/1985 | O'Brien |
| 4,580,421 | A | 4/1986 | Babuin et al. |
| 4,649,058 | A | 3/1987 | Schwengers |
| 4,689,297 | A | 8/1987 | Good et al. |
| 4,767,614 | A | 8/1988 | Scarpa et al. |
| 4,794,661 | A | 1/1989 | Durazzani |
| 4,797,361 | A | 1/1989 | Montenecourt |
| 4,799,550 | A | 1/1989 | Harris et al. |
| 4,861,381 | A | 8/1989 | Paul et al. |
| 4,963,298 | A | 10/1990 | Allen et al. |
| 5,141,858 | A | 8/1992 | Paul et al. |
| 5,296,286 | A | 3/1994 | Allen et al. |
| 5,324,649 | A | 6/1994 | Arnold et al. |
| 5,340,735 | A | 8/1994 | Christianson et al. |
| 5,457,046 | A | 10/1995 | Woeldike et al. |
| 5,500,364 | A | 3/1996 | Christianson et al. |
| 5,648,263 | A | 7/1997 | Schuelein et al. |
| 5,686,593 | A | 11/1997 | Woeldike et al. |
| 5,691,178 | A | 11/1997 | Schuelein et al. |
| 5,700,646 | A | 12/1997 | Wood |
| 5,700,676 | A | 12/1997 | Bott et al. |

(Continued)

FOREIGN PATENT DOCUMENTS

| EP | 0218272 A1 | 4/1987 |
| EP | 0258068 A2 | 3/1988 |

(Continued)

OTHER PUBLICATIONS

Kralj et al. Glucan synthesis in the genus *Lactobacillus* isolation and characterization of glucansucrase genes, enzymes and glucan products from six different strains. Microbiology (2004), 150, 3681-3690. (Year: 2004).*

(Continued)

Primary Examiner — Yih-Horng Shiao

(57) ABSTRACT

An enzymatically produced α-glucan oligomer/polymer compositions is provided. The enzymatically produced α-glucan oligomer/polymers can be derivatized into α-glucan ether compounds. The α-glucan oligomers/polymers and the corresponding α-glucan ethers are cellulose and/or protease resistant, making them suitable for use in fabric care and laundry care applications. Methods for the production and use of the present compositions are also provided.

8 Claims, No Drawings

Specification includes a Sequence Listing.

(56) References Cited

U.S. PATENT DOCUMENTS

| | | |
|---|---|---|
| 5,702,942 A | 12/1997 | Leathers et al. |
| 5,712,107 A | 1/1998 | Nichols |
| 5,763,254 A | 6/1998 | Woeldike et al. |
| 5,776,757 A | 7/1998 | Schuelein et al. |
| 5,786,196 A | 7/1998 | Cote et al. |
| 5,801,039 A | 9/1998 | Maurer et al. |
| 5,814,501 A | 9/1998 | Becker et al. |
| 5,855,625 A | 1/1999 | Maurer et al. |
| 5,942,431 A | 8/1999 | Yoneda et al. |
| 5,945,394 A | 8/1999 | Sajic et al. |
| 5,955,340 A | 9/1999 | Bott et al. |
| 5,985,666 A | 11/1999 | Loiselle et al. |
| 6,087,559 A | 7/2000 | Nichols |
| 6,127,602 A | 10/2000 | Nichols |
| 6,127,603 A | 10/2000 | Nichols |
| 6,284,479 B1 | 9/2001 | Nichols |
| 6,312,936 B1 | 11/2001 | Poulose et al. |
| 6,410,025 B1 | 6/2002 | Lander |
| 6,426,410 B1 | 7/2002 | Wang |
| 6,440,991 B1 | 8/2002 | Zhu et al. |
| 6,465,203 B2 | 10/2002 | Nichols |
| 6,482,628 B1 | 11/2002 | Poulose et al. |
| 6,486,314 B1 | 11/2002 | Van et al. |
| 6,562,612 B2 | 5/2003 | Jones et al. |
| 6,566,114 B1 | 5/2003 | Kauppinen et al. |
| 6,579,840 B1 | 6/2003 | Heltovics |
| 6,602,842 B2 | 8/2003 | Cuperus et al. |
| 6,630,586 B1 | 10/2003 | Fouache et al. |
| 6,730,646 B1 | 5/2004 | Waschenbach et al. |
| 6,867,026 B2 | 3/2005 | Van Geel-Schutten et al. |
| 6,933,140 B1 | 8/2005 | Dyson et al. |
| 7,000,000 B1 | 2/2006 | O'Brien |
| 7,001,878 B2 | 2/2006 | De et al. |
| 7,012,053 B1 | 3/2006 | Barnabas et al. |
| 7,056,880 B2 | 6/2006 | Wang et al. |
| 7,138,263 B2 | 11/2006 | Murashima et al. |
| 7,402,420 B2 | 7/2008 | Kossmann et al. |
| 7,439,049 B2 | 10/2008 | Bozonet et al. |
| 7,524,645 B2 | 4/2009 | Monsan et al. |
| 7,534,759 B2 | 5/2009 | Wahl et al. |
| 7,576,048 B2 | 8/2009 | Gray et al. |
| 7,595,182 B2 | 9/2009 | Koga et al. |
| 7,604,974 B2 | 10/2009 | Jones et al. |
| 7,612,198 B2 | 11/2009 | Fuertes et al. |
| 7,897,373 B2 | 3/2011 | Monsan et al. |
| 8,057,840 B2 | 11/2011 | Harrison et al. |
| 8,076,279 B2 | 12/2011 | Brand et al. |
| 8,192,956 B2 | 6/2012 | Kim et al. |
| 8,530,219 B2 | 9/2013 | Estell et al. |
| 8,541,041 B2 | 9/2013 | Pilling |
| 8,569,033 B2 | 10/2013 | Watanabe et al. |
| 8,575,083 B2 | 11/2013 | Bettiol et al. |
| 8,642,757 B2 | 2/2014 | O'Brien et al. |
| 8,828,689 B2 | 9/2014 | Caimi et al. |
| 8,835,374 B2 | 9/2014 | Guida et al. |
| 8,871,474 B2 | 10/2014 | Payne et al. |
| 8,962,282 B2 | 2/2015 | Caimi et al. |
| 9,034,092 B2 | 5/2015 | O'Brien |
| 9,080,195 B2 | 7/2015 | O'Brien et al. |
| 9,096,956 B2 | 8/2015 | Shiflett et al. |
| 9,139,718 B2 | 9/2015 | Paullin et al. |
| 9,175,423 B2 | 11/2015 | O'Brien et al. |
| 9,212,301 B2 | 12/2015 | O'Brien et al. |
| 9,278,988 B2 | 3/2016 | Kasat et al. |
| 9,334,584 B2 | 5/2016 | O'Brien et al. |
| 9,365,955 B2 | 6/2016 | Opper |
| 9,403,917 B2 | 8/2016 | Kasat et al. |
| 9,540,747 B2 | 1/2017 | O'Brien |
| 9,562,112 B2 | 2/2017 | Landschutze et al. |
| 9,644,322 B2 | 5/2017 | Massouda |
| 9,670,290 B2 | 6/2017 | Landschutze et al. |
| 9,695,253 B2 | 7/2017 | Nambiar et al. |
| 9,714,403 B2 | 7/2017 | Nagy et al. |
| 9,719,121 B2 | 8/2017 | Fake et al. |
| 9,771,548 B2 | 9/2017 | Nagy et al. |
| 9,957,334 B2 | 5/2018 | Dennes et al. |
| 9,982,284 B2 | 5/2018 | Nagy et al. |
| 10,005,850 B2 | 6/2018 | Kasat et al. |
| 10,059,779 B2 | 8/2018 | Nambiar et al. |
| 10,072,100 B2 | 9/2018 | Nambiar et al. |
| 10,087,479 B2 | 10/2018 | Fake et al. |
| 10,117,937 B2 | 11/2018 | Yao et al. |
| 10,428,362 B2 | 10/2019 | Nagy et al. |
| 2005/0059633 A1 | 3/2005 | Van Geel-Schuten |
| 2006/0127328 A1 | 6/2006 | Monsan et al. |
| 2007/0112185 A1 | 5/2007 | Myllymaki et al. |
| 2008/0090747 A1 | 4/2008 | Augustinus et al. |
| 2008/0095731 A1 | 4/2008 | Mitra |
| 2008/0248989 A1 | 10/2008 | Holderbaum et al. |
| 2009/0123448 A1 | 5/2009 | Bozonnet et al. |
| 2009/0209445 A1 | 8/2009 | Panandiker et al. |
| 2009/0297663 A1 | 12/2009 | Van et al. |
| 2009/0300798 A1 | 12/2009 | Kok-Jacon et al. |
| 2010/0047432 A1 | 2/2010 | Harrison et al. |
| 2010/0081598 A1 | 4/2010 | Sharma et al. |
| 2010/0122378 A1 | 5/2010 | Frohberg et al. |
| 2010/0284972 A1 | 11/2010 | Naeye et al. |
| 2011/0014345 A1 | 1/2011 | Pilling |
| 2011/0020496 A1 | 1/2011 | Shimada et al. |
| 2011/0039744 A1 | 2/2011 | Heath et al. |
| 2011/0081474 A1 | 4/2011 | Zhou et al. |
| 2011/0178289 A1 | 7/2011 | Monsan et al. |
| 2011/0223117 A1 | 9/2011 | Kim et al. |
| 2012/0034366 A1 | 2/2012 | Hoffman et al. |
| 2012/0165290 A1 | 6/2012 | Dijkhuizen et al. |
| 2013/0087938 A1 | 4/2013 | O'Brien et al. |
| 2013/0157316 A1 | 6/2013 | Caimi et al. |
| 2013/0161562 A1 | 6/2013 | O'Brien et al. |
| 2013/0161861 A1 | 6/2013 | O'Brien et al. |
| 2013/0168895 A1 | 7/2013 | Opper |
| 2013/0196384 A1 | 8/2013 | Caimi et al. |
| 2013/0214443 A1 | 8/2013 | Shiflett et al. |
| 2013/0244287 A1 | 9/2013 | O'Brien et al. |
| 2013/0244288 A1 | 9/2013 | O'Brien et al. |
| 2013/0313737 A1 | 11/2013 | O'Brien |
| 2014/0087431 A1 | 3/2014 | Payne et al. |
| 2014/0179913 A1 | 6/2014 | Paullin et al. |
| 2014/0187766 A1 | 7/2014 | Kasat et al. |
| 2014/0187767 A1 | 7/2014 | Kasat et al. |
| 2014/0323715 A1 | 10/2014 | Kasat et al. |
| 2015/0126730 A1 | 5/2015 | O'Brien |
| 2015/0191550 A1 | 7/2015 | Mishra et al. |
| 2015/0225877 A1 | 8/2015 | O'Brien |
| 2015/0232785 A1 | 8/2015 | Paullin et al. |
| 2015/0240278 A1 | 8/2015 | Nagy et al. |
| 2015/0353649 A1 | 12/2015 | Paullin et al. |
| 2015/0368594 A1 | 12/2015 | Nagy et al. |
| 2016/0053061 A1 | 2/2016 | Durnberger et al. |
| 2016/0053406 A1 | 2/2016 | Durnberger et al. |
| 2016/0060792 A1 | 3/2016 | Durnberger et al. |
| 2016/0122445 A1 | 5/2016 | Nambiar et al. |
| 2016/0138195 A1 | 5/2016 | Kraft et al. |
| 2016/0138196 A1 | 5/2016 | Roder et al. |
| 2016/0144065 A1 | 5/2016 | Roder et al. |
| 2016/0175811 A1 | 6/2016 | Behabtu et al. |
| 2016/0177471 A1 | 6/2016 | Kraft et al. |
| 2016/0230348 A1 | 8/2016 | Massouda |
| 2016/0251453 A1 | 9/2016 | Kasat et al. |
| 2016/0304629 A1 | 10/2016 | Kasat et al. |
| 2016/0311935 A1 | 10/2016 | Dennes et al. |
| 2016/0326269 A1 | 11/2016 | Dennes et al. |
| 2016/0333117 A1 | 11/2016 | Massouda et al. |
| 2016/0333157 A1 | 11/2016 | Massouda et al. |
| 2017/0167063 A1 | 6/2017 | Behabtu |
| 2017/0196231 A1 | 7/2017 | Massouda et al. |
| 2017/0198108 A1 | 7/2017 | Mishra et al. |
| 2017/0198109 A1 | 7/2017 | Mishra et al. |
| 2017/0198322 A1 | 7/2017 | Cheng et al. |
| 2017/0198323 A1 | 7/2017 | Cheng et al. |
| 2017/0198324 A1 | 7/2017 | Cheng et al. |
| 2017/0204203 A1 | 7/2017 | Massouda et al. |
| 2017/0204232 A1 | 7/2017 | Mishra |
| 2017/0204442 A1 | 7/2017 | Dicosimo et al. |
| 2017/0208823 A1 | 7/2017 | Massouda et al. |

(56) References Cited

U.S. PATENT DOCUMENTS

| | | |
|---|---|---|
| 2017/0218093 A1 | 8/2017 | Cheng et al. |
| 2017/0267787 A1 | 9/2017 | Nambiar et al. |
| 2017/0298303 A1 | 10/2017 | Nagy et al. |
| 2017/0362345 A1 | 12/2017 | Behabtu et al. |
| 2018/0021238 A1 | 1/2018 | Huh et al. |
| 2018/0049457 A1 | 2/2018 | Cheng et al. |
| 2018/0066214 A1 | 3/2018 | Nagy et al. |
| 2018/0119357 A1 | 5/2018 | Behabtu et al. |
| 2018/0127682 A1 | 5/2018 | Nambiar et al. |
| 2018/0223002 A1 | 8/2018 | Dennes et al. |
| 2018/0230241 A1 | 8/2018 | Johnson et al. |
| 2018/0258590 A1 | 9/2018 | Behabtu et al. |
| 2018/0273731 A1 | 9/2018 | Opietnik et al. |
| 2018/0282918 A1 | 10/2018 | Behabtu et al. |
| 2018/0291311 A1 | 10/2018 | Dicosimo et al. |
| 2018/0312781 A1 | 11/2018 | Dicosimo et al. |
| 2019/0136153 A1 | 5/2019 | Dicosimo et al. |
| 2019/0153674 A1 | 5/2019 | Behabtu |
| 2019/0186049 A1 | 6/2019 | Durnberger et al. |
| 2019/0218373 A1 | 7/2019 | Opietnik et al. |

FOREIGN PATENT DOCUMENTS

| | | |
|---|---|---|
| EP | 0260105 A2 | 3/1988 |
| EP | 0305216 A1 | 3/1989 |
| EP | 0331376 A2 | 9/1989 |
| EP | 0407225 A1 | 1/1991 |
| EP | 0495257 A1 | 7/1992 |
| EP | 0531315 | 3/1993 |
| EP | 0531372 | 3/1993 |
| EP | 1151085 B1 | 8/2005 |
| EP | 1504994 B1 | 7/2007 |
| EP | 2100949 A1 | 9/2009 |
| EP | 2365084 A2 | 9/2011 |
| EP | 1740690 B1 | 10/2012 |
| EP | 2644197 A1 | 10/2013 |
| GB | 1296839 | 11/1972 |
| GB | 1372034 A | 10/1974 |
| GB | 2095275 A | 9/1982 |
| WO | 88/09367 A1 | 12/1988 |
| WO | 89/06270 A1 | 7/1989 |
| WO | 90/09446 A1 | 8/1990 |
| WO | 91/00353 A2 | 1/1991 |
| WO | 91/16422 A1 | 10/1991 |
| WO | 91/17243 A1 | 11/1991 |
| WO | 91/17244 A1 | 11/1991 |
| WO | 92/05249 A1 | 4/1992 |
| WO | 92/06154 A1 | 4/1992 |
| WO | 92/06165 A1 | 4/1992 |
| WO | 92/06221 A1 | 4/1992 |
| WO | 92/21760 A1 | 12/1992 |
| WO | 93/24618 A1 | 12/1993 |
| WO | 94/01541 A1 | 1/1994 |
| WO | 94/02597 A1 | 2/1994 |
| WO | 94/07998 A1 | 4/1994 |
| WO | 94/12621 A1 | 6/1994 |
| WO | 94/18314 | 8/1994 |
| WO | 94/25578 A1 | 11/1994 |
| WO | 95/01426 A1 | 1/1995 |
| WO | 95/06720 A1 | 3/1995 |
| WO | 95/10602 A1 | 4/1995 |
| WO | 95/10603 A1 | 4/1995 |
| WO | 95/14783 A1 | 6/1995 |
| WO | 95/22615 A1 | 8/1995 |
| WO | 95/23221 A1 | 8/1995 |
| WO | 95/24471 A1 | 9/1995 |
| WO | 95/26397 A1 | 10/1995 |
| WO | 95/30744 A2 | 11/1995 |
| WO | 95/35381 A1 | 12/1995 |
| WO | 95/35382 A2 | 12/1995 |
| WO | 96/00292 A1 | 1/1996 |
| WO | 96/05295 A2 | 2/1996 |
| WO | 96/11262 A1 | 4/1996 |
| WO | 96/12012 A1 | 4/1996 |
| WO | 96/13580 A1 | 5/1996 |
| WO | 96/23873 A1 | 8/1996 |
| WO | 1996/023874 A1 | 8/1996 |
| WO | 96/27002 A1 | 9/1996 |
| WO | 96/29397 A1 | 9/1996 |
| WO | 96/30481 A1 | 10/1996 |
| WO | 97/03161 | 1/1997 |
| WO | 97/04079 A1 | 2/1997 |
| WO | 97/07202 A1 | 2/1997 |
| WO | 97/10342 A1 | 3/1997 |
| WO | 97/41213 A1 | 11/1997 |
| WO | 97/43424 A1 | 11/1997 |
| WO | 98/08940 A1 | 3/1998 |
| WO | 98/12307 A1 | 3/1998 |
| WO | 98/15257 A1 | 4/1998 |
| WO | 98/26078 A1 | 6/1998 |
| WO | 99/02702 A1 | 1/1999 |
| WO | 99/09183 A1 | 2/1999 |
| WO | 99/14341 A2 | 3/1999 |
| WO | 99/14342 A1 | 3/1999 |
| WO | 99/19467 A1 | 4/1999 |
| WO | 99/23211 A1 | 5/1999 |
| WO | 99/29876 A2 | 6/1999 |
| WO | 99/33960 A2 | 7/1999 |
| WO | 99/34003 A2 | 7/1999 |
| WO | 99/42567 A1 | 8/1999 |
| WO | 99/43793 A1 | 9/1999 |
| WO | 99/43794 | 9/1999 |
| WO | 99/46399 A1 | 9/1999 |
| WO | 00/29560 A1 | 5/2000 |
| WO | 00/60058 A2 | 10/2000 |
| WO | 00/60059 A2 | 10/2000 |
| WO | 00/60060 A2 | 10/2000 |
| WO | 01/14532 A2 | 3/2001 |
| WO | 01/14629 A1 | 3/2001 |
| WO | 01/34784 A1 | 5/2001 |
| WO | 01/34899 A1 | 5/2001 |
| WO | 01/64852 A1 | 9/2001 |
| WO | 01/66712 A2 | 9/2001 |
| WO | 01/85888 A2 | 11/2001 |
| WO | 01/88107 A2 | 11/2001 |
| WO | 01/96537 A2 | 12/2001 |
| WO | 02/10355 A2 | 2/2002 |
| WO | 02/31124 A2 | 4/2002 |
| WO | 2002/092797 | 11/2002 |
| WO | 03/08618 A2 | 1/2003 |
| WO | 2003/089562 A1 | 10/2003 |
| WO | 2004/113551 A1 | 12/2004 |
| WO | 2005/001064 A2 | 1/2005 |
| WO | 2005/003311 A2 | 1/2005 |
| WO | 2005/018336 A1 | 3/2005 |
| WO | 2005/019443 A2 | 3/2005 |
| WO | 2005/056782 A2 | 6/2005 |
| WO | 2005/056783 A1 | 6/2005 |
| WO | 2005/066338 A1 | 7/2005 |
| WO | 2006/007911 A1 | 1/2006 |
| WO | 2006/012899 A1 | 2/2006 |
| WO | 2006/012902 A2 | 2/2006 |
| WO | 2006/031554 A2 | 3/2006 |
| WO | 2006/045391 A1 | 5/2006 |
| WO | 2006/063594 A1 | 6/2006 |
| WO | 2006/066594 A2 | 6/2006 |
| WO | 2006/066596 A2 | 6/2006 |
| WO | 2006/136161 A2 | 12/2006 |
| WO | 2007/044993 A2 | 4/2007 |
| WO | 2007/106293 A1 | 9/2007 |
| WO | 2008/000567 A1 | 1/2008 |
| WO | 2008/000825 A1 | 1/2008 |
| WO | 2008/063400 A1 | 5/2008 |
| WO | 2008/087426 A1 | 7/2008 |
| WO | 2008/088493 A2 | 7/2008 |
| WO | 2008/092919 A1 | 8/2008 |
| WO | 2008/101894 A1 | 8/2008 |
| WO | 2008/106214 A1 | 9/2008 |
| WO | 2008/106215 A1 | 9/2008 |
| WO | 2009/058303 A2 | 5/2009 |
| WO | 2009/058661 A1 | 5/2009 |
| WO | 2009/061381 A2 | 5/2009 |
| WO | 2009/098659 A1 | 8/2009 |
| WO | 2009/098660 A1 | 8/2009 |

(56) References Cited

FOREIGN PATENT DOCUMENTS

| | | |
|---|---|---|
| WO | 2009/100102 A2 | 8/2009 |
| WO | 2009/112992 A1 | 9/2009 |
| WO | 2009/124160 A1 | 10/2009 |
| WO | 2009/126773 A1 | 10/2009 |
| WO | 2009/140504 A1 | 11/2009 |
| WO | 2009/149144 A2 | 12/2009 |
| WO | 2009/149145 A2 | 12/2009 |
| WO | 2009/149200 A2 | 12/2009 |
| WO | 2009/149419 A2 | 12/2009 |
| WO | 2009/152031 A1 | 12/2009 |
| WO | 2010/056640 A2 | 5/2010 |
| WO | 2010/056653 A2 | 5/2010 |
| WO | 2010/059413 A2 | 5/2010 |
| WO | 2010/059483 A1 | 5/2010 |
| WO | 2010/088112 A1 | 8/2010 |
| WO | 2010/088447 A1 | 8/2010 |
| WO | 2010/090915 A1 | 8/2010 |
| WO | 2010/091221 A1 | 8/2010 |
| WO | 2010/104675 A1 | 9/2010 |
| WO | 2010/115021 A2 | 10/2010 |
| WO | 2010/116139 A1 | 10/2010 |
| WO | 2010/117511 A1 | 10/2010 |
| WO | 2010/129839 A1 | 11/2010 |
| WO | 2010/135238 A1 | 11/2010 |
| WO | 2011/072099 A2 | 6/2011 |
| WO | 2011/076123 A1 | 6/2011 |
| WO | 2011/076897 A1 | 6/2011 |
| WO | 2011/080352 A1 | 7/2011 |
| WO | 2011/080353 A1 | 7/2011 |
| WO | 2011/080354 A1 | 7/2011 |
| WO | 2011/082425 A2 | 7/2011 |
| WO | 2011/082429 A1 | 7/2011 |
| WO | 2011/087836 A2 | 7/2011 |
| WO | 2011/094687 A1 | 8/2011 |
| WO | 2011/094690 A1 | 8/2011 |
| WO | 2011/098531 A1 | 8/2011 |
| WO | 2011/127102 A1 | 10/2011 |
| WO | 2011/140364 A1 | 11/2011 |
| WO | 2011/163428 A1 | 12/2011 |
| WO | 2012/027404 A1 | 3/2012 |
| WO | 2012/059336 A1 | 5/2012 |
| WO | 2012/104613 A1 | 8/2012 |
| WO | 2012/151534 A1 | 11/2012 |
| WO | 2013/036918 A2 | 3/2013 |
| WO | 2013/036968 A1 | 3/2013 |
| WO | 2013/052730 A1 | 4/2013 |
| WO | 2013/096502 A1 | 6/2013 |
| WO | 2013/096511 A1 | 6/2013 |
| WO | 2013/101854 A1 | 7/2013 |
| WO | 2013/177348 A1 | 11/2013 |
| WO | 2014/052386 A2 | 4/2014 |
| WO | 2014/077340 A1 | 5/2014 |
| WO | 2014/099724 A1 | 6/2014 |
| WO | 2014/105696 A1 | 7/2014 |
| WO | 2014/105698 A1 | 7/2014 |
| WO | 2014/161018 A1 | 10/2014 |
| WO | 2014/161019 A1 | 10/2014 |
| WO | 2014/165881 A1 | 10/2014 |
| WO | 2014/201479 A1 | 12/2014 |
| WO | 2014/201480 A1 | 12/2014 |
| WO | 2014/201481 A1 | 12/2014 |
| WO | 2014/201482 A1 | 12/2014 |
| WO | 2014/201483 A1 | 12/2014 |
| WO | 2014/201484 A1 | 12/2014 |
| WO | 2015130883 | 3/2015 |
| WO | 2015/069828 A1 | 5/2015 |
| WO | 2015/094402 A1 | 6/2015 |
| WO | 2015/095046 A1 | 6/2015 |
| WO | 2015/095358 A1 | 6/2015 |
| WO | 2015/103531 A1 | 7/2015 |
| WO | 2015/109064 A1 | 7/2015 |
| WO | 2015/109066 A1 | 7/2015 |
| WO | 2015/109164 A1 | 7/2015 |
| WO | 2015/123327 A1 | 8/2015 |
| WO | WO 2015/123323 * | 8/2015 |
| WO | 2015/130881 A1 | 9/2015 |
| WO | 2015/138283 A1 | 9/2015 |
| WO | 2015/183714 A1 | 12/2015 |
| WO | 2015/183721 A1 | 12/2015 |
| WO | 2015/183722 A1 | 12/2015 |
| WO | 2015/183724 A1 | 12/2015 |
| WO | 2015/183726 A1 | 12/2015 |
| WO | 2015/183729 A1 | 12/2015 |
| WO | 2015/195777 A1 | 12/2015 |
| WO | 2015/195960 A1 | 12/2015 |
| WO | 2015/200589 A1 | 12/2015 |
| WO | 2015/200590 A1 | 12/2015 |
| WO | 2015/200593 A1 | 12/2015 |
| WO | 2015/200596 A1 | 12/2015 |
| WO | 2015/200605 A1 | 12/2015 |
| WO | 2015/200612 A1 | 12/2015 |
| WO | 2016/073732 A1 | 5/2016 |
| WO | 2016/105971 A1 | 6/2016 |
| WO | 2016/106011 A1 | 6/2016 |
| WO | 2016/106068 A1 | 6/2016 |
| WO | 2016/126685 A1 | 8/2016 |
| WO | 2016/133734 A1 | 8/2016 |
| WO | 2016/160737 A1 | 10/2016 |
| WO | 2016/160738 A2 | 10/2016 |
| WO | 2016/160740 A1 | 10/2016 |
| WO | 2016/196021 A1 | 12/2016 |
| WO | 2016/196022 A1 | 12/2016 |
| WO | 2017/040369 A1 | 3/2017 |
| WO | 2017/074859 A1 | 5/2017 |
| WO | 2017/074862 A1 | 5/2017 |
| WO | 2017/083226 A1 | 5/2017 |
| WO | 2017/083228 A1 | 5/2017 |
| WO | 2017/083229 A1 | 5/2017 |

OTHER PUBLICATIONS

Simpson et al., 'Four glucosyltransferases, GtfJ, GtfK, GtfL and GtfM from *Streptococcus salivarius* ATCC 25975,' Microbiology, 1995, vol. 141, pp. 1451-1460.

Striegel et al., "An SEC/MALS study of alternan degradation during size-exclusion chromatographic analysis", Anal. Bioanal. Chem. (2009), 394:1887-1893.

Synytsya et al., "Structural Analysis of Glucans", Annals of Translational Medicine, Feb. 2014, vol. 2, No. 2, 14 pages.

Thompson, et al., "CLUSTAL W: Improving the Sensitivity of Progressive Multiple Sequence Alignment Through Sequence Weighting Position-Specific Gap Penalties and Weight Matrix Choice", Nuc. Acids Research, vol. 22, No. 22, pp. 4673-4680, 1994.

Villares et al., "Structural Features and Healthy Properties of Polysaccharides Occurring in Mushrooms", Agriculture, vol. 2, No. 4, 2012, pp. 452-471.

Yamaguchi et al,"Cloning and structure of the mono- and diacylglycerol lipase-encoding gene from Penicillium camembertii U-150", Gene, 1991, vol. 103, pp. 61-67.

Yui et al., "Molecular and crystal structure of (1 -> 3)-alpha-d-glucan Triacetate," International Journal of Biological Macromolecules, 1992, vol. 14, No. 2, pp. 87-96.

Zhang et al., 'Dissolution and regeneration of cellulose in NaOH/ Thiourea Aqueous Solution,' J Polym Sci Part B: Polym Phys, 2002, vol. 40, pp. 1521-1529.

Zhang et al., 'Effects of urea and sodium hydroxide on the molecular weight and conformation of alpha-(1->3)-d-glucan from Lentinus edodes in aqueous solution,' Carbohydrate Research, Aug. 7, 2000, vol. 327, No. 4, pp. 431-438.

"Applied Fibre Science", F. Happey, Ed, Chapter 8, Academic Press, New York, 1979 (Book not included).

Altschul, "Basic local alignment search tool", Journal of Mol. Biol, vol. 215, pp. 403-410, 1990.

Bao et al., Chemical Modification of the (1-->3)-a-D-Glucan From Spores of Ganoderma Lucidum and Investigation of Their Physicochemical Properties and Immunological Activity, Carbohydrate Research, vol. 336 (2001), pp. 127-140.

Cantarel et al., The Carbohydrate-Active Enzymes Database (CAZY): An Expert Resource for Glycogenomics, Nlucleic Acids Research (2009), vol. 37, Database Issue, pp. D233-D238.

(56) References Cited

OTHER PUBLICATIONS

Chenna et al., "Multiple Sequence Alignment with the Clustal Series of Programs", Nucleic Acids Res., vol. 31, 13, pp. 3497-3500, Jul. 2003.
Cumpstey, "Chemical Modification of Polysaccharides", Organic Chemistry, Jan. 1, 2013, vol. 2013, pp. 1-27.
Dartois et al., "Cloning, nucleotide sequence and expression in *Escherichia coli* of a lipase gene from Bacillus subtilis 168," Biochemica et Biophysica Acta, 1992, vol. 1131, pp. 253-360.
Dubois, et al., "Colorimetric Method for Determination of Sugars and Related Substances", Analytical Chemistry, vol. 28, No. 3, pp. 350-356, Mar. 1956.
Hage, et al., "Efficient Manganese Catalysts for Low-Temperature Bleaching", Letters to Nature, vol. 369, pp. 637-639, Jun. 1994.
Hakamada et al., "Nucleotide Deduced Amino Acid Sequences of Mutanase-like Genes from Paenibacillus Isolates: Proposal of a New Family of Glycoside Hydrolases", Science Direct, vol. 90, pp. 525-533, 2008.
Higgins and Sharp, "Fast and sensitive multiple sequence alignments on a microcomputer", CABIOS. 5:151-153 (1989).
Kiho et al, "(1-3) Alpha D Glucan From an Alkaline Extract of Agrocybe Cylindracea and Antitumor Activity of Its O carboxymethylated Derivatives", Carbohydrate Research, 1989, vol. 189, pp. 273-279.
Leemhuis et al. Glucansucrases: Three-dimensional structures, reactions, mechanisms, alpha-glucan analysis and their implications in biotechnology and food applications,1 Journal of Biotechnology, vol. 163, No. 2, Jan. 1, 2013, pp. 250-272.
Lever, "A New Reaction for Colorimetric Determination of Carbohydrates", Analytical Biochemistry 47, pp. 273-279, 1972.
Monchois et al., 'Glucansucrases: mechanism of action and structure-function relationships,' FEMS Microbiol Rev., vol. 23, 1999 pp. 131-151.
Ogawa et al., 'Conformation of (1-3)-to-glucan tribenzoate,' Biosci Biotech Biochem, 1993, vol. 57 (10), pp. 1663-1665.
Ogawa et al., 'Crystal structure of (1->3)-alpha-d-glucan, Water-soluble polymers: synthesis, solution properties and applications,' American Chemical Society, Jan. 1, 1980, vol. 141, pp. 353-362.
Ogawa et al., 'X-ray diffraction data for (I>3)-alpha-d-glucan,' Carbohydrate Research, Oct. 1, 1979, vol. 75, pp. CI3-CI6.
Ogawa et al., "Molecular and Crystal Structure of the Regenerated form of (1->3)-a-D-Glucan," International Journal of Biological Macromolecules, 1981, vol. 3. No. 1, pp. 31-36.
Ogawa et al., "X-Ray Diffraction Data for (1?3)-a-D-Glucan Triacetate," Carbohydrate Polymers, 1983, vol. 3, No. 4, pp. 287-297.
PCT International Search Report and Written Opinion issued for PCT/US2016/049194, dated Dec. 2, 2016.
PCT International Search Report and Written Opinion issued for PCT/US2013/076905, dated Feb. 25, 2014.
PCT International Search Report and Written Opinion issued for PCT/US2013/076919, dated Feb. 25, 2014.
PCT International Search Report and Written Opinion issued for PCT/US2014/044281, dated Sep. 3, 2014.
PCT International Search Report and Written Opinion issued for PCT/US2015/010139, dated Apr. 29, 2015.
PCT International Search Report and Written Opinion issued for PCT/US2015/011546, dated Apr. 13, 2015.
PCT International Search Report and Written Opinion issued for PCT/US2015/011551, dated Jul. 9, 2015.
PCT International Search Report and Written Opinion issued for PCT/US2015/011724, dated May 15, 2015.
PCT International Search Report and Written Opinion issued for PCT/US2015/037622, dated Sep. 22, 2015.
PCT International Search Report and Written Opinion issued for PCT/US2015/037624, dated Oct. 12, 2015.
PCT International Search Report and Written Opinion issued for PCT/US2015/037628, dated Sep. 22, 2015.
PCT International Search Report and Written Opinion issued for PCT/US2015/037634, dated Sep. 22, 2015.
PCT International Search Report and Written Opinion issued for PCT/US2015/037646, dated Oct. 7, 2015.
PCT International Search Report and Written Opinion issued for PCT/US2015/037656, dated Oct. 7, 2015.
PCT International Search Report and Written Opinion issued for PCT/US2015/066317, dated Mar. 30, 2016.
PCT International Search Report and Written Opinion issued for PCT/US2016/016136, dated Apr. 4, 2016.
PCT International Search Report and Written Opinion issued for PCT/US2016/033245, dated Aug. 22, 2016.
PCT International Search Report and Written Opinion issued for PCT/US2016/033249, dated Jul. 26, 2016.
PCT International Search Report and Written Opinion issued for PCT/US2016/058436, dated Feb. 8, 2017.
PCT International Search Report and Written Opinion issued for PCT/US2016/058453, dated Jan. 5, 2017.
PCT International Search Report and Written Opinion issued for PCT/US2016/060820, dated Feb. 17, 2017.
PCT International Search Report and Written Opinion issued for PCT/US2016/060832, dated Apr. 3, 2017.
PCT International Search Report and Written Opinion issued for PCT/US2016/060839, dated Apr. 3, 2017.
PCT International Search Report and Written Opinion issued for PCT/US2016/060892, dated Feb. 3, 2017.
PCT International Search Report and Written Opinion issued for PCT/US2017/036973, dated Sep. 15, 2017.
Pettolino et al., "Determining the Polysaccharide Composition of Plant Cell Walls", Nature Protocols, vol. 7, pp. 1590-1607, 2012.
Rice et al., "EMBOSS: The European Molecular Biology Open Software Suite", TIG, vol. 16, No. 6, pp. 276-277, Jun. 2000.
Schimada, et al., "cDNA Molecular Cloning of Geotrichum candidum Lipase." Journal of Biochem., vol. 106, pp. 383-388, 1989.
Shida et al., A (1/AR3)-Alpha-D-Glucan Isolated From the Fruit Bodies of Lentinus Edodes, Carbohydrate Research (1978), vol. 60, No. 1, pp. 117-127.
Shimamura, et al., "Identification of Amino Acid Residues in *Streptococcus mutans* Glucosyltransferases Influencing the Structure of the Glucan Product", Journ. Bacteriology, vol. 176, No. 16, pp. 4845-4850, 1994.

\* cited by examiner

GLUCAN FIBER COMPOSITIONS FOR USE IN LAUNDRY CARE AND FABRIC CARE

CROSS-REFERENCE TO RELATED APPLICATION

This application is the National Stage application of International Application No. PCT/US2016/060839 (filed Nov. 2, 2016), which claims the benefit of priority of U.S. Provisional Application No. 62/255,217 (filed Nov. 13, 2015), all of which prior applications are incorporated by reference herein in their entirety.

INCORPORATION BY REFERENCE OF THE SEQUENCE LISTING

The official copy of the sequence listing is submitted electronically via EFS-Web as an ASCII formatted sequence listing with a file named 20161104_CL6278WOPCT_SequenceListing_ST25.txt created on Nov. 2, 2016 and having a size of 91,265 bytes and is filed concurrently with the specification. The sequence listing contained in this ASCII-formatted document is part of the specification and is filed herein incorporated by reference herein in its entirety.

FIELD OF DISCLOSURE

This disclosure relates to oligosaccharides, polysaccharides, and derivatives thereof. Specially, the disclosure pertains to certain α-glucan polymers, derivatives of these α-glucans such as α-glucan ethers, and their use in fabric care and laundry care applications.

BACKGROUND

Driven by a desire to find new structural polysaccharides using enzymatic syntheses or genetic engineering of microorganisms, researchers have discovered oligosaccharides and polysaccharides that are biodegradable and can be made economically from renewably sourced feedstocks.

Various saccharide oligomer compositions have been reported in the art. For example, U.S. Pat. No. 6,486,314 discloses an α-glucan comprising at least 20, up to about 100,000 α-anhydroglucose units, 38-48% of which are 4-linked anhydroglucose units, 17-28% are 6-linked anhydroglucose units, and 7-20% are 4,6-linked anhydroglucose units and/or gluco-oligosaccharides containing at least two 4-linked anhydroglucose units, at least one 6-linked anhydroglucose unit and at least one 4,6-linked anhydroglucose unit. U.S. Patent Appl. Pub. No. 2010-0284972A1 discloses a composition for improving the health of a subject comprising an α-(1,2)-branched α-(1,6) oligodextran. U.S. Patent Appl. Pub. No. 2011-0020496A1 discloses a branched dextrin having a structure wherein glucose or isomaltooligosaccharide is linked to a non-reducing terminus of a dextrin through an α-(1,6) glycosidic bond and having a DE of 10 to 52. U.S. Pat. No. 6,630,586 discloses a branched maltodextrin composition comprising 22-35% (1,6) glycosidic linkages; a reducing sugars content of <20%; a polymolecularity index (Mp/Mn) of <5; and number average molecular weight (Mn) of 4500 g/mol or less. U.S. Pat. No. 7,612,198 discloses soluble, highly branched glucose polymers, having a reducing sugar content of less than 1%, a level of α-(1,6) glycosidic bonds of between 13 and 17% and a molecular weight having a value of between $0.9 \times 10^5$ and $1.5 \times 10^5$ daltons, wherein the soluble highly branched glucose polymers have a branched chain length distribution profile of 70 to 85% of a degree of polymerization (DP) of less than 15, of 10 to 14% of DP of between 15 and 25 and of 8 to 13% of DP greater than 25.

Poly α-1,3-glucan has been isolated by contacting an aqueous solution of sucrose with a glucosyltransferase (gtf) enzyme isolated from *Streptococcus salivarius* (Simpson et al., *Microbiology* 141:1451-1460, 1995). U.S. Pat. No. 7,000,000 disclosed the preparation of a polysaccharide fiber using an *S. salivarius* gtfJ enzyme. At least 50% of the hexose units within the polymer of this fiber were linked via α-1,3-glycosidic linkages. The disclosed polymer formed a liquid crystalline solution when it was dissolved above a critical concentration in a solvent or in a mixture comprising a solvent. From this solution continuous, strong, cotton-like fibers, highly suitable for use in textiles, were spun and used.

Development of new glucan polysaccharides and derivatives thereof is desirable given their potential utility in various applications. It is also desirable to identify glucosyltransferase enzymes that can synthesize new glucan polysaccharides, especially those with mixed glycosidic linkages, and derivatives thereof. The materials would be attractive for use in fabric care and laundry care applications to alter rheology, act as a structuring agent, provide a benefit (preferably a surface substantive effect) to a treated fabric, textile and/or article of clothing (such as improved fabric hand, improved resistance to soil deposition, etc.). Many applications, such as laundry care, often include enzymes such as cellulases, proteases, amylases, and the like. As such, the glucan polysaccharides are preferably resistant to cellulase, amylase, and/or protease activity.

SUMMARY

In one embodiment, a fabric care composition is provided comprising:
  a. an α-glucan oligomer/polymer composition comprising:
    i. 25-35 α-(1,3) glycosidic linkages;
    ii. 55-75% α-(1,6) glycosidic linkages;
    iii. 5-15% α-(1,3,6) glycosidic linkages;
    iv. a weight average molecular weight of less than 5000 Daltons;
    v. a viscosity of less than 0.25 Pascal second (Pa·s) at 12 wt % in water 20° C.;
    vi. a solubility of at least 20% (w/w) in water at 25° C.; and
    vii. a polydispersity index of less than 5; and
  b. at least one additional fabric care ingredient.

In another embodiment, a laundry care composition is provided comprising:
  a. an α-glucan oligomer/polymer composition comprising:
    i. 25-35 α-(1,3) glycosidic linkages;
    ii. 55-75% α-(1,6) glycosidic linkages;
    iii. 5-15% α-(1,3,6) glycosidic linkages;
    iv. a weight average molecular weight of less than 5000 Daltons;
    v. a viscosity of less than 0.25 Pascal second (Pa·s) at 12 wt % in water 20° C.;
    vi. a solubility of at least 20% (w/w) in water at 25° C.; and
    vii. a polydispersity index of less than 5; and
  b. at least one additional laundry care ingredient.

In another embodiment, the additional ingredient in the above fabric care composition or the above laundry care composition is at least one cellulase, at least one protease, at least one amylase or any combination thereof.

In another embodiment, the fabric care composition or the laundry care composition comprises 0.01 to 90% wt % of the soluble α-glucan oligomer/polymer composition.

In another embodiment, the fabric care composition or the laundry care composition comprises at least one additional ingredient comprising at least one of surfactants (anionic, nonionic, cationic, or zwitterionic), enzymes (proteases, cellulases, polyesterases, amylases, cutinases, lipases, pectate lyases, perhydrolases, xylanases, peroxidases, and/or laccases in any combination), detergent builders, complexing agents, polymers (in addition to the present α-glucan oligomers/polymers and/or α-glucan ethers), soil release polymers, surfactancy-boosting polymers, bleaching systems, bleach activators, bleaching catalysts, fabric conditioners, clays, foam boosters, suds suppressors (silicone or fatty-acid based), anti-corrosion agents, soil-suspending agents, anti-soil redeposition agents, dyes, bactericides, tarnish inhibiters, optical brighteners, perfumes, saturated or unsaturated fatty acids, dye transfer inhibiting agents, chelating agents, hueing dyes, calcium and magnesium cations, visual signaling ingredients, anti-foam, structurants, thickeners, anti-caking agents, starch, sand, gelling agents, and any combination thereof.

In another embodiment, a fabric care and/or laundry care composition is provided wherein the composition is in the form of a liquid, a gel, a powder, a hydrocolloid, an aqueous solution, granules, tablets, capsules, single compartment sachets, multi-compartment sachets or any combination thereof.

In another embodiment, the fabric care composition or the laundry care composition is packaged in a unit dose format.

Various glucan ethers may be produced from the present α-glucan oligomers/polymers. In another embodiment, an α-glucan ether composition is provided comprising:
  i. 25-35 α-(1,3) glycosidic linkages;
  ii. 55-75% α-(1,6) glycosidic linkages;
  iii. 5-15% α-(1,3,6) glycosidic linkages;
  iv. a weight average molecular weight of less than 5000 Daltons;
  v. a viscosity of less than 0.25 Pascal second (Pa·s) at 12 wt % in water 20° C.;
  vi. a solubility of at least 20% (w/w) in water at 25° C.; and
  i. a polydispersity index of less than 5; wherein the glucan ether composition has a degree of substitution (DoS) with at least one organic group of about 0.05 to about 3.0.

The α-glucan ether compositions may be used in a fabric care and/or laundry care formulation comprising enzymes such as a cellulases and proteases. In another embodiment, glucan ether composition is cellulase resistant, protease resistant, amylase resistant or any combination thereof.

The α-glucan ether compositions may be used in a fabric care and/or laundry care and/or personal care compositions. In another embodiment, a personal care composition, fabric care composition or laundry care composition is provided comprising the above α-glucan ether compositions.

In another embodiment, a method for preparing an aqueous composition is provided, the method comprising: contacting an aqueous composition with the above glucan ether composition wherein the aqueous composition comprises at least one cellulase, at least one protease, at least one amylase or any combination thereof.

In another embodiment, a method of treating an article of clothing, textile or fabric is provided comprising:

a. providing a composition selected from
  i. the above fabric care composition;
  ii. the above laundry care composition;
  iii. the above glucan ether composition;
  iv. the α-glucan oligomer/polymer composition comprising:
    a. 25-35 α-(1,3) glycosidic linkages;
    b. 55-75% α-(1,6) glycosidic linkages;
    c. 5-15% α-(1,3,6) glycosidic linkages;
    d. a weight average molecular weight of less than 5000 Daltons;
    e. a viscosity of less than 0.25 Pascal second (Pa·s) at 12 wt % in water 20° C.;
    f. a solubility of at least 20% (w/w) in water at 25° C.; and
    g. a polydispersity index of less than 5; and
  v. any combination of (i) through (iv);
b. contacting under suitable conditions the composition of (a) with a fabric, textile or article of clothing whereby the fabric, textile or article of clothing is treated and receives a benefit; and
c. optionally rinsing the treated fabric, textile or article of clothing of (b).

In another embodiment of the above method, the α-glucan oligomer/polymer composition or the α-glucan ether composition is a surface substantive.

In a further embodiment of the above method, the benefit is selected from the group consisting of improved fabric hand, improved resistance to soil deposition, improved colorfastness, improved wear resistance, improved wrinkle resistance, improved antifungal activity, improved stain resistance, improved cleaning performance when laundered, improved drying rates, improved dye, pigment or lake update, and any combination thereof.

In another embodiment, a method to produce a glucan ether composition is provided comprising:
a. providing an α-glucan oligomer/polymer composition comprising:
  i. 25-35 α-(1,3) glycosidic linkages;
  ii. 55-75% α-(1,6) glycosidic linkages;
  iii. 5-15% α-(1,3,6) glycosidic linkages;
  iv. a weight average molecular weight of less than 5000 Daltons;
  v. a viscosity of less than 0.25 Pascal second (Pa·s) at 12 wt % in water 20° C.;
  vi. a solubility of at least 20% (w/w) in water at 25° C.; and
  vii. a polydispersity index of less than 5;
b. contacting the α-glucan oligomer/polymer composition of (a) in a reaction under alkaline conditions with at least one etherification agent comprising an organic group; whereby an α-glucan ether is produced has a degree of substitution (DoS) with at least one organic group of about 0.05 to about 3.0; and
c. optionally isolating the α-glucan ether produced in step (b).

A textile, yarn, fabric or fiber may be modified to comprise (e.g., blended or coated with) the above α-glucan oligomer/polymer composition or the corresponding α-glucan ether composition. In another embodiment, a textile, yarn, fabric or fiber is provided comprising:
a. an α-glucan oligomer/polymer composition comprising:
  i. 25-35 α-(1,3) glycosidic linkages;
  ii. 55-75% α-(1,6) glycosidic linkages;
  iii. 5-15% α-(1,3,6) glycosidic linkages;

iv. a weight average molecular weight of less than 5000 Daltons;
v. a viscosity of less than 0.25 Pascal second (Pa·s) at 12 wt % in water 20° C.;
vi. a solubility of at least 20% (w/w) in water at 25° C.; and
vii. a polydispersity index of less than 5;
b. a glucan ether composition comprising
i. 25-35 α-(1,3) glycosidic linkages;
ii. 55-75% α-(1,6) glycosidic linkages;
iii. 5-15% α-(1,3,6) glycosidic linkages;
iv. a weight average molecular weight of less than 5000 Daltons;
v. a viscosity of less than 0.25 Pascal second (Pa·s) at 12 wt % in water 20° C.;
vi. a solubility of at least 20% (w/w) in water at 25° C.; and
vii. a polydispersity index of less than 5;
wherein the glucan ether composition has a degree of substitution (DoS) with at least one organic group of about 0.05 to about 3.0; or
c. any combination thereof.

BRIEF DESCRIPTION OF THE BIOLOGICAL SEQUENCES

The following sequences comply with 37 C.F.R. §§ 1.821-1.825 ("Requirements for Patent Applications Containing Nucleotide Sequences and/or Amino Acid Sequence Disclosures—the Sequence Rules") and are consistent with World Intellectual Property Organization (WIPO) Standard ST.25 (2009) and the sequence listing requirements of the European Patent Convention (EPC) and the Patent Cooperation Treaty (PCT) Rules 5.2 and 49.5(a-bis), and Section 208 and Annex C of the Administrative Instructions. The symbols and format used for nucleotide and amino acid sequence data comply with the rules set forth in 37 C.F.R. § 1.822.

SEQ ID NO: 1 is the amino acid sequence of the *Paenibacillus humicus* mutanase as provided in GENBANK® gi:257153265 where GENBANK® gi: 257153264 is the corresponding polynucleotide sequence.

SEQ ID NO: 2 is the nucleic acid sequence encoding the *Paenibacillus humicus* mutanase (GENBANK® gi: 257153265 where GENBANK® gi: 257153264 is the corresponding polynucleotide sequence) used for expression in *E. coli* BL21(DE3).

SEQ ID NO: 3 is the amino acid sequence of the mature *Paenibacillus humicus* mutanase (GENBANK® gi: 257153264; referred to herein as the "3264 mutanase" or "mut3264") used for expression in *E. coli* BL21(DE3).

SEQ ID NO: 4 is the amino acid sequence of the *B. subtilis* AprE signal peptide used in the expression vector that was coupled to various enzymes for expression in *B. subtilis*.

SEQ ID NO: 5 is the nucleic acid sequence encoding the *Paenibacillus humicus* mutanase used for expression in *B. subtilis* host BG6006.

SEQ ID NO: 6 is the amino acid sequence of the mature *Paenibacillus humicus* mutanase used for expression in *B. subtilis* host BG6006. As used herein, this mutanase may also be referred to herein as "mut3264".

SEQ ID NO: 7 is the nucleic acid sequence encoding the *Penicillium marneffei* ATCC® 18224™ mutanase.

SEQ ID NO: 8 is the amino acid sequence of the *Penicillium marneffei* ATCC® 18224™ mutanase (GENBANK® gi: 212533325; also referred to herein as the "3325 mutanase" or "mut3325").

SEQ ID NO: 9 is the polynucleotide sequence of plasmid pTrex3.

SEQ ID NO: 10 is the amino acid sequence of the *Lactobacillus reuteri* glucosyltransferase as found in GENBANK® gi:51574154.

SEQ ID NO: 11 is the nucleic acid sequence encoding a truncated version of the *Lactobacillus reuteri* glucosyltransferase (GENBANK® gi:51574154).

SEQ ID NO: 12 is the amino acid sequence encoding the truncated *Lactobacillus reuteri* glucosyltransferase referred to herein as "GTF4154".

SEQ ID NO: 13 is the nucleic acid sequence of a polynucleotide terminator sequence.

SEQ ID NO: 14 is the nucleic acid sequence of a polynucleotide linker sequence.

DETAILED DESCRIPTION

In this disclosure, a number of terms and abbreviations are used. The following definitions apply unless specifically stated otherwise.

As used herein, the articles "a", "an", and "the" preceding an element or component are intended to be nonrestrictive regarding the number of instances (i.e., occurrences) of the element or component.

Therefore "a", "an", and "the" should be read to include one or at least one, and the singular word form of the element or component also includes the plural unless the number is obviously meant to be singular.

As used herein, the term "comprising" means the presence of the stated features, integers, steps, or components as referred to in the claims, but that it does not preclude the presence or addition of one or more other features, integers, steps, components or groups thereof. The term "comprising" is intended to include embodiments encompassed by the terms "consisting essentially of" and "consisting of". Similarly, the term "consisting essentially of" is intended to include embodiments encompassed by the term "consisting of".

As used herein, the term "about" modifying the quantity of an ingredient or reactant employed refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

Where present, all ranges are inclusive and combinable. For example, when a range of "1 to 5" is recited, the recited range should be construed as including ranges "1 to 4", "1 to 3", "1-2", "1-2 & 4-5", "1-3 & 5", and the like.

As used herein, the term "obtainable from" shall mean that the source material (for example, sucrose) is capable of being obtained from a specified source, but is not necessarily limited to that specified source.

As used herein, the term "effective amount" will refer to the amount of the substance used or administered that is suitable to achieve the desired effect. The effective amount of material may vary depending upon the application. One of skill in the art will typically be able to determine an effective amount for a particular application or subject without undo experimentation.

The terms "percent by volume", "volume percent", "vol %" and "v/v %" are used interchangeably herein. The percent by volume of a solute in a solution can be determined using the formula: [(volume of solute)/(volume of solution)]×100%.

The terms "percent by weight", "weight percentage (wt %)" and "weight-weight percentage (% w/w)" are used interchangeably herein. Percent by weight refers to the percentage of a material on a mass basis as it is comprised in a composition, mixture, or solution.

The terms "increased", "enhanced" and "improved" are used interchangeably herein. These terms refer to a greater quantity or activity such as a quantity or activity slightly greater than the original quantity or activity, or a quantity or activity in large excess compared to the original quantity or activity, and including all quantities or activities in between. Alternatively, these terms may refer to, for example, a quantity or activity that is at least 1%, 2%, 3%, 4%, 5%, 6%, 7%, 8%, 9%, 10%, 11%, 12%, 13%, 14%, 15%, 16%, 17%, 18%, 19% or 20% more than the quantity or activity for which the increased quantity or activity is being compared.

As used herein, the term "isolated" means a substance in a form or environment that does not occur in nature. Non-limiting examples of isolated substances include (1) any non-naturally occurring substance, (2) any substance including, but not limited to, any host cell, enzyme, variant, nucleic acid, protein, peptide or cofactor, that is at least partially removed from one or more or all of the naturally occurring constituents with which it is associated in nature; (3) any substance modified by the hand of man relative to that substance found in nature; or (4) any substance modified by increasing the amount of the substance relative to other components with which it is naturally associated.

As used herein, term "water soluble" will refer to the present glucan oligomer/polymer compositions that are soluble at 20 wt % or higher in pH 7 water at 25° C.

As used herein, the terms "soluble glucan fiber", "α-glucan fiber", "α-glucan polymer", "α-glucan oligosaccharide", "α-glucan polysaccharide", "α-glucan oligomer", "α-glucan oligomer/polymer", "α-glucan polymer", and "soluble glucan fiber composition" refer to the present α-glucan polymer composition (non-derivatized; i.e., not an α-glucan ether) comprised of water soluble glucose oligomers having a glucose polymerization degree of 3 or more. The present soluble glucan polymer composition is enzymatically synthesized from sucrose (α-D-Glucopyranosyl β-D-fructofuranoside; CAS #57-50-1) obtainable from, for example, sugarcane and/or sugar beets. In one embodiment, the present soluble α-glucan polymer composition is not alternan or maltoalternan oligosaccharide.

As used herein, "weight average molecular weight" or "$M_w$" is calculated as $M_w = \Sigma N_i M_i^2 / \Sigma N_i M_i$; where $M_i$ is the molecular weight of a chain and $N_i$ is the number of chains of that molecular weight. The weight average molecular weight can be determined by technics such as static light scattering, small angle neutron scattering, X-ray scattering, and sedimentation velocity.

As used herein, "number average molecular weight" or "$M_n$" refers to the statistical average molecular weight of all the polymer chains in a sample. The number average molecular weight is calculated as $M_n = \Sigma N_i M_i / \Sigma N_i$ where $M_i$ is the molecular weight of a chain and $N_i$ is the number of chains of that molecular weight. The number average molecular weight of a polymer can be determined by technics such as gel permeation chromatography, viscometry via the (Mark-Houwink equation), and colligative methods such as vapor pressure osmometry, end-group determination or proton NMR.

As used herein, "polydispersity index", "PDI", "heterogeneity index", and "dispersity" refer to a measure of the distribution of molecular mass in a given polymer (such as a glucose oligomer) sample and can be calculated by dividing the weight average molecular weight by the number average molecular weight (PDI=$M_w/M_n$).

It shall be noted that the terms "glucose" and "glucopyranose" as used herein are considered as synonyms and used interchangeably. Similarly the terms "glucosyl" and "glucopyranosyl" units are used herein are considered as synonyms and used interchangeably.

As used herein, "glycosidic linkages" or "glycosidic bonds" will refer to the covalent the bonds connecting the sugar monomers within a saccharide oligomer (oligosaccharides and/or polysaccharides). Example of glycosidic linkage may include α-linked glucose oligomers with 1,6-α-D-glycosidic linkages (herein also referred to as α-D-(1,6) linkages or simply "α-(1,6)" linkages); 1,3-α-D-glycosidic linkages (herein also referred to as α-D-(1,3) linkages or simply "α-(1,3)" linkages; 1,4-α-D-glycosidic linkages (herein also referred to as α-D-(1,4) linkages or simply "α-(1,4)" linkages; 1,2-α-D-glycosidic linkages (herein also referred to as α-D-(1,2) linkages or simply "α-(1,2)" linkages; and combinations of such linkages typically associated with branched saccharide oligomers.

As used herein, the terms "glucansucrase", "glucosyltransferase", "glucoside hydrolase type 70", "GTF", and "GS" will refer to transglucosidases classified into family 70 of the glycoside-hydrolases typically found in lactic acid bacteria such as *Streptococcus, Leuconostoc, Weisella* or *Lactobacillus* genera (see <u>C</u>arbohydrate <u>A</u>ctive <u>E</u>nzymes database; "CAZy"; Cantarel et al., (2009) *Nucleic Acids Res* 37:D233-238). The GTF enzymes are able to polymerize the D-glucosyl units of sucrose to form homooligosaccharides or homopolysaccharides. Depending upon the specificity of the GTF enzyme, linear and/or branched glucans comprising various glycosidic linkages may be formed such as α-(1,2), α-(1,3), α-(1,4) and α-(1,6). Glucosyltransferases may also transfer the D-glucosyl units onto hydroxyl acceptor groups. A non-limiting list of acceptors may include carbohydrates, alcohols, polyols or flavonoids. Specific acceptors may also include maltose, isomaltose, isomaltotriose, and methyl-α-D-glucan, to name a few. The structure of the resultant glucosylated product is dependent upon the enzyme specificity. In one embodiment, the polypeptide having glucosyltransferase activity comprises an amino acid sequence having at least 90%, preferably at least 91, 92, 93, 94, 95, 96, 97, 98, 99 or 100% identity to SEQ ID NO: 10 or 12. In a further embodiment, the polypeptide having glucosyltransferase activity comprises an amino acid sequence having at least 95% identity, preferably 96, 97, 98, 99 or 100% identity to SEQ ID NO: 12. In one aspect, the glucosyltransferase is expressed in a truncated and/or mature form.

As used herein, the term "isomaltooligosaccharide" or "IMO" refers to a glucose oligomers comprised essentially of α-D-(1,6) glycosidic linkage typically having an average size of DP 2 to 20. Isomaltooligosaccharides can be produced commercially from an enzymatic reaction of α-amylase, pullulanase, β-amylase, and α-glucosidase upon corn starch or starch derivative products. Commercially available products comprise a mixture of isomaltooligosaccharides (DP ranging from 3 to 8, e.g., isomaltotriose, isomaltotetraose, isomaltopentaose, isomaltohexaose, isomaltoheptaose, isomaltooctaose) and may also include panose.

As used herein, the term "dextran" refers to water soluble α-glucans comprising at least 95% α-D-(1,6) glycosidic linkages (typically with up to 5% α-D-(1,3) glycosidic linkages at branching points). Dextrans often have an average molecular weight above 1000 kDa. As used herein, enzymes capable of synthesizing dextran from sucrose may be described as "dextransucrases" (EC 2.4.1.5).

As used herein, the term "mutan" refers to water insoluble α-glucans comprised primarily (50% or more of the glycosidic linkages present) of 1,3-α-D glycosidic linkages and typically have a degree of polymerization (DP) that is often greater than 9. Enzymes capable of synthesizing mutan or α-glucan oligomers comprising greater than 50% 1,3-α-D glycosidic linkages from sucrose may be described as "mutansucrases" (EC 2.4.1.-) with the proviso that the enzyme does not produce alternan.

As used herein, the term "alternan" refers to α-glucans having alternating 1,3-α-D glycosidic linkages and 1,6-α-D glycosidic linkages over at least 50% of the linear oligosaccharide backbone. Enzymes capable of synthesizing alternan from sucrose may be described as "alternansucrases" (EC 2.4.1.140).

As used herein, the term "reuteran" refers to soluble α-glucan comprised 1,4-α-D-glycosidic linkages (typically >50%); 1,6-α-D-glycosidic linkages; and 4,6-disubstituted α-glucosyl units at the branching points. Enzymes capable of synthesizing reuteran from sucrose may be described as "reuteransucrases" (EC 2.4.1.-).

As used herein, the terms "α-glucanohydrolase" and "glucanohydrolase" will refer to an enzyme capable of hydrolyzing an α-glucan oligomer. As used herein, the glucanohydrolase may be defined by the endohydrolysis activity towards certain α-D-glycosidic linkages. Examples may include, but are not limited to, dextranases (EC 3.2.1.1; capable of endohydrolyzing α-(1,6)-linked glycosidic bonds), mutanases (EC 3.2.1.59; capable of endohydrolyzing α-(1,3)-linked glycosidic bonds), and alternanases (EC 3.2.1.-; capable of endohydrolytically cleaving alternan). Various factors including, but not limited to, level of branching, the type of branching, and the relative branch length within certain α-glucans may adversely impact the ability of an α-glucanohydrolase to endohydrolyze some glycosidic linkages.

As used herein, the term "dextranase" (α-1,6-glucan-6-glucanohydrolase; EC 3.2.1.11) refers to an enzyme capable of endohydrolysis of 1,6-α-D-glycosidic linkages (the linkage predominantly found in dextran). Dextranases are known to be useful for a number of applications including the use as ingredient in dentifrice for prevention of dental caries, plaque and/or tartar and for hydrolysis of raw sugar juice or syrup of sugar canes and sugar beets. Several microorganisms are known to be capable of producing dextranases, among them fungi of the genera *Penicillium, Paecilomyces, Aspergillus, Fusarium, Spicaria, Verticillium, Helminthosporium* and *Chaetomium*; bacteria of the genera *Lactobacillus, Streptococcus, Cellvibrio, Cytophaga, Brevibacterium, Pseudomonas, Corynebacterium, Arthrobacter* and *Flavobacterium*, and yeasts such as *Lipomyces starkeyi*. Food grade dextranases are commercially available. An example of a food grade dextrinase is DEXTRANASE® Plus L, an enzyme from *Chaetomium erraticum* sold by Novozymes A/S, Bagsvaerd, Denmark. In a preferred aspect, the dextranase is the *Chaetomium erraticum* dextranase. In further embodiment, the dextranase is Dextranase L from *Chaetomium erraticum*.

As used herein, the term "mutanase" (glucan endo-1,3-α-glucosidase; EC 3.2.1.59) refers to an enzyme which hydrolytically cleaves 1,3-α-D-glycosidic linkages (the linkage predominantly found in mutan). Mutanases are available from a variety of bacterial and fungal sources. A non-limiting list of mutanases is provided as amino acid sequences 1, 3, 6, and 8. In a preferred embodiment, the mutanase comprises an amino acid sequence having at least 90% identity, preferably 91, 92, 93, 94, 95, 96, 97, 98, 99 or 100% identity to SEQ ID NOs 1, 3, 6 or 8. In a further preferred embodiment, the mutanase comprises at least 95% identity, preferably 96, 97, 98, 99 or 100% identity to SEQ ID NO: 3.

As used herein, the term "alternanase" (EC 3.2.1.-) refers to an enzyme which endo-hydrolytically cleaves alternan (U.S. Pat. No. 5,786,196 to Cote et al.).

As used herein, the term "wild type enzyme" will refer to an enzyme (full length and active truncated forms thereof) comprising the amino acid sequence as found in the organism from which it was obtained and/or annotated. The enzyme (full length or catalytically active truncation thereof) may be recombinantly produced in a microbial host cell. The enzyme is typically purified prior to being used as a processing aid in the production of the present soluble α-glucan oligomer/polymer composition. In one aspect, a combination of at least two wild type enzymes simultaneously present in the reaction system is used in order to obtain the present α-glucan polymer composition. In another aspect, under certain reaction conditions (for example, a reaction temperature around 47° C. to 50° C.) it may be possible to use a single wild type glucosyltransferase to produce the present soluble α-glucan polymer (see Examples 38, 44, and 45). In another aspect, the present method comprises a single reaction chamber comprising at least one glucosyltransferase capable of forming a soluble α-glucan polymer composition comprising 50% or more α-(1,3) glycosidic linkages (such as a mutansucrase) and at least one α-glucanohydrolase having endohydrolysis activity for the α-glucan synthesized from the glucosyltransferase(s) present in the reaction system.

As used herein, the terms "substrate for the enzymatic reaction" and "suitable substrate for α-glucan polymer synthesis" will refer to a composition comprising sucrose. In one embodiment, the substrate composition may further comprise one or more suitable acceptors, such as maltose, isomaltose, isomaltotriose, and methyl-α-D-glucan, to name a few. In one embodiment, a combination of at least one glucosyltransferase capable for forming glucose oligomers is used in combination with at least one α-glucanohydrolase in the same reaction mixture (i.e., they are simultaneously present and active in the reaction mixture). As such the "substrate" for the α-glucanohydrolase is the glucose oligomers concomitantly being synthesized in the reaction system by the glucosyltransferase from sucrose. In one aspect, a two-enzyme method (i.e., at least one glucosyltransferase (GTF) and at least one α-glucanohydrolase) where the enzymes are not used concomitantly in the reaction mixture is excluded, by proviso, from the present methods.

As used herein, the terms "suitable enzymatic reaction mixture", "suitable enzymatic reaction components", "suitable enzymatic aqueous reaction mixture", and "enzymatic reaction mixture", refer to the materials (suitable substrate(s)) and water in which the reactants come into contact with the enzyme(s). The suitable reaction components may be comprised of a plurality of enzymes. In one aspect, the suitable reaction components comprises at least one glucansucrase enzyme. In a further aspect, the suitable reaction components comprise at least one glucansucrase and at least one α-glucanohydrolase.

As used herein, "one unit of glucansucrase activity" or "one unit of glucosyltransferase activity" is defined as the amount of enzyme required to convert 1 umol of sucrose per minute when incubated with 200 g/L sucrose at pH 5.5 and 37° C. The sucrose concentration was determined using HPLC.

As used herein, "one unit of dextranase activity" is defined as the amount of enzyme that forms 1 μmol reducing sugar per minute when incubated with 0.5 mg/mL dextran substrate at pH 5.5 and 37° C. The reducing sugars were determined using the PAHBAH assay (Lever M., (1972), A New Reaction for Colorimetric Determination of Carbohydrates, *Anal. Biochem.* 47, 273-279).

As used herein, "one unit of mutanase activity" is defined as the amount of enzyme that forms 1 μmol reducing sugar per minute when incubated with 0.5 mg/mL mutan substrate at pH 5.5 and 37° C. The reducing sugars were determined using the PAHBAH assay (Lever M., supra).

As used herein, the term "enzyme catalyst" refers to a catalyst comprising an enzyme or combination of enzymes having the necessary activity to obtain the desired soluble α-glucan polymer composition. In certain embodiments, a combination of enzyme catalysts may be required to obtain the desired soluble glucan polymer composition. The enzyme catalyst(s) may be in the form of a whole microbial cell, permeabilized microbial cell(s), one or more cell components of a microbial cell extract(s), partially purified enzyme(s) or purified enzyme(s). In certain embodiments the enzyme catalyst(s) may also be chemically modified (such as by pegylation or by reaction with cross-linking reagents). The enzyme catalyst(s) may also be immobilized on a soluble or insoluble support using methods well-known to those skilled in the art; see for example, *Immobilization of Enzymes and Cells*; Gordon F. Bickerstaff, Editor; Humana Press, Totowa, N.J., USA; 1997.

The term "resistance to enzymatic hydrolysis" will refer to the relative stability of the present materials (α-glucan oligomers/polymers and/or the corresponding α-glucan ether compounds produced by the etherification of the present α-glucan oligomers/polymers) to enzymatic hydrolysis. The resistance to hydrolysis will be particular important for use of the present materials in applications wherein enzymes are often present, such as in fabric care and laundry care applications. In one embodiment, the α-glucan oligomers/polymers and/or the corresponding α-glucan ether compounds produced by the etherification of the present α-glucan oligomers/polymers are resistant to cellulases (i.e., cellulase resistant). In another embodiment, the α-glucan oligomers/polymers and/or the corresponding α-glucan ether compounds produced by the etherification of the present α-glucan oligomers/polymers are resistant to proteases (i.e., protease resistant). In another embodiment, the α-glucan oligomers/polymers and/or the corresponding α-glucan ether compounds produced by the etherification of the present α-glucan oligomers/polymers are resistant to amylases (i.e., amylase resistant). In a preferred aspect, α-glucan oligomers/polymers and/or the corresponding α-glucan ether compounds produced by the etherification of the present α-glucan oligomers/polymers are resistant to multiple classes of enzymes (combinations of cellulases, proteases, and/or amylases). Resistance to any particular enzyme will be defined as having at least 50%, preferably at least 60, 70, 80, 90, 95 or 100% of the materials remaining after treatment with the respective enzyme. The % remaining may be determined by measuring the supernatant after enzyme treatment using SEC-HPLC. The assay to measure enzyme resistance may using the following: A sample of the soluble material (e.g., 100 mg to is added to 10.0 mL water in a 20-mL scintillation vial and mixed using a PTFE magnetic stir bar to create a 1 wt % solution. The reaction is run at pH 7.0 at 20° C. After the fiber is complete dissolved, 1.0 mL (1 wt % enzyme formulation) of cellulase (PURADEX® EGL), amylase (PURASTAR® ST L) or protease (SAVINASE® 16.0 L) is added and the solution is mixed for 72 hrs at 20° C. The reaction mixture is heated to 70° C. for 10 minutes to inactivate the added enzyme, and the resulting mixture is cooled to room temperature and centrifuged to remove any precipitate. The supernatant is analyzed by SEC-HPLC for recovered oligomers/polymers and compared to a control where no enzyme was added to the reaction mixture. Percent changes in area counts for the respective oligomers/polymers may be used to test the relative resistance of the materials to the respective enzyme treatment. Percent changes in area count for total≥DP3$^+$ fibers will be used to assess the relative amount of materials remaining after treatment with a particular enzyme. Materials having a percent recovery of at least 50%, preferably at least 60, 70, 80, 90, 95 or 100% will be considered resistant to the respective enzyme treatment (e.g., "cellulase resistant", "protease resistant" and/or "amylase resistant").

The terms "α-glucan ether compound", "α-glucan ether composition", "α-glucan ether", and "α-glucan ether derivative" are used interchangeably herein. An α-glucan ether compound herein is the present α-glucan polymer that has been etherified with one or more organic groups such that the compound has a degree of substitution (DoS) with one or more organic groups of about 0.05 to about 3.0. Such etherification occurs at one or more hydroxyl groups of at least 30% of the glucose monomeric units of the α-glucan polymer.

An α-glucan ether compound is termed an "ether" herein by virtue of comprising the substructure —$C_G$—O—C—, where "—$C_G$—" represents a carbon atom of a glucose monomeric unit of an α-glucan ether compound (where such carbon atom was bonded to a hydroxyl group [—OH] in the α-glucan polymer precursor of the ether), and where "—C—" is a carbon atom of the organic group. Thus, for example, with regard to a glucose monomeric unit (G) involved in -1,3-G-1,3- within an ether herein, $C_G$ atoms 2, 4 and/or 6 of the glucose (G) may independently be linked to an OH group or be in ether linkage to an organic group. Similarly, for example, with regard to a glucose monomeric unit (G) involved in -1,3-G-1,6- within an ether herein, $C_G$ atoms 2, 4 and/or 6 of the glucose (G) may independently be linked to an OH group or be in ether linkage to an organic group. Also, for example, with regard to a glucose monomeric unit (G) involved in -1,6-G-1,6- within an ether herein, $C_G$ atoms 2, 3 and/or 4 of the glucose (G) may independently be linked to an OH group or be in ether linkage to an organic group. Similarly, for example, with regard to a glucose monomeric unit (G) involved in -1,6-G-1,3- within an ether herein, $C_G$ atoms 2, 3 and/or 4 of the glucose (G) may independently be linked to an OH group or be in ether linkage to an organic group.

It would be understood that a "glucose" monomeric unit of an α-glucan ether compound herein typically has one or more organic groups in ether linkage. Thus, such a glucose monomeric unit can also be referred to as an etherized glucose monomeric unit.

The α-glucan ether compounds disclosed herein are synthetic, man-made compounds. Likewise, compositions comprising the present α-glucan polymer are synthetic, man-made compounds.

An "organic group" group as used herein can refer to a chain of one or more carbons that (i) has the formula —$C_nH_{2n+1}$ (i.e., an alkyl group, which is completely saturated) or (ii) is mostly saturated but has one or more hydrogens substituted with another atom or functional group (i.e., a "substituted alkyl group"). Such substitution may be with one or more hydroxyl groups, oxygen atoms (thereby forming an aldehyde or ketone group), carboxyl groups, or other alkyl groups. Thus, as examples, an organic group herein can be an alkyl group, carboxy alkyl group, or hydroxy alkyl group. An organic group herein may thus be uncharged or anionic (an example of an anionic organic group is a carboxy alkyl group).

A "carboxy alkyl" group herein refers to a substituted alkyl group in which one or more hydrogen atoms of the alkyl group are substituted with a carboxyl group. A "hydroxy alkyl" group herein refers to a substituted alkyl group in which one or more hydrogen atoms of the alkyl group are substituted with a hydroxyl group.

An "organic group" can alternatively refer to a "positively charged organic group". A positively charged organic group as used herein refers to a chain of one or more carbons ("carbon chain") that has one or more hydrogens substituted with another atom or functional group (i.e., a "substituted alkyl group"), where one or more of the substitutions is with a positively charged group. Where a positively charged organic group has a substitution in addition to a substitution with a positively charged group, such additional substitution may be with one or more hydroxyl groups, oxygen atoms (thereby forming an aldehyde or ketone group), alkyl groups, and/or additional positively charged groups. A positively charged organic group has a net positive charge since it comprises one or more positively charged groups.

The terms "positively charged group", "positively charged ionic group" and "cationic group" are used interchangeably herein. A positively charged group comprises a cation (a positively charged ion). Examples of positively charged groups include substituted ammonium groups, carbocation groups and acyl cation groups.

A composition that is "positively charged" is repelled from other positively charged substances, but attracted to negatively charged substances.

The terms "substituted ammonium group", "substituted ammonium ion" and "substituted ammonium cation" are used interchangeably herein. A substituted ammonium group herein comprises structure I:

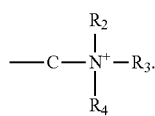

(I)

$R_2$, $R_3$ and $R_4$ in structure I each independently represent a hydrogen atom or an alkyl, aryl, cycloalkyl, aralkyl, or alkaryl group. The carbon atom (C) in structure I is part of the chain of one or more carbons ("carbon chain") of the positively charged organic group. The carbon atom is either directly ether-linked to a glucose monomer of the α-glucan polymer, or is part of a chain of two or more carbon atoms ether-linked to a glucose monomer of the α-glucan polymer/oligomer. The carbon atom in structure I can be —$CH_2$—, —CH— (where a H is substituted with another group such as a hydroxy group), or —C— (where both H's are substituted).

A substituted ammonium group can be a "primary ammonium group", "secondary ammonium group", "tertiary ammonium group", or "quaternary ammonium" group, depending on the composition of $R_2$, $R_3$ and $R_4$ in structure I. A primary ammonium group herein refers to structure I in which each of $R_2$, $R_3$ and $R_4$ is a hydrogen atom (i.e., —C—$NH_3^+$). A secondary ammonium group herein refers to structure I in which each of $R_2$ and $R_3$ is a hydrogen atom and $R_4$ is an alkyl, aryl, or cycloalkyl group. A tertiary ammonium group herein refers to structure I in which $R_2$ is a hydrogen atom and each of $R_3$ and $R_4$ is an alkyl, aryl, or cycloalkyl group. A quaternary ammonium group herein refers to structure I in which each of $R_2$, $R_3$ and $R_4$ is an alkyl, aryl, or cycloalkyl group (i.e., none of $R_2$, $R_3$ and $R_4$ is a hydrogen atom).

A quaternary ammonium poly alpha-1,3-1,6-glucan ether herein can comprise a trialkyl ammonium group (where each of $R_2$, $R_3$ and $R_4$ is an alkyl group), for example. A trimethylammonium group is an example of a trialkyl ammonium group, where each of $R_2$, $R_3$ and $R_4$ is a methyl group. It would be understood that a fourth member (i.e., $R_1$) implied by "quaternary" in this nomenclature is the chain of one or more carbons of the positively charged organic group that is ether-linked to a glucose monomer of the present α-glucan polymer/oligomer.

An example of a quaternary ammonium α-glucan ether compound is trimethylammonium hydroxypropyl α-glucan. The positively charged organic group of this ether compound can be represented as structure II:

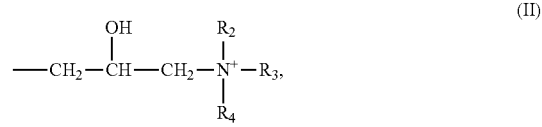

(II)

where each of $R_2$, $R_3$ and $R_4$ is a methyl group. Structure II is an example of a quaternary ammonium hydroxypropyl group.

A "halide" herein refers to a compound comprising one or more halogen atoms (e.g., fluorine, chlorine, bromine, iodine). A halide herein can refer to a compound comprising one or more halide groups such as fluoride, chloride, bromide, or iodide. A halide group may serve as a reactive group of an etherification agent.

When referring to the non-enzymatic etherification reaction, the terms "reaction", "reaction composition", and "etherification reaction" are used interchangeably herein and refer to a reaction comprising at least α-glucan polymer and an etherification agent. These components are typically mixed (e.g., resulting in a slurry) and/or dissolved in a solvent (organic and/or aqueous) comprising alkali hydroxide. A reaction is placed under suitable conditions (e.g., time, temperature) for the etherification agent to etherify one or more hydroxyl groups of the glucose units of α-glucan polymer/oligomer with an organic group, thereby yielding an α-glucan ether compound.

The term "alkaline conditions" herein refers to a solution or mixture pH of at least 10, 11 or 12. Alkaline conditions can be prepared by any means known in the art, such as by dissolving an alkali hydroxide in a solution or mixture.

The terms "etherification agent" and "alkylation agent" are used interchangeably herein. An etherification agent herein refers to an agent that can be used to etherify one or more hydroxyl groups of one or more glucose units of the present α-glucan polymer/oligomer with an organic group. An etherification agent thus comprises an organic group.

The term "degree of substitution" (DoS) as used herein refers to the average number of hydroxyl groups substituted in each monomeric unit (glucose) of the present α-glucan ether compound. Since there are at most three hydroxyl groups in a glucose monomeric unit in an α-glucan polymer/oligomer, the degree of substitution in an α-glucan ether compound herein can be no higher than 3.

The term "molar substitution" (M.S.) as used herein refers to the moles of an organic group per monomeric unit of the present α-glucan ether compound. Alternatively, M.S. can refer to the average moles of etherification agent used to react with each monomeric unit in the present α-glucan oligomer/polymer (M.S. can thus describe the degree of derivatization with an etherification agent). It is noted that the M.S. value for the present α-glucan may have no upper limit. For example, when an organic group containing a hydroxyl group (e.g., hydroxyethyl or hydroxypropyl) has been etherified to α-glucan, the hydroxyl group of the organic group may undergo further reaction, thereby coupling more of the organic group to the α-glucan oligomer/polymer.

The term "crosslink" herein refers to a chemical bond, atom, or group of atoms that connects two adjacent atoms in one or more polymer molecules. It should be understood that, in a composition comprising crosslinked α-glucan ether, crosslinks can be between at least two α-glucan ether molecules (i.e., intermolecular crosslinks); there can also be intramolecular crosslinking. A "crosslinking agent" as used herein is an atom or compound that can create crosslinks.

An "aqueous composition" herein refers to a solution or mixture in which the solvent is at least about 20 wt % water, for example, and which comprises the present α-glucan oligomer/polymer and/or the present α-glucan ether compound derivable from etherification of the present α-glucan oligomer/polymer. Examples of aqueous compositions herein are aqueous solutions and hydrocolloids.

The terms "hydrocolloid" and "hydrogel" are used interchangeably herein. A hydrocolloid refers to a colloid system in which water is the dispersion medium. A "colloid" herein refers to a substance that is microscopically dispersed throughout another substance. Therefore, a hydrocolloid herein can also refer to a dispersion, emulsion, mixture, or solution of α-glucan oligomer/polymer and/or one or more α-glucan ether compounds in water or aqueous solution.

The term "aqueous solution" herein refers to a solution in which the solvent is water. The present α-glucan oligomer/polymer and/or the present α-glucan ether compounds can be dispersed, mixed, and/or dissolved in an aqueous solution. An aqueous solution can serve as the dispersion medium of a hydrocolloid herein.

The terms "dispersant" and "dispersion agent" are used interchangeably herein to refer to a material that promotes the formation and stabilization of a dispersion of one substance in another. A "dispersion" herein refers to an aqueous composition comprising one or more particles (e.g., any ingredient of a personal care product, pharmaceutical product, food product, household product, or industrial product disclosed herein) that are scattered, or uniformly scattered, throughout the aqueous composition. It is believed that the present α-glucan oligomer/polymer and/or the present α-glucan ether compounds can act as dispersants in aqueous compositions disclosed herein.

The term "viscosity" as used herein refers to the measure of the extent to which a fluid or an aqueous composition such as a hydrocolloid resists a force tending to cause it to flow. Various units of viscosity that can be used herein include centipoise (cPs) and Pascal-second (Pas). A centipoise is one one-hundredth of a poise; one poise is equal to $0.100 \text{ kg} \cdot \text{m}^{-1} \cdot \text{s}^{-1}$. Thus, the terms "viscosity modifier" and "viscosity-modifying agent" as used herein refer to anything that can alter/modify the viscosity of a fluid or aqueous composition.

The term "shear thinning behavior" as used herein refers to a decrease in the viscosity of the hydrocolloid or aqueous solution as shear rate increases. The term "shear thickening behavior" as used herein refers to an increase in the viscosity of the hydrocolloid or aqueous solution as shear rate increases. "Shear rate" herein refers to the rate at which a progressive shearing deformation is applied to the hydrocolloid or aqueous solution. A shearing deformation can be applied rotationally.

The term "contacting" as used herein with respect to methods of altering the viscosity of an aqueous composition refers to any action that results in bringing together an aqueous composition with the present α-glucan polymer composition and/or α-glucan ether compound. "Contacting" may also be used herein with respect to treating a fabric, textile, yarn or fiber with the present α-glucan polymer and/or α-glucan ether compound to provide a surface substantive effect. Contacting can be performed by any means known in the art, such as dissolving, mixing, shaking, homogenization, spraying, treating, immersing, flushing, pouring on or in, combining, painting, coating, applying, affixing to and otherwise communicating an effective amount of the α-glucan polymer composition and/or α-glucan ether compound to an aqueous composition and/or directly to a fabric, fiber, yarn or textile to achieve the desired effect.

The terms "fabric", "textile", and "cloth" are used interchangeably herein to refer to a woven or non-woven material having a network of natural and/or artificial fibers. Such fibers can be thread or yarn, for example.

A "fabric care composition" herein is any composition suitable for treating fabric in some manner. Examples of such a composition include non-laundering fiber treatments (for desizing, scouring, mercerizing, bleaching, coloration, dying, printing, bio-polishing, anti-microbial treatments, anti-wrinkle treatments, stain resistance treatments, etc.), laundry care compositions (e.g., laundry care detergents), and fabric softeners.

The terms "heavy duty detergent" and "all-purpose detergent" are used interchangeably herein to refer to a detergent useful for regular washing of white and colored textiles at any temperature. The terms "low duty detergent" or "fine fabric detergent" are used interchangeably herein to refer to a detergent useful for the care of delicate fabrics such as viscose, wool, silk, microfiber or other fabric requiring special care. "Special care" can include conditions of using excess water, low agitation, and/or no bleach, for example.

The term "adsorption" herein refers to the adhesion of a compound (e.g., the present α-glucan polymer/oligomer and/or the present α-glucan ether compounds derived from the present α-glucan polymer/oligomers) to the surface of a material.

The terms "cellulase" and "cellulase enzyme" are used interchangeably herein to refer to an enzyme that hydrolyzes β-1,4-D-glucosidic linkages in cellulose, thereby partially or completely degrading cellulose. Cellulase can alternatively be referred to as "β-1,4-glucanase", for example, and can have endocellulase activity (EC 3.2.1.4), exocellulase activity (EC 3.2.1.91), or cellobiase activity (EC 3.2.1.21). A cellulase in certain embodiments herein can also hydrolyze β-1,4-D-glucosidic linkages in cellulose ether derivatives such as carboxymethyl cellulose. "Cellulose" refers to an insoluble polysaccharide having a linear chain of β-1,4-linked D-glucose monomeric units.

As used herein, the term "fabric hand" or "handle" is meant people's tactile sensory response towards fabric which may be physical, physiological, psychological, social or any combination thereof. In one embodiment, the fabric hand may be measured using a PhabrOmeter® System for measuring relative hand value (available from Nu Cybertek, Inc. Davis, Calif.) (American Association of Textile Chemists and Colorists (AATCC test method "202-2012, Relative Hand Value of Textiles: Instrumental Method").

As used herein, "pharmaceutically-acceptable" means that the compounds or compositions in question are suitable for use in contact with the tissues of humans and other animals without undue toxicity, incompatibility, instability, irritation, allergic response, and the like, commensurate with a reasonable benefit/risk ratio.

As used herein, the term "oligosaccharide" refers to polymers typically containing between 3 and about 30 monosaccharide units linked by α-glycosidic bonds.

As used herein the term "polysaccharide" refers to polymers typically containing greater than 30 monosaccharide units linked by α-glycosidic bonds.

As used herein, "personal care products" means products used in the cosmetic treatment hair, skin, scalp, and teeth, including, but not limited to shampoos, body lotions, shower gels, topical moisturizers, toothpaste, tooth gels, mouthwashes, mouthrinses, anti-plaque rinses, and/or other topical treatments. In some particularly preferred embodiments, these products are utilized on humans, while in other embodiments, these products find cosmetic use with non-human animals (e.g., in certain veterinary applications).

As used herein, an "isolated nucleic acid molecule", "isolated polynucleotide", and "isolated nucleic acid fragment" will be used interchangeably and refer to a polymer of RNA or DNA that is single- or double-stranded, optionally containing synthetic, non-natural or altered nucleotide bases. An isolated nucleic acid molecule in the form of a polymer of DNA may be comprised of one or more segments of cDNA, genomic DNA or synthetic DNA.

The term "amino acid" refers to the basic chemical structural unit of a protein or polypeptide. The following abbreviations are used herein to identify specific amino acids:

| Amino Acid | Three-Letter Abbreviation | One-Letter Abbreviation |
| --- | --- | --- |
| Alanine | Ala | A |
| Arginine | Arg | R |
| Asparagine | Asn | N |
| Aspartic acid | Asp | D |
| Cysteine | Cys | C |
| Glutamine | Gln | Q |
| Glutamic acid | Glu | E |
| Glycine | Gly | G |
| Histidine | His | H |
| Isoleucine | Ile | I |
| Leucine | Leu | L |
| Lysine | Lys | K |
| Methionine | Met | M |
| Phenylalanine | Phe | F |
| Proline | Pro | P |
| Serine | Ser | S |
| Threonine | Thr | T |
| Tryptophan | Trp | W |
| Tyrosine | Tyr | Y |
| Valine | Val | V |
| Any amino acid or as defined herein | Xaa | X |

For example, it is well known in the art that alterations in a gene which result in the production of a chemically equivalent amino acid at a given site, but do not affect the functional properties of the encoded protein are common. For the purposes of the present disclosure substitutions are defined as exchanges within one of the following five groups:

1. Small aliphatic, nonpolar or slightly polar residues: Ala, Ser, Thr (Pro, Gly);
2. Polar, negatively charged residues and their amides: Asp, Asn, Glu, Gln;
3. Polar, positively charged residues: His, Arg, Lys;
4. Large aliphatic, nonpolar residues: Met, Leu, Ile, Val (Cys); and
5. Large aromatic residues: Phe, Tyr, and Trp.

Thus, a codon for the amino acid alanine, a hydrophobic amino acid, may be substituted by a codon encoding another less hydrophobic residue (such as glycine) or a more hydrophobic residue (such as valine, leucine, or isoleucine). Similarly, changes which result in substitution of one negatively charged residue for another (such as aspartic acid for glutamic acid) or one positively charged residue for another (such as lysine for arginine) can also be expected to produce a functionally equivalent product. In many cases, nucleotide changes which result in alteration of the N-terminal and C-terminal portions of the protein molecule would also not be expected to alter the activity of the protein. Each of the proposed modifications is well within the routine skill in the art, as is determination of retention of biological activity of the encoded products.

As used herein, the term "codon optimized", as it refers to genes or coding regions of nucleic acid molecules for transformation of various hosts, refers to the alteration of codons in the gene or coding regions of the nucleic acid molecules to reflect the typical codon usage of the host organism without altering the polypeptide for which the DNA codes.

As used herein, "synthetic genes" can be assembled from oligonucleotide building blocks that are chemically synthesized using procedures known to those skilled in the art. These building blocks are ligated and annealed to form gene segments that are then enzymatically assembled to construct the entire gene. "Chemically synthesized", as pertaining to a DNA sequence, means that the component nucleotides were assembled in vitro. Manual chemical synthesis of DNA may be accomplished using well-established procedures, or automated chemical synthesis can be performed using one of a number of commercially available machines. Accordingly, the genes can be tailored for optimal gene expression based on optimization of nucleotide sequences to reflect the codon bias of the host cell. The skilled artisan appreciates the likelihood of successful gene expression if codon usage is biased towards those codons favored by the host. Determination of preferred codons can be based on a survey of genes derived from the host cell where sequence information is available.

As used herein, "gene" refers to a nucleic acid molecule that expresses a specific protein, including regulatory sequences preceding (5' non-coding sequences) and following (3' non-coding sequences) the coding sequence. "Native gene" refers to a gene as found in nature with its own regulatory sequences. "Chimeric gene" refers to any gene that is not a native gene, comprising regulatory and coding sequences that are not found together in nature. Accordingly, a chimeric gene may comprise regulatory sequences and coding sequences that are derived from different sources, or regulatory sequences and coding sequences derived from the same source, but arranged in a manner different from that found in nature. "Endogenous gene" refers to a native gene in its natural location in the genome of an organism. A "foreign" gene refers to a gene not normally found in the host organism, but that is introduced into the host organism by gene transfer. Foreign genes can comprise native genes inserted into a non-native organism, or chimeric genes. A "transgene" is a gene that has been introduced into the genome by a transformation procedure.

As used herein, "coding sequence" refers to a DNA sequence that codes for a specific amino acid sequence. "Suitable regulatory sequences" refer to nucleotide sequences located upstream (5' non-coding sequences), within, or downstream (3' non-coding sequences) of a coding sequence, and which influence the transcription, RNA processing or stability, or translation of the associated coding sequence. Regulatory sequences may include promoters, translation leader sequences, RNA processing site, effector binding sites, and stem-loop structures.

As used herein, the term "operably linked" refers to the association of nucleic acid sequences on a single nucleic acid molecule so that the function of one is affected by the other. For example, a promoter is operably linked with a coding sequence when it is capable of affecting the expression of that coding sequence, i.e., the coding sequence is under the transcriptional control of the promoter. Coding sequences can be operably linked to regulatory sequences in sense or antisense orientation.

As used herein, the term "expression" refers to the transcription and stable accumulation of sense (mRNA) or antisense RNA derived from the nucleic acid molecule. Expression may also refer to translation of mRNA into a polypeptide.

As used herein, "transformation" refers to the transfer of a nucleic acid molecule into the genome of a host organism, resulting in genetically stable inheritance. In the present disclosure, the host cell's genome includes chromosomal and extrachromosomal (e.g., plasmid) genes. Host organisms containing the transformed nucleic acid molecules are referred to as "transgenic", "recombinant" or "transformed" organisms.

As used herein, the term "sequence analysis software" refers to any computer algorithm or software program that is useful for the analysis of nucleotide or amino acid sequences. "Sequence analysis software" may be commercially available or independently developed. Typical sequence analysis software will include, but is not limited to, the GCG suite of programs (Wisconsin Package Version 9.0, Accelrys Software Corp., San Diego, Calif.), BLASTP, BLASTN, BLASTX (Altschul et al., *J. Mol. Biol.* 215:403-410 (1990)), and DNASTAR (DNASTAR, Inc. 1228 S. Park St. Madison, Wis. 53715 USA), CLUSTALW (for example, version 1.83; Thompson et al., *Nucleic Acids Research*, 22(22):4673-4680 (1994)), and the FASTA program incorporating the Smith-Waterman algorithm (W. R. Pearson, *Comput. Methods Genome Res.*, [Proc. Int. Symp.] (1994), Meeting Date 1992, 111-20. Editor(s): Suhai, Sandor. Publisher: Plenum, New York, N.Y.), Vector NTI (Informax, Bethesda, Md.) and Sequencher v. 4.05. Within the context of this application it will be understood that where sequence analysis software is used for analysis, that the results of the analysis will be based on the "default values" of the program referenced, unless otherwise specified. As used herein "default values" will mean any set of values or parameters set by the software manufacturer that originally load with the software when first initialized.

Structural and Functional Properties of the Soluble α-Glucan Oligomer/Polymer Composition The present soluble α-glucan oligomer/polymer composition was prepared from sucrose (e.g., cane sugar) using one or more enzymatic processing aids that have essentially the same amino acid sequences as found in nature (or active truncations thereof) from microorganisms which having a long history of exposure to humans (microorganisms naturally found in the oral cavity or found in foods such a beer, fermented soybeans, etc.). The soluble oligomers/polymers have low viscosity (enabling use in a broad range of applications), The present soluble α-glucan oligomer/polymer composition is characterized by the following combination of parameters:
 a. 25-35 α-(1,3) glycosidic linkages;
 b. 55-75% α-(1,6) glycosidic linkages;
 c. 5-15% α-(1,3,6) glycosidic linkages;
 d. a weight average molecular weight of less than 5000 Daltons;
 e. a viscosity of less than 0.25 Pascal second (Pa·s) at 12 wt % in water 20° C.;
 h. a solubility of at least 20% (w/w) in water at 25° C.; and
 i. a polydispersity index of less than 5.

In another embodiment, the present soluble α-glucan oligomer/polymer composition is characterized by
 a. 25-35 α-(1,3) glycosidic linkages;
 b. 55-65% α-(1,6) glycosidic linkages; and
 c. 5-15% α-(1,3,6) glycosidic linkages.

In a further embodiment, the present soluble α-glucan oligomer/polymer composition is characterized by
 a. 27-31 α-(1,3) glycosidic linkages;
 b. 57-61% α-(1,6) glycosidic linkages; and
 c. 7-11% α-(1,3,6) glycosidic linkages.

In another embodiment, in addition to the above mentioned glycosidic linkage content embodiments, the present soluble α-glucan oligomer/polymer composition further comprises less than 4%, preferably less than 2%, more preferably less than 1%, and most preferably less than 0.5% α-(1,4) glycosidic linkages.

In another embodiment, in addition the above mentioned glycosidic linkage content embodiments, the present α-glucan oligomer/polymer composition comprises a weight average molecular weight ($M_w$) of less than 5000 Daltons, preferably less than 2500 Daltons, more preferably between 500 and 2500 Daltons, and most preferably about 500 to about 2000 Daltons.

In another embodiment, in addition to any of the above features, the present α-glucan oligomer/polymer composition comprises a viscosity of less than 250 centipoise (cP) (0.25 Pascal second (Pas); preferably less than 10 centipoise (cP) (0.01 Pascal second (Pas)), preferably less than 7 cP (0.007 Pa·s), more preferably less than 5 cP (0.005 Pa·s), more preferably less than 4 cP (0.004 Pa·s), and most preferably less than 3 cP (0.003 Pa·s) at 12 wt % in water at 20° C.

In addition to any of the above embodiments, the present soluble α-glucan oligomer/polymer composition has a solubility of at least 20% (w/w), preferably at least 30%, 40%, 50%, 60%, or 70% in pH 7 water at 25° C.

In another embodiment, the present soluble α-glucan oligomer/polymer composition comprises a number average molecular weight (Mn) between 400 and 2500 g/mol, preferably 1000 to 2000 g/mol.

Compositions Comprising α-Glucan Oligomer/Polymers and/or α-Glucan Ethers

Depending upon the desired application, the present α-glucan oligomer/polymer composition and/or derivatives thereof (such as the present α-glucan ethers) may be formulated (e.g., blended, mixed, incorporated into, etc.) with one or more other materials and/or active ingredients suitable for use in laundry care, textile/fabric care, and/or personal care products. As such, the present disclosure includes compositions comprising the present glucan oligomer/polymer composition. The term "compositions comprising the present glucan oligomer/polymer composition" in this context may include, for example, aqueous formulations comprising the present glucan oligomer/polymer, rheology modifying compositions, fabric treatment/care compositions, laundry care formulations/compositions, fabric softeners, personal care compositions (hair, skin and oral care), and the like.

The present glucan oligomer/polymer composition may be directed as an ingredient in a desired product or may be blended with one or more additional suitable ingredients (ingredients suitable for fabric care applications, laundry care applications, and/or personal care applications). As such, the present disclosure comprises a fabric care, laundry care, or personal care composition comprising the present soluble α-glucan oligomer/polymer composition, the present α-glucan ethers, or a combination thereof. In one embodiment, the fabric care, laundry care or personal care composition comprises 0.01 to 99 wt % (dry solids basis), preferably 0.1 to 90 wt %, more preferably 1 to 90%, and most preferably 5 to 80 wt % of the glucan oligomer/polymer composition and/or the present α-glucan ether compounds.

In one embodiment, a fabric care composition is provided comprising:
a. an α-glucan oligomer/polymer composition comprising:
  i. 25-35 α-(1,3) glycosidic linkages;
  ii. 55-75% α-(1,6) glycosidic linkages;
  iii. 5-15% α-(1,3,6) glycosidic linkages;
  iv. a weight average molecular weight of less than 5000 Daltons;
  v. a viscosity of less than 0.25 Pascal second (Pa·s) at 12 wt % in water 20° C.;
  vi. a solubility of at least 20% (w/w) in water at 25° C.; and
  vii. a polydispersity index of less than 5; and
b. at least one additional fabric care ingredient.

In another embodiment, a laundry care composition is provided comprising:
a) an α-glucan oligomer/polymer composition comprising:
  i. 25-35 α-(1,3) glycosidic linkages;
  ii. 55-75% α-(1,6) glycosidic linkages;
  iii. 5-15% α-(1,3,6) glycosidic linkages;
  iv. a weight average molecular weight of less than 5000 Daltons;
  v. a viscosity of less than 0.25 Pascal second (Pa·s) at 12 wt % in water 20° C.;
  vi. a solubility of at least 20% (w/w) in water at 25° C.; and
  vii. a polydispersity index of less than 5; and
b) at least one additional laundry care ingredient.

In another embodiment, an α-glucan ether derived from the present α-glucan oligomer/polymer composition is provided comprising:
a. 25-35 α-(1,3) glycosidic linkages;
b. 55-75% α-(1,6) glycosidic linkages;
c. 5-15% α-(1,3,6) glycosidic linkages;
d. a weight average molecular weight of less than 5000 Daltons;
e. a viscosity of less than 0.25 Pascal second (Pa·s) at 12 wt % in water 20° C.;
f. a solubility of at least 20% (w/w) in water at 25° C.; and
g. a polydispersity index of less than 5; wherein the composition has a degree of substitution (DoS) with at least one organic group of about 0.05 to about 3.0.

In a further embodiment to any of the above embodiments, the glucan ether composition has a degree of substitution (DoS) with at least one organic group of about 0.05 to about 3.0.

In a further embodiment to any of the above embodiments, the glucan ether composition comprises at least one organic group is selected from the group consisting of carboxy alkyl group, hydroxy alkyl group, and alkyl group.

In a further embodiment to any of the above embodiments, the at least one organic group is selected from the group consisting of carboxymethyl, hydroxypropyl, dihydroxypropyl, hydroxyethyl, methyl, and ethyl group.

In a further embodiment to any of the above embodiments, the at least one organic group is a positively charged organic group.

In a further embodiment to any of the above embodiments, the glucan ether is a quaternary ammonium glucan ether.

In a further embodiment to any of the above embodiments, the glucan ether composition is a trimethylammonium hydroxypropyl glucan.

In a further embodiment to any of the above embodiments, an organic group may be an alkyl group such as a methyl, ethyl, propyl, butyl, pentyl, hexyl, heptyl, octyl, nonyl, or decyl group, for example.

In a further embodiment to any of the above embodiments, the organic group may be a substituted alkyl group in which there is a substitution on one or more carbons of the alkyl group. The substitution(s) may be one or more hydroxyl, aldehyde, ketone, and/or carboxyl groups. For example, a substituted alkyl group may be a hydroxy alkyl group, dihydroxy alkyl group, or carboxy alkyl group.

Examples of suitable hydroxy alkyl groups are hydroxymethyl (—CH$_2$OH), hydroxyethyl (e.g., —CH$_2$CH$_2$OH, —CH(OH)CH$_3$), hydroxypropyl (e.g., —CH$_2$CH$_2$CH$_2$OH, —CH$_2$CH(OH)CH$_3$, —CH(OH)CH$_2$CH$_3$), hydroxybutyl and hydroxypentyl groups. Other examples include dihydroxy alkyl groups (diols) such as dihydroxymethyl, dihydroxyethyl (e.g., —CH(OH)CH$_2$OH), dihydroxypropyl (e.g., —CH$_2$CH(OH)CH$_2$OH, —CH(OH)CH(OH)CH$_3$), dihydroxybutyl and dihydroxypentyl groups.

Examples of suitable carboxy alkyl groups are carboxymethyl (—CH$_2$COOH), carboxyethyl (e.g., —CH$_2$CH$_2$COOH, —CH(COOH)CH$_3$), carboxypropyl (e.g., —CH$_2$CH$_2$CH$_2$COOH, —CH$_2$CH(COOH)CH$_3$, —CH(COOH)CH$_2$CH$_3$), carboxybutyl and carboxypentyl groups.

Alternatively still, one or more carbons of an alkyl group can have a substitution(s) with another alkyl group. Examples of such substituent alkyl groups are methyl, ethyl and propyl groups. To illustrate, an organic group can be —CH(CH$_3$)CH$_2$CH$_3$ or —CH$_2$CH(CH$_3$)CH$_3$, for example, which are both propyl groups having a methyl substitution.

As should be clear from the above examples of various substituted alkyl groups, a substitution (e.g., hydroxy or carboxy group) on an alkyl group in certain embodiments may be bonded to the terminal carbon atom of the alkyl group, where the terminal carbon group is opposite the terminus that is in ether linkage to a glucose monomeric unit in an α-glucan ether compound. An example of this terminal substitution is the hydroxypropyl group —CH$_2$CH$_2$CH$_2$OH. Alternatively, a substitution may be on an internal carbon atom of an alkyl group. An example on an internal substitution is the hydroxypropyl group —CH$_2$CH(OH)CH$_3$. An alkyl group can have one or more substitutions, which may be the same (e.g., two hydroxyl groups [dihydroxy]) or different (e.g., a hydroxyl group and a carboxyl group).

In a further embodiment to any of the above embodiments, the α-glucan ether compounds disclosed herein may contain one type of organic group. Examples of such compounds contain a carboxy alkyl group as the organic group (carboxyalkyl α-glucan, generically speaking). A specific non-limiting example of such a compound is carboxymethyl α-glucan.

In a further embodiment to any of the above embodiments, α-glucan ether compounds disclosed herein can contain two or more different types of organic groups. Examples of such compounds contain (i) two different alkyl groups as organic groups, (ii) an alkyl group and a hydroxy alkyl group as organic groups (alkyl hydroxyalkyl α-glucan, generically speaking), (iii) an alkyl group and a carboxy alkyl group as organic groups (alkyl carboxyalkyl α-glucan, generically speaking), (iv) a hydroxy alkyl group and a carboxy alkyl group as organic groups (hydroxyalkyl carboxyalkyl α-glucan, generically speaking), (v) two different hydroxy alkyl groups as organic groups, or (vi) two different carboxy alkyl groups as organic groups. Specific non-limiting examples of such compounds include ethyl hydroxyethyl α-glucan, hydroxyalkyl methyl α-glucan, carboxymethyl hydroxyethyl α-glucan, and carboxymethyl hydroxypropyl α-glucan.

In a further embodiment to any of the above embodiments, the organic group herein can alternatively be a positively charged organic group. As defined above, a positively charged organic group comprises a chain of one or more carbons having one or more hydrogens substituted with another atom or functional group, where one or more of the substitutions is with a positively charged group.

A positively charged group may be a substituted ammonium group, for example. Examples of substituted ammonium groups are primary, secondary, tertiary and quaternary ammonium groups. Structure I depicts a primary, secondary, tertiary or quaternary ammonium group, depending on the composition of $R_2$, $R_3$ and $R_4$ in structure I. Each of $R_2$, $R_3$ and $R_4$ in structure I independently represent a hydrogen atom or an alkyl, aryl, cycloalkyl, aralkyl, or alkaryl group. Alternatively, each of $R_2$, $R_3$ and $R_4$ in can independently represent a hydrogen atom or an alkyl group. An alkyl group can be a methyl, ethyl, propyl, butyl, pentyl, hexyl, heptyl, octyl, nonyl, or decyl group, for example. Where two or three of $R_2$, $R_3$ and $R_4$ are an alkyl group, they can be the same or different alkyl groups.

A "primary ammonium α-glucan ether compound" herein can comprise a positively charged organic group having an ammonium group. In this example, the positively charged organic group comprises structure I in which each of $R_2$, $R_3$ and $R_4$ is a hydrogen atom. A non-limiting example of such a positively charged organic group is represented by structure II when each of $R_2$, $R_3$ and $R_4$ is a hydrogen atom. An example of a primary ammonium α-glucan ether compound can be represented in shorthand as ammonium α-glucan ether. It would be understood that a first member (i.e., $R_1$) implied by "primary" in the above nomenclature is the chain of one or more carbons of the positively charged organic group that is ether-linked to a glucose monomer of α-glucan.

A "secondary ammonium α-glucan ether compound" herein can comprise a positively charged organic group having a monoalkylammonium group, for example. In this example, the positively charged organic group comprises structure I in which each of $R_2$ and $R_3$ is a hydrogen atom and $R_4$ is an alkyl group. A non-limiting example of such a positively charged organic group is represented by structure II when each of $R_2$ and $R_3$ is a hydrogen atom and $R_4$ is an alkyl group. An example of a secondary ammonium α-glucan ether compound can be represented in shorthand herein as monoalkylammonium α-glucan ether (e.g., monomethyl-, monoethyl-, monopropyl-, monobutyl-, monopentyl-, monohexyl-, monoheptyl-, monooctyl-, mononoyl- or monodecyl-ammonium α-glucan ether). It would be understood that a second member (i.e., $R_1$) implied by "secondary" in the above nomenclature is the chain of one or more carbons of the positively charged organic group that is ether-linked to a glucose monomer of α-glucan.

A "tertiary ammonium α-glucan ether compound" herein can comprise a positively charged organic group having a dialkylammonium group, for example. In this example, the positively charged organic group comprises structure I in which $R_2$ is a hydrogen atom and each of $R_3$ and $R_4$ is an alkyl group. A non-limiting example of such a positively charged organic group is represented by structure II when $R_2$ is a hydrogen atom and each of $R_3$ and $R_4$ is an alkyl group. An example of a tertiary ammonium α-glucan ether compound can be represented in shorthand as dialkylammonium α-glucan ether (e.g., dimethyl-, diethyl-, dipropyl-, dibutyl-, dipentyl-, dihexyl-, diheptyl-, dioctyl-, dinonyl- or didecyl-ammonium α-glucan ether). It would be understood that a third member (i.e., $R_1$) implied by "tertiary" in the above nomenclature is the chain of one or more carbons of the positively charged organic group that is ether-linked to a glucose monomer of α-glucan.

A "quaternary ammonium α-glucan ether compound" herein can comprise a positively charged organic group having a trialkylammonium group, for example. In this example, the positively charged organic group comprises structure I in which each of $R_2$, $R_3$ and $R_4$ is an alkyl group. A non-limiting example of such a positively charged organic group is represented by structure II when each of $R_2$, $R_3$ and $R_4$ is an alkyl group. An example of a quaternary ammonium α-glucan ether compound can be represented in shorthand as trialkylammonium α-glucan ether (e.g., trimethyl-, triethyl-, tripropyl-, tributyl-, tripentyl-, trihexyl-, triheptyl-, trioctyl-, trinonyl- or tridecyl-ammonium α-glucan ether). It would be understood that a fourth member (i.e., $R_1$) implied by "quaternary" in the above nomenclature is the chain of one or more carbons of the positively charged organic group that is ether-linked to a glucose monomer of α-glucan.

Additional non-limiting examples of substituted ammonium groups that can serve as a positively charged group herein are represented in structure I when each of $R_2$, $R_3$ and $R_4$ independently represent a hydrogen atom; an alkyl group such as a methyl, ethyl, or propyl group; an aryl group such as a phenyl or naphthyl group; an aralkyl group such as a benzyl group; an alkaryl group; or a cycloalkyl group. Each of $R_2$, $R_3$ and $R_4$ may further comprise an amino group or a hydroxyl group, for example.

The nitrogen atom in a substituted ammonium group represented by structure I is bonded to a chain of one or more carbons as comprised in a positively charged organic group. This chain of one or more carbons ("carbon chain") is ether-linked to a glucose monomer of α-glucan, and may have one or more substitutions in addition to the substitution with the nitrogen atom of the substituted ammonium group. There can be 1, 2, 3, 4, 5, 6, 7, 8, 9 or 10 carbons, for example, in a carbon chain. To illustrate, the carbon chain of structure II is 3 carbon atoms in length.

Examples of a carbon chain of a positively charged organic group that do not have a substitution in addition to the substitution with a positively charged group include —$CH_2$—, —$CH_2CH_2$—, —$CH_2CH_2CH_2$—, —$CH_2CH_2CH_2CH_2$— and —$CH_2CH_2CH_2CH_2CH_2$—. In each of these examples, the first carbon atom of the chain is ether-linked to a glucose monomer of α-glucan, and the last carbon atom of the chain is linked to a positively charged group. Where the positively charged group is a substituted ammonium group, the last carbon atom of the chain in each of these examples is represented by the C in structure I.

Where a carbon chain of a positively charged organic group has a substitution in addition to a substitution with a positively charged group, such additional substitution may be with one or more hydroxyl groups, oxygen atoms (thereby forming an aldehyde or ketone group), alkyl groups (e.g., methyl, ethyl, propyl, butyl), and/or additional positively charged groups. A positively charged group is typically bonded to the terminal carbon atom of the carbon chain.

Examples of a carbon chain of a positively charged organic group having one or more substitutions with a hydroxyl group include hydroxyalkyl (e.g., hydroxyethyl, hydroxypropyl, hydroxybutyl, hydroxypentyl) groups and dihydroxyalkyl (e.g., dihydroxyethyl, dihydroxypropyl, dihydroxybutyl, dihydroxypentyl) groups. Examples of hydroxyalkyl and dihydroxyalkyl (diol) carbon chains include —CH(OH)—, —CH(OH)$CH_2$—, —C(OH)$_2$$CH_2$—, —$CH_2$CH(OH)$CH_2$—, —CH(OH)$CH_2CH_2$—, —CH(OH)CH(OH)$CH_2$—, —$CH_2CH_2$CH(OH)$CH_2$—, —$CH_2$CH(OH)$CH_2CH_2$—, —CH(OH)$CH_2CH_2CH_2$—, —$CH_2$CH(OH)CH(OH)$CH_2$—, —CH(OH)CH(OH)$CH_2CH_2$— and —CH(OH)$CH_2$CH(OH)$CH_2$—. In each of these examples, the first carbon atom of the chain is ether-linked to a glucose monomer of the present α-glucan, and the last carbon atom of the chain is linked to a positively charged group. Where the positively charged group is a substituted ammonium group, the last carbon atom of the chain in each of these examples is represented by the C in structure I.

Examples of a carbon chain of a positively charged organic group having one or more substitutions with an alkyl group include chains with one or more substituent methyl, ethyl and/or propyl groups. Examples of methylalkyl groups include —CH($CH_3$)$CH_2CH_2$— and —$CH_2$CH($CH_3$)$CH_2$—, which are both propyl groups having a methyl substitution. In each of these examples, the first carbon atom of the chain is ether-linked to a glucose monomer of the present α-glucan, and the last carbon atom of the chain is linked to a positively charged group. Where the positively charged group is a substituted ammonium group, the last carbon atom of the chain in each of these examples is represented by the C in structure I.

In a further embodiment to any of the above embodiments, the α-glucan ether compounds herein may contain one type of positively charged organic group. For example, one or more positively charged organic groups ether-linked to the glucose monomer of α-glucan may be trimethylammonium hydroxypropyl groups (structure II). Alternatively, α-glucan ether compounds disclosed herein can contain two or more different types of positively charged organic groups.

In a further embodiment to any of the above embodiments, α-glucan ether compounds herein can comprise at least one nonionic organic group and at least one anionic group, for example. As another example, α-glucan ether compounds herein can comprise at least one nonionic organic group and at least one positively charged organic group.

In a further embodiment to any of the above embodiments, α-glucan ether compounds may be derived from any of the present α-glucan oligomers/polymers disclosed herein. For example, the α-glucan ether compound can be produced by ether-derivatizing the present α-glucan oligomers/polymers using an etherification reaction as disclosed herein.

In certain embodiments, a composition comprising an α-glucan ether compound can be a hydrocolloid or aqueous solution having a viscosity of at least about 10 cPs. Alternatively, such a hydrocolloid or aqueous solution has a viscosity of at least about 100, 250, 500, 750, 1000, 1250, 1500, 1750, 2000, 2250, 2500, 3000, 3500, or 4000 cPs (or any integer between 100 and 4000 cPs), for example.

Viscosity can be measured with the hydrocolloid or aqueous solution at any temperature between about 3° C. to about 110° C. (or any integer between 3 and 110° C.). Alternatively, viscosity can be measured at a temperature between about 4° C. to 30° C., or about 20° C. to 25° C. Viscosity can be measured at atmospheric pressure (about 760 torr) or any other higher or lower pressure.

The viscosity of a hydrocolloid or aqueous solution disclosed herein can be measured using a viscometer or rheometer, or using any other means known in the art. It would be understood by those skilled in the art that a viscometer or rheometer can be used to measure the viscosity of those hydrocolloids and aqueous solutions that exhibit shear thinning behavior or shear thickening behavior (i.e., liquids with viscosities that vary with flow conditions). The viscosity of such embodiments can be measured at a rotational shear rate of about 10 to 1000 rpm (revolutions per minute) (or any integer between 10 and 1000 rpm), for example. Alternatively, viscosity can be measured at a rotational shear rate of about 10, 60, 150, 250, or 600 rpm.

The pH of a hydrocolloid or aqueous solution disclosed herein can be between about 2.0 to about 12.0. Alternatively, pH can be about 2.0, 3.0, 4.0, 5.0, 6.0, 7.0, 8.0, 9.0, 10.0, 11.0, 12.0; or between 5.0 to about 12.0; or between about 4.0 and 8.0; or between about 5.0 and 8.0.

An aqueous composition herein such as a hydrocolloid or aqueous solution can comprise a solvent having at least about 20 wt % water. In other embodiments, a solvent is at least about 30, 40, 50, 60, 70, 80, 90, or 100 wt % water (or any integer value between 20 and 100 wt %), for example.

In a further embodiment to any of the above embodiments, the α-glucan ether compound disclosed herein can be present in a hydrocolloid or aqueous solution at a weight percentage (wt %) of at least about 0.01%, 0.05%, 0.1%, 0.2%, 0.3%, 0.4%, 0.5%, 0.6%, 0.7%, 0.8%, 0.9%, 1.0%, 1.2%, 1.4%, 1.6%, 1.8%, 2.0%, 2.5%, 3.0%, 3.5%, 4.0%, 4.5%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or 30%, for example.

In a further embodiment to any of the above embodiments, the hydrocolloid or aqueous solution herein can comprise other components in addition to one or more α-glucan ether compounds. For example, the hydrocolloid or aqueous solution can comprise one or more salts such as a sodium salt (e.g., NaCl, $Na_2SO_4$). Other non-limiting examples of salts include those having (i) an aluminum, ammonium, barium, calcium, chromium (II or III), copper (I or II), iron (II or III), hydrogen, lead (II), lithium, magnesium, manganese (II or III), mercury (I or II), potassium, silver, sodium strontium, tin (II or IV), or zinc cation, and (ii) an acetate, borate, bromate, bromide, carbonate, chlorate, chloride, chlorite, chromate, cyanamide, cyanide, dichromate, dihydrogen phosphate, ferricyanide, ferrocyanide, fluoride, hydrogen carbonate, hydrogen phosphate, hydrogen sulfate, hydrogen sulfide, hydrogen sulfite, hydride, hydroxide, hypochlorite, iodate, iodide, nitrate, nitride, nitrite, oxalate, oxide, perchlorate, permanganate, peroxide, phosphate, phosphide, phosphite, silicate, stannate, stannite, sulfate, sulfide, sulfite, tartrate, or thiocyanate anion. Thus, any salt having a cation from (i) above and an anion from (ii) above can be in a hydrocolloid or aqueous solution, for example. A salt can be present in a hydrocolloid or aqueous solution at a wt % of about 0.01% to about 10.00% (or any hundredth increment between 0.01% and 10.00%), for example.

In a further embodiment to any of the above embodiments, those skilled in the art would understand that in certain embodiments, the α-glucan ether compound can be in an anionic form in a hydrocolloid or aqueous solution. Examples may include those α-glucan ether compounds having an organic group comprising an alkyl group substituted with a carboxyl group. Carboxyl (COOH) groups in a carboxyalkyl α-glucan ether compound can convert to carboxylate ($COO^-$) groups in aqueous conditions. Such anionic groups can interact with salt cations such as any of those listed above in (i) (e.g., potassium, sodium, or lithium cation). Thus, an α-glucan ether compound can be a sodium carboxyalkyl α-glucan ether (e.g., sodium carboxymethyl α-glucan), potassium carboxyalkyl α-glucan ether (e.g., potassium carboxymethyl α-glucan), or lithium carboxyalkyl α-glucan ether (e.g., lithium carboxymethyl α-glucan), for example.

In alternative embodiments to any of the above embodiments, a composition comprising the α-glucan ether compound herein can be non-aqueous (e.g., a dry composition). Examples of such embodiments include powders, granules, microcapsules, flakes, or any other form of particulate matter. Other examples include larger compositions such as pellets, bars, kernels, beads, tablets, sticks, or other agglomerates. A non-aqueous or dry composition herein typically has less than 3, 2, 1, 0.5, or 0.1 wt % water comprised therein.

In certain embodiments the α-glucan ether compound may be crosslinked using any means known in the art. Such crosslinks may be borate crosslinks, where the borate is from any boron-containing compound (e.g., boric acid, diborates, tetraborates, pentaborates, polymeric compounds such as Polybor®, polymeric compounds of boric acid, alkali borates, for example. Alternatively, crosslinks can be provided with polyvalent metals such as titanium or zirconium. Titanium crosslinks may be provided, for example, using titanium IV-containing compounds such as titanium ammonium lactate, titanium triethanolamine, titanium acetylacetonate, and polyhydroxy complexes of titanium. Zirconium crosslinks can be provided using zirconium IV-containing compounds such as zirconium lactate, zirconium carbonate, zirconium acetylacetonate, zirconium triethanolamine, zirconium diisopropylamine lactate and polyhydroxy complexes of zirconium, for example. Alternatively still, crosslinks can be provided with any crosslinking agent described in U.S. Pat. Nos. 4,462,917, 4,464,270, 4,477,360 and 4,799,550, which are all incorporated herein by reference. A crosslinking agent (e.g., borate) may be present in an aqueous composition herein at a concentration of about 0.2% to 20 wt %, or about 0.1, 0.2, 0.3, 0.4, 0.5, 1, 2, 3, 4, 5, 6, 7, 8, 9, 10, 15, or 20 wt %, for example.

It is believed that an α-glucan ether compound disclosed herein that is crosslinked typically has a higher viscosity in an aqueous solution compared to its non-crosslinked counterpart. In addition, it is believed that a crosslinked α-glucan ether compound can have increased shear thickening behavior compared to its non-crosslinked counterpart.

In a further embodiment to any of the above embodiments, a composition herein (fabric care, laundry care, personal care, etc.) may optionally contain one or more active enzymes. Non-limiting examples of suitable enzymes include proteases, cellulases, hemicellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases and amylases. If an enzyme(s) is included, it may be comprised in a composition herein at about 0.0001-0.1 wt % (e.g., 0.01-0.03 wt %) active enzyme (e.g., calculated as pure enzyme protein), for example.

A cellulase herein can have endocellulase activity (EC 3.2.1.4), exocellulase activity (EC 3.2.1.91), or cellobiase activity (EC 3.2.1.21). A cellulase herein is an "active cellulase" having activity under suitable conditions for maintaining cellulase activity; it is within the skill of the art to determine such suitable conditions. Besides being able to degrade cellulose, a cellulase in certain embodiments can also degrade cellulose ether derivatives such as carboxymethyl cellulose. Examples of cellulose ether derivatives which are expected to not be stable to cellulase are disclosed in U.S. Pat. Nos. 7,012,053, 7,056,880, 6,579,840, 7,534,759 and 7,576,048.

A cellulase herein may be derived from any microbial source, such as a bacteria or fungus. Chemically-modified cellulases or protein-engineered mutant cellulases are included. Suitable cellulases include, but are not limited to, cellulases from the genera *Bacillus, Pseudomonas, Streptomyces, Trichoderma, Humicola, Fusarium, Thielavia* and *Acremonium*. As other examples, a cellulase may be derived from *Humicola insolens, Myceliophthora thermophila* or *Fusarium oxysporum*; these and other cellulases are disclosed in U.S. Pat. Nos. 4,435,307, 5,648,263, 5,691,178, 5,776,757 and 7,604,974, which are all incorporated herein by reference. Exemplary *Trichoderma reesei* cellulases are disclosed in U.S. Pat. Nos. 4,689,297, 5,814,501, 5,324,649, and International Patent Appl. Publ. Nos. WO92/06221 and WO92/06165, all of which are incorporated herein by reference. Exemplary *Bacillus* cellulases are disclosed in U.S. Pat. No. 6,562,612, which is incorporated herein by reference. A cellulase, such as any of the foregoing, preferably is in a mature form lacking an N-terminal signal peptide. Commercially available cellulases useful herein include CELLUZYME® and CAREZYME® (Novozymes A/S); CLAZINASE® and PURADAX® HA (DuPont Industrial Biosciences), and KAC-500(B)® (Kao Corporation).

Alternatively, a cellulase herein may be produced by any means known in the art, such as described in U.S. Pat. Nos. 4,435,307, 5,776,757 and 7,604,974, which are incorporated herein by reference. For example, a cellulase may be produced recombinantly in a heterologous expression system, such as a microbial or fungal heterologous expression system. Examples of heterologous expression systems include bacterial (e.g., *E. coli, Bacillus* sp.) and eukaryotic systems. Eukaryotic systems can employ yeast (e.g., *Pichia* sp., *Saccharomyces* sp.) or fungal (e.g., *Trichoderma* sp. such as *T. reesei, Aspergillus* species such as *A. niger*) expression systems, for example.

One or more cellulases can be directly added as an ingredient when preparing a composition disclosed herein. Alternatively, one or more cellulases can be indirectly (inadvertently) provided in the disclosed composition. For example, cellulase can be provided in a composition herein by virtue of being present in a non-cellulase enzyme preparation used for preparing a composition. Cellulase in compositions in which cellulase is indirectly provided thereto can be present at about 0.1-10 ppb (e.g., less than 1 ppm), for example. A contemplated benefit of a composition herein, by virtue of employing a poly alpha-1,3-1,6-glucan ether compound instead of a cellulose ether compound, is that non-cellulase enzyme preparations that might have background cellulase activity can be used without concern that the desired effects of the glucan ether will be negated by the background cellulase activity.

A cellulase in certain embodiments can be thermostable. Cellulase thermostability refers to the ability of the enzyme to retain activity after exposure to an elevated temperature (e.g. about 60-70° C.) for a period of time (e.g., about 30-60 minutes). The thermostability of a cellulase can be measured by its half-life (t½) given in minutes, hours, or days, during which time period half the cellulase activity is lost under defined conditions.

A cellulase in certain embodiments can be stable to a wide range of pH values (e.g. neutral or alkaline pH such as pH of ~7.0 to ~11.0). Such enzymes can remain stable for a predetermined period of time (e.g., at least about 15 min., 30 min., or 1 hour) under such pH conditions.

At least one, two, or more cellulases may be included in the composition. The total amount of cellulase in a composition herein typically is an amount that is suitable for the purpose of using cellulase in the composition (an "effective amount"). For example, an effective amount of cellulase in a composition intended for improving the feel and/or appearance of a cellulose-containing fabric is an amount that produces measurable improvements in the feel of the fabric (e.g., improving fabric smoothness and/or appearance, removing pills and fibrils which tend to reduce fabric appearance sharpness). As another example, an effective amount of cellulase in a fabric stonewashing composition herein is that amount which will provide the desired effect (e.g., to produce a worn and faded look in seams and on fabric panels). The amount of cellulase in a composition herein can also depend on the process parameters in which the composition is employed (e.g., equipment, temperature, time, and the like) and cellulase activity, for example. The effective concentration of cellulase in an aqueous composition in which a fabric is treated can be readily determined by a skilled artisan. In fabric care processes, cellulase can be present in an aqueous composition (e.g., wash liquor) in which a fabric is treated in a concentration that is minimally about 0.01-0.1 ppm total cellulase protein, or about 0.1-10 ppb total cellulase protein (e.g., less than 1 ppm), to maximally about 100, 200, 500, 1000, 2000, 3000, 4000, or 5000 ppm total cellulase protein, for example.

In a further embodiment to any of the above embodiments, the α-glucan oligomer/polymers and/or the present α-glucan ethers (derived from the present α-glucan oligomer/polymers) are mostly or completely stable (resistant) to being degraded by cellulase. For example, the percent degradation of the present α-glucan oligomers/polymers and/or α-glucan ether compounds by one or more cellulases is less than 10%, 9%, 8%, 7%, 6%, 5%, 4%, 3%, 2%, or 1%, or is 0%. Such percent degradation can be determined, for example, by comparing the molecular weight of polymer before and after treatment with a cellulase for a period of time (e.g., ~24 hours).

In a further embodiment to any of the above embodiments, hydrocolloids and aqueous solutions in certain embodiments are believed to have either shear thinning behavior or shear thickening behavior. Shear thinning behavior is observed as a decrease in viscosity of the hydrocolloid or aqueous solution as shear rate increases, whereas shear thickening behavior is observed as an increase in viscosity of the hydrocolloid or aqueous solution as shear rate increases. Modification of the shear thinning behavior or shear thickening behavior of an aqueous solution herein is due to the admixture of the α-glucan ether to the aqueous composition. Thus, one or more α-glucan ether compounds can be added to an aqueous composition to modify its rheological profile (i.e., the flow properties of the aqueous liquid, solution, or mixture are modified). Also, one or more α-glucan ether compounds can be added to an aqueous composition to modify its viscosity.

The rheological properties of hydrocolloids and aqueous solutions can be observed by measuring viscosity over an increasing rotational shear rate (e.g., from about 10 rpm to about 250 rpm). For example, shear thinning behavior of a hydrocolloid or aqueous solution disclosed herein can be observed as a decrease in viscosity (cPs) by at least about 5%, 10%, 15%, 20%, 25%, 30%, 35%, 40%, 45%, 50%, 55%, 60%, 65%, 70%, 75%, 80%, 85%, 90%, or 95% (or any integer between 5% and 95%) as the rotational shear rate increases from about 10 rpm to 60 rpm, 10 rpm to 150 rpm, 10 rpm to 250 rpm, 60 rpm to 150 rpm, 60 rpm to 250 rpm, or 150 rpm to 250 rpm. As another example, shear thickening behavior of a hydrocolloid or aqueous solution disclosed herein can be observed as an increase in viscosity (cPs) by at least about 5%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, or 200% (or any integer between 5% and 200%) as the rotational shear rate increases from about 10 rpm to 60 rpm, 10 rpm to 150 rpm, 10 rpm to 250 rpm, 60 rpm to 150 rpm, 60 rpm to 250 rpm, or 150 rpm to 250 rpm.

A hydrocolloid or aqueous solution disclosed herein can be in the form of, and/or comprised in, a textile care product, a laundry care product, a personal care product, a pharmaceutical product, or industrial product. The present α-glucan oligomers/polymers and/or the present α-glucan ether compounds can be used as thickening agents and/or dispersion agents in each of these products. Such a thickening agent may be used in conjunction with one or more other types of thickening agents if desired, such as those disclosed in U.S. Pat. No. 8,541,041, the disclosure of which is incorporated herein by reference in its entirety.

A household and/or industrial product herein can be in the form of drywall tape-joint compounds; mortars; grouts; cement plasters; spray plasters; cement stucco; adhesives; pastes; wall/ceiling texturizers; binders and processing aids for tape casting, extrusion forming, injection molding and ceramics; spray adherents and suspending/dispersing aids for pesticides, herbicides, and fertilizers; fabric care products such as fabric softeners and laundry detergents; hard surface cleaners; air fresheners; polymer emulsions; gels such as water-based gels; surfactant solutions; paints such as water-based paints; protective coatings; adhesives; sealants and caulks; inks such as water-based ink; metal-working fluids; emulsion-based metal cleaning fluids used in electroplating, phosphatizing, galvanizing and/or general metal cleaning operations; hydraulic fluids (e.g., those used for fracking in downhole operations); and aqueous mineral slurries, for example.

In a further embodiment to any of the above embodiments, compositions disclosed herein can be in the form of a fabric care composition. A fabric care composition herein can be used for hand wash, machine wash and/or other purposes such as soaking and/or pretreatment of fabrics, for example. A fabric care composition may take the form of, for example, a laundry detergent; fabric conditioner; any wash-, rinse-, or dryer-added product; unit dose or spray. Fabric care compositions in a liquid form may be in the form of an aqueous composition as disclosed herein. In other aspects, a fabric care composition can be in a dry form such as a granular detergent or dryer-added fabric softener sheet. Other non-limiting examples of fabric care compositions herein include: granular or powder-form all-purpose or heavy-duty washing agents; liquid, gel or paste-form all-purpose or heavy-duty washing agents; liquid or dry fine-fabric (e.g. delicates) detergents; cleaning auxiliaries such as bleach additives, "stain-stick", or pre-treatments; substrate-laden products such as dry and wetted wipes, pads, or sponges; sprays and mists.

A detergent composition herein may be in any useful form, e.g., as powders, granules, pastes, bars, unit dose, or liquid. A liquid detergent may be aqueous, typically containing up to about 70 wt % of water and 0 wt % to about 30 wt % of organic solvent. It may also be in the form of a compact gel type containing only about 30 wt % water.

A detergent composition herein typically comprises one or more surfactants, wherein the surfactant is selected from nonionic surfactants, anionic surfactants, cationic surfactants, ampholytic surfactants, zwitterionic surfactants, semi-polar nonionic surfactants and mixtures thereof. In some embodiments, the surfactant is present at a level of from about 0.1% to about 60%, while in alternative embodiments the level is from about 1% to about 50%, while in still further embodiments the level is from about 5% to about 40%, by weight of the cleaning composition. A detergent will usually contain 0 wt % to about 50 wt % of an anionic surfactant such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap. In addition, a detergent composition may optionally contain 0 wt % to about 40 wt % of a nonionic surfactant such as alcohol ethoxylate (AEO or AE), carboxylated alcohol ethoxylates, nonylphenol ethoxylate, alkylpolyglycoside, alkyldimethylamineoxide, ethoxylated fatty acid monoethanolamide, fatty acid monoethanolamide, or polyhydroxy alkyl fatty acid amide (as described for example in WO92/06154, which is incorporated herein by reference).

A detergent composition herein typically comprises one or more detergent builders or builder systems. In some embodiments incorporating at least one builder, the cleaning compositions comprise at least about 1%, from about 3% to about 60% or even from about 5% to about 40% builder by weight of the cleaning composition. Builders include, but are not limited to, the alkali metal, ammonium and alkanolammonium salts of polyphosphates, alkali metal silicates, alkaline earth and alkali metal carbonates, aluminosilicates, polycarboxylate compounds, ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, citric acid, oxydisuccinic acid, polymaleic acid, benzene 1,3,5-tricarboxylic acid, carboxymethyloxysuccinic acid, and soluble salts thereof. Indeed, it is contemplated that any suitable builder will find use in various embodiments of the present disclosure. Examples of a detergent builder or complexing agent include zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g., SKS-6 from Hoechst). A detergent may also be unbuilt, i.e., essentially free of detergent builder.

In some embodiments, the builders form water-soluble hardness ion complexes (e.g., sequestering builders), such as citrates and polyphosphates (e.g., sodium tripolyphosphate and sodium tripolyphospate hexahydrate, potassium tripolyphosphate, and mixed sodium and potassium tripolyphosphate, etc.). It is contemplated that any suitable builder will find use in the present disclosure, including those known in the art (See e.g., EP 2 100 949).

In some embodiments, builders for use herein include phosphate builders and non-phosphate builders. In some embodiments, the builder is a phosphate builder. In some embodiments, the builder is a non-phosphate builder. If present, builders are used in a level of from 0.1% to 80%, or from 5 to 60%, or from 10 to 50% by weight of the composition. In some embodiments the product comprises a mixture of phosphate and non-phosphate builders. Suitable phosphate builders include mono-phosphates, di-phosphates, tri-polyphosphates or oligomeric-poylphosphates, including the alkali metal salts of these compounds, including the sodium salts. In some embodiments, a builder can be sodium tripolyphosphate (STPP). Additionally, the composition can comprise carbonate and/or citrate, preferably citrate that helps to achieve a neutral pH composition. Other suitable non-phosphate builders include homopolymers and copolymers of polycarboxylic acids and their partially or completely neutralized salts, monomeric polycarboxylic acids and hydroxycarboxylic acids and their salts. In some embodiments, salts of the above mentioned compounds include the ammonium and/or alkali metal salts, i.e. the lithium, sodium, and potassium salts, including sodium salts. Suitable polycarboxylic acids include acyclic, alicyclic, hetero-cyclic and aromatic carboxylic acids, wherein in some embodiments, they can contain at least two carboxyl groups which are in each case separated from one another by, in some instances, no more than two carbon atoms.

A detergent composition herein can comprise at least one chelating agent. Suitable chelating agents include, but are not limited to, copper, iron and/or manganese chelating agents and mixtures thereof. In embodiments in which at least one chelating agent is used, the cleaning compositions comprise from about 0.1% to about 15% or even from about 3.0% to about 10% chelating agent by weight of the subject cleaning composition.

A detergent composition herein can comprise at least one deposition aid. Suitable deposition aids include, but are not limited to, polyethylene glycol, polypropylene glycol, polycarboxylate, soil release polymers such as polytelephthalic acid, clays such as kaolinite, montmorillonite, atapulgite, illite, bentonite, halloysite, and mixtures thereof.

A detergent composition herein can comprise one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. Additional dye transfer inhibiting agents include manganese phthalocyanine, peroxidases, polyvinylpyrrolidone polymers, polyamine N-oxide polymers, copolymers of N-vinylpyrrolidone and N-vinylimidazole, polyvinyloxazolidones and polyvinylimidazoles and/or mixtures thereof; chelating agents examples of which include ethylene-diamine-tetraacetic acid (EDTA); diethylene triamine penta methylene phosphonic acid (DTPMP); hydroxy-ethane diphosphonic acid (HEDP); ethylenediamine N,N'-disuccinic acid (EDDS); methyl glycine diacetic acid (MGDA); diethylene triamine penta acetic acid (DTPA); propylene diamine tetracetic acid (PDT A); 2-hydroxypyridine-N-oxide (HPNO); or methyl glycine diacetic acid (MGDA); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid and any salts thereof; N-hydroxyethylethylenediaminetriacetic acid (HEDTA), triethylenetetraaminehexaacetic acid (TTNA), N-hydroxyethyliminodiacetic acid (HEIDA), dihydroxyethylglycine (DHEG), ethylenediaminetetrapropionic acid (EDTP) and derivatives thereof, which can be used alone or in combination with any of the above. In embodiments in which at least one dye transfer inhibiting agent is used, the cleaning compositions comprise from about 0.0001% to about 10%, from about 0.01% to about 5%, or even from about 0.1% to about 3% by weight of the cleaning composition.

A detergent composition herein can comprise silicates. In some such embodiments, sodium silicates (e.g., sodium disilicate, sodium metasilicate, and crystalline phyllosilicates) find use. In some embodiments, silicates are present at a level of from about 1% to about 20%. In some embodiments, silicates are present at a level of from about 5% to about 15% by weight of the composition.

A detergent composition herein can comprise dispersants. Suitable water-soluble organic materials include, but are not limited to the homo- or co-polymeric acids or their salts, in which the polycarboxylic acid comprises at least two carboxyl radicals separated from each other by not more than two carbon atoms.

Any cellulase disclosed above is contemplated for use in the disclosed detergent compositions. Suitable cellulases include, but are not limited to *Humicola insolens* cellulases (See e.g., U.S. Pat. No. 4,435,307). Exemplary cellulases contemplated for such use are those having color care benefit for a textile. Examples of cellulases that provide a color care benefit are disclosed in EP0495257, EP0531372, EP531315, WO96/11262, WO96/29397, WO94/07998; WO98/12307; WO95/24471, WO98/08940, and U.S. Pat. Nos. 5,457,046, 5,686,593 and 5,763,254, all of which are incorporated herein by reference. Examples of commercially available cellulases useful in a detergent include CELLUSOFT®, CELLUCLEAN®, CELLUZYME®, and CAREZYME® (Novo Nordisk A/S and Novozymes A/S); CLAZINASE®, PURADAX HA®, and REVITALENZ™ (DuPont Industrial Biosciences); BIOTOUCH® (AB Enzymes); and KAC-500(B)™ (Kao Corporation). Additional cellulases are disclosed in, e.g., U.S. Pat. Nos. 7,595,182, 8,569,033, 7,138,263, 3,844,890, 4,435,307, 4,435,307, and GB2095275.

A detergent composition herein may additionally comprise one or more other enzymes in addition to at least one cellulase. Examples of other enzymes include proteases, cellulases, hemicellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase, phenoloxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, alpha-amylases, beta-amylases, galactosidases, galactanases, catalases, carageenases, hyaluronidases, keratinases, lactases, ligninases, peroxidases, phosphatases, polygalacturonases, pullulanases, rhamnogalacturonases, tannases, transglutaminases, xyloglucanases, xylosidases, metalloproteases, arabinofuranosidases, phytases, isomerases, transferases and/or amylasesin any combination.

In some embodiments, the detergent compositions can comprise one or more enzymes, each at a level from about 0.00001% to about 10% by weight of the composition and the balance of cleaning adjunct materials by weight of composition. In some other embodiments, the detergent compositions also comprise each enzyme at a level of about 0.0001% to about 10%, about 0.001% to about 5%, about 0.001% to about 2%, about 0.005% to about 0.5% enzyme by weight of the composition.

Suitable proteases include those of animal, vegetable or microbial origin. In some embodiments, microbial proteases are used. In some embodiments, chemically or genetically modified mutants are included. In some embodiments, the protease is a serine protease, preferably an alkaline microbial protease or a trypsin-like protease. Examples of alkaline proteases include subtilisins, especially those derived from *Bacillus* (e.g., subtilisin, lentus, *amyloliquefaciens*, subtilisin Carlsberg, subtilisin 309, subtilisin 147 and subtilisin 168). Additional examples include those mutant proteases described in U.S. Pat. Nos. RE 34,606, 5,955,340, 5,700,676, 6,312,936, and 6,482,628, all of which are incorporated herein by reference. Additional protease examples include, but are not limited to trypsin (e.g., of porcine or bovine origin), and the *Fusarium* protease described in WO 89/06270. In some embodiments, commercially available protease enzymes that find use in the present disclosure include, but are not limited to MAXATASE®, MAXACAL™, MAXAPEM™, OPTICLEAN®, OPTIMASE®, PROPERASE®, PURAFECT®, PURAFECT® OXP, PURAMAX™, EXCELLASE™, PREFERENZ™ proteases (e.g. P100, P110, P280), EFFECTENZ™ proteases (e.g. P1000, P1050, P2000), EXCELLENZ™ proteases (e.g. P1000), ULTIMASE®, and PURAFAST™ (Genencor); ALCALASE®, SAVINASE®, PRIMASE®, DURA- ZYM™, POLARZYME®, OVOZYME®, KANNASE®, LIQUANASE®, NEUTRASE®, RELASE® and ESPERASE® (Novozymes); BLAP™ and BLAP™ variants (Henkel Kommanditgesellschaft auf Aktien, Duesseldorf, Germany), and KAP (*B. alkalophilus subtilisin*; Kao Corp., Tokyo, Japan). Various proteases are described in WO95/23221, WO 92/21760, WO 09/149200, WO 09/149144, WO 09/149145, WO 11/072099, WO 10/056640, WO 10/056653, WO 11/140364, WO 12/151534, U.S. Pat. Publ. No. 2008/0090747, and U.S. Pat. Nos. 5,801,039, 5,340,735, 5,500,364, 5,855,625, US RE 34,606, 5,955,340, 5,700,676, 6,312,936, 6,482,628, 8,530,219, and various other patents. In some further embodiments, neutral metalloproteases find use in the present disclosure, including but not limited to the neutral metalloproteases described in WO1999014341, WO1999033960, WO1999014342, WO1999034003, WO2007044993, WO2009058303, WO2009058661. Exemplary metalloproteases include nprE, the recombinant form of neutral metalloprotease expressed in *Bacillus subtilis* (See e.g., WO 07/044993), and PMN, the purified neutral metalloprotease from *Bacillus amyloliquefaciens*.

Suitable mannanases include, but are not limited to those of bacterial or fungal origin. Chemically or genetically modified mutants are included in some embodiments. Various mannanases are known which find use in the present disclosure (See e.g., U.S. Pat. Nos. 6,566,114, 6,602,842, and 6,440,991, all of which are incorporated herein by reference). Commercially available mannanases include, but are not limited to MANNASTAR®, PURABRITE™, and MANNAWAY®.

Suitable lipases include those of bacterial or fungal origin. Chemically modified, proteolytically modified, or protein engineered mutants are included. Examples of useful lipases include those from the genera *Humicola* (e.g., *H. lanuginosa*, EP258068 and EP305216; *H. insolens*, WO96/13580), *Pseudomonas* (e.g., *P. alcaligenes* or *P. pseudoalcaligenes*, EP218272; *P. cepacia*, EP331376; *P. stutzeri*, GB1372034; *P. fluorescens* and *Pseudomonas* sp. strain SD 705, WO95/06720 and WO96/27002; *P. wisconsinensis*, WO96/12012); and *Bacillus* (e.g., *B. subtilis*, Dartois et al., *Biochemica et Biophysica Acta* 1131:253-360; *B. stearothermophilus*, JP64/744992; *B. pumilus*, WO91/16422). Furthermore, a number of cloned lipases find use in some embodiments of the present disclosure, including but not limited to *Penicillium camembertii* lipase (See, Yamaguchi et al., *Gene* 103:61-67 [1991]), *Geotricum candidum* lipase (See, Schimada et al., J. Biochem., 106:383-388 [1989]), and various *Rhizopus* lipases such as *R. delemar* lipase (See, Hass et al., *Gene* 109:117-113 [1991]), a *R. niveus* lipase (Kugimiya et al., Biosci. Biotech. Biochem. 56:716-719 [1992]) and *R. oryzae* lipase. Additional lipases useful herein include, for example, those disclosed in WO92/05249, WO94/01541, WO95/35381, WO96/00292, WO95/30744, WO94/25578, WO95/14783, WO95/22615, WO97/04079, WO97/07202, EP407225 and EP260105. Other types of lipase polypeptide enzymes such as cutinases also find use in some embodiments, including but not limited to the cutinase derived from *Pseudomonas mendocina* (See, WO 88/09367), and the cutinase derived from *Fusarium solani pisi* (See, WO 90/09446). Examples of certain commercially available lipase enzymes useful herein include M1 LIPASE™, LUMA FAST™, and LIPOMAX™ (Genencor); LIPEX®, LIPOLASE® and LIPOLASE® ULTRA (Novozymes); and LIPASE P™ "Amano" (Amano Pharmaceutical Co. Ltd., Japan).

Suitable polyesterases include, for example, those disclosed in WO01/34899, WO01/14629 and U.S. Pat. No. 6,933,140.

A detergent composition herein can also comprise 2,6-beta-D-fructan hydrolase, which is effective for removal/cleaning of certain biofilms present on household and/or industrial textiles/laundry.

Suitable amylases include, but are not limited to those of bacterial or fungal origin. Chemically or genetically modified mutants are included in some embodiments. Amylases that find use in the present disclosure, include, but are not limited to α-amylases obtained from *B. licheniformis* (See e.g., GB 1,296,839). Additional suitable amylases include those found in WO9510603, WO9526397, WO9623874, WO9623873, WO9741213, WO9919467, WO0060060, WO0029560, WO9923211, WO9946399, WO0060058, WO0060059, WO9942567, WO0114532, WO02092797, WO0166712, WO0188107, WO0196537, WO0210355, WO9402597, WO0231124, WO9943793, WO9943794, WO2004113551, WO2005001064, WO2005003311, WO0164852, WO2006063594, WO2006066594, WO2006066596, WO2006012899, WO2008092919, WO2008000825, WO2005018336, WO2005066338, WO2009140504, WO2005019443, WO2010091221, WO2010088447, WO0134784, WO2006012902, WO2006031554, WO2006136161, WO2008101894, WO2010059413, WO2011098531, WO2011080352, WO2011080353, WO2011080354, WO2011082425, WO2011082429, WO2011076123, WO2011087836, WO2011076897, WO94183314, WO9535382, WO9909183, WO9826078, WO9902702, WO9743424, WO9929876, WO9100353, WO9605295, WO9630481, WO9710342, WO2008088493, WO2009149419, WO2009061381, WO2009100102, WO2010104675, WO2010117511, and WO2010115021.

Suitable amylases include, for example, commercially available amylases such as STAINZYME®, STAINZYME PLUS®, NATALASE®, DURAMYL®, TERMAMYL®, TERMAMYL ULTRA®, FUNGAMYL® and BAN™ (Novo Nordisk A/S and Novozymes A/S); RAPIDASE®, POWERASE®, PURASTAR® and PREFERENZ™ (DuPont Industrial Biosciences).

Suitable peroxidases/oxidases contemplated for use in the compositions include those of plant, bacterial or fungal origin. Chemically modified or protein engineered mutants are included. Examples of peroxidases useful herein include those from the genus *Coprinus* (e.g., *C. cinereus*, WO93/24618, WO95/10602, and WO98/15257), as well as those referenced in WO 2005056782, WO2007106293, WO2008063400, WO2008106214, and WO2008106215. Commercially available peroxidases useful herein include, for example, GUARDZYME™ (Novo Nordisk A/S and Novozymes A/S).

In some embodiments, peroxidases are used in combination with hydrogen peroxide or a source thereof (e.g., a percarbonate, perborate or persulfate) in the compositions. In some alternative embodiments, oxidases are used in combination with oxygen. Both types of enzymes are used for "solution bleaching" (i.e., to prevent transfer of a textile dye from a dyed fabric to another fabric when the fabrics are washed together in a wash liquor), preferably together with an enhancing agent (See e.g., WO 94/12621 and WO 95/01426). Suitable peroxidases/oxidases include, but are not limited to those of plant, bacterial or fungal origin. Chemically or genetically modified mutants are included in some embodiments.

Enzymes that may be comprised in a detergent composition herein may be stabilized using conventional stabilizing agents, e.g., a polyol such as propylene glycol or glycerol; a sugar or sugar alcohol; lactic acid; boric acid or a boric acid derivative (e.g., an aromatic borate ester).

A detergent composition herein may contain about 1 wt % to about 65 wt % of a detergent builder or complexing agent such as zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g., SKS-6 from Hoechst). A detergent may also be unbuilt, i.e., essentially free of detergent builder.

A detergent composition in certain embodiments may comprise one or more other types of polymers in addition to the present α-glucan oligomers/polymers and/or the present α-glucan ether compounds. Examples of other types of polymers useful herein include carboxymethyl cellulose (CMC), poly(vinylpyrrolidone) (PVP), polyethylene glycol (PEG), poly(vinyl alcohol) (PVA), polycarboxylates such as polyacrylates, maleic/acrylic acid copolymers and lauryl methacrylate/acrylic acid copolymers.

A detergent composition herein may contain a bleaching system. For example, a bleaching system can comprise an $H_2O_2$ source such as perborate or percarbonate, which may be combined with a peracid-forming bleach activator such as tetraacetylethylenediamine (TAED) or nonanoyloxybenzenesulfonate (NOBS). Alternatively, a bleaching system may comprise peroxyacids (e.g., amide, imide, or sulfone type peroxyacids). Alternatively still, a bleaching system can be an enzymatic bleaching system comprising perhydrolase, for example, such as the system described in WO2005/056783.

A detergent composition herein may also contain conventional detergent ingredients such as fabric conditioners, clays, foam boosters, suds suppressors, anti-corrosion agents, soil-suspending agents, anti-soil redeposition agents, dyes, bactericides, tarnish inhibiters, optical brighteners, or perfumes. The pH of a detergent composition herein (measured in aqueous solution at use concentration) is usually neutral or alkaline (e.g., pH of about 7.0 to about 11.0).

Particular forms of detergent compositions that can be adapted for purposes disclosed herein are disclosed in, for example, US20090209445A1, US20100081598A1, U.S. Pat. No. 7,001,878B2, EP1504994B1, WO2001085888A2, WO2003089562A1, WO2009098659A1, WO2009098660A1, WO2009112992A1, WO2009124160A1, WO2009152031A1, WO2010059483A1, WO2010088112A1, WO2010090915A1, WO2010135238A1, WO2011094687A1, WO2011094690A1, WO2011127102A1, WO2011163428A1, WO2008000567A1, WO2006045391A1, WO2006007911A1, WO2012027404A1, EP1740690B1, WO2012059336A1, U.S. Pat. No. 6,730,646B1, WO2008087426A1, WO2010116139A1, and WO2012104613A1, all of which are incorporated herein by reference.

Laundry detergent compositions herein can optionally be heavy duty (all purpose) laundry detergent compositions. Exemplary heavy duty laundry detergent compositions comprise a detersive surfactant (10%-40% wt/wt), including an anionic detersive surfactant (selected from a group of linear or branched or random chain, substituted or unsubstituted alkyl sulphates, alkyl sulphonates, alkyl alkoxylated sulphate, alkyl phosphates, alkyl phosphonates, alkyl carboxylates, and/or mixtures thereof), and optionally non-ionic surfactant (selected from a group of linear or branched or random chain, substituted or unsubstituted alkyl alkoxylated alcohol, e.g., $C_8$-$C_{18}$ alkyl ethoxylated alcohols and/or $C_6$-$C_{12}$ alkyl phenol alkoxylates), where the weight ratio of anionic detersive surfactant (with a hydrophilic index (HIc) of from 6.0 to 9) to non-ionic detersive surfactant is greater than 1:1. Suitable detersive surfactants also include cationic detersive surfactants (selected from a group of alkyl pyridinium compounds, alkyl quaternary ammonium compounds, alkyl quaternary phosphonium compounds, alkyl ternary sulphonium compounds, and/or mixtures thereof); zwitterionic and/or amphoteric detersive surfactants (selected from a group of alkanolamine sulpho-betaines); ampholytic surfactants; semi-polar non-ionic surfactants and mixtures thereof.

A detergent herein such as a heavy duty laundry detergent composition may optionally include, a surfactancy boosting polymer consisting of amphiphilic alkoxylated grease cleaning polymers (selected from a group of alkoxylated polymers having branched hydrophilic and hydrophobic properties, such as alkoxylated polyalkylenimines in the range of 0.05 wt %-10 wt %) and/or random graft polymers (typically comprising of hydrophilic backbone comprising monomers selected from the group consisting of: unsaturated $C_1$-$C_6$ carboxylic acids, ethers, alcohols, aldehydes, ketones, esters, sugar units, alkoxy units, maleic anhydride, saturated polyalcohols such as glycerol, and mixtures thereof; and hydrophobic side chain(s) selected from the group consisting of: $C_4$-$C_{25}$ alkyl group, polypropylene, polybutylene, vinyl ester of a saturated $C_1$-$C_6$ mono-carboxylic acid, $C_1$-$C_6$ alkyl ester of acrylic or methacrylic acid, and mixtures thereof.

A detergent herein such as a heavy duty laundry detergent composition may optionally include additional polymers such as soil release polymers (include anionically end-capped polyesters, for example SRP1, polymers comprising at least one monomer unit selected from saccharide, dicarboxylic acid, polyol and combinations thereof, in random or block configuration, ethylene terephthalate-based polymers and co-polymers thereof in random or block configuration, for example REPEL-O-TEX SF, SF-2 AND SRP6, TEXCARE SRA100, SRA300, SRN100, SRN170, SRN240, SRN300 AND SRN325, MARLOQUEST SL), anti-redeposition polymers (0.1 wt % to 10 wt %), include carboxylate polymers, such as polymers comprising at least one monomer selected from acrylic acid, maleic acid (or maleic anhydride), fumaric acid, itaconic acid, aconitic acid, mesaconic acid, citraconic acid, methylenemalonic acid, and any mixture thereof, vinylpyrrolidone homopolymer, and/or polyethylene glycol, molecular weight in the range of from 500 to 100,000 Da); and polymeric carboxylate (such as maleate/acrylate random copolymer or polyacrylate homopolymer).

A detergent herein such as a heavy duty laundry detergent composition may optionally further include saturated or unsaturated fatty acids, preferably saturated or unsaturated $C_{12}$-$C_{24}$ fatty acids (0 wt % to 10 wt %); deposition aids in addition to the α-glucan ether compound disclosed herein (examples for which include polysaccharides, cellulosic polymers, poly diallyl dimethyl ammonium halides (DADMAC), and co-polymers of DAD MAC with vinyl pyrrolidone, acrylamides, imidazoles, imidazolinium halides, and mixtures thereof, in random or block configuration, cationic guar gum, cationic starch, cationic polyacylamides, and mixtures thereof.

A detergent herein such as a heavy duty laundry detergent composition may optionally further include dye transfer inhibiting agents, examples of which include manganese phthalocyanine, peroxidases, polyvinylpyrrolidone polymers, polyamine N-oxide polymers, copolymers of N-vinylpyrrolidone and N-vinylimidazole, polyvinyloxazolidones and polyvinylimidazoles and/or mixtures thereof; chelating agents, examples of which include ethylene-diamine-tetraacetic acid (EDTA), diethylene triamine penta methylene phosphonic acid (DTPMP), hydroxy-ethane diphosphonic acid (HEDP), ethylenediamine N,N'-disuccinic acid (EDDS), methyl glycine diacetic acid (MGDA), diethylene triamine penta acetic acid (DTPA), propylene diamine tetracetic acid (PDTA), 2-hydroxypyridine-N-oxide (HPNO), or methyl glycine diacetic acid (MGDA), glutamic acid N,N-diacetic acid (N,N-dicarboxymethyl glutamic acid tetrasodium salt (GLDA), nitrilotriacetic acid (NTA), 4,5-dihydroxy-m-benzenedisulfonic acid, citric acid and any salts thereof, N-hydroxyethylethylenediaminetriacetic acid (HEDTA), triethylenetetraaminehexaacetic acid (TTNA), N-hydroxyethyliminodiacetic acid (HEIDA), dihydroxyethylglycine (DHEG), ethylenediaminetetrapropionic acid (EDTP), and derivatives thereof.

A detergent herein such as a heavy duty laundry detergent composition may optionally include silicone or fatty-acid based suds suppressors; hueing dyes, calcium and magnesium cations, visual signaling ingredients, anti-foam (0.001 wt % to about 4.0 wt %), and/or a structurant/thickener (0.01 wt % to 5 wt %) selected from the group consisting of diglycerides and triglycerides, ethylene glycol distearate, microcrystalline cellulose, microfiber cellulose, biopolymers, xanthan gum, gellan gum, and mixtures thereof). Such structurant/thickener would be in addition to the one or more of the present α-glucan oligomers/polymers and/or α-glucan ether compounds comprised in the detergent.

A detergent herein can be in the form of a heavy duty dry/solid laundry detergent composition, for example. Such a detergent may include: (i) a detersive surfactant, such as any anionic detersive surfactant disclosed herein, any non-ionic detersive surfactant disclosed herein, any cationic detersive surfactant disclosed herein, any zwitterionic and/or amphoteric detersive surfactant disclosed herein, any ampholytic surfactant, any semi-polar non-ionic surfactant, and mixtures thereof; (ii) a builder, such as any phosphate-free builder (e.g., zeolite builders in the range of 0 wt % to less than 10 wt %), any phosphate builder (e.g., sodium tri-polyphosphate in the range of 0 wt % to less than 10 wt %), citric acid, citrate salts and nitrilotriacetic acid, any silicate salt (e.g., sodium or potassium silicate or sodium meta-silicate in the range of 0 wt % to less than 10 wt %); any carbonate salt (e.g., sodium carbonate and/or sodium bicarbonate in the range of 0 wt % to less than 80 wt %), and mixtures thereof; (iii) a bleaching agent, such as any photobleach (e.g., sulfonated zinc phthalocyanines, sulfonated aluminum phthalocyanines, xanthenes dyes, and mixtures thereof), any hydrophobic or hydrophilic bleach activator (e.g., dodecanoyl oxybenzene sulfonate, decanoyl oxybenzene sulfonate, decanoyl oxybenzoic acid or salts thereof, 3,5,5-trimethy hexanoyl oxybenzene sulfonate, tetraacetyl ethylene diamine-TAED, nonanoyloxybenzene sulfonate-NOBS, nitrile quats, and mixtures thereof), any source of hydrogen peroxide (e.g., inorganic perhydrate salts, examples of which include mono or tetra hydrate sodium salt of perborate, percarbonate, persulfate, perphosphate, or persilicate), any preformed hydrophilic and/or hydrophobic peracids (e.g., percarboxylic acids and salts, percarbonic acids and salts, perimidic acids and salts, peroxymonosulfuric acids and salts, and mixtures thereof); and/or (iv) any other components such as a bleach catalyst (e.g., imine bleach boosters examples of which include iminium cations and polyions, iminium zwitterions, modified amines, modified amine oxides, N-sulphonyl imines, N-phosphonyl imines, N-acyl imines, thiadiazole dioxides, perfluoroimines, cyclic sugar ketones, and mixtures thereof), and a metal-containing bleach catalyst (e.g., copper, iron, titanium, ruthenium, tungsten, molybdenum, or manganese cations along with an auxiliary metal cations such as zinc or aluminum and a sequestrate such as EDTA, ethylenediaminetetra(methylenephosphonic acid).

Compositions disclosed herein can be in the form of a dishwashing detergent composition. Examples of dishwashing detergents include automatic dishwashing detergents (typically used in dishwasher machines) and hand-washing dish detergents. A dishwashing detergent composition can be in any dry or liquid/aqueous form as disclosed herein, for example. Components that may be included in certain embodiments of a dishwashing detergent composition include, for example, one or more of a phosphate; oxygen- or chlorine-based bleaching agent; non-ionic surfactant; alkaline salt (e.g., metasilicates, alkali metal hydroxides, sodium carbonate); any active enzyme disclosed herein; anti-corrosion agent (e.g., sodium silicate); anti-foaming agent; additives to slow down the removal of glaze and patterns from ceramics; perfume; anti-caking agent (in granular detergent); starch (in tablet-based detergents); gelling agent (in liquid/gel based detergents); and/or sand (powdered detergents).

Dishwashing detergents such as an automatic dishwasher detergent or liquid dishwashing detergent can comprise (i) a non-ionic surfactant, including any ethoxylated non-ionic surfactant, alcohol alkoxylated surfactant, epoxy-capped poly(oxyalkylated) alcohol, or amine oxide surfactant present in an amount from 0 to 10 wt %; (ii) a builder, in the range of about 5-60 wt %, including any phosphate builder (e.g., mono-phosphates, di-phosphates, tri-polyphosphates, other oligomeric-polyphosphates, sodium tripolyphosphate-STPP), any phosphate-free builder (e.g., amino acid-based compounds including methyl-glycine-diacetic acid [MGDA] and salts or derivatives thereof, glutamic-N,N-diacetic acid [GLDA] and salts or derivatives thereof, iminodisuccinic acid (IDS) and salts or derivatives thereof, carboxy methyl inulin and salts or derivatives thereof, nitrilotriacetic acid [NTA], diethylene triamine penta acetic acid [DTPA], B-alaninediacetic acid [B-ADA] and salts thereof), homopolymers and copolymers of poly-carboxylic acids and partially or completely neutralized salts thereof, monomeric polycarboxylic acids and hydroxycarboxylic acids and salts thereof in the range of 0.5 wt % to 50 wt %, or sulfonated/carboxylated polymers in the range of about 0.1 wt % to about 50 wt %; (iii) a drying aid in the range of about 0.1 wt % to about 10 wt % (e.g., polyesters, especially anionic polyesters, optionally together with further monomers with 3 to 6 functionalities—typically acid, alcohol or ester functionalities which are conducive to polycondensation, polycarbonate-, polyurethane- and/or polyurea-polyorganosiloxane compounds or precursor compounds thereof, particularly of the reactive cyclic carbonate and urea type); (iv) a silicate in the range from about 1 wt % to about 20 wt % (e.g., sodium or potassium silicates such as sodium disilicate, sodium meta-silicate and crystalline phyllosilicates); (v) an inorganic bleach (e.g., perhydrate salts such as perborate, percarbonate, perphosphate, persulfate and persilicate salts) and/or an organic bleach (e.g., organic peroxyacids such as diacyl- and tetraacylperoxides, especially diperoxydodecanedioic acid, diperoxytetradecanedioic acid, and diperoxyhexadecanedioic acid); (vi) a bleach activator (e.g., organic peracid precursors in the range from about 0.1 wt % to about 10 wt %) and/or bleach catalyst (e.g., manganese triazacyclononane and related complexes; Co, Cu, Mn, and Fe bispyridylamine and related complexes; and pentamine acetate cobalt(III) and related complexes); (vii) a metal care agent in the range from about 0.1 wt % to 5 wt % (e.g., benzatriazoles, metal salts and complexes, and/or silicates); and/or (viii) any active enzyme disclosed herein in the range from about 0.01 to 5.0 mg of active enzyme per gram of automatic dishwashing detergent composition, and an enzyme stabilizer component (e.g., oligosaccharides, polysaccharides, and inorganic divalent metal salts).

Various examples of detergent formulations comprising at least one α-glucan ether compound (e.g., a carboxyalkyl α-glucan ether such as carboxymethyl α-glucan) are disclosed below (1-19):

1) A detergent composition formulated as a granulate having a bulk density of at least 600 g/L comprising: linear alkylbenzenesulfonate (calculated as acid) at about 7-12 wt %; alcohol ethoxysulfate (e.g., $C_{12}$-$C_{18}$ alcohol, 1-2 ethylene oxide [EO]) or alkyl sulfate (e.g., C16-18) at about 1-4 wt %; alcohol ethoxylate (e.g., $C_{14}$-$C_{15}$ alcohol) at about 5-9 wt %; sodium carbonate at about 14-20 wt %; soluble silicate (e.g., $Na_2O_2SiO_2$) at about 2-6 wt %; zeolite (e.g., NaAlSiO$_4$) at about 15-22 wt %; sodium sulfate at about 0-6 wt %; sodium citrate/citric acid at about 0-15 wt %; sodium perborate at about 11-18 wt %; TAED at about 2-6 wt %; α-glucan ether up to about 2 wt %; other polymers (e.g., maleic/acrylic acid copolymer, PVP, PEG) at about 0-3 wt %; optionally an enzyme(s) (calculated as pure enzyme protein) at about 0.0001-0.1 wt %; and minor ingredients (e.g., suds suppressors, perfumes, optical brightener, photobleach) at about 0-5 wt %.

2) A detergent composition formulated as a granulate having a bulk density of at least 600 g/L comprising: linear alkylbenzenesulfonate (calculated as acid) at about 6-11 wt %; alcohol ethoxysulfate (e.g., C12-18 alcohol, 1-2 EO) or alkyl sulfate (e.g., C16-18) at about 1-3 wt %; alcohol ethoxylate (e.g., C14-15 alcohol) at about 5-9 wt %; sodium carbonate at about 15-21 wt %; soluble silicate (e.g., $Na_2O_2SiO_2$) at about 1-4 wt %; zeolite (e.g., NaAlSiO$_4$) at about 24-34 wt %; sodium sulfate at about 4-10 wt %; sodium citrate/citric acid at about 0-15 wt %; sodium perborate at about 11-18 wt %; TAED at about 2-6 wt %; α-glucan ether up to about 2 wt %; other polymers (e.g., maleic/acrylic acid copolymer, PVP, PEG) at about 1-6 wt %; optionally an enzyme(s) (calculated as pure enzyme protein) at about 0.0001-0.1 wt %; and minor ingredients (e.g., suds suppressors, perfumes, optical brightener, photobleach) at about 0-5 wt %.

3) A detergent composition formulated as a granulate having a bulk density of at least 600 g/L comprising: linear alkylbenzenesulfonate (calculated as acid) at about 5-9 wt %; alcohol ethoxysulfate (e.g., C12-18 alcohol, 7 EO) at about 7-14 wt %; soap as fatty acid (e.g., C16-22 fatty acid) at about 1-3 wt %; sodium carbonate at about 10-17 wt %; soluble silicate (e.g., $Na_2O$ $2SiO_2$) at about 3-9 wt %; zeolite (e.g., NaAlSiO$_4$) at about 23-33 wt %; sodium sulfate at about 0-4 wt %; sodium perborate at about 8-16 wt %; TAED at about 2-8 wt %; phosphonate (e.g., EDTMPA) at about 0-1 wt %; α-glucan ether up to about 2 wt %; other polymers (e.g., maleic/acrylic acid copolymer, PVP, PEG) at about 0-3 wt %; optionally an enzyme(s) (calculated as pure enzyme protein) at about 0.0001-0.1 wt %; and minor ingredients (e.g., suds suppressors, perfumes, optical brightener) at about 0-5 wt %.

4) A detergent composition formulated as a granulate having a bulk density of at least 600 g/L comprising: linear alkylbenzenesulfonate (calculated as acid) at about 8-12 wt %; alcohol ethoxylate (e.g., C12-18 alcohol, 7 EO) at about 10-25 wt %; sodium carbonate at about 14-22 wt %; soluble silicate (e.g., $Na_2O$ $2SiO_2$) at about 1-5 wt %; zeolite (e.g., NaAlSiO$_4$) at about 25-35 wt %; sodium sulfate at about 0-10 wt %; sodium perborate at about 8-16 wt %; TAED at about 2-8 wt %; phosphonate (e.g., EDTMPA) at about 0-1 wt %; α-glucan ether up to about 2 wt %; other polymers (e.g., maleic/acrylic acid copolymer, PVP, PEG) at about 1-3 wt %; optionally an enzyme(s) (calculated as pure enzyme protein) at about 0.0001-0.1 wt %; and minor ingredients (e.g., suds suppressors, perfumes) at about 0-5 wt %.

5) An aqueous liquid detergent composition comprising: linear alkylbenzenesulfonate (calculated as acid) at about 15-21 wt %; alcohol ethoxylate (e.g., C12-18 alcohol, 7 EO; or C12-15 alcohol, 5 EO) at about 12-18 wt %; soap as fatty acid (e.g., oleic acid) at about 3-13 wt %; alkenylsuccinic acid (C12-14) at about 0-13 wt %; aminoethanol at about 8-18 wt %; citric acid at about 2-8 wt %; phosphonate at about 0-3 wt %; α-glucan ether up to about 2 wt %; other polymers (e.g., PVP, PEG) at about 0-3 wt %; borate at about 0-2 wt %; ethanol at about 0-3 wt %; propylene glycol at about 8-14 wt %; optionally an enzyme(s) (calculated as pure enzyme protein) at about 0.0001-0.1 wt %; and minor ingredients (e.g., dispersants, suds suppressors, perfume, optical brightener) at about 0-5 wt %.

6) An aqueous structured liquid detergent composition comprising: linear alkylbenzenesulfonate (calculated as acid) at about 15-21 wt %; alcohol ethoxylate (e.g., C12-18 alcohol, 7 EO; or C12-15 alcohol, 5 EO) at about 3-9 wt %; soap as fatty acid (e.g., oleic acid) at about 3-10 wt %; zeolite (e.g., NaAlSiO$_4$) at about 14-22 wt %; potassium citrate about 9-18 wt %; borate at about 0-2 wt %; α-glucan ether up to about 2 wt %; other polymers (e.g., PVP, PEG) at about 0-3 wt %; ethanol at about 0-3 wt %; anchoring polymers (e.g., lauryl methacrylate/acrylic acid copolymer, molar ratio 25:1, MW 3800) at about 0-3 wt %; glycerol at about 0-5 wt %; optionally an enzyme(s) (calculated as pure enzyme protein) at about 0.0001-0.1 wt %; and minor ingredients (e.g., dispersants, suds suppressors, perfume, optical brightener) at about 0-5 wt %.

7) A detergent composition formulated as a granulate having a bulk density of at least 600 g/L comprising: fatty alcohol sulfate at about 5-10 wt %, ethoxylated fatty acid monoethanolamide at about 3-9 wt %; soap as fatty acid at about 0-3 wt %; sodium carbonate at about 5-10 wt %; soluble silicate (e.g., $Na_2O$ $2SiO_2$) at about 1-4 wt %; zeolite (e.g., NaAlSiO$_4$) at about 20-40 wt %; sodium sulfate at about 2-8 wt %; sodium perborate at about 12-18 wt %; TAED at about 2-7 wt %; α-glucan ether up to about 2 wt %; other polymers (e.g., maleic/acrylic acid copolymer, PEG) at about 1-5 wt %; optionally an enzyme(s) (calculated as pure enzyme protein) at about 0.0001-0.1 wt %; and minor ingredients (e.g., optical brightener, suds suppressors, perfumes) at about 0-5 wt %.

8) A detergent composition formulated as a granulate comprising: linear alkylbenzenesulfonate (calculated as acid) at about 8-14 wt %; ethoxylated fatty acid monoethanolamide at about 5-11 wt %; soap as fatty acid at about 0-3 wt %; sodium carbonate at about 4-10 wt %; soluble silicate (e.g., $Na_2O$ $2SiO_2$) at about 1-4 wt %; zeolite (e.g., NaAlSiO$_4$) at about 30-50 wt %; sodium sulfate at about 3-11 wt %; sodium citrate at about 5-12 wt %; α-glucan ether up to about 2 wt %; other polymers (e.g., PVP, maleic/acrylic acid copolymer, PEG) at about 1-5 wt %; optionally an enzyme(s) (calculated as pure enzyme protein) at about 0.0001-0.1 wt %; and minor ingredients (e.g., suds suppressors, perfumes) at about 0-5 wt %.

9) A detergent composition formulated as a granulate comprising: linear alkylbenzenesulfonate (calculated as acid) at about 6-12 wt %; nonionic surfactant at about 1-4 wt %; soap as fatty acid at about 2-6 wt %; sodium carbonate at about 14-22 wt %; zeolite (e.g., NaAlSiO$_4$) at about 18-32 wt %; sodium sulfate at about 5-20 wt %; sodium citrate at about 3-8 wt %; sodium perborate at about 4-9 wt %; bleach activator (e.g., NOBS or TAED) at about 1-5 wt %; α-glucan ether up to about 2 wt %; other polymers (e.g., polycarboxylate or PEG) at about 1-5 wt %; optionally an enzyme(s) (calculated as pure enzyme protein) at about 0.0001-0.1 wt %; and minor ingredients (e.g., optical brightener, perfume) at about 0-5 wt %.

10) An aqueous liquid detergent composition comprising: linear alkylbenzenesulfonate (calculated as acid) at about 15-23 wt %; alcohol ethoxysulfate (e.g., C12-15 alcohol, 2-3 EO) at about 8-15 wt %; alcohol ethoxylate (e.g., C12-15 alcohol, 7 EO; or C12-15 alcohol, 5 EO) at about 3-9 wt %; soap as fatty acid (e.g., lauric acid) at about 0-3 wt %; aminoethanol at about 1-5 wt %; sodium citrate at about 5-10 wt %; hydrotrope (e.g., sodium toluenesulfonate) at about 2-6 wt %; borate at about 0-2 wt %; α-glucan ether up to about 1 wt %; ethanol at about 1-3 wt %; propylene glycol at about 2-5 wt %; optionally an enzyme(s) (calculated as pure enzyme protein) at about 0.0001-0.1 wt %; and minor ingredients (e.g., dispersants, perfume, optical brighteners) at about 0-5 wt %.

11) An aqueous liquid detergent composition comprising: linear alkylbenzenesulfonate (calculated as acid) at about 20-32 wt %; alcohol ethoxylate (e.g., C12-15 alcohol, 7 EO; or C12-15 alcohol, 5 EO) at about 6-12 wt %; aminoethanol at about 2-6 wt %; citric acid at about 8-14 wt %; borate at about 1-3 wt %; α-glucan ether up to about 2 wt %; ethanol at about 1-3 wt %; propylene glycol at about 2-5 wt %; other polymers (e.g., maleic/acrylic acid copolymer, anchoring polymer such as lauryl methacrylate/acrylic acid copolymer) at about 0-3 wt %; glycerol at about 3-8 wt %; optionally an enzyme(s) (calculated as pure enzyme protein) at about 0.0001-0.1 wt %; and minor ingredients (e.g., hydrotropes, dispersants, perfume, optical brighteners) at about 0-5 wt %.

12) A detergent composition formulated as a granulate having a bulk density of at least 600 g/L comprising: anionic surfactant (e.g., linear alkylbenzenesulfonate, alkyl sulfate, alpha-olefinsulfonate, alpha-sulfo fatty acid methyl esters, alkanesulfonates, soap) at about 25-40 wt %; nonionic surfactant (e.g., alcohol ethoxylate) at about 1-10 wt %; sodium carbonate at about 8-25 wt %; soluble silicate (e.g., Na$_2$O 2SiO$_2$) at about 5-15 wt %; sodium sulfate at about 0-5 wt %; zeolite (NaAlSiO$_4$) at about 15-28 wt %; sodium perborate at about 0-20 wt %; bleach activator (e.g., TAED or NOBS) at about 0-5 wt %; α-glucan ether up to about 2 wt %; optionally an enzyme(s) (calculated as pure enzyme protein) at about 0.0001-0.1 wt %; and minor ingredients (e.g., perfume, optical brighteners) at about 0-3 wt %.

13) Detergent compositions as described in (1)-(12) above, but in which all or part of the linear alkylbenzenesulfonate is replaced by C12-C18 alkyl sulfate.

14) A detergent composition formulated as a granulate having a bulk density of at least 600 g/L comprising: C12-C18 alkyl sulfate at about 9-15 wt %; alcohol ethoxylate at about 3-6 wt %; polyhydroxy alkyl fatty acid amide at about 1-5 wt %; zeolite (e.g., NaAlSiO$_4$) at about 10-20 wt %; layered disilicate (e.g., SK56 from Hoechst) at about 10-20 wt %; sodium carbonate at about 3-12 wt %; soluble silicate (e.g., Na$_2$O 2SiO$_2$) at about 0-6 wt %; sodium citrate at about 4-8 wt %; sodium percarbonate at about 13-22 wt %; TAED at about 3-8 wt %; α-glucan ether up to about 2 wt %; other polymers (e.g., polycarboxylates and PVP) at about 0-5 wt %; optionally an enzyme(s) (calculated as pure enzyme protein) at about 0.0001-0.1 wt %; and minor ingredients (e.g., optical brightener, photobleach, perfume, suds suppressors) at about 0-5 wt %.

15) A detergent composition formulated as a granulate having a bulk density of at least 600 g/L comprising: C12-C18 alkyl sulfate at about 4-8 wt %; alcohol ethoxylate at about 11-15 wt %; soap at about 1-4 wt %; zeolite MAP or zeolite A at about 35-45 wt %; sodium carbonate at about 2-8 wt %; soluble silicate (e.g., Na$_2$O 2SiO$_2$) at 0-4 wt %; sodium percarbonate at about 13-22 wt %; TAED at about 1-8 wt %; α-glucan ether up to about 3 wt %; other polymers (e.g., polycarboxylates and PVP) at about 0-3 wt %; optionally an enzyme(s) (calculated as pure enzyme protein) at about 0.0001-0.1 wt %; and minor ingredients (e.g., optical brightener, phosphonate, perfume) at about 0-3 wt %.

16) Detergent formulations as described in (1)-(15) above, but that contain a stabilized or encapsulated peracid, either as an additional component or as a substitute for an already specified bleach system(s).

17) Detergent compositions as described in (1), (3), (7), (9) and (12) above, but in which perborate is replaced by percarbonate.

18) Detergent compositions as described in (1), (3), (7), (9), (12), (14) and (15) above, but that additionally contain a manganese catalyst. A manganese catalyst, for example, is one of the compounds described by Hage et al. (1994, *Nature* 369:637-639), which is incorporated herein by reference.

19) Detergent compositions formulated as a non-aqueous detergent liquid comprising a liquid non-ionic surfactant (e.g., a linear alkoxylated primary alcohol), a builder system (e.g., phosphate), α-glucan ether, optionally an enzyme(s), and alkali. The detergent may also comprise an anionic surfactant and/or bleach system.

In another embodiment, the present α-glucan oligomers/polymers (non-derivatized) may be partially or completely substituted for the α-glucan ether component in any of the above exemplary formulations.

It is believed that numerous commercially available detergent formulations can be adapted to include a poly alpha-1,3-1,6-glucan ether compound. Examples include PUREX® ULTRAPACKS (Henkel), FINISH® QUANTUM (Reckitt Benckiser), CLOROX™ 2 PACKS (Clorox), OXICLEAN MAX FORCE POWER PAKS (Church & Dwight), TIDE® STAIN RELEASE, CASCADE® ACTIONPACS, and TIDE® PODS™ (Procter & Gamble).

In a further embodiment to any of the above embodiments, a personal care composition, a fabric care composition or a laundry care composition is provided comprising the glucan ether composition described in any of the preceding embodiments.

The present α-glucan oligomer/polymer composition and/or the present α-glucan ether composition may be applied as a surface substantive treatment to a fabric, yarn or fiber. In yet a further embodiment, a fabric, yarn or fiber is provided comprising the present α-glucan oligomer/polymer composition, the present α-glucan ether composition, or a combination thereof.

The α-glucan ether compound disclosed herein may be used to alter viscosity of an aqueous composition. The α-glucan ether compound herein can have a relatively low DoS and still be an effective viscosity modifier. It is believed that the viscosity modification effect of the disclosed α-glucan ether compounds may be coupled with a rheology modification effect. It is further believed that, by contacting a hydrocolloid or aqueous solution herein with a surface (e.g., fabric surface), one or more α-glucan ether compounds and/or the present α-glucan oligomer/polymer composition, the compounds will adsorb to the surface.

In another embodiment, a method for preparing an aqueous composition, the method is provided comprising: contacting an aqueous composition with the present α-glucan ether compound wherein the aqueous composition comprises a cellulase, a protease or a combination thereof.

In another embodiment, a method to produce a glucan ether composition is provided comprising:
a. Providing an α-glucan oligomer/polymer composition comprising:
  i. 25-35 α-(1,3) glycosidic linkages;
  ii. 55-75% α-(1,6) glycosidic linkages;
  iii. 5-15% α-(1,3,6) glycosidic linkages;
  iv. a weight average molecular weight of less than 5000 Daltons;
  v. a viscosity of less than 0.25 Pascal second (Pa·s) at 12 wt % in water 20° C.;
  vi. a solubility of at least 20% (w/w) in water at 25° C.; and
  vii. a polydispersity index of less than 5;
b. contacting the α-glucan oligomer/polymer composition of (a) in a reaction under alkaline conditions with at least one etherification agent comprising an organic group; whereby an α-glucan ether is produced has a degree of substitution (DoS) with at least one organic group of about 0.05 to about 3.0; and
c. optionally isolating the α-glucan ether produced in step (b).

In another embodiment, a method of treating an article of clothing, textile or fabric is provided comprising:
a. providing a composition selected from
  i. a fabric care composition as described above;
  ii. a laundry care composition as described above;
  iii. an α-glucan ether composition as described above;
  iv. an α-glucan oligomer/polymer composition comprising:
    i. 25-35 α-(1,3) glycosidic linkages;
    ii. 55-75% α-(1,6) glycosidic linkages;
    iii. 5-15% α-(1,3,6) glycosidic linkages;
    iv. a weight average molecular weight of less than 5000 Daltons;
    v. a viscosity of less than 0.25 Pascal second (Pa·s) at 12 wt % in water 20° C.;
    vi. a solubility of at least 20% (w/w) in water at 25° C.; and
    vii. a polydispersity index of less than 5;
  v. any combination of (i) through (iv).
b. contacting under suitable conditions the composition of (a) with a fabric, textile or article of clothing whereby the fabric, textile or article of clothing is treated and receives a benefit;
c. optionally rinsing the treated fabric or article of clothing of (b).

In a preferred embodiment of the above method, the composition of (a) is cellulase resistant, protease resistant or a combination thereof.

In another embodiment to the above method, the α-glucan oligomer/polymer composition and/or the α-glucan ether composition is a surface substantive.

In another embodiment to any of the above methods, the benefit is selected from the group consisting of improved fabric hand, improved resistance to soil deposition, improved colorfastness, improved wear resistance, improved wrinkle resistance, improved antifungal activity, improved stain resistance, improved cleaning performance when laundered, improved drying rates, improved dye, pigment or lake update, and any combination thereof.

A fabric herein can comprise natural fibers, synthetic fibers, semi-synthetic fibers, or any combination thereof. A semi-synthetic fiber herein is produced using naturally occurring material that has been chemically derivatized, an example of which is rayon. Non-limiting examples of fabric types herein include fabrics made of (i) cellulosic fibers such as cotton (e.g., broadcloth, canvas, chambray, chenille, chintz, corduroy, cretonne, damask, denim, flannel, gingham, jacquard, knit, matelassé, oxford, percale, poplin, plissé, sateen, seersucker, sheers, terry cloth, twill, velvet), rayon (e.g., viscose, modal, lyocell), linen, and Tencel®; (ii) proteinaceous fibers such as silk, wool and related mammalian fibers; (iii) synthetic fibers such as polyester, acrylic, nylon, and the like; (iv) long vegetable fibers from jute, flax, ramie, coir, kapok, sisal, henequen, abaca, hemp and sunn; and (v) any combination of a fabric of (i)-(iv). Fabric comprising a combination of fiber types (e.g., natural and synthetic) include those with both a cotton fiber and polyester, for example. Materials/articles containing one or more fabrics herein include, for example, clothing, curtains, drapes, upholstery, carpeting, bed linens, bath linens, tablecloths, sleeping bags, tents, car interiors, etc. Other materials comprising natural and/or synthetic fibers include, for example, non-woven fabrics, paddings, paper, and foams.

An aqueous composition that is contacted with a fabric can be, for example, a fabric care composition (e.g., laundry detergent, fabric softener or other fabric treatment composition). Thus, a treatment method in certain embodiments can be considered a fabric care method or laundry method if employing a fabric care composition therein. A fabric care composition herein can effect one or more of the following fabric care benefits: improved fabric hand, improved resistance to soil deposition, improved soil release, improved colorfastness, improved fabric wear resistance, improved wrinkle resistance, improved wrinkle removal, improved shape retention, reduction in fabric shrinkage, pilling reduction, improved antifungal activity, improved stain resistance, improved cleaning performance when laundered, improved drying rates, improved dye, pigment or lake update, and any combination thereof.

Examples of conditions (e.g., time, temperature, wash/rinse volumes) for conducting a fabric care method or laundry method herein are disclosed in WO1997/003161 and U.S. Pat. Nos. 4,794,661, 4,580,421 and 5,945,394, which are incorporated herein by reference. In other examples, a material comprising fabric can be contacted with an aqueous composition herein: (i) for at least about 5, 10, 20, 30, 40, 50, 60, 70, 80, 90, 100, 110, or 120 minutes; (ii) at a temperature of at least about 10, 15, 20, 25, 30, 35, 40, 45, 50, 55, 60, 65, 70, 75, 80, 85, 90, or 95° C. (e.g., for laundry wash or rinse: a "cold" temperature of about 15-30° C., a "warm" temperature of about 30-50° C., a "hot" temperature of about 50-95° C.); (iii) at a pH of about 2, 3, 4, 5, 6, 7, 8, 9, 10, 11, or 12 (e.g., pH range of about 2-12, or about 3-11); (iv) at a salt (e.g., NaCl) concentration of at least about 0.5, 1.0, 1.5, 2.0, 2.5, 3.0, 3.5, or 4.0 wt %; or any combination of (i)-(iv). The contacting step in a fabric care method or laundry method can comprise any of washing, soaking, and/or rinsing steps, for example.

In certain embodiments of treating a material comprising fabric, the present α-glucan oligomers/polymers and/or the present α-glucan ether compound component(s) of the aqueous composition adsorbs to the fabric. This feature is believed to render the compounds useful as anti-redeposition agents and/or anti-greying agents in fabric care compositions disclosed herein (in addition to their viscosity-modifying effect). An anti-redeposition agent or anti-greying agent herein helps keep soil from redepositing onto clothing in wash water after the soil has been removed. It is further contemplated that adsorption of one or more of the present compounds herein to a fabric enhances mechanical properties of the fabric.

Adsorption of the present α-glucan oligomers/polymer and/or the present α-glucan ethers to a fabric herein can be measured following the methodology disclosed in the below Examples, for example. Alternatively, adsorption can be measured using a colorimetric technique (e.g., Dubois et al., 1956, *Anal. Chem.* 28:350-356; Zemljič et al., 2006, *Lenzinger Berichte* 85:68-76; both incorporated herein by reference) or any other method known in the art.

Other materials that can be contacted in the above treatment method include surfaces that can be treated with a dish detergent (e.g., automatic dishwashing detergent or hand dish detergent). Examples of such materials include surfaces of dishes, glasses, pots, pans, baking dishes, utensils and flatware made from ceramic material, china, metal, glass, plastic (e.g., polyethylene, polypropylene, polystyrene, etc.) and wood (collectively referred to herein as "tableware"). Thus, the treatment method in certain embodiments can be considered a dishwashing method or tableware washing method, for example. Examples of conditions (e.g., time, temperature, wash volume) for conducting a dishwashing or tableware washing method herein are disclosed in U.S. Pat. No. 8,575,083, which is incorporated herein by reference. In other examples, a tableware article can be contacted with an aqueous composition herein under a suitable set of conditions such as any of those disclosed above with regard to contacting a fabric-comprising material.

Certain embodiments of a method of treating a material herein further comprise a drying step, in which a material is dried after being contacted with the aqueous composition. A drying step can be performed directly after the contacting step, or following one or more additional steps that might follow the contacting step (e.g., drying of a fabric after being rinsed, in water for example, following a wash in an aqueous composition herein). Drying can be performed by any of several means known in the art, such as air drying (e.g., ~20-25° C.), or at a temperature of at least about 30, 40, 50, 60, 70, 80, 90, 100, 120, 140, 160, 170, 175, 180, or 200° C., for example. A material that has been dried herein typically has less than 3, 2, 1, 0.5, or 0.1 wt % water comprised therein. Fabric is a preferred material for conducting an optional drying step.

An aqueous composition used in a treatment method herein can be any aqueous composition disclosed herein, such as in the above embodiments or in the below Examples. Examples of aqueous compositions include detergents (e.g., laundry detergent or dish detergent) and water-containing dentifrices such as toothpaste.

In another embodiment, a method to alter the viscosity of an aqueous composition is provided comprising contacting one or more of the present α-glucan ether compounds with the aqueous composition, wherein the presence of the one or more α-glucan ether compounds alters (increases or decreases) the viscosity of the aqueous composition.

In a preferred aspect, the alteration in viscosity can be an increase and/or decrease of at least about 1%, 10%, 100%, 1000%, 100000%, or 1000000% (or any integer between 1% and 1000000%), for example, compared to the viscosity of the aqueous composition before the contacting step.

Etherification of the Present α-Glucan Oligomers/Polymers

The following steps can be taken to prepare the above etherification reaction.

The present α-glucan oligomers/polymers are contacted in a reaction under alkaline conditions with at least one etherification agent comprising an organic group. This step can be performed, for example, by first preparing alkaline conditions by contacting the present α-glucan oligomers/polymers with a solvent and one or more alkali hydroxides to provide a mixture (e.g., slurry) or solution. The alkaline conditions of the etherification reaction can thus comprise an alkali hydroxide solution. The pH of the alkaline conditions can be at least about 11.0, 11.2, 11.4, 11.6, 11.8, 12.0, 12.2, 12.4, 12.6, 12.8, or 13.0.

Various alkali hydroxides can be used, such as sodium hydroxide, potassium hydroxide, calcium hydroxide, lithium hydroxide, and/or tetraethylammonium hydroxide. The concentration of alkali hydroxide in a preparation with the present α-glucan oligomers/polymers and a solvent can be from about 1-70 wt %, 5-50 wt %, 5-10 wt %, 10-50 wt %, 10-40 wt %, or 10-30 wt % (or any integer between 1 and 70 wt %). Alternatively, the concentration of alkali hydroxide such as sodium hydroxide can be at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. An alkali hydroxide used to prepare alkaline conditions may be in a completely aqueous solution or an aqueous solution comprising one or more water-soluble organic solvents such as ethanol or isopropanol. Alternatively, an alkali hydroxide can be added as a solid to provide alkaline conditions.

Various organic solvents that can optionally be included or used as the main solvent when preparing the etherification reaction include alcohols, acetone, dioxane, isopropanol and toluene, for example. Toluene or isopropanol can be used in certain embodiments. An organic solvent can be added before or after addition of alkali hydroxide. The concentration of an organic solvent (e.g., isopropanol or toluene) in a preparation comprising the present α-glucan oligomers/polymers and an alkali hydroxide can be at least about 10, 15, 20, 25, 30, 35, 40, 45, 50, 55, 60, 65, 70, 75, 80, 85, or 90 wt % (or any integer between 10 and 90 wt %).

Alternatively, solvents that can dissolve the present α-glucan oligomers/polymers can be used when preparing the etherification reaction. These solvents include, but are not limited to, lithium chloride (LiCl)/N,N-dimethyl-acetamide (DMAc), $SO_2$/diethylamine (DEA)/dimethyl sulfoxide (DMSO), LiCl/1,3-dimethy-2-imidazolidinone (DMI), N,N-dimethylformamide (DMF)/$N_2O_4$, DMSO/tetrabutyl-ammonium fluoride trihydrate (TBAF), N-methylmorpholine-N-oxide (NMMO), Ni(tren)(OH)$_2$ [tren¼tris(2-aminoethyl) amine] aqueous solutions and melts of LiClO$_4$.3H$_2$O, NaOH/urea aqueous solutions, aqueous sodium hydroxide, aqueous potassium hydroxide, formic acid, and ionic liquids.

The present α-glucan oligomers/polymers can be contacted with a solvent and one or more alkali hydroxides by mixing. Such mixing can be performed during or after adding these components with each other. Mixing can be performed by manual mixing, mixing using an overhead mixer, using a magnetic stir bar, or shaking, for example. In certain embodiments, the present α-glucan oligomers/polymers can first be mixed in water or an aqueous solution before it is mixed with a solvent and/or alkali hydroxide.

After contacting the present α-glucan oligomers/polymers, solvent, and one or more alkali hydroxides with each other, the resulting composition can optionally be maintained at ambient temperature for up to 14 days. The term "ambient temperature" as used herein refers to a temperature between about 15-30° C. or 20-25° C. (or any integer between 15 and 30° C.). Alternatively, the composition can be heated with or without reflux at a temperature from about 30° C. to about 150° C. (or any integer between 30 and 150° C.) for up to about 48 hours. The composition in certain embodiments can be heated at about 55° C. for about 30 minutes or about 60 minutes. Thus, a composition obtained from mixing the present α-glucan oligomers/polymers, solvent, and one or more alkali hydroxides with each other can be heated at about 50, 51, 52, 53, 54, 55, 56, 57, 58, 59, or 60° C. for about 30-90 minutes.

After contacting the present α-glucan oligomers/polymers, solvent, and one or more alkali hydroxides with each other, the resulting composition can optionally be filtered (with or without applying a temperature treatment step). Such filtration can be performed using a funnel, centrifuge, press filter, or any other method and/or equipment known in the art that allows removal of liquids from solids. Though filtration would remove much of the alkali hydroxide, the filtered α-glucan oligomers/polymers would remain alkaline (i.e., mercerized α-glucan), thereby providing alkaline conditions.

An etherification agent comprising an organic group can be contacted with the present α-glucan oligomers/polymers in a reaction under alkaline conditions in a method herein of producing the respective α-glucan ether compounds. For example, an etherification agent can be added to a composition prepared by contacting the present α-glucan oligomers/polymers composition, solvent, and one or more alkali hydroxides with each other as described above. Alternatively, an etherification agent can be included when preparing the alkaline conditions (e.g., an etherification agent can be mixed with the present α-glucan oligomers/polymers and solvent before mixing with alkali hydroxide).

An etherification agent herein can refer to an agent that can be used to etherify one or more hydroxyl groups of glucose monomeric units of the present α-glucan oligomers/polymers with an organic group as disclosed herein. Examples of organic groups include alkyl groups, hydroxy alkyl groups, and carboxy alkyl groups. One or more etherification agents may be used in the reaction.

Etherification agents suitable for preparing an alkyl α-glucan ether compound include, for example, dialkyl sulfates, dialkyl carbonates, alkyl halides (e.g., alkyl chloride), iodoalkanes, alkyl triflates (alkyl trifluoromethanesulfonates) and alkyl fluorosulfonates. Thus, examples of etherification agents for producing methyl α-glucan ethers include dimethyl sulfate, dimethyl carbonate, methyl chloride, iodomethane, methyl triflate and methyl fluorosulfonate. Examples of etherification agents for producing ethyl α-glucan ethers include diethyl sulfate, diethyl carbonate, ethyl chloride, iodoethane, ethyl triflate and ethyl fluorosulfonate. Examples of etherification agents for producing propyl α-glucan ethers include dipropyl sulfate, dipropyl carbonate, propyl chloride, iodopropane, propyl triflate and propyl fluorosulfonate. Examples of etherification agents for producing butyl α-glucan ethers include dibutyl sulfate, dibutyl carbonate, butyl chloride, iodobutane and butyl triflate.

Etherification agents suitable for preparing a hydroxyalkyl α-glucan ether compound include, for example, alkylene oxides such as ethylene oxide, propylene oxide (e.g., 1,2-propylene oxide), butylene oxide (e.g., 1,2-butylene oxide; 2,3-butylene oxide; 1,4-butylene oxide), or combinations thereof. As examples, propylene oxide can be used as an etherification agent for preparing hydroxypropyl α-glucan, and ethylene oxide can be used as an etherification agent for preparing hydroxyethyl α-glucan. Alternatively, hydroxyalkyl halides (e.g., hydroxyalkyl chloride) can be used as etherification agents for preparing hydroxyalkyl α-glucan. Examples of hydroxyalkyl halides include hydroxyethyl halide, hydroxypropyl halide (e.g., 2-hydroxypropyl chloride, 3-hydroxypropyl chloride) and hydroxybutyl halide. Alternatively, alkylene chlorohydrins can be used as etherification agents for preparing hydroxyalkyl α-glucan ethers. Alkylene chlorohydrins that can be used include, but are not limited to, ethylene chlorohydrin, propylene chlorohydrin, butylene chlorohydrin, or combinations of these.

Etherification agents suitable for preparing a dihydroxyalkyl α-glucan ether compound include dihydroxyalkyl halides (e.g., dihydroxyalkyl chloride) such as dihydroxyethyl halide, dihydroxypropyl halide (e.g., 2,3-dihydroxypropyl chloride [i.e., 3-chloro-1,2-propanediol]), or dihydroxybutyl halide, for example. 2,3-dihydroxypropyl chloride can be used to prepare dihydroxypropyl α-glucan ethers, for example.

Etherification agents suitable for preparing a carboxyalkyl α-glucan ether compounds may include haloalkylates (e.g., chloroalkylate). Examples of haloalkylates include haloacetate (e.g., chloroacetate), 3-halopropionate (e.g., 3-chloropropionate) and 4-halobutyrate (e.g., 4-chlorobutyrate). For example, chloroacetate (monochloroacetate) (e.g., sodium chloroacetate) can be used as an etherification agent to prepare carboxymethyl α-glucan. An etherification agent herein can alternatively comprise a positively charged organic group.

An etherification agent in certain embodiments can etherify α-glucan oligomers/polymers with a positively charged organic group, where the carbon chain of the positively charged organic group only has a substitution with a positively charged group (e.g., substituted ammonium group such as trimethylammonium). Examples of such etherification agents include dialkyl sulfates, dialkyl carbonates, alkyl halides (e.g., alkyl chloride), iodoalkanes, alkyl triflates (alkyl trifluoromethanesulfonates) and alkyl fluorosulfonates, where the alkyl group(s) of each of these agents has one or more substitutions with a positively charged group (e.g., substituted ammonium group such as trimethylammonium). Other examples of such etherification agents include dimethyl sulfate, dimethyl carbonate, methyl chloride, iodomethane, methyl triflate and methyl fluorosulfonate, where the methyl group(s) of each of these agents has a substitution with a positively charged group (e.g., substituted ammonium group such as trimethylammonium). Other examples of such etherification agents include diethyl sulfate, diethyl carbonate, ethyl chloride, iodoethane, ethyl triflate and ethyl fluorosulfonate, where the ethyl group(s) of each of these agents has a substitution with a positively charged group (e.g., substituted ammonium group such as trimethylammonium). Other examples of such etherification agents include dipropyl sulfate, dipropyl carbonate, propyl chloride, iodopropane, propyl triflate and propyl fluorosulfonate, where the propyl group(s) of each of these agents has one or more substitutions with a positively charged group (e.g., substituted ammonium group such as trimethylammonium). Other examples of such etherification agents include dibutyl sulfate, dibutyl carbonate, butyl chloride, iodobutane and butyl triflate, where the butyl group(s) of each of these agents has one or more substitutions with a positively charged group (e.g., substituted ammonium group such as trimethylammonium).

An etherification agent alternatively may be one that can etherify the present α-glucan oligomers/polymers with a positively charged organic group, where the carbon chain of the positively charged organic group has a substitution (e.g., hydroxyl group) in addition to a substitution with a positively charged group (e.g., substituted ammonium group such as trimethylammonium). Examples of such etherification agents include hydroxyalkyl halides (e.g., hydroxyalkyl chloride) such as hydroxypropyl halide and hydroxybutyl halide, where a terminal carbon of each of these agents has a substitution with a positively charged group (e.g., substituted ammonium group such as trimethylammonium); an example is 3-chloro-2-hydroxypropyl-trimethylammonium. Other examples of such etherification agents include alkylene oxides such as propylene oxide (e.g., 1,2-propylene oxide) and butylene oxide (e.g., 1,2-butylene oxide; 2,3-butylene oxide), where a terminal carbon of each of these agents has a substitution with a positively charged group (e.g., substituted ammonium group such as trimethylammonium).

A substituted ammonium group comprised in any of the foregoing etherification agent examples can be a primary, secondary, tertiary, or quaternary ammonium group. Examples of secondary, tertiary and quaternary ammonium groups are represented in structure I, where $R_2$, $R_3$ and $R_4$ each independently represent a hydrogen atom or an alkyl group such as a methyl, ethyl, propyl, or butyl group. Etherification agents herein typically can be provided as a fluoride, chloride, bromide, or iodide salt (where each of the foregoing halides serve as an anion).

When producing the present α-glucan ether compounds with two or more different organic groups, two or more different etherification agents would be used, accordingly. For example, both an alkylene oxide and an alkyl chloride could be used as etherification agents to produce an alkyl hydroxyalkyl α-glucan ether. Any of the etherification agents disclosed herein may therefore be combined to produce α-glucan ether compounds with two or more different organic groups. Such two or more etherification agents may be used in the reaction at the same time, or may be used sequentially in the reaction. When used sequentially, any of the temperature-treatment (e.g., heating) steps disclosed below may optionally be used between each addition. One may choose sequential introduction of etherification agents in order to control the desired DoS of each organic group. In general, a particular etherification agent would be used first if the organic group it forms in the ether product is desired at a higher DoS compared to the DoS of another organic group to be added.

The amount of etherification agent to be contacted with the present α-glucan oligomers/polymers in a reaction under alkaline conditions can be determined based on the DoS required in the α-glucan ether compound being produced. The amount of ether substitution groups on each glucose monomeric unit in α-glucan ether compounds produced herein can be determined using nuclear magnetic resonance (NMR) spectroscopy. The molar substitution (MS) value for α-glucan has no upper limit. In general, an etherification agent can be used in a quantity of at least about 0.05 mole per mole of α-glucan. There is no upper limit to the quantity of etherification agent that can be used.

Reactions for producing α-glucan ether compounds herein can optionally be carried out in a pressure vessel such as a Parr reactor, an autoclave, a shaker tube or any other pressure vessel well known in the art. A reaction herein can optionally be heated following the step of contacting the present α-glucan oligomers/polymers with an etherification agent under alkaline conditions. The reaction temperatures and time of applying such temperatures can be varied within wide limits. For example, a reaction can optionally be maintained at ambient temperature for up to 14 days. Alternatively, a reaction can be heated, with or without reflux, between about 25° C. to about 200° C. (or any integer between 25 and 200° C.). Reaction time can be varied correspondingly: more time at a low temperature and less time at a high temperature.

In certain embodiments of producing carboxymethyl α-glucan ethers, a reaction can be heated to about 55° C. for about 3 hours. Thus, a reaction for preparing a carboxyalkyl α-glucan ether herein can be heated to about 50° C. to about 60° C. (or any integer between 50 and 60° C.) for about 2 hours to about 5 hours, for example. Etherification agents such as a haloacetate (e.g., monochloroacetate) may be used in these embodiments, for example.

Optionally, an etherification reaction herein can be maintained under an inert gas, with or without heating. As used herein, the term "inert gas" refers to a gas which does not undergo chemical reactions under a set of given conditions, such as those disclosed for preparing a reaction herein.

All of the components of the reactions disclosed herein can be mixed together at the same time and brought to the desired reaction temperature, whereupon the temperature is maintained with or without stirring until the desired α-glucan ether compound is formed. Alternatively, the mixed components can be left at ambient temperature as described above.

Following etherification, the pH of a reaction can be neutralized. Neutralization of a reaction can be performed using one or more acids. The term "neutral pH" as used herein, refers to a pH that is neither substantially acidic or basic (e.g., a pH of about 6-8, or about 6.0, 6.2, 6.4, 6.6, 6.8, 7.0, 7.2, 7.4, 7.6, 7.8, or 8.0). Various acids that can be used for this purpose include, but are not limited to, sulfuric, acetic (e.g., glacial acetic), hydrochloric, nitric, any mineral (inorganic) acid, any organic acid, or any combination of these acids.

The present α-glucan ether compounds produced in a reaction herein can optionally be washed one or more times with a liquid that does not readily dissolve the compound. For example, α-glucan ether can typically be washed with alcohol, acetone, aromatics, or any combination of these, depending on the solubility of the ether compound therein (where lack of solubility is desirable for washing). In general, a solvent comprising an organic solvent such as alcohol is preferred for washing an α-glucan ether. The present α-glucan ether product(s) can be washed one or more times with an aqueous solution containing methanol or ethanol, for example. For example, 70-95 wt % ethanol can be used to wash the product. The present α-glucan ether product can be washed with a methanol:acetone (e.g., 60:40) solution in another embodiment.

An α-glucan ether produced in the disclosed reaction can be isolated. This step can be performed before or after neutralization and/or washing steps using a funnel, centrifuge, press filter, or any other method or equipment known in the art that allows removal of liquids from solids. An isolated α-glucan ether product can be dried using any method known in the art, such as vacuum drying, air drying, or freeze drying.

Any of the above etherification reactions can be repeated using an α-glucan ether product as the starting material for further modification. This approach may be suitable for increasing the DoS of an organic group, and/or adding one or more different organic groups to the ether product.

The structure, molecular weight and DoS of the α-glucan ether product can be confirmed using various physiochemical analyses known in the art such as NMR spectroscopy and size exclusion chromatography (SEC).

Personal Care and/or Pharmaceutical Compositions Comprising the Present Soluble Oligomer/Polymer The present glucan oligomer/polymers and/or the present α-glucan ethers may be used in personal care products. For example, one may be able to use such materials as humectants, hydrocolloids or possibly thickening agents. The present α-glucan oligomers/polymers and/or the present α-glucan ethers may be used in conjunction with one or more other types of thickening agents if desired, such as those disclosed in U.S. Pat. No. 8,541,041, the disclosure of which is incorporated herein by reference in its entirety.

Personal care products herein are not particularly limited and include, for example, skin care compositions, cosmetic compositions, antifungal compositions, and antibacterial compositions. Personal care products herein may be in the form of, for example, lotions, creams, pastes, balms, ointments, pomades, gels, liquids, combinations of these and the like. The personal care products disclosed herein can include at least one active ingredient. An active ingredient is generally recognized as an ingredient that causes the intended pharmacological effect.

In certain embodiments, a skin care product can be applied to skin for addressing skin damage related to a lack of moisture. A skin care product may also be used to address the visual appearance of skin (e.g., reduce the appearance of flaky, cracked, and/or red skin) and/or the tactile feel of the skin (e.g., reduce roughness and/or dryness of the skin while improved the softness and subtleness of the skin). A skin care product typically may include at least one active ingredient for the treatment or prevention of skin ailments, providing a cosmetic effect, or for providing a moisturizing benefit to skin, such as zinc oxide, petrolatum, white petrolatum, mineral oil, cod liver oil, lanolin, dimethicone, hard fat, vitamin A, allantoin, calamine, kaolin, glycerin, or colloidal oatmeal, and combinations of these. A skin care product may include one or more natural moisturizing factors such as ceramides, hyaluronic acid, glycerin, squalane, amino acids, cholesterol, fatty acids, triglycerides, phospholipids, glycosphingolipids, urea, linoleic acid, glycosaminoglycans, mucopolysaccharide, sodium lactate, or sodium pyrrolidone carboxylate, for example. Other ingredients that may be included in a skin care product include, without limitation, glycerides, apricot kernel oil, canola oil, squalane, squalene, coconut oil, corn oil, jojoba oil, jojoba wax, lecithin, olive oil, safflower oil, sesame oil, shea butter, soybean oil, sweet almond oil, sunflower oil, tea tree oil, shea butter, palm oil, cholesterol, cholesterol esters, wax esters, fatty acids, and orange oil.

A personal care product herein can also be in the form of makeup or other product including, but not limited to, a lipstick, mascara, rouge, foundation, blush, eyeliner, lip liner, lip gloss, other cosmetics, sunscreen, sun block, nail polish, mousse, hair spray, styling gel, nail conditioner, bath gel, shower gel, body wash, face wash, shampoo, hair conditioner (leave-in or rinse-out), cream rinse, hair dye, hair coloring product, hair shine product, hair serum, hair anti-frizz product, hair split-end repair product, lip balm, skin conditioner, cold cream, moisturizer, body spray, soap, body scrub, exfoliant, astringent, scruffing lotion, depilatory, permanent waving solution, antidandruff formulation, antiperspirant composition, deodorant, shaving product, preshaving product, after-shaving product, cleanser, skin gel, rinse, toothpaste, or mouthwash, for example.

A pharmaceutical product herein can be in the form of an emulsion, liquid, elixir, gel, suspension, solution, cream, capsule, tablet, sachet or ointment, for example. Also, a pharmaceutical product herein can be in the form of any of the personal care products disclosed herein. A pharmaceutical product can further comprise one or more pharmaceutically acceptable carriers, diluents, and/or pharmaceutically acceptable salts. The present α-glucan oligomers/polymers and/or compositions comprising the present α-glucan oligomers/polymers can also be used in capsules, encapsulants, tablet coatings, and as excipients for medicaments and drugs.

Enzymatic Synthesis of the Soluble α-Glucan Oligomer/Polymer Composition

Methods are provided to enzymatically produce a soluble α-glucan oligomer/polymer composition. In one embodiment, the method comprises the use of at least one recombinantly produced glucosyltransferase belong to glucoside hydrolase type 70 (E.C. 2.4.1.-) capable of catalyzing the synthesis of a digestion resistant soluble α-glucan oligomer/polymer composition using sucrose as a substrate. Glycoside hydrolase family 70 enzymes are transglucosidases produced by lactic acid bacteria such as *Streptococcus*, *Leuconostoc*, *Weisella* or *Lactobacillus* genera (see Carbohydrate Active Enzymes database; "CAZy"; Cantarel et al., (2009) *Nucleic Acids Res* 37:D233-238). The recombinantly expressed glucosyltransferases preferably have an amino acid sequence identical to that found in nature (i.e., the same as the full length sequence as found in the source organism or a catalytically active truncation thereof).

The GTF enzymes are able to polymerize the D-glucosyl units of sucrose to form homooligosaccharides or homopolysaccharides. Depending upon the specificity of the GTF enzyme, linear and/or branched glucans comprising various glycosidic linkages may be formed such as α-(1,2), α-(1,3), α-(1,4) and α-(1,6). Glucosyltransferases may also transfer the D-glucosyl units onto hydroxyl acceptor groups. A non-limiting list of acceptors may include carbohydrates, alcohols, polyols or flavonoids. The structure of the resultant glucosylated product is dependent upon the enzyme specificity.

In the present disclosure, the D-glucopyranosyl donor is sucrose.

As such the reaction is:

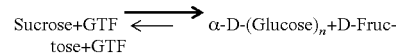

The type of glycosidic linkage predominantly formed is used to name/classify the glucosyltransferase enzyme. Examples include dextransucrases (α-(1,6) linkages; EC 2.4.1.5), mutansucrases (α-(1,3) linkages; EC 2.4.1.-), alternansucrases (alternating α(1,3)-α(1,6) backbone; EC 2.4.1.140), and reuteransucrases (mix of α-(1,4) and α-(1,6) linkages; EC 2.4.1.-).

In one aspect, the glucosyltransferase (GTF) is capable of forming glucans having 25-35% or more α-(1,3) glycosidic linkages with the proviso that that glucan product is not alternan (i.e., the enzyme is not an alternansucrase). In a preferred aspect, the glucosyltransferase is a mutansucrase (EC 2.4.1.-).

In one aspect, the glucosyltransferase comprises an amino acid sequence selected from the group consisting of SEQ ID NOs:10, 12 and combinations thereof (including the mature glucosyltransferases with the signal peptide removed). However, it should be noted that some wild type sequences may be found in nature in a truncated form. As such, and in a further embodiment, the glucosyltransferase suitable for use may be a truncated form of the wild type sequence. In a further embodiment, the truncated glucosyltransferase comprises a sequence derived from the full length wild type amino acid SEQ ID NO: 10. In another embodiment, the glucosyltransferase may be truncated and will have an amino acid sequence SEQ ID NO: 12.

The concentration of the catalyst in the aqueous reaction formulation depends on the specific catalytic activity of the catalyst, and is chosen to obtain the desired rate of reaction. The weight of each catalyst (either a single glucosyltransferase or individually a glucosyltransferase and α-glucanohydrolase) reactions typically ranges from 0.0001 mg to 20 mg per mL of total reaction volume, preferably from 0.001 mg to 10 mg per mL. The catalyst may also be immobilized on a soluble or insoluble support using methods well-known to those skilled in the art; see for example, *Immobilization of Enzymes and Cells*; Gordon F. Bickerstaff, Editor; Humana Press, Totowa, N.J., USA; 1997. The use of immobilized catalysts permits the recovery and reuse of the catalyst in subsequent reactions. The enzyme catalyst may be in the form of whole microbial cells, permeabilized microbial cells, microbial cell extracts, partially-purified or purified enzymes, and mixtures thereof.

The pH of the final reaction formulation is from about 3 to about 8, preferably from about 4 to about 8, more preferably from about 5 to about 8, even more preferably about 5.5 to about 7.5, and yet even more preferably about 5.5 to about 6.5. The pH of the reaction may optionally be controlled by the addition of a suitable buffer including, but not limited to, phosphate, pyrophosphate, bicarbonate, acetate, or citrate. The concentration of buffer, when employed, is typically from 0.1 mM to 1.0 M, preferably from 1 mM to 300 mM, most preferably from 10 mM to 100 mM.

The sucrose concentration initially present when the reaction components are combined is at least 50 g/L, preferably 50 g/L to 500 g/L, more preferably 100 g/L to 500 g/L, more preferably 150 g/L to 450 g/L, and most preferably 250 g/L to 450 g/L. The substrate for the α-glucanohydrolase (when present) will be the members of the glucose oligomer population formed by the glucosyltransferase. As the glucose oligomers present in the reaction system may act as acceptors, the exact concentration of each species present in the reaction system will vary. Additionally, other acceptors may be added (i.e., external acceptors) to the initial reaction mixture such as maltose, isomaltose, isomaltotriose, and methyl-α-D-glucan, to name a few.

The length of the reaction may vary and may often be determined by the amount of time it takes to use all of the available sucrose substrate. In one embodiment, the reaction is conducted until at least 90%, preferably at least 95% and most preferably at least 99% of the sucrose initially present in the reaction mixture is consumed. In another embodiment, the reaction time is 1 hour to 168 hours, preferably 1 hour to 120 hours, and most preferably 1 hour to 72 hours.

Soluble Glucan Fiber Synthesis—Reaction Systems Comprising a Glucosyltransferase (Gtf) and an α-Glucanohydrolase A method is provided to enzymatically produce the present soluble glucan oligomer/polymers using at least one α-glucanohydrolase in combination (i.e., concomitantly in the reaction mixture) with at least one of the above glucosyltransferases. The simultaneous use of the two enzymes produces a different product profile (i.e., the profile of the soluble oligomer/polymer composition) when compared to a sequential application of the same enzymes (i.e., first synthesizing the glucan polymer from sucrose using a glucosyltransferase and then subsequently treating the glucan polymer with an α-glucanohydrolase). In one embodiment, a glucan oligomer/polymer synthesis method based on sequential application of a glucosyltransferase with an α-glucanohydrolase is specifically excluded.

Similar to the glucosyltransferases, an α-glucanohydrolase may be defined by the endohydrolysis activity towards certain α-D-glycosidic linkages. Examples may include, but are not limited to, dextranases (capable of hydrolyzing α-(1,6)-linked glycosidic bonds; E.C. 3.2.1.11), mutanases (capable of hydrolyzing α-(1,3)-linked glycosidic bonds; E.C. 3.2.1.59), mycodextranases (capable of endohydrolysis of (1→4)-α-D-glucosidic linkages in α-D-glucans containing both (1→3)- and (1→4)-bonds; EC 3.2.1.61), glucan 1,6-α-glucosidase (EC 3.2.1.70), and alternanases (capable of endohydrolytically cleaving alternan; E.C. 3.2.1.-; see U.S. Pat. No. 5,786,196). Various factors including, but not limited to, level of branching, the type of branching, and the relative branch length within certain α-glucans may adversely impact the ability of an α-glucanohydrolase to endohydrolyze some glycosidic linkages.

In one embodiment, the α-glucanohydrolase is a dextranase (EC 2.1.1.11), a mutanase (EC 3.1.1.59) or a combination thereof. In one embodiment, the dextranase is a food grade dextranase from *Chaetomium erraticum*. In a further embodiment, the dextranase from *Chaetomium erraticum* is DEXTRANASE® PLUS L, available from Novozymes A/S, Denmark.

In another embodiment, the α-glucanohydrolase is at least one mutanase (EC 3.1.1.59). In one embodiment, the mutanase is one obtainable from the genera *Penicillium, Paenibacillus, Hypocrea, Aspergillus*, and *Trichoderma*. In a further embodiment, the mutanase is from *Penicillium marneffei* ATCC 18224 or *Paenibacillus humicus*. In one embodiment, the polypeptide having mutanase activity comprises at least 90% identity, preferably 91, 92, 93, 94, 95, 96, 97, 98, 99 or 100% identity, to at least one of the mutanase sequences described herein. In one embodiment, the polypeptide having mutanase activity comprises at least 90% identity, preferably 91, 92, 93, 94, 95, 96, 97, 98, 99 or 100% identity, to SEQ ID NO: 1, 3, 6 or 8. In one embodiment, the mutanase comprises an amino acid sequence selected from SEQ ID NOs 1, 3, 6, 8 and any combination thereof when used in combination with the above glucosyltransferases In yet a further embodiment, the mutanase comprises an amino acid sequence selected from SEQ ID NO: 1, 3, 6, and any combination thereof. In a further embodiment, the mutanase comprises SEQ ID NO: 3. In another embodiment, the above mutanases may be a catalytically active truncation so long as the mutanase activity is retained The temperature of the enzymatic reaction system comprising concomitant use of at least one glucosyltransferase and at least one α-glucanohydrolase may be chosen to control both the reaction rate and the stability of the enzyme catalyst activity. The temperature of the reaction may range from just above the freezing point of the reaction formulation (approximately 0° C.) to about 60° C., with a preferred range of 5° C. to about 55° C., and a more preferred range of reaction temperature of from about 20° C. to about 45° C.

The ratio of glucosyltransferase activity to α-glucanohydrolase activity may vary depending upon the selected enzymes. In one embodiment, the ratio of glucosyltransferase activity to α-glucanohydrolase activity ranges from 1:0.01 to 0.01:1.0.

In one embodiment, a method is provided to produce a soluble α-glucan oligomer/polymer composition comprising:

a. providing a set of reaction components comprising:
   i. sucrose;
   ii. at least one polypeptide having glucosyltransferase activity; said polypeptide having at least 90% identity to SEQ ID NO: 10 or 12;
   iii. at least one polypeptide having α-glucanohydrolase activity; said polypeptide selected from the group of:
      1. a polypeptide having mutanase activity, said polypeptide having at least 90% identity to SEQ ID NO: 1 or 3;
      2. a polypeptide comprising dextranase activity; and
      3. a combination of 1 and 2; and
   iv. optionally one more acceptors;
b. combining under suitable reaction conditions the set of reaction components of (a) whereby a product comprising a soluble α-glucan oligomer/polymer composition is produced; and
c. optionally isolating the soluble α-glucan oligomer/polymer composition from the product of step (b).

In a preferred embodiment, the at least one glucosyltransferase and the at least one α-glucanohydrolase are concomitantly present in the reaction to produce the soluble α-glucan oligomer/polymer composition.

Methods to Identify Substantially Similar Enzymes Having the Desired Activity

The skilled artisan recognizes that substantially similar enzyme sequences may also be used in the present compositions and methods so long as the desired activity is retained (i.e., glucosyltransferase activity capable of forming glucans having the desired glycosidic linkages or α-glucanohydrolases having endohydrolytic activity towards the target glycosidic linkage(s)). For example, it has been demonstrated that catalytically activity truncations may be prepared and used so long as the desired activity is retained (or even improved in terms of specific activity). In one embodiment, substantially similar sequences are defined by their ability to hybridize, under highly stringent conditions with the nucleic acid molecules associated with sequences exemplified herein. In another embodiment, sequence alignment algorithms may be used to define substantially similar enzymes based on the percent identity to the DNA or amino acid sequences provided herein.

As used herein, a nucleic acid molecule is "hybridizable" to another nucleic acid molecule, such as a cDNA, genomic DNA, or RNA, when a single strand of the first molecule can anneal to the other molecule under appropriate conditions of temperature and solution ionic strength. Hybridization and washing conditions are well known and exemplified in Sambrook, J. and Russell, D., T. *Molecular Cloning: A Laboratory Manual*, Third Edition, Cold Spring Harbor Laboratory Press, Cold Spring Harbor (2001). The conditions of temperature and ionic strength determine the "stringency" of the hybridization. Stringency conditions can be adjusted to screen for moderately similar molecules, such as homologous sequences from distantly related organisms, to highly similar molecules, such as genes that duplicate functional enzymes from closely related organisms. Post-hybridization washes typically determine stringency conditions. One set of preferred conditions uses a series of washes starting with 6×SSC, 0.5% SDS at room temperature for 15 min, then repeated with 2×SSC, 0.5% SDS at 45° C. for 30 min, and then repeated twice with 0.2×SSC, 0.5% SDS at 50° C. for 30 min. A more preferred set of conditions uses higher temperatures in which the washes are identical to those above except for the temperature of the final two 30 min washes in 0.2×SSC, 0.5% SDS was increased to 60° C. Another preferred set of highly stringent hybridization conditions is 0.1×SSC, 0.1% SDS, 65° C. and washed with 2×SSC, 0.1% SDS followed by a final wash of 0.1×SSC, 0.1% SDS, 65° C.

Hybridization requires that the two nucleic acids contain complementary sequences, although depending on the stringency of the hybridization, mismatches between bases are possible. The appropriate stringency for hybridizing nucleic acids depends on the length of the nucleic acids and the degree of complementation, variables well known in the art. The greater the degree of similarity or homology between two nucleotide sequences, the greater the value of Tm for hybrids of nucleic acids having those sequences. The relative stability (corresponding to higher Tm) of nucleic acid hybridizations decreases in the following order: RNA:RNA, DNA:RNA, DNA:DNA. For hybrids of greater than 100 nucleotides in length, equations for calculating Tm have been derived (Sambrook, J. and Russell, D., T., supra). For hybridizations with shorter nucleic acids, i.e., oligonucleotides, the position of mismatches becomes more important, and the length of the oligonucleotide determines its specificity. In one aspect, the length for a hybridizable nucleic acid is at least about 10 nucleotides. Preferably, a minimum length for a hybridizable nucleic acid is at least about 15 nucleotides in length, more preferably at least about 20 nucleotides in length, even more preferably at least 30 nucleotides in length, even more preferably at least 300 nucleotides in length, and most preferably at least 800 nucleotides in length. Furthermore, the skilled artisan will recognize that the temperature and wash solution salt concentration may be adjusted as necessary according to factors such as length of the probe.

As used herein, the term "percent identity" is a relationship between two or more polypeptide sequences or two or more polynucleotide sequences, as determined by comparing the sequences. In the art, "identity" also means the degree of sequence relatedness between polypeptide or polynucleotide sequences, as the case may be, as determined by the match between strings of such sequences. "Identity" and "similarity" can be readily calculated by known methods, including but not limited to those described in: *Computational Molecular Biology* (Lesk, A. M., ed.) Oxford University Press, NY (1988); *Biocomputing: Informatics and Genome Projects* (Smith, D. W., ed.) Academic Press, NY (1993); *Computer Analysis of Sequence Data, Part I* (Griffin, A. M., and Griffin, H. G., eds.) Humana Press, NJ (1994); *Sequence Analysis in Molecular Biology* (von Heinje, G., ed.) Academic Press (1987); and *Sequence Analysis Primer* (Gribskov, M. and Devereux, J., eds.) Stockton Press, NY (1991). Methods to determine identity and similarity are codified in publicly available computer programs. Sequence alignments and percent identity calculations may be performed using the Megalign program of the LASERGENE bioinformatics computing suite (DNASTAR Inc., Madison, Wis.), the AlignX program of Vector NTI v. 7.0 (Informax, Inc., Bethesda, Md.), or the EMBOSS Open Software Suite (EMBL-EBI; Rice et al., *Trends in Genetics* 16, (6):276-277 (2000)). Multiple alignment of the sequences can be performed using the CLUSTAL method (such as CLUSTALW; for example version 1.83) of alignment (Higgins and Sharp, *CABIOS*, 5:151-153 (1989); Higgins et al., *Nucleic Acids Res.* 22:4673-4680 (1994); and Chenna et al., *Nucleic Acids Res* 31 (13):3497-500 (2003)), available from the European Molecular Biology Laboratory via the European Bioinformatics Institute) with the default parameters. Suitable parameters for CLUSTALW protein alignments include GAP Existence penalty=15, GAP extension=0.2, matrix=Gonnet (e.g., Gonnet250), protein END- GAP=−1, protein GAPDIST=4, and KTUPLE=1. In one embodiment, a fast or slow alignment is used with the default settings where a slow alignment is preferred. Alternatively, the parameters using the CLUSTALW method (e.g., version 1.83) may be modified to also use KTUPLE=1, GAP PENALTY=10, GAP extension=1, matrix=BLOSUM (e.g., BLOSUM64), WINDOW=5, and TOP DIAGONALS SAVED=5.

In one aspect, suitable isolated nucleic acid molecules encode a polypeptide having an amino acid sequence that is at least about 20%, preferably at least 30%, 40%, 50%, 60%, 70%, 80%, 85%, 90%, 91%, 92%, 93%, 94%, 95%, 96%, 97%, 98%, or 99% identical to the amino acid sequences reported herein. In another aspect, suitable isolated nucleic acid molecules encode a polypeptide having an amino acid sequence that is at least about 20%, preferably at least 30%, 40%, 50%, 60%, 70%, 80%, 85%, 90%, 91%, 92%, 93%, 94%, 95%, 96%, 97%, 98%, or 99% identical to the amino acid sequences reported herein; with the proviso that the polypeptide retains the respective activity (i.e., glucosyltransferase or α-glucanohydrolase activity).

Methods to Obtain the Enzymatically-Produced Soluble α-Glucan Oligomer/Polymer Composition Any number of common purification techniques may be used to obtain the present soluble α-glucan oligomer/polymer composition from the reaction system including, but not limited to centrifugation, filtration, fractionation, chromatographic separation, dialysis, evaporation, precipitation, dilution or any combination thereof, preferably by dialysis or chromatographic separation, most preferably by dialysis (ultrafiltration).

Recombinant Microbial Expression

The genes and gene products of the instant sequences may be produced in heterologous host cells, particularly in the cells of microbial hosts. Preferred heterologous host cells for expression of the instant genes and nucleic acid molecules are microbial hosts that can be found within the fungal or bacterial families and which grow over a wide range of temperature, pH values, and solvent tolerances. For example, it is contemplated that any of bacteria, yeast, and filamentous fungi may suitably host the expression of the present nucleic acid molecules. The enzyme(s) may be expressed intracellularly, extracellularly, or a combination of both intracellularly and extracellularly, where extracellular expression renders recovery of the desired protein from a fermentation product more facile than methods for recovery of protein produced by intracellular expression. Transcription, translation and the protein biosynthetic apparatus remain invariant relative to the cellular feedstock used to generate cellular biomass; functional genes will be expressed regardless. Examples of host strains include, but are not limited to, bacterial, fungal or yeast species such as *Aspergillus, Trichoderma, Saccharomyces, Pichia, Phaffia, Kluyveromyces, Candida, Hansenula, Yarrowia, Salmonella, Bacillus, Acinetobacter, Zymomonas, Agrobacterium, Erythrobacter, Chlorobium, Chromatium, Flavobacterium, Cytophaga, Rhodobacter, Rhodococcus, Streptomyces, Brevibacterium, Corynebacteria, Mycobacterium, Deinococcus, Escherichia, Erwinia, Pantoea, Pseudomonas, Sphingomonas, Methylomonas, Methylobacter, Methylococcus, Methylosinus, Methylomicrobium, Methylocystis, Alcaligenes, Synechocystis, Synechococcus, Anabaena, Thiobacillus, Methanobacterium, Klebsiella,* and *Myxococcus.* In one embodiment, the fungal host cell is *Trichoderma,* preferably a strain of *Trichoderma reesei.* In one embodiment, bacterial host strains include *Escherichia, Bacillus, Kluyveromyces,* and *Pseudomonas.* In a preferred embodiment, the bacterial host cell is *Bacillus subtilis* or *Escherichia coli.*

Large-scale microbial growth and functional gene expression may use a wide range of simple or complex carbohydrates, organic acids and alcohols or saturated hydrocarbons, such as methane or carbon dioxide in the case of photosynthetic or chemoautotrophic hosts, the form and amount of nitrogen, phosphorous, sulfur, oxygen, carbon or any trace micronutrient including small inorganic ions. The regulation of growth rate may be affected by the addition, or not, of specific regulatory molecules to the culture and which are not typically considered nutrient or energy sources.

Vectors or cassettes useful for the transformation of suitable host cells are well known in the art. Typically the vector or cassette contains sequences directing transcription and translation of the relevant gene, a selectable marker, and sequences allowing autonomous replication or chromosomal integration. Suitable vectors comprise a region 5' of the gene which harbors transcriptional initiation controls and a region 3' of the DNA fragment which controls transcriptional termination. It is most preferred when both control regions are derived from genes homologous to the transformed host cell and/or native to the production host, although such control regions need not be so derived.

Initiation control regions or promoters which are useful to drive expression of the present cephalosporin C deacetylase coding region in the desired host cell are numerous and familiar to those skilled in the art. Virtually any promoter capable of driving these genes is suitable including but not limited to, CYC1, HIS3, GAL1, GAL10, ADH1, PGK, PHO5, GAPDH, ADC1, TRP1, URA3, LEU2, ENO, TPI (useful for expression in *Saccharomyces*); AOX1 (useful for expression in *Pichia*); and lac, araB, tet, trp, $IP_L$, $IP_R$, T7, tac, and trc (useful for expression in *Escherichia coli*) as well as the amy, apr, npr promoters and various phage promoters useful for expression in *Bacillus.*

Termination control regions may also be derived from various genes native to the preferred host cell. In one embodiment, the inclusion of a termination control region is optional. In another embodiment, the chimeric gene includes a termination control region derived from the preferred host cell.

Industrial Production

A variety of culture methodologies may be applied to produce the enzyme(s). For example, large-scale production of a specific gene product over-expressed from a recombinant microbial host may be produced by batch, fed-batch, and continuous culture methodologies. Batch and fed-batch culturing methods are common and well known in the art and examples may be found in *Biotechnology: A Textbook of Industrial Microbiology* by Wulf Crueger and Anneliese Crueger (authors), Second Edition, (Sinauer Associates, Inc., Sunderland, Mass. (1990) and *Manual of Industrial Microbiology and Biotechnology,* Third Edition, Richard H. Baltz, Arnold L. Demain, and Julian E. Davis (Editors), (ASM Press, Washington, D.C. (2010).

Commercial production of the desired enzyme(s) may also be accomplished with a continuous culture. Continuous cultures are an open system where a defined culture media is added continuously to a bioreactor and an equal amount of conditioned media is removed simultaneously for processing. Continuous cultures generally maintain the cells at a constant high liquid phase density where cells are primarily in log phase growth. Alternatively, continuous culture may be practiced with immobilized cells where carbon and nutrients are continuously added and valuable products, by-products or waste products are continuously removed from the cell mass. Cell immobilization may be performed using a wide range of solid supports composed of natural and/or synthetic materials.

Recovery of the desired enzyme(s) from a batch fermentation, fed-batch fermentation, or continuous culture, may be accomplished by any of the methods that are known to those skilled in the art. For example, when the enzyme catalyst is produced intracellularly, the cell paste is separated from the culture medium by centrifugation or membrane filtration, optionally washed with water or an aqueous buffer at a desired pH, then a suspension of the cell paste in an aqueous buffer at a desired pH is homogenized to produce a cell extract containing the desired enzyme catalyst. The cell extract may optionally be filtered through an appropriate filter aid such as celite or silica to remove cell debris prior to a heat-treatment step to precipitate undesired protein from the enzyme catalyst solution. The solution containing the desired enzyme catalyst may then be separated from the precipitated cell debris and protein by membrane filtration or centrifugation, and the resulting partially-purified enzyme catalyst solution concentrated by additional membrane filtration, then optionally mixed with an appropriate carrier (for example, maltodextrin, phosphate buffer, citrate buffer, or mixtures thereof) and spray-dried to produce a solid powder comprising the desired enzyme catalyst. Alternatively, the resulting partially-purified enzyme catalyst solution can be stabilized as a liquid formulation by the addition of polyols such as maltodextrin, sorbitol, or propylene glycol, to which is optionally added a preservative such as sorbic acid, sodium sorbate or sodium benzoate.

When an amount, concentration, or other value or parameter is given either as a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope be limited to the specific values recited when defining a range.

Description of Certain Embodiments

In a first embodiment (the "first embodiment"), a soluble α-glucan oligomer/polymer composition is provided, said soluble α-glucan oligomer/polymer composition comprising:
  a. 25-35 α-(1,3) glycosidic linkages, preferably 27-31% α-(1,3) glycosidic linkages;
  b. 55-75% α-(1,6) glycosidic linkages; preferable 55-65%, more preferably 57-61% α-(1,6) glycosidic linkages;
  c. 5-15% α-(1,3,6) glycosidic linkages; preferably 7-11% α-(1,3,6) glycosidic linkages;
  d. a weight average molecular weight of less than 5000 Daltons; preferably less than 2500 Daltons, more preferably between 500 and 2500 Daltons, and most preferably about 500 to about 2000 Daltons;
  e. a viscosity of less than 250 cP (0.25 Pascal second (Pa·s)), preferably less than 10 cP (0.01 Pa·s), preferably less than 7 cP (0.007 Pa·s), more preferably less than 5 cP (0.005 Pa·s), more preferably less than 4 cP (0.004 Pa·s), and most preferably less than 3 cP (0.003 Pa·s) at 12 wt % in water at 20° C.
  f. a solubility of at least 20% (w/w), preferably at least 30%, 40%, 50%, 60%, or 70%, in water at 25° C.; and
  g. a polydispersity index of less than 5.

In second embodiment, a fabric care, laundry care, or aqueous composition is provided comprising 0.01 to 99 wt % (dry solids basis), preferably 10 to 90% wt %, of the soluble α-glucan oligomer/polymer composition described above.

In another embodiment, a method to produce a soluble α-glucan oligomer/polymer composition is provided comprising:
  a. providing a set of reaction components comprising:
    i. sucrose; preferably at an initial concentration of at least 50 g/L, more preferably at least 200 g/L;
    ii. at least one polypeptide having glucosyltransferase activity; said polypeptide having at least 90% identity, preferably 91, 92, 93, 94, 95, 96, 97, 98, 99 or 100% identity to SEQ ID NO: 10 or 12;
    iii. at least one polypeptide having α-glucanohydrolase activity; said polypeptide selected from the group of:
      1. a polypeptide having mutanase activity, said polypeptide having at least 90% identity, preferably at least 91, 92, 93, 94, 95, 96, 97, 98, 99 or 100% identity to SEQ ID NO: 1, 3, 6 or 8;
      2. a polypeptide comprising dextranase activity; preferably dextranase activity from *Chaetomium erraticum*; more preferably dextranase L from *Chaetomium erraticum*; and
      3. a combination of 1 and 2; and
    iv. optionally one more acceptors;
  b. combining under suitable reaction conditions the set of reaction components of (a) whereby a product comprising a soluble α-glucan oligomer/polymer composition is produced; preferably wherein the polypeptide having glucosyltransferase activity and the polypeptide having α-glucanohydrolase activity are concomitantly present in the reaction mixture; and
  c. optionally isolating the soluble α-glucan oligomer/polymer composition from the product of step (b); preferably wherein the isolating step (c) is present.

In another embodiment, the above method is used to produce the α-glucan oligomer/polymer composition of the first embodiment.

A composition or method according to any of the above embodiments wherein the soluble α-glucan oligomer/polymer composition comprises less than 4%, preferably less than 2%, more preferably less than 1%, and most preferably less than 0.5% α-(1,4) glycosidic linkages.

A composition or method according to any of the above embodiments wherein the soluble α-glucan oligomer/polymer composition is characterized by a number average molecular weight (Mn) between 400 and 2500 g/mol.

A composition or method according to any of the above embodiments wherein the α-glucanohydrolase is an endomutanase and the glucosyltransferase is a mutansucrase.

A composition comprising 0.01 to 99 wt % (dry solids basis) of the present soluble α-glucan oligomer/polymer composition and at least one of the following ingredients: at least one cellulase, at least one protease or a combination thereof.

A method according to any of the above embodiments wherein the isolating step comprises at least one of centrifugation, filtration, fractionation, chromatographic separation, dialysis, evaporation, dilution or any combination thereof.

A method according to any of the above embodiments wherein the ratio of glucosyltransferase activity to α-glucanohydrolase activity ranges from 0.01:1 to 1:0.01.

A method according to any of the above embodiments wherein the suitable reaction conditions (for enzymatic glucan synthesis) comprises a reaction temperature between 0° C. and 45° C.

A method according to any of the above embodiments wherein the suitable reaction conditions comprise a pH range of 3 to 8, preferably 4 to 8.

A method according to any of the above embodiments wherein a buffer is present and is selected from the group consisting of phosphate, pyrophosphate, bicarbonate, acetate, or citrate.

A method according to any of the above embodiments wherein said at least one glucosyltransferase and said at least one α-glucanohydrolase is selected from the combinations of:

1) glucosyltransferase GTF4154 (SEQ ID NO: 10, 12 or a combination thereof) and mutanase MUT3264 (SEQ ID NO: 1, 3, 6 or a combination thereof) and
2) glucosyltransferase GTF4154 (SEQ ID NO: 10, 12 or a combination thereof) and dextranase; preferably a *Chaetomium erraticum* dextranase.

A product produced by any of the above process embodiments; preferably wherein the product produced is the soluble α-glucan oligomer/polymer composition of the first embodiment.

EXAMPLES

Unless defined otherwise herein, all technical and scientific terms used herein have the same meaning as commonly understood by one of ordinary skill in the art to which this disclosure belongs. Singleton, et al., *DICTIONARY OF MICROBIOLOGY AND MOLECULAR BIOLOGY*, 2D ED., John Wiley and Sons, New York (1994), and Hale & Marham, *THE HARPER COLLINS DICTIONARY OF BIOLOGY*, Harper Perennial, N.Y. (1991) provide one of skill with a general dictionary of many of the terms used in this disclosure.

The present disclosure is further defined in the following Examples. It should be understood that these Examples, while indicating preferred embodiments of the disclosure, are given by way of illustration only. From the above discussion and these Examples, one skilled in the art can ascertain the essential characteristics, and without departing from the spirit and scope thereof, can make various changes and modifications to adapt it to various uses and conditions.

The meaning of abbreviations is as follows: "sec" or "s" means second(s), "ms" mean milliseconds, "min" means minute(s), "h" or "hr" means hour(s), "μL" means microliter(s), "mL" means milliliter(s), "L" means liter(s); "mL/min" is milliliters per minute; "μg/mL" is microgram(s) per milliliter(s); "LB" is Luria broth; "μm" is micrometers, "nm" is nanometers; "OD" is optical density; "IPTG" is isopropyl-β-D-thio-galactoside; "g" is gravitational force; "mM" is millimolar; "SDS-PAGE" is sodium dodecyl sulfate polyacrylamide; "mg/mL" is milligrams per milliliters; "N" is normal; "w/v" is weight for volume; "DTT" is dithiothreitol; "BCA" is bicinchoninic acid; "DMAc" is N,N'-dimethyl acetamide; "LiCl" is Lithium chloride; "NMR" is nuclear magnetic resonance; "DMSO" is dimethylsulfoxide; "SEC" is size exclusion chromatography; "GI" or "gi" means GenInfo Identifier, a system used by GENBANK® and other sequence databases to uniquely identify polynucleotide and/or polypeptide sequences within the respective databases; "DPx" means glucan degree of polymerization having "x" units in length; "ATCC" means American Type Culture Collection (Manassas, Va.), "DSMZ" and "DSM" will refer to Leibniz Institute DSMZ-German Collection of Microorganisms and Cell Cultures, (Braunschweig, Germany); "EELA" is the Finish Food Safety Authority (Helsinki, Finland) "CCUG" refer to the Culture Collection, University of Göteborg, Sweden; "Suc." means sucrose; "Gluc." means glucose; "Fruc." means fructose; "Leuc." means leucrose; and "Rxn" means reaction.

General Methods

Standard recombinant DNA and molecular cloning techniques used herein are well known in the art and are described by Sambrook, J. and Russell, D., *Molecular Cloning: A Laboratory Manual*, Third Edition, Cold Spring Harbor Laboratory Press, Cold Spring Harbor, N.Y. (2001); and by Silhavy, T. J., Bennan, M. L. and Enquist, L. W., *Experiments with Gene Fusions*, Cold Spring Harbor Laboratory Cold Press Spring Harbor, NY (1984); and by Ausubel, F. M. et. al., *Short Protocols in Molecular Biology*, 5th Ed. Current Protocols and John Wiley and Sons, Inc., N.Y., 2002.

Materials and methods suitable for the maintenance and growth of bacterial cultures are also well known in the art. Techniques suitable for use in the following Examples may be found in *Manual of Methods for General Bacteriology*, Phillipp Gerhardt, R. G. E. Murray, Ralph N. Costilow, Eugene W. Nester, Willis A. Wood, Noel R. Krieg and G. Briggs Phillips, eds., (American Society for Microbiology Press, Washington, D.C. (1994)), *Biotechnology: A Textbook of Industrial Microbiology* by Wulf Crueger and Anneliese Crueger (authors), Second Edition, (Sinauer Associates, Inc., Sunderland, Mass. (1990)), and *Manual of Industrial Microbiology and Biotechnology*, Third Edition, Richard H. Baltz, Arnold L. Demain, and Julian E. Davis (Editors), (American Society of Microbiology Press, Washington, D.C. (2010).

All reagents, restriction enzymes and materials used for the growth and maintenance of bacterial cells were obtained from BD Diagnostic Systems (Sparks, Md.), Invitrogen/Life Technologies Corp. (Carlsbad, Calif.), Life Technologies (Rockville, Md.), QIAGEN (Valencia, Calif.), Sigma-Aldrich Chemical Company (St. Louis, Mo.) or Pierce Chemical Co. (A division of Thermo Fisher Scientific Inc., Rockford, Ill.) unless otherwise specified. IPTG, (cat #16758) and triphenyltetrazolium chloride were obtained from the Sigma Co., (St. Louis, Mo.). Bellco spin flask was from the Bellco Co., (Vineland, N.J.). LB medium was from Becton, Dickinson and Company (Franklin Lakes, N.J.). BCA protein assay was from Sigma-Aldrich (St Louis, Mo.).

Growth of Recombinant *E. Coli* Strains for Production of GTF Enzymes

*Escherichia coli* strains expressing a functional GTF enzyme were grown in shake flask using LB medium with ampicillin (100 μg/mL) at 37° C. and 220 rpm to $OD_{600\ nm}$=0.4-0.5, at which time isopropyl-β-D-thio-galactoside (IPTG) was added to a final concentration of 0.5 mM and incubation continued for 2-4 hr at 37° C. Cells were harvested by centrifugation at 5,000×g for 15 min and resuspended (20%-25% wet cell weight/v) in 50 mM phosphate buffer pH 7.0). Resuspended cells were passed through a French Pressure Cell (SLM Instruments, Rochester, N.Y.) twice to ensure >95% cell lysis. Cell lysate was centrifuged for 30 min at 12,000×g and 4° C. The resulting supernatant (cell extract) was analyzed by the BCA protein assay and SDS-PAGE to confirm expression of the GTF enzyme, and the cell extract was stored at −80° C.

pHYT Vector

The pHYT vector backbone is a replicative *Bacillus subtilis* expression plasmid containing the *Bacillus subtilis* aprE promoter. It was derived from the *Escherichia coli-Bacillus subtilis* shuttle vector pHY320PLK (GENBANK® Accession No. D00946 and is commercially available from Takara Bio Inc. (Otsu, Japan)). The replication origin for *Escherichia coli* and ampicillin resistance gene are from pACYC177 (GENBANK® X06402 and is commercially available from New England Biolabs Inc., Ipswich, Mass.). The replication origin for *Bacillus subtilis* and tetracycline resistance gene were from pAMalpha-1 (Francia et al., *J Bacteriol.* 2002 September; 184(18):5187-93)). To construct pHYT, a terminator sequence: 5'-ATAAAAAACGCTCG-GTTGCCGCCGGGCGTTTTTTAT-3' (SEQ ID NO: 13) from phage lambda was inserted after the tetracycline resistance gene. The entire expression cassette (EcoRI-BamHI fragment) containing the aprE promoter—AprE signal peptide sequence-coding sequence encoding the enzyme of interest (e.g., coding sequences for various GTFs)-BPN' terminator was cloned into the EcoRI and HindIII sites of pHYT using a BamHI-HindIII linker that destroyed the HindIII site. The linker sequence is 5'-GGATCCTGACT-GCCTGAGCTT-3' (SEQ ID NO: 14). The aprE promoter and AprE signal peptide sequence (SEQ ID NO: 4) are native to *Bacillus subtilis*. The BPN' terminator is from subtilisin of *Bacillus amyloliquefaciens*. In the case when native signal peptide was used, the AprE signal peptide was replaced with the native signal peptide of the expressed gene.

Biolistic Transformation of *T. Reesei*

A *Trichoderma reesei* spore suspension was spread onto the center ~6 cm diameter of an acetamidase transformation plate (150 μL of a $5 \times 10^7$-$5 \times 10^8$ spore/mL suspension). The plate was then air dried in a biological hood. The stopping screens (BioRad 165-2336) and the macrocarrier holders (BioRad 1652322) were soaked in 70% ethanol and air dried. DRIERITE® desiccant (calcium sulfate desiccant; W.A. Hammond DRIERITE® Company, Xenia, Ohio) was placed in small Petri dishes (6 cm Pyrex) and overlaid with Whatman filter paper (GE Healthcare Bio-Sciences, Pittsburgh, Pa.). The macrocarrier holder containing the macrocarrier (BioRad 165-2335; Bio-Rad Laboratories, Hercules, Calif.) was placed flatly on top of the filter paper and the Petri dish lid replaced. A tungsten particle suspension was prepared by adding 60 mg tungsten M-10 particles (microcarrier, 0.7 micron, BioRad #1652266, Bio-Rad Laboratories) to an Eppendorf tube. Ethanol (1 mL) (100%) was added. The tungsten was vortexed in the ethanol solution and allowed to soak for 15 minutes. The Eppendorf tube was microfuged briefly at maximum speed to pellet the tungsten. The ethanol was decanted and washed three times with sterile distilled water. After the water wash was decanted the third time, the tungsten was resuspended in 1 mL of sterile 50% glycerol. The transformation reaction was prepared by adding 25 μL suspended tungsten to a 1.5 mL-Eppendorf tube for each transformation. Subsequent additions were made in order, 2 μL DNA pTrex3 expression vectors (SEQ ID NO: 9; see U.S. Pat. No. 6,426,410), 25 μL 2.5 M $CaCl_2$, 10 μL 0.1M spermidine. The reaction was vortexed continuously for 5-10 minutes, keeping the tungsten suspended. The Eppendorf tube was then microfuged briefly and decanted. The tungsten pellet was washed with 200 μL of 70% ethanol, microfuged briefly to pellet and decanted. The pellet was washed with 200 μL of 100% ethanol, microfuged briefly to pellet, and decanted. The tungsten pellet was resuspended in 24 μL 100% ethanol. The Eppendorf tube was placed in an ultrasonic water bath for 15 seconds and 8 μL aliquots were transferred onto the center of the desiccated macrocarriers. The macrocarriers were left to dry in the desiccated Petri dishes.

A Helium tank was turned on to 1500 psi (~10.3 MPa). 1100 psi (~7.58 MPa) rupture discs (BioRad 165-2329) were used in the Model PDS-1000/He™ BIOLISTIC® Particle Delivery System (BioRad). When the tungsten solution was dry, a stopping screen and the macrocarrier holder were inserted into the PDS-1000. An acetamidase plate, containing the target *T. reesei* spores, was placed 6 cm below the stopping screen. A vacuum of 29 inches Hg (~98.2 kPa) was pulled on the chamber and held. The He BIOLISTIC® Particle Delivery System was fired. The chamber was vented and the acetamidase plate removed for incubation at 28° C. until colonies appeared (5 days).

Modified amdS Biolistic Agar (MABA) Per Liter
Part I, make in 500 mL distilled water ($dH_2O$)
1000× salts 1 mL
Noble agar 20 g
pH to 6.0, autoclave
Part II, make in 500 mL $dH_2O$
Acetamide 0.6 g
CsCl 1.68 g
Glucose 20 g
$KH_2PO_4$ 15 g
$MgSO_4.7H_2O$ 0.6 g
$CaCl_2.2H_2O$ 0.6 g
pH to 4.5, 0.2 micron filter sterilize; leave in 50° C. oven to warm, add to agar, mix, pour plates. Stored at room temperature (~21° C.)

1000× Salts per liter
$FeSO_4.7H_2O$ 5 g
$MnSO_4.H_2O$ 1.6 g
$ZnSO_4.7H_2O$ 1.4 g
$CoCl_2.6H_2O$ 1 g
Bring up to 1 L $dH_2O$.
0.2 micron filter sterilize Determination of the Glucosyltransferase Activity Glucosyltransferase activity assay was performed by incubating 1-10% (v/v) crude protein extract containing GTF enzyme with 200 g/L sucrose in 25 mM or 50 mM sodium acetate buffer at pH 5.5 in the presence or absence of 25 g/L dextran (MW~1500, Sigma-Aldrich, Cat. #31394) at 37° C. and 125 rpm orbital shaking. One aliquot of reaction mixture was withdrawn at 1 h, 2 h and 3 h and heated at 90° C. for 5 min to inactivate the GTF. The insoluble material was removed by centrifugation at 13,000×g for 5 min, followed by filtration through 0.2 μm RC (regenerated cellulose) membrane. The resulting filtrate was analyzed by HPLC using two Aminex HPX-87C columns series at 85° C. (Bio-Rad, Hercules, Calif.) to quantify sucrose concentration. The sucrose concentration at each time point was plotted against the reaction time and the initial reaction rate was determined from the slope of the linear plot. One unit of GTF activity was defined as the amount of enzyme needed to consume one micromole of sucrose in one minute under the assay condition.

Determination of the α-Glucanohydrolase Activity

Insoluble mutan polymers required for determining mutanase activity were prepared using secreted enzymes produced by *Streptococcus sobrinus* ATCC® 33478™. Specifically, one loop of glycerol stock of *S. sobrinus* ATCC® 33478™ was streaked on a BHI agar plate (Brain Heart Infusion agar, Teknova, Hollister, Calif.), and the plate was incubated at 37° C. for 2 days; A few colonies were picked using a loop to inoculate 2×100 mL BHI liquid medium in the original medium bottle from Teknova, and the culture was incubated at 37° C., static for 24 h. The resulting cells were removed by centrifugation and the resulting supernatant was filtered through 0.2 µm sterile filter; 2×101 mL of filtrate was collected. To the filtrate was added 2×11.2 mL of 200 g/L sucrose (final sucrose 20 g/L). The reaction was incubated at 37° C., with no agitation for 67 h. The resulting polysaccharide polymers were collected by centrifugation at 5000×g for 10 min. The supernatant was carefully decanted. The insoluble polymers were washed 4 times with 40 mL of sterile water. The resulting mutan polymers were lyophilized for 48 h. Mutan polymer (390 mg) was suspended in 39 mL of sterile water to make suspension of 10 mg/mL. The mutan suspension was homogenized by sonication (40% amplitude until large lumps disappear, ~10 min in total). The homogenized suspension was aliquoted and stored at 4° C.

A mutanase assay was initiated by incubating an appropriate amount of enzyme with 0.5 mg/mL mutan polymer (prepared as described above) in 25 mM KOAc buffer at pH 5.5 and 37° C. At various time points, an aliquot of reaction mixture was withdrawn and quenched with equal volume of 100 mM glycine buffer (pH 10). The insoluble material in each quenched sample was removed by centrifugation at 14,000×g for 5 min. The reducing ends of oligosaccharide and polysaccharide polymer produced at each time point were quantified by the p-hydroxybenzoic acid hydrazide solution (PAHBAH) assay (Lever M., *Anal. Biochem.*, (1972) 47:273-279) and the initial rate was determined from the slope of the linear plot of the first three or four time points of the time course. The PAHBAH assay was performed by adding 10 µL of reaction sample supernatant to 100 µL of PAHBAH working solution and heated at 95° C. for 5 min. The working solution was prepared by mixing one part of reagent A (0.05 g/mL p-hydroxy benzoic acid hydrazide and 5% by volume of concentrated hydrochloric acid) and four parts of reagent B (0.05 g/mL NaOH, 0.2 g/mL sodium potassium tartrate). The absorption at 410 nm was recorded and the concentration of the reducing ends was calculated by subtracting appropriate background absorption and using a standard curve generated with various concentrations of glucose as standards.

Determination of Glycosidic Linkages

One-dimensional $^1$H NMR data were acquired on a Varian Unity Inova system (Agilent Technologies, Santa Clara, Calif.) operating at 500 MHz using a high sensitivity cryoprobe. Water suppression was obtained by carefully placing the observe transmitter frequency on resonance for the residual water signal in a "presat" experiment, and then using the "tnnoesy" experiment with a full phase cycle (multiple of 32) and a mix time of 10 ms.

Typically, dried samples were taken up in 1.0 mL of $D_2O$ and sonicated for 30 min. From the soluble portion of the sample, 100 µL was added to a 5 mm NMR tube along with 350 µL $D_2O$ and 100 µL of $D_2O$ containing 15.3 mM DSS (4,4-dimethyl-4-silapentane-1-sulfonic acid sodium salt) as internal reference and 0.29% $NaN_3$ as bactericide. The abundance of each type of anomeric linkage was measured by the integrating the peak area at the corresponding chemical shift. The percentage of each type of anomeric linkage was calculated from the abundance of the particular linkage and the total abundance anomeric linkages from oligosaccharides.

Methylation Analysis

The distribution of glucosidic linkages in glucans was determined by a well-known technique generally named "methylation analysis," or "partial methylation analysis" (see: F. A. Pettolino, et al., *Nature Protocols*, (2012) 7(9): 1590-1607). The technique has a number of minor variations but always includes: 1. methylation of all free hydroxyl groups of the glucose units, 2. hydrolysis of the methylated glucan to individual monomer units, 3. reductive ring-opening to eliminate anomers and create methylated glucitols; the anomeric carbon is typically tagged with a deuterium atom to create distinctive mass spectra, 4. acetylation of the free hydroxyl groups (created by hydrolysis and ring opening) to create partially methylated glucitol acetates, also known as partially methylated products, 5. analysis of the resulting partially methylated products by gas chromatography coupled to mass spectrometry and/or flame ionization detection.

The partially methylated products include non-reducing terminal glucose units, linked units and branching points. The individual products are identified by retention time and mass spectrometry. The distribution of the partially-methylated products is the percentage (area %) of each product in the total peak area of all partially methylated products. The gas chromatographic conditions were as follows: RTx-225 column (30 m×250 µm ID×0.1 µm film thickness, Restek Corporation, Bellefonte, Pa., USA), helium carrier gas (0.9 mL/min constant flow rate), oven temperature program starting at 80° C. (hold for 2 min) then 30° C./min to 170° C. (hold for 0 min) then 4° C./min to 240° C. (hold for 25 min), 1 µL injection volume (split 5:1), detection using electron impact mass spectrometry (full scan mode)

Viscosity Measurement

The viscosity of 12 wt % aqueous solutions of soluble oligomer/polymer was measured using a TA Instruments AR-G2 controlled-stress rotational rheometer (TA Instruments—Waters, LLC, New Castle, Del.) equipped with a cone and plate geometry. The geometry consists of a 40 mm 2° upper cone and a peltier lower plate, both with smooth surfaces. An environmental chamber equipped with a water-saturated sponge was used to minimize solvent (water) evaporation during the test. The viscosity was measured at 20° C. The peltier was set to the desired temperature and 0.65 mL of sample was loaded onto the plate using an Eppendorf pipette (Eppendorf North America, Hauppauge, N.Y.). The cone was lowered to a gap of 50 µm between the bottom of the cone and the plate. The sample was thermally equilibrated for 3 minutes. A shear rate sweep was performed over a shear rate range of 500-10 $s^{-1}$. Sample stability was confirmed by running repeat shear rate points at the end of the test.

Determination of the Concentration of Sucrose, Glucose, Fructose and Leucrose

Sucrose, glucose, fructose, and leucrose were quantitated by HPLC with two tandem Aminex HPX-87C Columns (Bio-Rad, Hercules, Calif.). Chromatographic conditions used were 85° C. at column and detector compartments, 40° C. at sample and injector compartment, flow rate of 0.6 mL/min, and injection volume of 10 µL. Software packages used for data reduction were EMPOWER™ version 3 from Waters (Waters Corp., Milford, Mass.). Calibrations were performed with various concentrations of standards for each individual sugar.

Determination of the Concentration of Oligosaccharides

Soluble oligosaccharides were quantitated by HPLC with two tandem Aminex HPX-42A columns (Bio-Rad). Chromatographic conditions used were 85° C. column temperature and 40° C. detector temperature, water as mobile phase (flow rate of 0.6 mL/min), and injection volume of 10 µL. Software package used for data reduction was EMPOWER™ version 3 from Waters Corp. Oligosaccharide samples from DP2 to DP7 were obtained from Sigma- Aldrich: maltoheptaose (DP7, Cat. #47872), maltohexanose (DP6, Cat. #47873), maltopentose (DP5, Cat. #47876), maltotetraose (DP4, Cat. #47877), isomaltotriose (DP3, Cat. #47884) and maltose (DP2, Cat. #47288). Calibration was performed for each individual oligosaccharide with various concentrations of the standard.

Purification of Soluble Oligosaccharide Oligomer/Polymer

Soluble oligosaccharide oligomer/polymer present in product mixtures produced by the conversion of sucrose using glucosyltransferase enzymes with or without added mutanases as described in the following examples were purified and isolated by size-exclusion column chromatography (SEC). In a typical procedure, product mixtures were heat-treated at 60° C. to 90° C. for between 15 min and 30 min and then centrifuged at 4000 rpm for 10 min. The resulting supernatant was injected onto an AKTAprime purification system (SEC; GE Healthcare Life Sciences) (10 mL-50 mL injection volume) connected to a GE HK 50/60 column packed with 1.1 L of Bio-Gel P2 Gel (Bio-Rad, Fine 45-90 µm) using water as eluent at 0.7 mL/min. The SEC fractions (~5 mL per tube) were analyzed by HPLC for oligosaccharides using a Bio-Rad HPX-47A column. Fractions containing >DP2 oligosaccharides were combined and the soluble oligomer/polymer isolated by rotary evaporation of the combined fractions to produce a solution containing between 3% and 6% (w/w) solids, where the resulting solution was lyophilized to produce the soluble oligomer/polymer as a solid product.

Example 1

Production of Mutanase MUT3264 GI: 257153264 in *E. Coli* BL21(DE3)

A gene encoding mutanase from *Paenibacillus Humicus* NA1123 identified in GENBANK® as GI:257153264 (SEQ ID NO: 1) was synthesized by GenScript (GenScript USA Inc., Piscataway, N.J.). The nucleotide sequence (SEQ ID NO: 2) encoding protein sequence ("mut3264"; SEQ ID NO: 3) was subcloned into pET24a (Novagen; Merck KGaA, Darmstadt, Germany). The resulting plasmid was transformed into *E. coli* BL21(DE3) (Invitrogen) to generate the strain identified as SGZY6. The strain was grown at 37° C. with shaking at 220 rpm to $OD_{600}$ of ~0.7, then the temperature was lowered to 18° C. and IPTG was added to a final concentration of 0.4 mM. The culture was grown overnight before harvest by centrifugation at 4000×g. The cell pellet from 600 mL of culture was suspended in 22 mL 50 mM KPi buffer, pH 7.0. Cells were disrupted by French Cell Press (2 passages @ 15,000 psi (103.4 MPa)); cell debris was removed by centrifugation (SORVALL™ SS34 rotor, @13,000 rpm; Thermo Fisher Scientific, Inc., Waltham, Mass.) for 40 min. The supernatant was analyzed by SDS-PAGE to confirm the expression of the "mut3264" mutanase and the crude extract was used for activity assay. A control strain without the mutanase gene was created by transforming *E. coli* BL21(DE3) cells with the pET24a vector.

Example 2

Production of Mutanase MUT3264 GI:257153264 in *B. Subtilis* Strain BG6006 Strain SG1021-1

SG1021-1 is a *Bacillus subtilis* mutanase expression strain that expresses the mutanase from *Paenibacillus humicus* NA1123 isolated from fermented soy bean natto. For recombinant expression in *B. subtilis*, the native signal peptide was replaced with a *Bacillus* AprE signal peptide (GENBANK® Accession No. AFG28208; SEQ ID NO: 4). The polynucleotide encoding mut3264 (SEQ ID NO: 5) was operably linked downstream of an AprE signal peptide (SEQ ID NO: 4) encoding *Bacillus* expressed mut3264 provided as SEQ ID NO: 6. A C-terminal lysine was deleted to provide a stop codon prior to a sequence encoding a poly histidine tag.

The *B. subtilis* host BG6006 strain contains 9 protease deletions (amyE::xylRPxylAcomK-ermC, degUHy32, oppA, ΔspoIIE3501, ΔaprE, ΔnprE, Δepr, ΔispA, Δbpr, Δvpr, ΔwprA, Δmpr-ybfJ, ΔnprB). The wild type mut3264 (as found under GENBANK® gi: 257153264) has 1146 amino acids with the N terminal 33 amino acids deduced as the native signal peptide by the SignalP 4.0 program (Nordahl et al., (2011) *Nature Methods*, 8:785-786). The mature mut3264 without the native signal peptide was synthesized by GenScript and cloned into the NheI and HindIII sites of the replicative *Bacillus* expression pHYT vector under the aprE promoter and fused with the *B. subtilis* AprE signal peptide (SEQ ID NO: 4) on the vector. The construct was first transformed into *E. coli* DH10B and selected on LB with ampicillin (100 µg/mL) plates. The confirmed construct pDCQ921 was then transformed into *B. subtilis* BG6006 and selected on the LB plates with tetracycline (12.5 µg/mL). The resulting *B. subtilis* expression strain SG1021 was purified and a single colony isolate, SG1021-1, was used as the source of the mutanase mut3264. SG1021-1 strain was first grown in LB containing 10 µg/mL tetracycline, and then sub-cultured into GrantsII medium containing 12.5 µg/mL tetracycline and grown at 37° C. for 2-3 days. The cultures were spun at 15,000×g for 30 min at 4° C. and the supernatant filtered through a 0.22 µm filter. The filtered supernatant containing mut3264 was aliquoted and frozen at −80° C.

Example 3

Production of Mutanase MUT3325 GI: 212533325

A gene encoding the *Penicillium marneffei* ATCC® 18224™ mutanase identified in GENBANK® as gi:212533325 was synthesized by GenScript (Piscataway, N.J.). The nucleotide sequence (SEQ ID NO: 7) encoding protein sequence (mut3325; SEQ ID NO: 8) was subcloned into plasmid pTrex3 (SEQ ID NO: 9) at SacII and AscI restriction sites, a vector designed to express the gene of interest in *Trichoderma reesei*, under control of CBHI promoter and terminator, with *Aspergillus niger* acetamidase for selection. The resulting plasmid was transformed into *T. reesei* by biolistic injection as described in the general method section, above. The detailed method of biolistic transformation is described in International PCT Patent Application Publication WO2009/126773 A1. A 1 cm² agar plug with spores from a stable clone TRM05-3 was used to inoculate the production media (described below). The culture was grown in the shake flasks for 4-5 days at 28° C. and 220 rpm. To harvest the secreted proteins, the cell mass was first removed by centrifugation at 4000×g for 10 min and the supernatant was filtered through 0.2 µM sterile filters. The expression of mutanase mut3325 was confirmed by SDS-PAGE.

The production media component is listed below.
NREL-Trich Lactose Defined

| Formula | Amount | Units |
|---|---|---|
| ammonium sulfate | 5 | g |
| PIPPS | 33 | g |
| BD Bacto casamino acid | 9 | g |
| KH$_2$PO$_4$ | 4.5 | g |
| CaCl$_2$•2H$_2$O | 1.32 | g |
| MgSO$_4$•7H$_2$O | 1 | g |
| *T. reesei* trace elements | 2.5 | mL |
| NaOH pellet | 4.25 | g |
| Adjust pH to 5.5 with 50% NaOH | | |
| Bring volume to | 920 | mL |
| Add to each aliquot: Foamblast | 5 | Drops |
| Autoclave, then add 20% lactose filter sterilized | 80 | mL |

*T. Reesei* Trace Elements

| Formula | Amount | Units |
|---|---|---|
| citric acid•H$_2$O | 191.41 | g |
| FeSO$_4$•7H$_2$O | 200 | g |
| ZnSO$_4$•7H$_2$O | 16 | g |
| CuSO$_4$•5H$_2$O | 3.2 | g |
| MnSO$_4$•H$_2$O | 1.4 | g |
| H$_3$BO$_3$ (boric acid) | 0.8 | g |
| Bring volume to | 1 | L |

Example 4

Production of MUT3325 by Fermentation

Fermentation seed culture was prepared by inoculating 0.5 L of minimal medium in a 2-L baffled flask with 1.0 mL frozen spore suspension of the mut3325 expression strain TRM05-3 (Example 3) (The minimal medium was composed of 5 g/L ammonium sulfate, 4.5 g/L potassium phosphate monobasic, 1.0 g/L magnesium sulfate heptahydrate, 14.4 g/L citric acid anhydrous, 1 g/L calcium chloride dihydrate, 25 g/L glucose and trace elements including 0.4375 g/L citric acid, 0.5 g/L ferrous sulfate heptahydrate, 0.04 g/L zinc sulfate heptahydrate, 0.008 g/L cupric sulfate pentahydrate, 0.0035 g/L manganese sulfate monohydrate and 0.002 g/L boric acid. The pH was 5.5). The culture was grown at 32° C. and 170 rpm for 48 hours before transferred to 8 L of the production medium in a 14-L fermentor. The production medium was composed of 75 g/L glucose, 4.5 g/L potassium phosphate monobasic, 0.6 g/L calcium chloride dehydrate, 1.0 g/L magnesium sulfate heptahydrate, 7.0 g/L ammonium sulfate, 0.5 g/L citric acid anhydrous, 0.5 g/L ferrous sulfate heptahydrate, 0.04 g/L zinc sulfate heptahydrate, 0.00175 g/L cupric sulfate pentahydrate, 0.0035 g/L manganese sulfate monohydrate, 0.002 g/L boric acid and 0.3 mL/L foam blast 882.

The fermentation was first run with batch growth on glucose at 34° C., 500 rpm for 24 h. At the end of 24 h. the temperature was lowered to 28° C. and agitation speed was increased to 1000 rpm. The fermentor was then fed with a mixture of glucose and sophorose (62% w/w) at specific feed rate of 0.030 g glucose-sophorose solids/g biomass/hr.

At the end of run, the biomass was removed by centrifugation and the supernatant containing the mutanase was concentrated about 10-fold by ultrafiltration using 10-kD Molecular Weight Cut-Off ultrafiltration cartridge (UFP-10-E-35; GEHealthcare, Lithe Chalfont, Buckinghamshire, UK). The concentrated protein was stored at −80° C.

Example 5

Production of GTF GI: 51574154 in *E. Coli* TOP10

A gene encoding a truncated version of the gtf enzyme from *Lactobacillus reuteri* identified in GENBANK® as gi:51574154 (SEQ ID NO: 10) was synthesized using codons optimized for expression in *E. coli* (DNA 2.0, Menlo Park Calif.). The nucleic acid product (SEQ ID NO: 11), encoding protein 4154 (SEQ ID NO: 12), was subcloned into PJEXPRESS404® (DNA 2.0, Menlo Park Calif.) to generate the plasmid identified as pMP80. The plasmid pMP80 was used to transform *E. coli* TOP10 (Invitrogen, Carlsbad Calif.) to generate the strain identified as TOP10/pMP80.

*E. coli* strain TOP10/pMP80 expressing the GTF enzyme "4154" was grown in LB medium with ampicillin (100 μg/mL) at 37° C. with shaking to OD600 nm=0.4-0.5, at which time IPTG was added to a final concentration of 0.5 mM, and incubation continued for 2-4 hours at 37° C. Cells were harvested by centrifugation at 5,000×g for 15 minutes and resuspended (20% w/v) in 50 mM phosphate buffer pH 7.0 supplemented with DTT (1.0 mM). Resuspended cells were passed through a French Pressure Cell (SLM Instruments, Rochester, N.Y.) twice to ensure >95% cell lysis. Lysed cells were centrifuged for 30 minutes at 12,000×g at 4° C. The resulting supernatant was analyzed by the BCA protein assay and SDS-PAGE to confirm expression of the gtf enzyme, and the supernatant was stored at −20° C.

GTF activity was confirmed by measuring the production of reducing sugars (fructose and glucose) in a gtf reaction solution in which extract was added (5% by volume) to a mixture containing sucrose (50 mg/mL), dextran T-10 (1 mg/mL) and potassium phosphate buffer (pH 6.5, 50 mM) at 22-25° C. for 24-30 hours. Reducing sugars were subsequently measured by adding 0.01 mL of a centrifuged GTF reaction solution to a mixture containing 1 N NaOH and 0.1% triphenyltetrazolium chloride and monitoring the increase in absorbance at OD480 nm for 5 minutes (Ultrospec, Pharmacia LKB, New York, N.Y.).

Example 6

Isolation of Soluble Oligosaccharide Fiber Produced by the Combination of GTF4154 and MUT3264

A 1000 mL reaction containing 100 g/L sucrose, *E. coli* crude protein extract (1.0% v/v) containing GTF enzyme from *Lactobacillus reuteri* identified in GENBANK® as gi:51574154 (Example 5), and *E. coli* crude protein extract (1.0% v/v) comprising a mutanase from *Paenibacillus humicus* (mut3264, gi:257153264; Example 1) in 10 mM potassium phosphate buffer (pH 6.0) was stirred at 37° C. for 30 h, then heated to 90° C. for 15 min to inactivate the enzymes. The resulting product mixture was centrifuged and the resulting supernatant analyzed by HPLC for soluble monosaccharides, disaccharides and oligosaccharides, then 132 mL of the supernatant was purified by SEC using BioGel P2 resin (BioRad). The SEC fractions that contained oligosaccharides≥DP3 were combined and concentrated by rotary evaporation for analysis by HPLC (Table 1).

TABLE 1

Soluble oligosaccharide oligomer/polymer produced by GTF4154/mut3264 mutanase.
100 g/L sucrose, GTF GI: 51574154, mut3264, 37° C., 30 h

|  | Product mixture, g/L | SEC-purified product, g/L |
|---|---|---|
| ≥DP8 | 23.9 | 74.4 |
| DP7 | 2.6 | 6.1 |
| DP6 | 2.5 | 4.9 |
| DP5 | 2.3 | 4.1 |
| DP4 | 1.3 | 1.8 |
| DP3 | 1.3 | 1.1 |
| DP2 | 2.5 | 0.6 |
| Sucrose | 0.0 | 0.2 |
| Leucrose | 7.4 | 0.3 |
| Glucose | 3.7 | 0.1 |
| Fructose | 44.1 | 0.1 |
| Sum DP2-≥DP8 | 33.9 | 93.0 |
| Sum DP3-≥DP8 | 36.4 | 92.4 |

Example 7

Isolation of Soluble Oligosaccharide Fiber Produced by the Combination of GTF4154 and Dextranase A 1200 mL reaction containing 100 g/L sucrose, E. coli crude protein extract (1.0% v/v) containing GTF enzyme from Lactobacillus reuteri identified in GENBANK® as gi:51574154 (Example 5), and 0.01% (v/v) dextranase (1,6-α-D-Glucan 6-glucanhydrolase from Chaetomium erraticum, Sigma catalog D-0443) in 10 mM potassium phosphate buffer (pH 6.5), was stirred at 37° C. for 45 h, then heated to 90° C. for 15 min to inactivate the enzymes. The resulting product mixture was centrifuged and the resulting supernatant analyzed by HPLC for soluble monosaccharides, disaccharides and oligosaccharides, then the supernatant was purified by SEC using BioGel P2 resin (BioRad). The SEC fractions that contained oligosaccharides≥DP3 were combined and concentrated by rotary evaporation for analysis by HPLC (Table 2).

TABLE 2

Soluble oligosaccharide oligomer/polymer produced by GTF4154 and dextranase.
100 g/L sucrose, GTF GI: 51574154, dextranase, 37° C., 45 h

|  | Product mixture, g/L | SEC-purified product, g/L |
|---|---|---|
| ≥DP8 | 22.6 | 64.2 |
| DP7 | 3.3 | 5.8 |
| DP6 | 3.5 | 5.0 |
| DP5 | 3.6 | 4.4 |
| DP4 | 1.8 | 1.7 |
| DP3 | 1.5 | 1.1 |
| DP2 | 4.0 | 1.1 |
| Sucrose | 0 | 0.7 |
| Leucrose | 7.4 | 0.6 |
| Glucose | 3.6 | 0.5 |
| Fructose | 46.3 | 2.3 |
| Sum DP2-≥DP8 | 40.3 | 83.3 |
| Sum DP3-≥DP8 | 36.3 | 82.2 |

Example 8

Anomeric Linkage Analysis of Soluble Fiber Produced by Combination of GTF4154 and MUT3264 or Dextranase Solutions of chromatographically-purified soluble oligosaccharide oligomer/polymers prepared as described in Examples 6 and Example 7 were dried to a constant weight by lyophilization, and the resulting solids analyzed by $^1$H NMR spectroscopy and by GC/MS as described in the General Methods section (above). The anomeric linkages for each of these soluble oligosaccharide oligomer/polymer mixtures are reported in Tables 3 and 4.

TABLE 3

Anomeric linkage analysis of soluble oligomer/polymer by $^1$H NMR spectroscopy.

| Example # | GTF | % α-(1, 3) | % α-(1, 2) | % α-(1, 3, 6) | % α-(1, 2, 6) | % α-(1, 6) |
|---|---|---|---|---|---|---|
| 6 | GTF4154/mut3264 | 0 | 0.0 | 29.5 | 0 | 70.5 |
| 7 | GTF4154/dextranase | 0 | 0.0 | 32.5 | 0 | 67.5 |

TABLE 4

Anomeric linkage analysis of soluble oligomer/polymer by GC/MS.

| Example # | GTF | % α-(1, 4) | % α-(1, 3) | % α-(1, 3, 6) | % 2,1 Fruc | % α-(1, 2) | % α-(1, 6) | % α-(1, 3, 4) | % α-(1, 2, 3) | % α-(1,4,6) + α-(1, 2, 6) |
|---|---|---|---|---|---|---|---|---|---|---|
| 6 | GTF4154/mut3264 | 1.3 | 27.6 | 9.5 | 0.2 | 0.5 | 60.3 | 0.0 | 0.0 | 0.6 |
| 7 | GTF4154/dextranase | 1.4 | 29.0 | 9.3 | 0.2 | 0.5 | 59.1 | 0.0 | 0.0 | 0.6 |

Example 9

Viscosity of Soluble Fiber Produced by Combination of GTF4154 and MUT3264 or Dextranase Solutions of chromatographically-purified soluble oligosaccharide oligomer/polymers prepared as described in Examples 6 and Example 7 were dried to a constant weight by lyophilization, and the resulting solids were used to prepare a 12 wt % solution of soluble oligomer/polymer in distilled, deionized water. The viscosity of the soluble oligomer/polymer solutions (reported in centipoise (cP), where 1 cP=1 millipascal-s (mPa-s)) (Table 5) was measured at 20° C. as described in the General Methods section.

TABLE 5

Viscosity of 12% (w/w) soluble oligomer/polymer solutions measured at 20° C. (ND = not determined).

| Example # | GTF | viscosity (cP) |
|---|---|---|
| 6 | GTF4154/mut3264 | 9.8 |
| 7 | GTF4154/dextranase | 5.1 |

Example 10

Molecular Weight of Fiber Produced by Combination of GTF4154 and MUT3264 or Dextranase A solution of chromatographically-purified soluble oligosaccharide oligomer/polymers prepared as described in Examples 6 and Example 7 were dried to a constant weight by lyophilization, and the resulting solids were analyzed by SEC chromatography for number average molecular weight ($M_n$), weight average molecular weight ($M_w$), peak molecular weight ($M_p$), z-average molecular weight ($M_z$), and polydispersity index (PDI=$M_w/M_n$) as described in the General Methods section (Table 6).

TABLE 6

Characterization of soluble oligomer/polymer by SEC.

| Example # | GTF or GTF/mutanase | Component (%) | $M_n$ (Daltons) | $M_w$ (Daltons) | $M_p$ (Daltons) | $M_z$ (Daltons) | PDI |
|---|---|---|---|---|---|---|---|
| 6 | GTF4154/mut3264 | 69 | 1663 | 2058 | 2015 | 2460 | 1.24 |
| 6 | GTF4154/mut3264 | 31 | 529436 | 784727 | 808747 | 949419 | 1.48 |
| 7 | GTF4154/dextranase | 66 | 1596 | 1984 | 1926 | 2407 | 1.24 |
| 7 | GTF4154/dextranase | 22 | 458381 | 612419 | 651301 | 763911 | 1.34 |

Example 11

Production of GTF GI: 51574154 in Bacillus Subtilis

The nucleic acid product (SEQ ID NO: 11) encoding protein GTF4154 was amplified from the E. coli expression plasmid pMP80 with flanking NheI and HindIII restriction sites and cloned into the NheI and HindIII sites of the Bacillus subtilis integrative expression plasmid p4JH under the aprE promoter and fused with the B. subtilis AprE signal peptide (SEQ ID NO: 4) on the vector. The construct was first transformed into E. coli DH10B and selected on LB with ampicillin (100 ug/mL) plates. The confirmed construct pDCQ985 expressing GTF4154 was then transformed into B. subtilis BG6006 contains 9 protease deletions (amyE:: xylRPxylAcomK-ermC, degUHy32, oppA, ΔspoIIE3501, ΔaprE, ΔnprE, Δepr, ΔispA, Δbpr, Δvpr, ΔmprA, Δmpr-ybfJ, ΔnprB) and selected on the LB plates with chloramphenicol (5 ug/ml). The colonies grown on LB plates with 5 ug/mL chloramphenicol were streaked several times onto LB plates with 25 ug/mL chloramphenicol. The resulted B. subtilis expression strain SG1185 was grown in LB medium with 25 ug/mL chloramphenicol first and then subcultured into GrantsII medium containing 25 ug/mL chloramphenicol grown at 30° C. for 2-3 days. The cultures were spun at 15,000×g for 30 min at 4° C. and the supernatant was filtered through 0.22 um filters. The filtered supernatant was aliquoted and frozen at −80° C.

Example 12

Preparation of a Sodium Carboxymethyl α-Glucan

This Example describes producing the glucan ether derivative, carboxymethyl glucan, using the α-glucan oligomer/polymer composition described herein.

Approximately 1 g of an α-glucan oligomer/polymer composition as described in Examples 6 or 7 is added to 20 mL of isopropanol in a 50-mL capacity round bottom flask fitted with a thermocouple for temperature monitoring and a condenser connected to a recirculating bath, and a magnetic stir bar. Sodium hydroxide (4 mL of a 15% solution) is added drop wise to the preparation, which is then heated to 25° C. on a hotplate. The preparation is stirred for 1 hour before the temperature is increased to 55° C. Sodium monochloroacetate (0.3 g) is then added to provide a reaction, which is held at 55° C. for 3 hours before being neutralized with glacial acetic acid. The material is then collected and analyzed by NMR to determine degree of substitution (DoS) of the solid.

Various DoS samples of carboxymethyl α-glucan are prepared using processes similar to the above process, but with certain modifications such as the use of different reagent (sodium monochloroacetate): α-glucan oligomer/polymer molar ratios, different NaOH:α-glucan oligomer/polymer molar ratios, different temperatures, and/or reaction times.

Example 13

Viscosity Modification Using Carboxymethyl α-Glucan

This Example describes the effect of carboxymethyl α-glucan on the viscosity of an aqueous composition.

Various sodium carboxymethyl glucan samples as prepared in Example 12 are tested. To prepare 0.6 wt % solutions of each of these samples, 0.102 g of sodium carboxymethyl α-glucan is added to DI water (17 g). Each preparation is then mixed using a bench top vortexer at 1000 rpm until completely dissolved.

To determine the viscosity of carboxymethyl α-glucan, each solution of the dissolved α-glucan ether samples is subjected to various shear rates using a Brookfield III+ viscometer equipped with a recirculating bath to control temperature (20° C.). The shear rate is increased using a gradient program which increased from 0.1-232.5 rpm and the shear rate is increased by 4.55 (1/s) every 20 seconds.

Example 14

Preparation of Carboxymethyl Dextran from Solid Dextran

This Example describes producing carboxymethyl dextran for use in Example 15.

Approximately 0.5 g of solid dextran ($M_w$=750000) was added to 10 mL of isopropanol in a 50-mL capacity round bottom flask fitted with a thermocouple for temperature monitoring and a condenser connected to a recirculating bath, and a magnetic stir bar. Sodium hydroxide (0.9 mL of a 15% solution) was added drop wise to the preparation, which was then heated to 25° C. on a hotplate. The preparation was stirred for 1 hour before the temperature was increased to 55° C. Sodium monochloroacetate (0.15 g) was then added to provide a reaction, which was held at 55° C. for 3 hours before being neutralized with glacial acetic acid. The solid material was then collected by vacuum filtration and washed with ethanol (70%) four times, dried under vacuum at 20-25° C., and analyzed by NMR to determine degree of substitution (DoS) of the solid. The solid was identified as sodium carboxymethyl dextran.

Additional sodium carboxymethyl dextran was prepared using dextran of different $M_w$. The DoS values of carboxymethyl dextran samples prepared in this example are provided in Table 7.

TABLE 7

Samples of Sodium Carboxymethyl Dextran Prepared from Solid Dextran

| Product Sample Designation | Dextran $M_w$ | Reagent[a]:Dextran Molar Ratio[b] | NaOH:Dextran Molar Ratio[b] | Reaction Time (hours) | DoS |
|---|---|---|---|---|---|
| 2A | 750000 | 0.41 | 1.08 | 3 | 0.64 |
| 2B | 1750000 | 0.41 | 0.41 | 3 | 0.49 |

[a]Reagent refers to sodium monochloroacetate.
[b]Molar ratios calculated as moles of reagent per moles of dextran (third column), or moles of NaOH per moles of dextran (fourth column).

These carboxymethyl dextran samples were tested for their viscosity modification effects in Example 15.

Example 15 (Comparative)

Effect of Shear Rate on Viscosity of Carboxymethyl Dextran

This Example describes the viscosity, and the effect of shear rate on viscosity, of solutions containing the carboxymethyl dextran samples prepared in Example 14.

Various sodium carboxymethyl dextran samples (2A and 2B) were prepared as described in Example 14. To prepare 0.6 wt % solutions of each of these samples, 0.102 g of sodium carboxymethyl dextran was added to DI water (17 g). Each preparation was then mixed using a bench top vortexer at 1000 rpm until the solid was completely dissolved.

To determine the viscosity of carboxymethyl dextran at various shear rates, each solution of the dissolved dextran ether samples was subjected to various shear rates using a Brookfield III+ viscometer equipped with a recirculating bath to control temperature (20° C.). The shear rate was increased using a gradient program which increased from 0.1-232.5 rpm and the shear rate was increased by 4.55 (1/s) every 20 seconds. The results of this experiment at 14.72 (1/s) are listed in Table y+1.

TABLE 8

Viscosity of Carboxymethyl Dextran Solutions at Various Shear Rates

| Sample | Sample Loading (wt %) | Viscosity (cPs) @ 66.18 rpm | Viscosity (cPs) @ 110.3 rpm | Viscosity (cPs) @ 183.8 rpm | Viscosity (cPs) @ 250 rpm |
|---|---|---|---|---|---|
| 2A | 0.6 | 4.97 | 2.55 | 4.43 | 3.88 |
| 2B | 0.6 | 6.86 | 5.68 | 5.28 | 5.26 |

The results summarized in Table 8 indicate that 0.6 wt % solutions of carboxymethyl dextran have viscosities of about 2.5-7 cPs.

Example 16 (Comparative)

Preparation of Carboxymethyl α-Glucan

This Example describes producing carboxymethyl glucan for use in Example 17.

The glucan was prepared as described in Examples 6 or 7. Approximately 150 g of the α-glucan oligomer/polymer composition is added to 3000 mL of isopropanol in a 500-mL capacity round bottom flask fitted with a thermocouple for temperature monitoring and a condenser connected to a recirculating bath, and a magnetic stir bar. Sodium hydroxide (600 mL of a 15% solution) is added drop wise to the preparation, which is then heated to 25° C. on a hotplate. The preparation is stirred for 1 hour before the temperature is increased to 55° C. Sodium monochloroacetate is then added to provide a reaction, which is held at 55° C. for 3 hours before being neutralized with 90% acetic acid. The material is then collected and analyzed by NMR to determine degree of substitution (DoS).

Various DoS samples of carboxymethyl α-glucan are prepared using processes similar to the above process, but with certain modifications such as the use of different reagent (sodium monochloroacetate):α-glucan oligomer/ polymer molar ratios, different NaOH:α-glucan oligomer/polymer molar ratios, different temperatures, and/or reaction times.

Example 17 (Comparative)

Viscosity Modification Using Carboxymethyl α-Glucan

This Example describes the effect of carboxymethyl α-glucan on the viscosity of an aqueous composition.

Various sodium carboxymethyl glucan samples are prepared as described in Example 16. To prepare 0.6 wt % solutions of each of these samples, 0.102 g of sodium carboxymethyl α-glucan is added to DI water (17 g). Each preparation is then mixed using a bench top vortexer at 1000 rpm until completely dissolved.

To determine the viscosity of carboxymethyl glucan at various shear rates, each solution of the glucan ether samples is subjected to various shear rates using a Brookfield III+ viscometer equipped with a recirculating bath to control temperature (20° C.). The shear rate is increased using a gradient program which increased from 0.1-232.5 rpm and then the shear rate is increased by 4.55 (1/s) every 20 seconds.

Example 18 (Comparative)

Viscosity Modification Using Carboxymethyl Cellulose

This Example describes the effect of carboxymethyl cellulose (CMC) on the viscosity of an aqueous composition.

CMC samples obtained from DuPont Nutrition & Health (Danisco) were dissolved in DI water to prepare 0.6 wt % solutions of each sample.

To determine the viscosity of CMC at various shear rates, each solution of the dissolved CMC samples was subjected to various shear rates using a Brookfield III+ viscometer equipped with a recirculating bath to control temperature (20° C.). The shear rate was increased using a gradient program which increased from 0.1-232.5 rpm and the shear rate was increased by 4.55 (1/s) every 20 seconds. Results of this experiment at 14.72 (1/s) are listed in Table 9.

TABLE 9

Viscosity of CMC Solutions

| Sample | Molecular Weight (Mw) | DoS | Sample Loading (wt %) | Viscosity (cPs) @ 14.9 rpm |
|---|---|---|---|---|
| C3A (BAK 130) | ~130000 | 0.66 | 0.6 | 235.03 |
| C3B (BAK 550) | ~550000 | 0.734 | 0.6 | 804.31 |

CMC (0.6 wt %) therefore can increase the viscosity of an aqueous solution.

Example 19

Creating Calibration Curves for Direct Red 80 and Toluidine Blue 0 Dyes Using UV Absorption This example discloses creating calibration curves that could be useful for determining the relative level of adsorption of glucan ether derivatives onto fabric surfaces.

Solutions of known concentration (ppm) are made using Direct Red 80 and Toluidine Blue O dyes. The absorbance of these solutions are measured using a LAMOTTE SMART2 Colorimeter at either 520 nm (Direct Red 80) or 620 nm (Toluidine Blue O Dye). The absorption information is plotted in order that it can be used to determine dye concentration of solutions exposed to fabric samples. The concentration and absorbance of each calibration curve are provided in Tables 10 and 11.

TABLE 10

Direct Red 80 Dye Calibration Curve Data

| Dye Concentration (ppm) | Average Absorbance @520 nm |
|---|---|
| 25 | 0.823333333 |
| 22.5 | 0.796666667 |
| 20 | 0.666666667 |
| 15 | 0.51 |
| 10 | 0.37 |
| 5 | 0.2 |

TABLE 11

Toluidine Blue O Dye Calibration Curve Data

| Dye Concentration (ppm) | Average Absorbance @620 nm |
|---|---|
| 12.5 | 1.41 |
| 10 | 1.226666667 |
| 7 | 0.88 |
| 5 | 0.676666667 |
| 3 | 0.44 |
| 1 | 0.166666667 |

Thus, calibration curves were prepared that are useful for determining the relative level of adsorption of poly alpha-1,3-glucan ether derivatives onto fabric surfaces.

Example 20

Preparation of Quaternary Ammonium Glucan

This Example describes how one could produce a quaternary ammonium glucan ether derivative. Specifically, trimethylammonium hydroxypropyl glucan can be produced.

Approximately 10 g of the α-glucan oligomer/polymer composition (prepared as in Examples 6 or 7) is added to 100 mL of isopropanol in a 500-mL capacity round bottom flask fitted with a thermocouple for temperature monitoring and a condenser connected to a recirculating bath, and a magnetic stir bar. 30 mL of sodium hydroxide (17.5% solution) is added drop wise to this preparation, which is then heated to 25° C. on a hotplate. The preparation is stirred for 1 hour before the temperature is increased to 55° C. 3-chloro-2-hydroxypropyl-trimethylammonium chloride (31.25 g) is then added to provide a reaction, which is held at 55° C. for 1.5 hours before being neutralized with 90% acetic acid. The product that forms (trimethylammonium hydroxypropyl glucan) is collected by vacuum filtration and washed with ethanol (95%) four times, dried under vacuum at 20-25° C., and analyzed by NMR and SEC to determine molecular weight and DoS.

Thus, the quaternary ammonium glucan ether derivative, trimethylammonium hydroxypropyl glucan, can be prepared and isolated.

Example 21

Effect of Shear Rate on Viscosity of Quaternary Ammonium Glucan

This Example describes how one could test the effect of shear rate on the viscosity of trimethylammonium hydroxypropyl glucan as prepared in Example 22. It is contemplated that this glucan ether derivative exhibits shear thinning or shear thickening behavior.

Samples of trimethylammonium hydroxypropyl glucan are prepared as described in Example 20. To prepare a 2 wt % solution of each sample, 1 g of sample is added to 49 g of DI water. Each preparation is then homogenized for 12-15 seconds at 20,000 rpm to dissolve the trimethylammonium hydroxypropyl glucan sample in the water.

To determine the viscosity of each 2 wt % quaternary ammonium glucan solution at various shear rates, each solution is subjected to various shear rates using a Brookfield DV III+ Rheometer equipped with a recirculating bath to control temperature (20° C.) and a ULA (ultra low adapter) spindle and adapter set. The shear rate is increased using a gradient program which increases from 10-250 rpm and the shear rate is increased by 4.9 1/s every 20 seconds for the ULA spindle and adapter.

It is contemplated that the viscosity of each of the quaternary ammonium glucan solutions would change (reduced or increased) as the shear rate is increased, thereby indicating that the solutions demonstrate shear thinning or shear thickening behavior. Such would indicate that quaternary ammonium glucan could be added to an aqueous liquid to modify its rheological profile.

Example 22

Adsorption of Quaternary Ammonium Glucan on Various Fabrics

This example discloses how one could test the degree of adsorption of a quaternary ammonium glucan (trimethylammonium hydroxypropyl glucan) on different types of fabrics.

A 0.07 wt % solution of trimethylammonium hydroxypropyl glucan (as prepared in Example 20) is made by dissolving 0.105 g of the polymer in 149.89 g of deionized water. This solution is divided into several aliquots with different concentrations of polymer (Table 12). Other components are added such as acid (dilute hydrochloric acid) or base (sodium hydroxide) to modify pH, or NaCl salt.

TABLE 12

Quaternary Ammonium Glucan Solutions Useful in Fabric Adsorption Studies

| Amount of NaCl (g) | Amount of Solution (g) | Polymer Concentration (wt %) | Final pH |
|---|---|---|---|
| 0 | 15 | 0.07 | ~7 |
| 0.15 | 14.85 | 0.0693 | ~7 |
| 0.3 | 14.7 | 0.0686 | ~7 |
| 0.45 | 14.55 | 0.0679 | ~7 |
| 0 | 9.7713 | 0.0683 | ~3 |
| 0 | 9.7724 | 0.0684 | ~5 |

TABLE 12-continued

Quaternary Ammonium Glucan Solutions Useful in Fabric Adsorption Studies

| Amount of NaCl (g) | Amount of Solution (g) | Polymer Concentration (wt %) | Final pH |
|---|---|---|---|
| 0 | 10.0311 | 0.0702 | ~9 |
| 0 | 9.9057 | 0.0693 | ~11 |

Four different fabric types (cretonne, polyester, 65:35 polyester/cretonne, bleached cotton) are cut into 0.17 g pieces. Each piece is placed in a 2-mL well in a 48-well cell culture plate. Each fabric sample is exposed to 1 mL of each of the above solutions (Table 12) for a total of 36 samples (a control solution with no polymer is included for each fabric test). The fabric samples are allowed to sit for at least 30 minutes in the polymer solutions. The fabric samples are removed from the polymer solutions and rinsed in DI water for at least one minute to remove any unbound polymer. The fabric samples are then dried at 60° C. for at least 30 minutes until constant dryness is achieved. The fabric samples are weighed after drying and individually placed in 2-mL wells in a clean 48-well cell culture plate. The fabric samples are then exposed to 1 mL of a 250 ppm Direct Red 80 dye solution. The samples are left in the dye solution for at least 15 minutes. Each fabric sample is removed from the dye solution, after which the dye solution is diluted 10×.

The absorbance of the diluted solutions is measured compared to a control sample. A relative measure of glucan polymer adsorbed to the fabric is calculated based on the calibration curve created in Example 19 for Direct Red 80 dye. Specifically, the difference in UV absorbance for the fabric samples exposed to polymer compared to the controls (fabric not exposed to polymer) represents a relative measure of polymer adsorbed to the fabric. This difference in UV absorbance could also be expressed as the amount of dye bound to the fabric (over the amount of dye bound to control), which is calculated using the calibration curve (i.e., UV absorbance is converted to ppm dye). A positive value represents the dye amount that is in excess to the dye amount bound to the control fabric, whereas a negative value represents the dye amount that is less than the dye amount bound to the control fabric. A positive value would reflect that the glucan ether compound adsorbed to the fabric surface.

It is believed that this assay would demonstrate that quaternary ammonium glucan can adsorb to various types of fabric under different salt and pH conditions. This adsorption would suggest that cationic glucan ether derivatives are useful in detergents for fabric care (e.g., as anti-redeposition agents).

Example 23

Adsorption of the Present α-Glucan Fiber Compositions on Various Fabrics

This example discloses how one could test the degree of adsorption of the present α-glucan oligomer/polymer composition (unmodified) on different types of fabrics.

A 0.07 wt % solution of the present α-glucan oligomer/polymer composition (as prepared in Examples 6 or 7) is made by dissolving 0.105 g of the polymer in 149.89 g of deionized water. This solution is divided into several aliquots with different concentrations of polymer (Table 13).

Other components are added such as acid (dilute hydrochloric acid) or base (sodium hydroxide) to modify pH, or NaCl salt.

TABLE 13

α-Glucan Fiber Solutions Useful in Fabric Adsorption Studies

| Amount of NaCl (g) | Amount of Solution (g) | Polymer Concentration (wt %) | Final pH |
|---|---|---|---|
| 0 | 15 | 0.07 | ~7 |
| 0.15 | 14.85 | 0.0693 | ~7 |
| 0.3 | 14.7 | 0.0686 | ~7 |
| 0.45 | 14.55 | 0.0679 | ~7 |
| 0 | 9.7713 | 0.0683 | ~3 |
| 0 | 9.7724 | 0.0684 | ~5 |
| 0 | 10.0311 | 0.0702 | ~9 |
| 0 | 9.9057 | 0.0693 | ~11 |

Four different fabric types (cretonne, polyester, 65:35 polyester/cretonne, bleached cotton) are cut into 0.17 g pieces. Each piece is placed in a 2-mL well in a 48-well cell culture plate. Each fabric sample is exposed to 1 mL of each of the above solutions (Table 13) for a total of 36 samples (a control solution with no polymer is included for each fabric test). The fabric samples are allowed to sit for at least 30 minutes in the polymer solutions. The fabric samples are removed from the polymer solutions and rinsed in DI water for at least one minute to remove any unbound polymer. The fabric samples are then dried at 60° C. for at least 30 minutes until constant dryness is achieved. The fabric samples are weighed after drying and individually placed in 2-mL wells in a clean 48-well cell culture plate. The fabric samples are then exposed to 1 mL of a 250 ppm Direct Red 80 dye solution. The samples are left in the dye solution for at least 15 minutes. Each fabric sample is removed from the dye solution, after which the dye solution is diluted 10×.

The absorbance of the diluted solutions is measured compared to a control sample. A relative measure of the α-glucan polymer adsorbed to the fabric is calculated based on the calibration curve created in Example 19 for Direct Red 80 dye. Specifically, the difference in UV absorbance for the fabric samples exposed to polymer compared to the controls (fabric not exposed to polymer) represents a relative measure of polymer adsorbed to the fabric. This difference in UV absorbance could also be expressed as the amount of dye bound to the fabric (over the amount of dye bound to control), which is calculated using the calibration curve (i.e., UV absorbance is converted to ppm dye). A positive value represents the dye amount that is in excess to the dye amount bound to the control fabric, whereas a negative value represents the dye amount that is less than the dye amount bound to the control fabric. A positive value would reflect that the glucan ether compound adsorbed to the fabric surface.

It is believed that this assay would demonstrate that the present α-glucan oligomer/polymer compositions can adsorb to various types of fabric under different salt and pH conditions. This adsorption would suggest that the present α-glucan oligomer/polymer compositions are useful in detergents for fabric care (e.g., as anti-redeposition agents).

Example 24

Adsorption of Carboxymethyl α-Glucan (CMG) on Various Fabrics

This example discloses how one could test the degree of adsorption of an α-glucan ether compound (CMG) on different types of fabrics.

A 0.25 wt % solution of CMG is made by dissolving 0.375 g of the polymer in 149.625 g of deionized water. This solution is divided into several aliquots with different concentrations of polymer (Table 14). Other components are added such as acid (dilute hydrochloric acid) or base (sodium hydroxide) to modify pH, or NaCl salt.

TABLE 14

CMG Solutions Useful in Fabric Adsorption Studies

| Amount of NaCl (g) | Amount of Solution (g) | Polymer Concentration (wt %) | Final pH |
|---|---|---|---|
| 0 | 15 | 0.25 | ~7 |
| 0.15 | 14.85 | 0.2475 | ~7 |
| 0.3 | 14.7 | 0.245 | ~7 |
| 0.45 | 14.55 | 0.2425 | ~7 |
| 0 | 9.8412 | 0.2459 | ~3 |
| 0 | 9.4965 | 0.2362 | ~5 |
| 0 | 9.518 | 0.2319 | ~9 |
| 0 | 9.8811 | 0.247 | ~11 |

Four different fabric types (cretonne, polyester, 65:35 polyester/cretonne, bleached cotton) are cut into 0.17 g pieces. Each piece is placed in a 2-mL well in a 48-well cell culture plate. Each fabric sample is exposed to 1 mL of each of the above solutions (Table 14) for a total of 36 samples (a control solution with no polymer is included for each fabric test). The fabric samples are allowed to sit for at least 30 minutes in the polymer solutions. The fabric samples are removed from the polymer solutions and rinsed in DI water for at least one minute to remove any unbound polymer. The fabric samples are then dried at 60° C. for at least 30 minutes until constant dryness is achieved. The fabric samples are weighed after drying and individually placed in 2-mL wells in a clean 48-well cell culture plate. The fabric samples are then exposed to 1 mL of a 250 ppm Toluidine Blue dye solution. The samples are left in the dye solution for at least 15 minutes. Each fabric sample is removed from the dye solution, after which the dye solution is diluted 10×.

The absorbance of the diluted solutions is measured compared to a control sample. A relative measure of CMG polymer adsorbed to the fabric is calculated based on the calibration curve created in Example 19 for Toluidine Blue dye. Specifically, the difference in UV absorbance for the fabric samples exposed to polymer compared to the controls (fabric not exposed to polymer) represents a relative measure of polymer adsorbed to the fabric. This difference in UV absorbance could also be expressed as the amount of dye bound to the fabric (over the amount of dye bound to control), which is calculated using the calibration curve (i.e., UV absorbance is converted to ppm dye). A positive value represents the dye amount that is in excess to the dye amount bound to the control fabric, whereas a negative value represents the dye amount that is less than the dye amount bound to the control fabric. A positive value would reflect that the CMG polymer adsorbed to the fabric surface.

It is believed that this assay would demonstrate that CMG polymer can adsorb to various types of fabric under different salt and pH conditions. This adsorption would suggest that the present glucan ether derivatives are useful in detergents for fabric care (e.g., as anti-redeposition agents).

Example 25

Effect of Cellulase on Carboxymethyl Glucan (CMG)

This example discloses how one could test the stability of an α-glucan ether, CMG, in the presence of cellulase compared to the stability of carboxymethyl cellulose (CMC). Stability to cellulase would indicate applicability of CMG to use in cellulase-containing compositions/processes such as in fabric care.

Solutions (1 wt %) of CMC ($M_w$=90000, DoS=0.7) or CMG are treated with cellulase or amylase as follows. CMG or CMC polymer (100 mg) is added to a clean 20-mL glass scintillation vial equipped with a PTFE stir bar. Water (10.0 mL) that has been previously adjusted to pH 7.0 using 5 vol % sodium hydroxide or 5 vol % sulfuric acid is then added to the scintillation vial, and the mixture is agitated until a solution (1 wt %) forms. A cellulase or amylase enzyme is added to the solution, which is then agitated for 24 hours at room temperature (~25° C.). Each enzyme-treated sample is analyzed by SEC (above) to determine the molecular weight of the treated polymer. Negative controls are conducted as above, but without the addition of a cellulase or amylase. Various enzymatic treatments of CMG and CMC that could be performed are listed in Table 15, for example.

TABLE 15

Measuring Stability of CMG and CMC Against Degradation by Cellulase or Amylase

| Polymer | Enzyme | Enzyme Type | Enzyme Loading |
|---|---|---|---|
| CMC | none | N/A | — |
| CMC | PURADAX HA 1200E | Cellulase | 1 mg/mL |
| CMC | PREFERENZ S 100 | Amylase | 3 μL/mL |
| CMG | none | N/A | — |
| CMG | PURADAX HA 1200E | Cellulase | 1 mg/mL |
| CMG | PREFERENZ S 100 | Amylase | 3 μL/mL |
| CMG | PURASTAR ST L | Amylase | 3 μL/mL |
| CMG | PURADAX EG L | Cellulase | 3 μL/mL |

It is believed that the enzymatic studies in Table 15 would indicate that CMC is highly susceptible to degradation by cellulase, whereas CMG is more resistant to this degradation. It is also believed that these studies would indicate that both CMC and CMG are largely stable to amylase.

Use of CMC for providing viscosity to an aqueous composition (e.g., laundry or dishwashing detergent) containing cellulase would be unacceptable. CMG on the other hand, given its stability to cellulase, would be useful for cellulase-containing aqueous compositions such as detergents.

Example 26

Effect of Cellulase on Carboxymethyl Glucan (CMG)

This example discloses how one could test the stability of the present α-glucan oligomer/polymer composition (unmodified) in the presence of cellulase compared to the stability of carboxymethyl cellulose (CMC). Stability to cellulase would indicate applicability of the present α-glucan oligomer/polymer composition to use in cellulase-containing compositions/processes, such as in fabric care.

Solutions (1 wt %) of CMC ($M_w$=90000, DoS=0.7) or the present α-glucan oligomer/polymer composition as described in Examples 6 or 7 are treated with cellulase or amylase as follows. The present α-glucan oligomer/polymer composition or CMC polymer (100 mg) is added to a clean 20-mL glass scintillation vial equipped with a PTFE stir bar. Water (10.0 mL) that has been previously adjusted to pH 7.0 using 5 vol % sodium hydroxide or 5 vol % sulfuric acid is then added to the scintillation vial, and the mixture is agitated until a solution (1 wt %) forms. A cellulase or amylase enzyme is added to the solution, which is then agitated for 24 hours at room temperature (~25° C.). Each enzyme-treated sample is analyzed by SEC (above) to determine the molecular weight of the treated polymer. Negative controls are conducted as above, but without the addition of a cellulase or amylase. Various enzymatic treatments of the present α-glucan oligomer/polymer composition and CMC that could be performed are listed in Table 16, for example.

TABLE 16

Measuring Stability of an α-Glucan Fiber Composition and CMC Against Degradation by Cellulase or Amylase

| Polymer | Enzyme | Enzyme Type | Enzyme Loading |
|---|---|---|---|
| CMC | none | N/A | — |
| CMC | PURADAX HA 1200E | Cellulase | 1 mg/mL |
| CMC | PREFERENZ S 100 | Amylase | 3 μL/mL |
| α-GF[1] | none | N/A | — |
| α-GF | PURADAX HA 1200E | Cellulase | 1 mg/mL |
| α-GF | PREFERENZ S 100 | Amylase | 3 μL/mL |
| α-GF | PURASTAR ST L | Amylase | 3 μL/mL |
| α-GF | PURADAX EG L | Cellulase | 3 μL/mL |

[1] = α-GF is the present α-glucan fiber.

It is believed that the enzymatic studies in Table 16 would indicate that CMC is highly susceptible to degradation by cellulase, whereas the present α-glucan oligomer/polymer composition is more resistant to this degradation. It is also believed that these studies would indicate that both CMC and the present α-glucan oligomer/polymer composition are largely stable to amylase.

Use of CMC for providing viscosity to an aqueous composition (e.g., laundry or dishwashing detergent) containing cellulase would be unacceptable. The present α-glucan oligomer/polymer composition (unmodified) on the other hand, given its stability to cellulase, would be useful for cellulase-containing aqueous compositions such as detergents.

Example 27

Preparation of Hydroxypropyl α-Glucan

This Example describes producing the glucan ether derivative, hydroxypropyl α-glucan.

Approximately 10 g of the present α-glucan oligomer/polymer composition as prepared in Examples 6 or 7 is mixed with 101 g of toluene and 5 mL of 20% sodium hydroxide. This preparation is stirred in a 500-mL glass beaker on a magnetic stir plate at 55° C. for 30 minutes. The preparation is then transferred to a shaker tube reactor after which 34 g of propylene oxide is added; the reaction is then stirred at 75° C. for 3 hours. The reaction is then neutralized with 20 g of acetic acid and the hydroxypropyl α-glucan formed is collected, washed with 70% aqueous ethanol or hot water, and dried. The molar substitution (MS) of the product is determined by NMR.

Example 28

Preparation of Hydroxyethyl α-Glucan

This Example describes producing the glucan ether derivative, hydroxyethyl poly alpha-1,3-glucan.

Approximately 10 g of the present α-glucan oligomer/polymer composition as prepared in Examples 6 or 7 is mixed with 150 mL of isopropanol and 40 mL of 30% sodium hydroxide. This preparation is stirred in a 500-mL glass beaker on a magnetic stir plate at 55° C. for 1 hour, and then is stirred overnight at ambient temperature. The preparation is then transferred to a shaker tube reactor after which 15 g of ethylene oxide is added; the reaction is then stirred at 60° C. for 6 hour. The reaction is then allowed to remain in the sealed shaker tube overnight (approximately 16 hours) before it is neutralized with 20.2 g of acetic acid thereby forming hydroxyethyl glucan. The hydroxyethyl glucan solids is collected and is washed in a beaker by adding a methanol:acetone (60:40 v/v) mixture and stirring with a stir bar for 20 minutes. The methanol:acetone mixture is then filtered away from the solids. This washing step is repeated two times prior to drying of the product. The molar substitution (MS) of the product is determined by NMR.

Example 29

Preparation of Ethyl α-Glucan

This Example describes producing the glucan ether derivative, ethyl glucan.

Approximately 10 g of the present α-glucan oligomer/polymer composition as prepared in Examples 6 or 7 is added to a shaker tube, after which sodium hydroxide (1-70% solution) and ethyl chloride are added to provide a reaction. The reaction is heated to 25-200° C. and held at that temperature for 1-48 hours before the reaction is neutralized with acetic acid. The resulting product is collected washed, and analyzed by NMR and SEC to determine the molecular weight and degree of substitution (DoS) of the ethyl glucan.

Example 30

Preparation of Ethyl Hydroxyethyl α-Glucan

This Example describes producing the glucan ether derivative, ethyl hydroxyethyl glucan.

Approximately 10 g of the present α-glucan oligomer/polymer composition as prepared in Examples 6 or 7 is added to a shaker tube, after which sodium hydroxide (1-70% solution) is added. Then, ethyl chloride is added followed by an ethylene oxide/ethyl chloride mixture to provide a reaction. The reaction is slowly heated to 25-200° C. and held at that temperature for 1-48 hours before being neutralized with acetic acid. The product formed is collected, washed, dried under a vacuum at 20-70° C., and then analyzed by NMR and SEC to determine the molecular weight and DoS of the ethyl hydroxyethyl glucan.

Example 31

Preparation of Methyl α-Glucan

This Example describes producing the glucan ether derivative, methyl glucan.

Approximately 10 g of the present α-glucan oligomer/polymer composition as prepared in Examples 6 or 7 is mixed with 40 mL of 30% sodium hydroxide and 40 mL of 2-propanol, and is stirred at 55° C. for 1 hour to provide alkali glucan. This preparation is then filtered, if needed, using a Buchner funnel. The alkali glucan is then mixed with 150 mL of 2-propanol. A shaker tube reactor is charged with the mixture and 15 g of methyl chloride is added to provide a reaction. The reaction is stirred at 70° C. for 17 hours. The resulting methyl glucan solid is filtered and neutralized with 20 mL 90% acetic acid, followed by three 200-mL ethanol washes. The resulting product is analyzed by NMR and SEC to determine the molecular weight and degree of substitution (DoS).

Example 32

Preparation of Hydroxyalkyl Methyl α-Glucan

This Example describes producing the glucan ether derivative, hydroxyalkyl methyl α-glucan.

Approximately 10 g of the present α-glucan oligomer/polymer composition as prepared in Examples 6 or 7 is added to a vessel, after which sodium hydroxide (5-70% solution) is added. This preparation is stirred for 0.5-8 hours. Then, methyl chloride is added to the vessel to provide a reaction, which is then heated to 30-100° C. for up to 14 days. An alkylene oxide (e.g., ethylene oxide, propylene oxide, butylene oxide, etc.) is then added to the reaction while controlling the temperature. The reaction is heated to 25-100° C. for up to 14 days before being neutralized with acid. The product thus formed is filtered, washed and dried. The resulting product is analyzed by NMR and SEC to determine the molecular weight and degree of substitution (DoS).

Example 33

Preparation of Carboxymethyl Hydroxyethyl α-Glucan

This Example describes producing the glucan ether derivative, carboxymethyl hydroxyethyl glucan.

Approximately 10 g of the present α-glucan oligomer/polymer composition as prepared in Examples 6 or 7 is added to an aliquot of a substance such as isopropanol or toluene in a 400-mL capacity shaker tube, after which sodium hydroxide (1-70% solution) is added. This preparation is stirred for up to 48 hours. Then, monochloroacetic acid is added to provide a reaction, which is then heated to 25-100° C. for up to 14 days. Ethylene oxide is then added to the reaction, which is then heated to 25-100° C. for up to 14 days before being neutralized with acid (e.g., acetic, sulfuric, nitric, hydrochloric, etc.). The product thus formed is collected, washed and dried. The resulting product is analyzed by NMR and SEC to determine the molecular weight and degree of substitution (DoS).

Example 34

Preparation of Sodium Carboxymethyl Hydroxyethyl α-Glucan

This Example describes producing the glucan ether derivative, sodium carboxymethyl hydroxyethyl glucan.

Approximately 10 g of the present α-glucan oligomer/polymer composition as prepared in Examples 6 or 7 is added to an aliquot of an alcohol such as isopropanol in a 400-mL capacity shaker tube, after which sodium hydroxide (1-70% solution) is added. This preparation is stirred for up to 48 hours. Then, sodium monochloroacetate is added to provide a reaction, which is then heated to 25-100° C. for up to 14 days. Ethylene oxide is then added to the reaction, which is then heated to 25-100° C. for up to 14 days before being neutralized with acid (e.g., acetic, sulfuric, nitric, hydrochloric, etc.). The product thus formed is collected, washed and dried. The resulting product is analyzed by NMR and SEC to determine the molecular weight and degree of substitution (DoS).

Example 35

Preparation of Carboxymethyl Hydroxypropyl α-Glucan

This Example describes producing the glucan ether derivative, carboxymethyl hydroxypropyl glucan.

Approximately 10 g of the present α-glucan oligomer/polymer composition as prepared in Examples 6 or 7 is added to an aliquot of a substance such as isopropanol or toluene in a 400-mL capacity shaker tube, after which sodium hydroxide (1-70% solution) is added. This preparation is stirred for up to 48 hours. Then, monochloroacetic acid is added to provide a reaction, which is then heated to 25-100° C. for up to 14 days. Propylene oxide is then added to the reaction, which is then heated to 25-100° C. for up to 14 days before being neutralized with acid (e.g., acetic, sulfuric, nitric, hydrochloric, etc.). The solid product thus formed is collected, washed and dried. The resulting product is analyzed by NMR and SEC to determine the molecular weight and degree of substitution (DoS).

Example 36

Preparation of Sodium Carboxymethyl Hydroxypropyl α-Glucan

This Example describes producing the glucan ether derivative, sodium carboxymethyl hydroxypropyl glucan.

Approximately 10 g of the present α-glucan oligomer/polymer composition as prepared in Examples 6 or 7 is added to an aliquot of a substance such as isopropanol or toluene in a 400-mL capacity shaker tube, after which sodium hydroxide (1-70% solution) is added. This preparation is stirred for up to 48 hours. Then, sodium monochloroacetate is added to provide a reaction, which is then heated to 25-100° C. for up to 14 days. Propylene oxide is then added to the reaction, which is then heated to 25-100° C. for up to 14 days before being neutralized with acid (e.g., acetic, sulfuric, nitric, hydrochloric, etc.). The product thus formed is collected, washed and dried. The resulting product is analyzed by NMR and SEC to determine the molecular weight and degree of substitution (DoS).

Example 37

Preparation of Potassium Carboxymethyl α-Glucan

This Example describes producing the glucan ether derivative, potassium carboxymethyl glucan.

Approximately 10 g of the present α-glucan oligomer/polymer composition as prepared in Examples 6 or 7 is added to 200 mL of isopropanol in a 500-mL capacity round bottom flask fitted with a thermocouple for temperature monitoring and a condenser connected to a recirculating bath, and a magnetic stir bar. 40 mL of potassium hydroxide (15% solution) is added drop wise to this preparation, which is then heated to 25° C. on a hotplate. The preparation is stirred for 1 hour before the temperature is increased to 55° C. Potassium chloroacetate (12 g) is then added to provide a reaction, which was held at 55° C. for 3 hours before being neutralized with 90% acetic acid. The product formed was collected, washed with ethanol (70%), and dried under vacuum at 20-25° C. The resulting product is analyzed by NMR and SEC to determine the molecular weight and degree of substitution (DoS).

Example 38

Preparation of Lithium Carboxymethyl α-Glucan

This Example describes producing the glucan ether derivative, lithium carboxymethyl glucan.

Approximately 10 g of the present α-glucan oligomer/polymer composition as prepared in Examples 6 or 7 is added to 200 mL of isopropanol in a 500-mL capacity round bottom flask fitted with a thermocouple for temperature monitoring and a condenser connected to a recirculating bath, and a magnetic stir bar. 50 mL of lithium hydroxide (11.3% solution) is added drop wise to this preparation, which is then heated to 25° C. on a hotplate. The preparation is stirred for 1 hour before the temperature is increased to 55° C. Lithium chloroacetate (12 g) is then added to provide a reaction, which is held at 55° C. for 3 hours before being neutralized with 90% acetic acid. The product formed is collected, washed with ethanol (70%), and dried under vacuum at 20-25° C. The resulting product is analyzed by NMR and SEC to determine the molecular weight and degree of substitution (DoS).

Example 39

Preparation of a Dihydroxyalkyl α-Glucan

This Example describes producing a dihydroxyalkyl ether derivative of α-glucan. Specifically, dihydroxypropyl glucan is produced.

Approximately 10 g of the present α-glucan oligomer/polymer composition as prepared in Example 6 or 7 is added to 100 mL of 20% tetraethylammonium hydroxide in a 500-mL capacity round bottom flask fitted with a thermocouple for temperature monitoring and a condenser connected to a recirculating bath, and a magnetic stir bar (resulting in ~9.1 wt % poly alpha-1,3-glucan). This preparation is stirred and heated to 30° C. on a hotplate. The preparation is stirred for 1 hour to dissolve any solids before the temperature is increased to 55° C. 3-chloro-1,2-propanediol (6.7 g) and 11 g of DI water were then added to provide a reaction (containing ~5.2 wt % 3-chloro-1,2-propanediol), which is held at 55° C. for 1.5 hours after which time 5.6 g of DI water is added to the reaction. The reaction is held at 55° C. for an additional 3 hours and 45 minutes before being neutralized with acetic acid. After neutralization, an excess of isopropanol is added. The product formed was collected, washed with ethanol (95%), and dried under vacuum at 20-25° C. The resulting product is analyzed by NMR and SEC to determine the molecular weight and degree of substitution (DoS).

What is claimed is:

1. A fabric care or laundry care composition comprising:
   (a) a soluble α-glucan composition, wherein the glycosidic linkages of the α-glucan composition consist of:
   (i) 25-35% α-(1,3) glycosidic linkages,
   (ii) 55-75% α-(1,6) glycosidic linkages, and
   (iii) 5-15% α-(1,3,6) glycosidic linkages,
   wherein the % glycosidic linkages are determined by methylation analysis;
   wherein the α-glucan composition has
   (iv) a weight average molecular weight of less than 5000 Daltons,
   (v) a viscosity of less than 0.25 Pascal second (Pa·s) at 12 wt % in water at 20° C.,
   (vi) a solubility of at least 20% (w/w) in water at 25° C., and
   (vii) a polydispersity index of less than 5; and
   (b) at least one additional fabric care or laundry care ingredient.

2. The fabric care or laundry care composition of claim 1, wherein the additional ingredient is at least one cellulase.

3. The fabric care or laundry care composition of claim 1, wherein the additional ingredient is at least one protease.

4. The fabric care or laundry care composition of claim 1, wherein the fabric care or laundry care composition comprises 0.01 to 90 wt % of the soluble α-glucan composition.

5. The fabric care or laundry care composition of claim 1, wherein the at least one additional ingredient comprises at least one of surfactants selected from anionic surfactants, nonionic surfactants, cationic surfactants, or zwitterionic surfactants; enzymes selected from proteases, cellulases, polyesterases, amylases, cutinases, lipases, pectate lyases, perhydrolases, xylanases, peroxidases, or laccases; detergent builders, complexing agents, polymers, soil release polymers, surfactancy-boosting polymers, bleaching systems, bleach activators, bleaching catalysts, fabric conditioners, clays, foam boosters, suds suppressors, anti-corrosion agents, soil-suspending agents, anti-soil redeposition agents, dyes, bactericides, tarnish inhibiters, optical brighteners, perfumes, saturated or unsaturated fatty acids, dye transfer inhibiting agents, chelating agents, hueing dyes, calcium and magnesium cations, visual signaling ingredients, anti-foam, structurants, thickeners, anti-caking agents, starch, sand, or gelling agents.

6. The fabric care or laundry care composition of claim 1, wherein the composition is in the form of a liquid, a gel, a powder, a hydrocolloid, an aqueous solution, granules, tablets, capsules, single compartment sachets, or multi-compartment sachets.

7. The fabric care or laundry care composition of claim 1, wherein the α-glucan composition is cellulase resistant, protease resistant, or amylase resistant.

8. A method of treating an article of clothing, textile, or fabric, said method comprising:
   (a) providing a fabric care or laundry care composition according to claim 1;
   (b) contacting, under suitable conditions, the composition of (a) with a fabric, textile, or article of clothing, whereby the fabric, textile, or article of clothing is treated by the composition; and
   (c) optionally, rinsing the treated fabric, textile, or article of clothing of (b).

* * * * *

UNITED STATES PATENT AND TRADEMARK OFFICE
CERTIFICATE OF CORRECTION

PATENT NO. : 10,822,574 B2  
APPLICATION NO. : 15/765558  
DATED : November 3, 2020  
INVENTOR(S) : Robert DiCosimo et al.

Page 1 of 1

It is certified that error appears in the above-identified patent and that said Letters Patent is hereby corrected as shown below:

In the Specification

Column 1, Line 9:
Replace "Nov. 2, 2016" with "Nov. 7, 2016".

Signed and Sealed this
Fifteenth Day of April, 2025

Coke Morgan Stewart
*Acting Director of the United States Patent and Trademark Office*

SEQUENCE LISTING

<160> NUMBER OF SEQ ID NOS: 14

<210> SEQ ID NO 1
<211> LENGTH: 1146
<212> TYPE: PRT
<213> ORGANISM: Paenibacillus humicus

<400> SEQUENCE: 1

Met Arg Ile Arg Thr Lys Tyr Met Asn Trp Met Leu Val Leu Val Leu
1               5                   10                  15

Ile Ala Ala Gly Phe Phe Gln Ala Ala Gly Pro Ile Ala Pro Ala Thr
            20                  25                  30

Ala Ala Gly Gly Ala Asn Leu Thr Leu Gly Lys Thr Val Thr Ala Ser
        35                  40                  45

Gly Gln Ser Gln Thr Tyr Ser Pro Asp Asn Val Lys Asp Ser Asn Gln
50                  55                  60

Gly Thr Tyr Trp Glu Ser Thr Asn Asn Ala Phe Pro Gln Trp Ile Gln
65                  70                  75                  80

Val Asp Leu Gly Ala Ser Thr Ser Ile Asp Gln Ile Val Leu Lys Leu
            85                  90                  95

Pro Ser Gly Trp Glu Thr Arg Thr Gln Thr Leu Ser Ile Gln Gly Ser
            100                 105                 110

Ala Asn Gly Ser Thr Phe Thr Asn Ile Val Gly Ser Ala Gly Tyr Thr
        115                 120                 125

Phe Asn Pro Ser Val Ala Gly Asn Ser Val Thr Ile Asn Phe Ser Ala
130                 135                 140

Ala Ser Ala Arg Tyr Val Arg Leu Asn Phe Thr Ala Asn Thr Gly Trp
145                 150                 155                 160

Pro Ala Gly Gln Leu Ser Glu Leu Glu Ile Tyr Gly Ala Thr Ala Pro
            165                 170                 175

Thr Pro Thr Pro Thr Pro Thr Pro Thr Pro Thr Pro Thr Pro Thr Pro
        180                 185                 190

Thr Pro Thr Pro Thr Val Thr Pro Ala Pro Ser Ala Thr Pro Thr Pro
        195                 200                 205

Thr Pro Pro Ala Gly Ser Asn Ile Ala Val Gly Lys Ser Ile Thr Ala
210                 215                 220

Ser Ser Ser Thr Gln Thr Tyr Val Ala Ala Asn Ala Asn Asp Asn Asn
225                 230                 235                 240

Thr Ser Thr Tyr Trp Glu Gly Gly Ser Asn Pro Ser Thr Leu Thr Leu
            245                 250                 255

Asp Phe Gly Ser Asn Gln Ser Ile Thr Ser Val Val Leu Lys Leu Asn
            260                 265                 270

Pro Ala Ser Glu Trp Gly Thr Arg Thr Gln Thr Ile Gln Val Leu Gly
            275                 280                 285

Ala Asp Gln Asn Ala Gly Ser Phe Ser Asn Leu Val Ser Ala Gln Ser
        290                 295                 300

Tyr Thr Phe Asn Pro Ala Thr Gly Asn Thr Val Thr Ile Pro Val Ser
305                 310                 315                 320

Ala Thr Val Lys Arg Leu Gln Leu Asn Ile Thr Ala Asn Ser Gly Ala
            325                 330                 335

Pro Ala Gly Gln Ile Ala Glu Phe Gln Val Phe Gly Thr Pro Ala Pro
        340                 345                 350

Asn Pro Asp Leu Thr Ile Thr Gly Met Ser Trp Thr Pro Ser Ser Pro
        355                 360                 365

-continued

Val Glu Ser Gly Asp Ile Thr Leu Asn Ala Val Val Lys Asn Ile Gly
370                 375                 380

Thr Ala Ala Ala Gly Ala Thr Thr Val Asn Phe Tyr Leu Asn Asn Glu
385                 390                 395                 400

Leu Ala Gly Thr Ala Pro Val Gly Ala Leu Ala Gly Ala Ser Ala
                405                 410                 415

Asn Val Ser Ile Asn Ala Gly Ala Lys Ala Ala Ala Thr Tyr Ala Val
                420                 425                 430

Ser Ala Lys Val Asp Glu Ser Asn Ala Val Ile Glu Gln Asn Glu Gly
            435                 440                 445

Asn Asn Ser Tyr Ser Asn Pro Thr Asn Leu Val Ala Pro Val Ser
450                 455                 460

Ser Ser Asp Leu Val Ala Val Thr Ser Trp Ser Pro Gly Thr Pro Ser
465                 470                 475                 480

Gln Gly Ala Ala Val Ala Phe Thr Val Ala Leu Lys Asn Gln Gly Thr
                485                 490                 495

Leu Ala Ser Ala Gly Gly Ala His Pro Val Thr Val Val Leu Lys Asn
                500                 505                 510

Ala Ala Gly Ala Thr Leu Gln Thr Phe Thr Gly Thr Tyr Thr Gly Ser
            515                 520                 525

Leu Ala Ala Gly Ala Ser Ala Asn Ile Ser Val Gly Ser Trp Thr Ala
530                 535                 540

Ala Ser Gly Thr Tyr Thr Val Ser Thr Thr Val Ala Ala Asp Gly Asn
545                 550                 555                 560

Glu Ile Pro Ala Lys Gln Ser Asn Asn Thr Ser Ser Ala Ser Leu Thr
                565                 570                 575

Val Tyr Ser Ala Arg Gly Ala Ser Met Pro Tyr Ser Arg Tyr Asp Thr
                580                 585                 590

Glu Asp Ala Val Leu Gly Gly Gly Ala Val Leu Arg Thr Ala Pro Thr
            595                 600                 605

Phe Asp Gln Ser Leu Ile Ala Ser Glu Ala Ser Gly Gln Lys Tyr Ala
610                 615                 620

Ala Leu Pro Ser Asn Gly Ser Ser Leu Gln Trp Thr Val Arg Gln Gly
625                 630                 635                 640

Gln Gly Gly Ala Gly Val Thr Met Arg Phe Thr Met Pro Asp Thr Ser
                645                 650                 655

Asp Gly Met Gly Gln Asn Gly Ser Leu Asp Val Tyr Val Asn Gly Thr
                660                 665                 670

Lys Ala Lys Thr Val Ser Leu Thr Ser Tyr Tyr Ser Trp Gln Tyr Phe
            675                 680                 685

Ser Gly Asp Met Pro Ala Asp Ala Pro Gly Gly Arg Pro Leu Phe
690                 695                 700

Arg Phe Asp Glu Val His Phe Lys Leu Asp Thr Ala Leu Lys Pro Gly
705                 710                 715                 720

Asp Thr Ile Arg Val Gln Lys Gly Gly Asp Ser Leu Glu Tyr Gly Val
                725                 730                 735

Asp Phe Ile Glu Ile Glu Pro Ile Pro Ala Ala Val Ala Arg Pro Ala
                740                 745                 750

Asn Ser Val Ser Val Thr Glu Tyr Gly Ala Val Ala Asn Asp Gly Lys
            755                 760                 765

Asp Asp Leu Ala Ala Phe Lys Ala Ala Val Thr Ala Ala Val Ala Ala
770                 775                 780

Gly Lys Ser Leu Tyr Ile Pro Glu Gly Thr Phe His Leu Ser Ser Met

```
                                            785                 790                 795                 800
Trp Glu Ile Gly Ser Ala Thr Ser Met Ile Asp Asn Phe Thr Val Thr
                    805                 810                 815
Gly Ala Gly Ile Trp Tyr Thr Asn Ile Gln Phe Thr Asn Pro Asn Ala
                    820                 825                 830
Ser Gly Gly Gly Ile Ser Leu Arg Ile Lys Gly Lys Leu Asp Phe Ser
                    835                 840                 845
Asn Ile Tyr Met Asn Ser Asn Leu Arg Ser Arg Tyr Gly Gln Asn Ala
        850                 855                 860
Val Tyr Lys Gly Phe Met Asp Asn Phe Gly Thr Asn Ser Ile Ile His
865                 870                 875                 880
Asp Val Trp Val Glu His Phe Glu Cys Gly Met Trp Val Gly Asp Tyr
                    885                 890                 895
Ala His Thr Pro Ala Ile Tyr Ala Ser Gly Leu Val Val Glu Asn Ser
                    900                 905                 910
Arg Ile Arg Asn Asn Leu Ala Asp Gly Ile Asn Phe Ser Gln Gly Thr
                    915                 920                 925
Ser Asn Ser Thr Val Arg Asn Ser Ser Ile Arg Asn Asn Gly Asp Asp
        930                 935                 940
Gly Leu Ala Val Trp Thr Ser Asn Thr Asn Gly Ala Pro Ala Gly Val
945                 950                 955                 960
Asn Asn Thr Phe Ser Tyr Asn Thr Ile Glu Asn Asn Trp Arg Ala Ala
                    965                 970                 975
Ala Ile Ala Phe Phe Gly Gly Ser Gly His Lys Ala Asp His Asn Tyr
                    980                 985                 990
Ile Ile Asp Cys Val Gly Gly Ser Gly Ile Arg Met Asn Thr Val Phe
                    995                 1000                1005
Pro Gly Tyr His Phe Gln Asn Asn Thr Gly Ile Thr Phe Ser Asp
        1010                1015                1020
Thr Thr Ile Ile Asn Ser Gly Thr Ser Gln Asp Leu Tyr Asn Gly
        1025                1030                1035
Glu Arg Gly Ala Ile Asp Leu Glu Ala Ser Asn Asp Ala Ile Lys
        1040                1045                1050
Asn Val Thr Phe Thr Asn Ile Asp Ile Asn Ala Gln Arg Asp
        1055                1060                1065
Gly Val Gln Ile Gly Tyr Gly Gly Phe Glu Asn Ile Val Phe
        1070                1075                1080
Asn Asn Ile Thr Ile Asp Gly Thr Gly Arg Asp Gly Ile Ser Thr
        1085                1090                1095
Ser Arg Phe Ser Gly Pro His Leu Gly Ala Ala Ile Tyr Thr Tyr
        1100                1105                1110
Thr Gly Asn Gly Ser Ala Thr Phe Asn Asn Leu Val Thr Arg Asn
        1115                1120                1125
Ile Ala Tyr Ala Gly Gly Asn Tyr Ile Gln Ser Gly Phe Asn Leu
        1130                1135                1140
Thr Ile Lys
        1145

<210> SEQ ID NO 2
<211> LENGTH: 3351
<212> TYPE: DNA
<213> ORGANISM: Paenibacillus humicus

<400> SEQUENCE: 2
```

```
atggctagcg cagcaggagg cgcgaatctg acgctcggca aaaccgtcac cgccagcggc    60
cagtcgcaga cgtacagccc cgacaatgtc aaggacagca atcagggaac ttactgggaa   120
agcacgaaca acgccttccc gcagtggatc caagtcgacc ttggcgccag cacgagcatc   180
gaccagatcg tgctcaaact tccgtccgga tgggagactc gtacgcaaac gctctcgata   240
cagggcagcg cgaacggctc gacgttcacg aacatcgtcg gatcggccgg gtatacattc   300
aatccatccg tcgccggcaa cagcgtcacg atcaacttca cgctgccag cgcccgctac    360 gtccgcctga atttcacggc caatacgggc tggccagcag gccagctgtc ggagcttgag   420
atctacggag cgacggcgcc aacgcctact cccacgccta ctccaacacc aacgccaacg   480
ccaacaccaa cgccaacccc tacagtaacc cctgcgcctt cggccacgcc gactccgact   540
cctccggcag gcagcaacat cgccgtaggg aaatcgatta cagcctcttc cagcacgcag   600
acctacgtag ctgcaaatgc aaatgacaac aatacatcca cctattggga gggaggaagc   660
aacccgagca cgctgactct cgatttcggt tccaaccaga gcatcacttc cgtcgtcctc   720
aagctgaatc cggcttcgga atgggggact cgcacgcaaa cgatccaagt tcttggagcg   780
gatcagaacg ccggctcctt cagcaatctc gtctctgccc agtcctatac gttcaatccc   840
gcaaccggca atacggtgac gattccggtc tccgcgacgg tcaagcgcct ccagctgaac   900
attacggcga actccggcgc ccctgccggc cagattgccg agttccaagt gttcggcacg   960
ccagcgccta atccggactt gaccattacc ggcatgtcct ggactccgtc ttctccggtc  1020
gagagcggcg acattacgct gaacgccgtc gtcaagaaca tcggaactgc agctgcaggc  1080
gccacgacgg tcaatttcta cctgaacaac gaactcgccg caccgctcc ggtaggcgcg   1140 cttgcggcag gagcttctgc aaatgtatcg atcaatgcag gcgccaaagc agccgcaacg  1200
tatgcggtaa gcgccaaagt cgacgagagc aacgccgtca tcgagcagaa tgaaggcaac  1260
aacagctact cgaacccgac taacctcgtc gtagcgccgg tgtccagctc cgacctcgtc  1320
gccgtgacgt catggtcgcc gggcacgccg tcgcagggag cggcggtcgc atttaccgtc  1380
gcgcttaaaa atcagggtac gctggcttcc gccggcggag cccatcccgt aaccgtcgtt  1440
ctgaaaaacg ctgccggagc gacgctgcaa accttcacgg gcacctacac aggttccctg  1500
gcagcaggcg catccgcgaa tatcagcgtg ggcagctgga cggcagcgag cggcacctat  1560
accgtctcga cgacggtagc cgctgacggc aatgaaattc cggccaagca aagcaacaat  1620
acgagcagcg cgagcctcac ggtctactcg gcgcgcggcg ccagcatgcc gtacagccgt  1680
tacgacacgg aggatgcggt gctcggcggc ggagctgtcc tgagaacggc gccgacgttc  1740
gatcagtcgc tcatcgcttc cgaagcatcg ggacagaaat acgccgcact tccgtccaac  1800
ggctccagcc tgcagtggac cgtccgtcaa ggccagggcg tgcaggcgt cacgatgcgc   1860 ttcacgatgc ccgacacgag cgacggcatg gccagaacg gctcgctcga cgtctatgtc   1920
aacggaacca aagccaaaac ggtgtcgctg acctcttatt acagctggca gtatttctcc  1980
ggcgacatgc cggctgacgc tccgggcggc ggcaggccgc tcttccgctt cgacgaagtc  2040
cacttcaagc tggatacggc gttgaagccg ggagacacga tccgcgtcca aagggcggt    2100 gacagcctgg agtacggcgt cgacttcatc gagatcgagc cgattccggc agcggttgcc  2160
cgtccggcca actcggtgtc cgtcaccgaa tacggcgctg tcgccaatga cggcaaggat  2220
gatctcgccg ccttcaaggc tgccgtgacc cagcgcgtag cggccggaaa atccctctac  2280
atcccggaag gcaccttcca cctgagcagc atgtgggaga tcggctcggc caccagcatg  2340
atcgacaact tcacggtcac gggtgccggc atctggtata cgaacatcca gttcacgaat  2400
```

```
cccaatgcat cgggcggcgg catctccctg agaatcaaag gaaagctgga tttcagcaac    2460
atctacatga actccaacct gcgttcccgt tacgggcaga acgccgtcta caaaggcttt    2520
atggacaatt tcggcactaa ttcgatcatc catgacgtct gggtcgagca tttcgaatgc    2580
ggcatgtggg tcggcgacta cgcccatact cctgcgatct atgcgagcgg gctcgtcgtg    2640
gaaaacagcc gcatccgcaa caatcttgcc gacggcatca acttctcgca gggaacgagc    2700
aactcgaccg tccgcaacag cagcatccgc aacaacggcg atgacggcct cgccgtctgg    2760
acgagcaaca cgaacggcgc tccggccggc gtgaacaaca ccttctccta caacacgatc    2820
gagaacaact ggcgcgcggc ggccatcgcc ttcttcggcg gcagcggcca caaggctgac    2880
cacaactaca tcatcgactg tgtcggcggc tccggcatcc ggatgaatac ggtgttccca    2940
ggctaccact tccagaacaa caccggcatc accttctcgg atacgacgat catcaacagc    3000
ggcaccagcc aggatctgta caacggcgag cgcggagcga ttgatctgga agcatccaac    3060
gacgcgatca aaaacgtcac cttcaccaac atcgacatca tcaatgccca gcgcgacggc    3120
gttcagatcg gctatggcgg cggcttcgag aacatcgtgt tcaacaacat cacgatcgac    3180
ggcaccggcc gcgacgggat atcgacatcc cgcttctcgg gacctcatct tggcgcagcc    3240
atctatacgt acacgggcaa cggctcggcg acgttcaaca acctggtgac ccggaacatc    3300
gcctatgcag gcggcaacta catccagagc gggttcaacc tgacgatcta a            3351

<210> SEQ ID NO 3
<211> LENGTH: 1116
<212> TYPE: PRT
<213> ORGANISM: Paenibacillus humicus

<400> SEQUENCE: 3

Met Ala Ser Ala Ala Gly Gly Ala Asn Leu Thr Leu Gly Lys Thr Val
1               5                   10                  15

Thr Ala Ser Gly Gln Ser Gln Thr Tyr Ser Pro Asp Asn Val Lys Asp
                20                  25                  30

Ser Asn Gln Gly Thr Tyr Trp Glu Ser Thr Asn Asn Ala Phe Pro Gln
            35                  40                  45

Trp Ile Gln Val Asp Leu Gly Ala Ser Thr Ser Ile Asp Gln Ile Val
        50                  55                  60

Leu Lys Leu Pro Ser Gly Trp Glu Thr Arg Thr Gln Thr Leu Ser Ile
65                  70                  75                  80

Gln Gly Ser Ala Asn Gly Ser Thr Phe Thr Asn Ile Val Gly Ser Ala
                85                  90                  95

Gly Tyr Thr Phe Asn Pro Ser Val Ala Gly Asn Ser Val Thr Ile Asn
                100                 105                 110

Phe Ser Ala Ala Ser Ala Arg Tyr Val Arg Leu Asn Phe Thr Ala Asn
            115                 120                 125

Thr Gly Trp Pro Ala Gly Gln Leu Ser Glu Leu Glu Ile Tyr Gly Ala
        130                 135                 140

Thr Ala Pro Thr Pro Thr Pro Thr Pro Thr Pro Thr Pro Thr Pro Thr
145                 150                 155                 160

Pro Thr Pro Thr Pro Thr Pro Val Thr Pro Ala Pro Ser Ala Thr
                165                 170                 175

Pro Thr Pro Thr Pro Pro Ala Gly Ser Asn Ile Ala Val Gly Lys Ser
            180                 185                 190

Ile Thr Ala Ser Ser Ser Thr Gln Thr Tyr Val Ala Ala Asn Ala Asn
        195                 200                 205
```

-continued

```
Asp Asn Asn Thr Ser Thr Tyr Trp Glu Gly Gly Ser Asn Pro Ser Thr
    210                 215                 220

Leu Thr Leu Asp Phe Gly Ser Asn Gln Ser Ile Thr Ser Val Val Leu
225                 230                 235                 240

Lys Leu Asn Pro Ala Ser Glu Trp Gly Thr Arg Thr Gln Thr Ile Gln
                245                 250                 255

Val Leu Gly Ala Asp Gln Asn Ala Gly Ser Phe Ser Asn Leu Val Ser
                260                 265                 270

Ala Gln Ser Tyr Thr Phe Asn Pro Ala Thr Gly Asn Thr Val Thr Ile
            275                 280                 285

Pro Val Ser Ala Thr Val Lys Arg Leu Gln Leu Asn Ile Thr Ala Asn
    290                 295                 300

Ser Gly Ala Pro Ala Gly Gln Ile Ala Glu Phe Gln Val Phe Gly Thr
305                 310                 315                 320

Pro Ala Pro Asn Pro Asp Leu Thr Ile Thr Gly Met Ser Trp Thr Pro
                325                 330                 335

Ser Ser Pro Val Glu Ser Gly Asp Ile Thr Leu Asn Ala Val Val Lys
                340                 345                 350

Asn Ile Gly Thr Ala Ala Ala Gly Ala Thr Thr Val Asn Phe Tyr Leu
            355                 360                 365

Asn Asn Glu Leu Ala Gly Thr Ala Pro Val Gly Ala Leu Ala Ala Gly
    370                 375                 380

Ala Ser Ala Asn Val Ser Ile Asn Ala Gly Ala Lys Ala Ala Ala Thr
385                 390                 395                 400

Tyr Ala Val Ser Ala Lys Val Asp Glu Ser Asn Ala Val Ile Glu Gln
                405                 410                 415

Asn Glu Gly Asn Asn Ser Tyr Ser Asn Pro Thr Asn Leu Val Val Ala
            420                 425                 430

Pro Val Ser Ser Ser Asp Leu Val Ala Val Thr Ser Trp Ser Pro Gly
    435                 440                 445

Thr Pro Ser Gln Gly Ala Ala Val Ala Phe Thr Val Ala Leu Lys Asn
450                 455                 460

Gln Gly Thr Leu Ala Ser Ala Gly Gly Ala His Pro Val Thr Val Val
465                 470                 475                 480

Leu Lys Asn Ala Ala Gly Ala Thr Leu Gln Thr Phe Thr Gly Thr Tyr
                485                 490                 495

Thr Gly Ser Leu Ala Ala Gly Ala Ser Ala Asn Ile Ser Val Gly Ser
                500                 505                 510

Trp Thr Ala Ala Ser Gly Thr Tyr Thr Val Ser Thr Val Ala Ala
            515                 520                 525

Asp Gly Asn Glu Ile Pro Ala Lys Gln Ser Asn Thr Ser Ser Ala
    530                 535                 540

Ser Leu Thr Val Tyr Ser Ala Arg Gly Ala Ser Met Pro Tyr Ser Arg
545                 550                 555                 560

Tyr Asp Thr Glu Asp Ala Val Leu Gly Gly Ala Val Leu Arg Thr
                565                 570                 575

Ala Pro Thr Phe Asp Gln Ser Leu Ile Ala Ser Glu Ala Ser Gly Gln
                580                 585                 590

Lys Tyr Ala Ala Leu Pro Ser Asn Gly Ser Ser Leu Gln Trp Thr Val
            595                 600                 605

Arg Gln Gly Gln Gly Gly Ala Gly Val Thr Met Arg Phe Thr Met Pro
    610                 615                 620
```

-continued

Asp Thr Ser Asp Gly Met Gly Gln Asn Gly Ser Leu Asp Val Tyr Val
625                 630                 635                 640

Asn Gly Thr Lys Ala Lys Thr Val Ser Leu Thr Ser Tyr Tyr Ser Trp
            645                 650                 655

Gln Tyr Phe Ser Gly Asp Met Pro Ala Asp Ala Pro Gly Gly Gly Arg
            660                 665                 670

Pro Leu Phe Arg Phe Asp Glu Val His Phe Lys Leu Asp Thr Ala Leu
            675                 680                 685

Lys Pro Gly Asp Thr Ile Arg Val Gln Lys Gly Gly Asp Ser Leu Glu
690                 695                 700

Tyr Gly Val Asp Phe Ile Glu Ile Glu Pro Ile Pro Ala Ala Val Ala
705                 710                 715                 720

Arg Pro Ala Asn Ser Val Ser Val Thr Glu Tyr Gly Ala Val Ala Asn
                725                 730                 735

Asp Gly Lys Asp Asp Leu Ala Ala Phe Lys Ala Ala Val Thr Ala Ala
                740                 745                 750

Val Ala Ala Gly Lys Ser Leu Tyr Ile Pro Glu Gly Thr Phe His Leu
                755                 760                 765

Ser Ser Met Trp Glu Ile Gly Ser Ala Thr Ser Met Ile Asp Asn Phe
770                 775                 780

Thr Val Thr Gly Ala Gly Ile Trp Tyr Thr Asn Ile Gln Phe Thr Asn
785                 790                 795                 800

Pro Asn Ala Ser Gly Gly Ile Ser Leu Arg Ile Lys Gly Lys Leu
                805                 810                 815

Asp Phe Ser Asn Ile Tyr Met Asn Ser Asn Leu Arg Ser Arg Tyr Gly
                820                 825                 830

Gln Asn Ala Val Tyr Lys Gly Phe Met Asp Asn Phe Gly Thr Asn Ser
                835                 840                 845

Ile Ile His Asp Val Trp Val Glu His Phe Glu Cys Gly Met Trp Val
850                 855                 860

Gly Asp Tyr Ala His Thr Pro Ala Ile Tyr Ala Ser Gly Leu Val Val
865                 870                 875                 880

Glu Asn Ser Arg Ile Arg Asn Asn Leu Ala Asp Gly Ile Asn Phe Ser
                885                 890                 895

Gln Gly Thr Ser Asn Ser Thr Val Arg Asn Ser Ser Ile Arg Asn Asn
                900                 905                 910

Gly Asp Asp Gly Leu Ala Val Trp Thr Ser Asn Thr Asn Gly Ala Pro
                915                 920                 925

Ala Gly Val Asn Asn Thr Phe Ser Tyr Asn Thr Ile Glu Asn Asn Trp
930                 935                 940

Arg Ala Ala Ala Ile Ala Phe Phe Gly Gly Ser Gly His Lys Ala Asp
945                 950                 955                 960

His Asn Tyr Ile Ile Asp Cys Val Gly Gly Ser Gly Ile Arg Met Asn
                965                 970                 975

Thr Val Phe Pro Gly Tyr His Phe Gln Asn Asn Thr Ile Thr Phe
                980                 985                 990

Ser Asp Thr Thr Ile Ile Asn Ser Gly Thr Ser Gln Asp Leu Tyr Asn
                995                 1000                1005

Gly Glu Arg Gly Ala Ile Asp Leu Glu Ala Ser Asn Asp Ala Ile
            1010                1015                1020

Lys Asn Val Thr Phe Thr Asn Ile Asp Ile Ile Asn Ala Gln Arg
            1025                1030                1035

Asp Gly Val Gln Ile Gly Tyr Gly Gly Gly Phe Glu Asn Ile Val

```
                1040                1045                1050

Phe Asn Asn Ile Thr Ile Asp Gly Thr Gly Arg Asp Gly Ile Ser
        1055                1060                1065

Thr Ser Arg Phe Ser Gly Pro His Leu Gly Ala Ala Ile Tyr Thr
    1070                1075                1080

Tyr Thr Gly Asn Gly Ser Ala Thr Phe Asn Asn Leu Val Thr Arg
1085                1090                1095

Asn Ile Ala Tyr Ala Gly Gly Asn Tyr Ile Gln Ser Gly Phe Asn
    1100                1105                1110

Leu Thr Ile
    1115

<210> SEQ ID NO 4
<211> LENGTH: 26
<212> TYPE: PRT
<213> ORGANISM: Bacillus subtilis

<400> SEQUENCE: 4

Met Arg Ser Lys Lys Leu Trp Ile Ser Leu Leu Phe Ala Leu Thr Leu
1               5                   10                  15

Ile Phe Thr Met Ala Phe Ser Asn Met Ser
            20                  25

<210> SEQ ID NO 5
<211> LENGTH: 3426
<212> TYPE: DNA
<213> ORGANISM: Paenibacillus humicus

<400> SEQUENCE: 5
gtgagaagca aaaaattgtg gatcagcttg ttgtttgcgt taacgttaat ctttacgatg      60
gcgttcagca acatgtctgc tagcgcagca ggaggcgcga atctgacgct cggcaaaacc     120
gtcaccgcca gcggccagtc gcagacgtac agccccgaca atgtcaagga cagcaatcag     180
ggaacttact gggaaagcac gaacaacgcc ttcccgcagt ggatccaagt cgaccttggc     240
gccagcacga gcatcgacca gatcgtgctc aaacttccgt ccggatggga gactcgtacg     300
caaacgctct cgatacaggg cagcgcgaac ggctcgacgt tcacgaacat cgtcggatcg     360
gccgggtata cattcaatcc atccgtcgcc ggcaacagcg tcacgatcaa cttcagcgct     420
gccagcgccc gctacgtccg cctgaatttc acggccaata cgggctggcc agcaggccag     480
ctgtcggagc ttgagatcta cggagcgacg gcgccaacgc tactcccac gcctactcca      540 acaccaacgc caacgccaac accaacgcca ccccctacag taaccctgc gccttcggcc     600 acgccgactc cgactcctcc ggcaggcagc aacatcgccg tagggaaatc gattacagcc     660
tcttccagca gcagacccta cgtagctgca aatgcaaatg acaacaatac atccacctat     720
tgggagggag gaagcaaccc gagcacgctg actctcgatt tcggttccaa ccagagcatc     780
acttccgtcg tcctcaagct gaatccggct tcggaatggg gactcgcac gcaaacgatc      840 caagttcttg gagcggatca gaacgccggc tccttcagca atctcgtctc tgcccagtcc     900
tatacgttca atcccgcaac cggcaatacg gtgacgattc cggtctccgc gacggtcaag     960
cgcctccagc tgaacattac ggcgaactcc ggcgcccctg ccggccagat tgccgagttc    1020
caagtgttcg gcacgccagc gcctaatccg gacttgacca ttaccggcat gtcctggact    1080
ccgtcttctc cggtcgagag cggcgacatt acgctgaacg ccgtcgtcaa gaacatcgga    1140
actgcagctg caggcgccac gacggtcaat ttctacctga caacgaact cgccggcacc    1200
```

```
gctccggtag gcgcgcttgc ggcaggagct tctgcaaatg tatcgatcaa tgcaggcgcc    1260
aaagcagccg caacgtatgc ggtaagcgcc aaagtcgacg agagcaacgc cgtcatcgag    1320
cagaatgaag gcaacaacag ctactcgaac ccgactaacc tcgtcgtagc gccggtgtcc    1380
agctccgacc tcgtcgccgt gacgtcatgg tcgccgggca cgccgtcgca gggagcggcg    1440
gtcgcattta ccgtcgcgct taaaaatcag ggtacgctgg cttccgccgg cggagcccat    1500
cccgtaaccg tcgttctgaa aaacgctgcc ggagcgacgc tgcaaacctt cacgggcacc    1560
tacacaggtt ccctggcagc aggcgcatcc gcgaatatca gcgtgggcag ctggacggca    1620
gcgagcggca cctataccgt ctcgacgacg gtagccgctg acggcaatga aattccggcc    1680
aagcaaagca acaatacgag cagcgcgagc ctcacggtct actcggcgcg cggcgccagc    1740
atgccgtaca gccgttacga cacggaggat gcggtgctcg gcggcggagc tgtcctgaga    1800
acggcgccga cgttcgatca gtcgctcatc gcttccgaag catcgggaca gaaatacgcc    1860
gcacttccgt ccaacggctc cagcctgcag tggaccgtcc gtcaaggcca gggcggtgca    1920
ggcgtcacga tgcgcttcac gatgcccgac acgagcgacg gcatgggcca gaacggctcg    1980
ctcgacgtct atgtcaacgg aaccaaagcc aaaacggtgt cgctgacctc ttattacagc    2040
tggcagtatt tctccggcga catgccggct gacgctccgg gcggcggcag gccgctcttc    2100
cgcttcgacg aagtccactt caagctggat acggcgttga agccgggaga cacgatccgc    2160
gtccagaagg gcggtgacag cctggagtac ggcgtcgact tcatcgagat cgagccgatt    2220
ccggcagcgg ttgcccgtcc ggccaactcg gtgtccgtca ccgaatacgg cgctgtcgcc    2280
aatgacggca aggatgatct cgccgccttc aaggctgccg tgaccgcagc ggtagcggcc    2340
ggaaaatccc tctacatccc ggaaggcacc ttccacctga gcagcatgtg ggagatcggc    2400
tcggccacca gcatgatcga caacttcacg gtcacgggtg ccggcatctg gtatacgaac    2460
atccagttca cgaatcccaa tgcatcgggc ggcggcatct ccctgagaat caaaggaaag    2520
ctggatttca gcaacatcta catgaactcc aacctgcgtt cccgttacgg gcagaacgcc    2580
gtctacaaag gctttatgga caatttcggc actaattcga tcatccatga cgtctgggtc    2640
gagcatttcg aatgcggcat gtgggtcggc gactacgccc atactcctgc gatctatgcg    2700
agcgggctcg tcgtggaaaa cagccgcatc cgcaacaatc ttgccgacgg catcaacttc    2760
tcgcagggaa cgagcaactc gaccgtccgc aacagcagca tccgcaacaa cggcgatgac    2820
ggcctcgccg tctggacgag caacacgaac ggcgctccgg ccggcgtgaa caacaccttc    2880
tcctacaaca cgatcgagaa caactggcgc gcggcggcca tcgccttctt cggcggcagc    2940
ggccacaagg ctgaccacaa ctacatcatc gactgtgtcg gcggctccgg catccggatg    3000
aatacggtgt cccaggcta ccacttccag aacaacaccg gcatcacctt ctcggatacg    3060
acgatcatca acagcggcac cagccaggat ctgtacaacg gcgagcgcgg agcgattgat    3120
ctggaagcat ccaacgacgc gatcaaaaac gtcaccttca ccaacatcga catcatcaat    3180
gcccagcgcg acggcgttca gatcggctat ggcggcggct tcgagaacat cgtgttcaac    3240
aacatcacga tcgacggcac cggccgcgac gggatatcga catcccgctt ctcgggacct    3300
catcttggcg cagccatcta tacgtacacg ggcaacggct cggcgacgtt caacaacctg    3360
gtgacccgga acatcgccta tgcaggcggc aactacatcc agagcgggtt caacctgacg    3420
atctaa                                                             3426
```

<210> SEQ ID NO 6
<211> LENGTH: 1141

<212> TYPE: PRT
<213> ORGANISM: Paenibacillus humicus

<400> SEQUENCE: 6

```
Met Arg Ser Lys Lys Leu Trp Ile Ser Leu Leu Phe Ala Leu Thr Leu
1               5                   10                  15

Ile Phe Thr Met Ala Phe Ser Asn Met Ser Ala Ser Ala Ala Gly Gly
            20                  25                  30

Ala Asn Leu Thr Leu Gly Lys Thr Val Thr Ala Ser Gly Gln Ser Gln
        35                  40                  45

Thr Tyr Ser Pro Asp Asn Val Lys Asp Ser Asn Gln Gly Thr Tyr Trp
    50                  55                  60

Glu Ser Thr Asn Asn Ala Phe Pro Gln Trp Ile Gln Val Asp Leu Gly
65                  70                  75                  80

Ala Ser Thr Ser Ile Asp Gln Ile Val Leu Lys Leu Pro Ser Gly Trp
                85                  90                  95

Glu Thr Arg Thr Gln Thr Leu Ser Ile Gln Gly Ser Ala Asn Gly Ser
            100                 105                 110

Thr Phe Thr Asn Ile Val Gly Ser Ala Gly Tyr Thr Phe Asn Pro Ser
        115                 120                 125

Val Ala Gly Asn Ser Val Thr Ile Asn Phe Ser Ala Ala Ser Ala Arg
    130                 135                 140

Tyr Val Arg Leu Asn Phe Thr Ala Asn Thr Gly Trp Pro Ala Gly Gln
145                 150                 155                 160

Leu Ser Glu Leu Glu Ile Tyr Gly Ala Thr Ala Pro Thr Pro Thr Pro
                165                 170                 175

Thr Pro Thr Pro Thr Pro Thr Pro Thr Pro Thr Pro Thr Pro Thr Pro
            180                 185                 190

Thr Val Thr Pro Ala Pro Ser Ala Thr Pro Thr Pro Thr Pro Pro Ala
        195                 200                 205

Gly Ser Asn Ile Ala Val Gly Lys Ser Ile Thr Ala Ser Ser Ser Thr
    210                 215                 220

Gln Thr Tyr Val Ala Ala Asn Ala Asn Asp Asn Asn Thr Ser Thr Tyr
225                 230                 235                 240

Trp Glu Gly Gly Ser Asn Pro Ser Thr Leu Thr Leu Asp Phe Gly Ser
                245                 250                 255

Asn Gln Ser Ile Thr Ser Val Val Leu Lys Leu Asn Pro Ala Ser Glu
            260                 265                 270

Trp Gly Thr Arg Thr Gln Thr Ile Gln Val Leu Gly Ala Asp Gln Asn
        275                 280                 285

Ala Gly Ser Phe Ser Asn Leu Val Ser Ala Gln Ser Tyr Thr Phe Asn
    290                 295                 300

Pro Ala Thr Gly Asn Thr Val Thr Ile Pro Val Ser Ala Thr Val Lys
305                 310                 315                 320

Arg Leu Gln Leu Asn Ile Thr Ala Asn Ser Gly Ala Pro Ala Gly Gln
                325                 330                 335

Ile Ala Glu Phe Gln Val Phe Gly Thr Pro Ala Pro Asn Pro Asp Leu
            340                 345                 350

Thr Ile Thr Gly Met Ser Trp Thr Pro Ser Ser Pro Val Glu Ser Gly
        355                 360                 365

Asp Ile Thr Leu Asn Ala Val Val Lys Asn Ile Gly Thr Ala Ala Ala
    370                 375                 380

Gly Ala Thr Thr Val Asn Phe Tyr Leu Asn Asn Glu Leu Ala Gly Thr
385                 390                 395                 400
```

```
Ala Pro Val Gly Ala Leu Ala Ala Gly Ala Ser Ala Asn Val Ser Ile
            405                 410                 415

Asn Ala Gly Ala Lys Ala Ala Thr Tyr Ala Val Ser Ala Lys Val
        420                 425                 430

Asp Glu Ser Asn Ala Val Ile Glu Gln Asn Glu Gly Asn Asn Ser Tyr
            435                 440                 445

Ser Asn Pro Thr Asn Leu Val Val Ala Pro Val Ser Ser Asp Leu
        450                 455                 460

Val Ala Val Thr Ser Trp Ser Pro Gly Thr Pro Ser Gln Gly Ala Ala
465                 470                 475                 480

Val Ala Phe Thr Val Ala Leu Lys Asn Gln Gly Thr Leu Ala Ser Ala
            485                 490                 495

Gly Gly Ala His Pro Val Thr Val Leu Lys Asn Ala Ala Gly Ala
            500                 505                 510

Thr Leu Gln Thr Phe Thr Gly Thr Tyr Thr Gly Ser Leu Ala Ala Gly
            515                 520                 525

Ala Ser Ala Asn Ile Ser Val Gly Ser Trp Thr Ala Ala Ser Gly Thr
        530                 535                 540

Tyr Thr Val Ser Thr Thr Val Ala Ala Asp Gly Asn Glu Ile Pro Ala
545                 550                 555                 560

Lys Gln Ser Asn Asn Thr Ser Ser Ala Ser Leu Thr Val Tyr Ser Ala
                565                 570                 575

Arg Gly Ala Ser Met Pro Tyr Ser Arg Tyr Asp Thr Glu Asp Ala Val
            580                 585                 590

Leu Gly Gly Gly Ala Val Leu Arg Thr Ala Pro Thr Phe Asp Gln Ser
            595                 600                 605

Leu Ile Ala Ser Glu Ala Ser Gly Gln Lys Tyr Ala Ala Leu Pro Ser
        610                 615                 620

Asn Gly Ser Ser Leu Gln Trp Thr Val Arg Gln Gly Gln Gly Gly Ala
625                 630                 635                 640

Gly Val Thr Met Arg Phe Thr Met Pro Asp Thr Ser Asp Gly Met Gly
                645                 650                 655

Gln Asn Gly Ser Leu Asp Val Tyr Val Asn Gly Thr Lys Ala Lys Thr
            660                 665                 670

Val Ser Leu Thr Ser Tyr Tyr Ser Trp Gln Tyr Phe Ser Gly Asp Met
        675                 680                 685

Pro Ala Asp Ala Pro Gly Gly Arg Pro Leu Phe Arg Phe Asp Glu
        690                 695                 700

Val His Phe Lys Leu Asp Thr Ala Leu Lys Pro Gly Asp Thr Ile Arg
705                 710                 715                 720

Val Gln Lys Gly Gly Asp Ser Leu Glu Tyr Gly Val Asp Phe Ile Glu
            725                 730                 735

Ile Glu Pro Ile Pro Ala Ala Val Ala Arg Pro Ala Asn Ser Val Ser
            740                 745                 750

Val Thr Glu Tyr Gly Ala Val Ala Asn Asp Gly Lys Asp Asp Leu Ala
        755                 760                 765

Ala Phe Lys Ala Ala Val Thr Ala Ala Val Ala Gly Lys Ser Leu
        770                 775                 780

Tyr Ile Pro Glu Gly Thr Phe His Leu Ser Ser Met Trp Glu Ile Gly
785                 790                 795                 800

Ser Ala Thr Ser Met Ile Asp Asn Phe Thr Val Thr Gly Ala Gly Ile
                805                 810                 815
```

Trp Tyr Thr Asn Ile Gln Phe Thr Asn Pro Asn Ala Ser Gly Gly
                820                 825                 830

Ile Ser Leu Arg Ile Lys Gly Lys Leu Asp Phe Ser Asn Ile Tyr Met
835                 840                 845

Asn Ser Asn Leu Arg Ser Arg Tyr Gly Gln Asn Ala Val Tyr Lys Gly
        850                 855                 860

Phe Met Asp Asn Phe Gly Thr Asn Ser Ile Ile His Asp Val Trp Val
865                 870                 875                 880

Glu His Phe Glu Cys Gly Met Trp Val Gly Asp Tyr Ala His Thr Pro
                885                 890                 895

Ala Ile Tyr Ala Ser Gly Leu Val Val Glu Asn Ser Arg Ile Arg Asn
        900                 905                 910

Asn Leu Ala Asp Gly Ile Asn Phe Ser Gln Gly Thr Ser Asn Ser Thr
    915                 920                 925

Val Arg Asn Ser Ser Ile Arg Asn Asn Gly Asp Asp Gly Leu Ala Val
930                 935                 940

Trp Thr Ser Asn Thr Asn Gly Ala Pro Ala Gly Val Asn Asn Thr Phe
945                 950                 955                 960

Ser Tyr Asn Thr Ile Glu Asn Asn Trp Arg Ala Ala Ile Ala Phe
                965                 970                 975

Phe Gly Gly Ser Gly His Lys Ala Asp His Asn Tyr Ile Ile Asp Cys
        980                 985                 990

Val Gly Gly Ser Gly Ile Arg Met Asn Thr Val Phe Pro Gly Tyr His
            995                 1000                1005

Phe Gln Asn Asn Thr Gly Ile Thr Phe Ser Asp Thr Thr Ile Ile
    1010                1015                1020

Asn Ser Gly Thr Ser Gln Asp Leu Tyr Asn Gly Glu Arg Gly Ala
    1025                1030                1035

Ile Asp Leu Glu Ala Ser Asn Asp Ala Ile Lys Asn Val Thr Phe
    1040                1045                1050

Thr Asn Ile Asp Ile Ile Asn Ala Gln Arg Asp Gly Val Gln Ile
    1055                1060                1065

Gly Tyr Gly Gly Gly Phe Glu Asn Ile Val Phe Asn Asn Ile Thr
    1070                1075                1080

Ile Asp Gly Thr Gly Arg Asp Gly Ile Ser Thr Ser Arg Phe Ser
    1085                1090                1095

Gly Pro His Leu Gly Ala Ala Ile Tyr Thr Tyr Thr Gly Asn Gly
    1100                1105                1110

Ser Ala Thr Phe Asn Asn Leu Val Thr Arg Asn Ile Ala Tyr Ala
    1115                1120                1125

Gly Gly Asn Tyr Ile Gln Ser Gly Phe Asn Leu Thr Ile
    1130                1135                1140

<210> SEQ ID NO 7
<211> LENGTH: 1308
<212> TYPE: DNA
<213> ORGANISM: Penicillium marneffei

<400> SEQUENCE: 7
atgaagcaaa ccacttccct cctcctctca gccatcgcgg caaccagcag cttcagcgga    60
ctaacagccg ctcaaaaact cgcctttgcg cacgtcgtcg tcggcaacac tgcagcacac   120
acccaatcca cctgggaaag cgacattact ctcgcccata actccggtct agatgccttt   180
gccttgaacg gtggattccc cgatggcaac atccccgcac aaatcgccaa cgcttttgcg   240

-continued

```
gcttgtgaag ccctttcaaa tggcttcaag ctattcattt cgtttgacta cctcggtggt      300
ggtcagccct ggcctgcctc agaggttgtg tctatgctga agcagtatgc cagttccgat      360
tgttatttgg cctatgatgg caagcccttt gtctcaactt ttgagggcac cggaaatatt      420
gcggattggg cgcacggagg tcccattcgg tcggcggtgg atgtttactt tgtgccggat      480
tggacgagtt tggggcctgc tgggattaag tcgtatctcg acaatatcga tggattttt c      540 agctggaaca tgtggcctgt aggtgcggcc gatatgaccg acgagcctga tttcgaatgg      600
ctcgatgcaa ttgggtccga caagacgtac atgatgggcg tttcgccatg gttcttccac      660
agtgcaagcg gaggcaccga ctgggtctgg cgtggtgatg acctctggga tgaccgatgg      720
attcaagtca cctgcgtcga ccctcaattt gtccaggtcg tcacatggaa cgactggggt      780
gaatcctcct acatcggccc cttcgtgacc gctagcgaag tccccgccgg ctcattagcc      840
tacgtcgaca acatgtcaca ccaaagcttc cttgacttct tgccttccta catcgccacc      900
ttcaaaggcg acacattcaa catctcccgc gaccagatgc aatactggta ccgcctcgca      960
cccgccgcag caggcagcgc gtgcggcgta acggcaatg atcccgatca aggccagact    1020
accgttgacg tcaactccat cgttcaggac aaggtgtttt tcagtgcttt gttgacggct    1080
gatgctactg taacggtgca gattggtagt aatgctgcgg tttcatatga tggtgttgct    1140
ggtatgaacc actggagtca ggactttaat ggccagaccg gcgcggttac gtttagtgtt    1200
gtcaggggtg gcgctacagt taagagtggt attggagccg agattacggc ttcgacttcg    1260
ttgtcgaatg ggtgcactaa ttacaaccct tgggttggta gtttctaa                  1308
```

<210> SEQ ID NO 8
<211> LENGTH: 435
<212> TYPE: PRT
<213> ORGANISM: Penicillium marneffei

<400> SEQUENCE: 8

```
Met Lys Gln Thr Thr Ser Leu Leu Ser Ala Ile Ala Ala Thr Ser
1               5                   10                  15

Ser Phe Ser Gly Leu Thr Ala Ala Gln Lys Leu Ala Phe Ala His Val
                20                  25                  30

Val Val Gly Asn Thr Ala His Thr Gln Ser Thr Trp Glu Ser Asp
            35                  40                  45

Ile Thr Leu Ala His Asn Ser Gly Leu Asp Ala Phe Ala Leu Asn Gly
        50                  55                  60

Gly Phe Pro Asp Gly Asn Ile Pro Ala Gln Ile Ala Asn Ala Phe Ala
65                  70                  75                  80

Ala Cys Glu Ala Leu Ser Asn Gly Phe Lys Leu Phe Ile Ser Phe Asp
                85                  90                  95

Tyr Leu Gly Gly Gly Gln Pro Trp Pro Ala Ser Glu Val Val Ser Met
                100                 105                 110

Leu Lys Gln Tyr Ala Ser Ser Asp Cys Tyr Leu Ala Tyr Asp Gly Lys
            115                 120                 125

Pro Phe Val Ser Thr Phe Glu Gly Thr Gly Asn Ile Ala Asp Trp Ala
        130                 135                 140

His Gly Gly Pro Ile Arg Ser Ala Val Asp Val Tyr Phe Val Pro Asp
145                 150                 155                 160

Trp Thr Ser Leu Gly Pro Ala Gly Ile Lys Ser Tyr Leu Asp Asn Ile
                165                 170                 175

Asp Gly Phe Phe Ser Trp Asn Met Trp Pro Val Gly Ala Ala Asp Met
            180                 185                 190
```

```
Thr Asp Glu Pro Asp Phe Glu Trp Leu Asp Ala Ile Gly Ser Asp Lys
        195                 200                 205

Thr Tyr Met Met Gly Val Ser Pro Trp Phe His Ser Ala Ser Gly
        210                 215                 220

Gly Thr Asp Trp Val Trp Arg Gly Asp Asp Leu Trp Asp Asp Arg Trp
225                 230                 235                 240

Ile Gln Val Thr Cys Val Asp Pro Gln Phe Val Gln Val Val Thr Trp
                245                 250                 255

Asn Asp Trp Gly Glu Ser Ser Tyr Ile Gly Pro Phe Val Thr Ala Ser
                260                 265                 270

Glu Val Pro Ala Gly Ser Leu Ala Tyr Val Asp Asn Met Ser His Gln
        275                 280                 285

Ser Phe Leu Asp Phe Leu Pro Phe Tyr Ile Ala Thr Phe Lys Gly Asp
        290                 295                 300

Thr Phe Asn Ile Ser Arg Asp Gln Met Gln Tyr Trp Tyr Arg Leu Ala
305                 310                 315                 320

Pro Ala Ala Ala Gly Ser Ala Cys Gly Val Tyr Gly Asn Asp Pro Asp
                325                 330                 335

Gln Gly Gln Thr Thr Val Asp Val Asn Ser Ile Val Gln Asp Lys Val
                340                 345                 350

Phe Phe Ser Ala Leu Leu Thr Ala Asp Ala Thr Val Thr Val Gln Ile
        355                 360                 365

Gly Ser Asn Ala Ala Val Ser Tyr Asp Gly Val Ala Gly Met Asn His
        370                 375                 380

Trp Ser Gln Asp Phe Asn Gly Gln Thr Gly Ala Val Thr Phe Ser Val
385                 390                 395                 400

Val Arg Gly Gly Ala Thr Val Lys Ser Gly Ile Gly Ala Glu Ile Thr
                405                 410                 415

Ala Ser Thr Ser Leu Ser Asn Gly Cys Thr Asn Tyr Asn Pro Trp Val
                420                 425                 430

Gly Ser Phe
        435

<210> SEQ ID NO 9
<211> LENGTH: 8616
<212> TYPE: DNA
<213> ORGANISM: artificial sequence
<220> FEATURE:
<223> OTHER INFORMATION: plasmid pTrex

<400> SEQUENCE: 9
aagcttaact agtacttctc gagctctgta catgtccggt cgcgacgtac gcgtatcgat      60
ggcgccagct gcaggcggcc gcctgcagcc acttgcagtc ccgtggaatt ctcacggtga     120
atgtaggcct tttgtagggt aggaattgtc actcaagcac ccccaacctc cattacgcct     180
cccccataga gttcccaatc agtgagtcat ggcactgttc tcaaatagat tgggagaag      240 ttgacttccg cccagagctg aaggtcgcac aaccgcatga tatagggtcg caacggcaa      300 aaaagcacgt ggctcaccga aaagcaagat gtttgcgatc taacatccag gaacctggat     360
acatccatca tcacgcacga ccactttgat ctgctggtaa actcgtattc gccctaaacc     420
gaagtgcgtg gtaaatctac acgtgggccc ctttcggtat actgcgtgtg tcttctctag     480
gtgccattct tttcccttcc tctagtgttg aattgtttgt gttggagtcc gagctgtaac     540
tacctctgaa tctctggaga atggtggact aacgactacc gtgcacctgc atcatgtata     600
```

```
taatagtgat cctgagaagg ggggtttgga gcaatgtggg actttgatgg tcatcaaaca    660
aagaacgaag acgcctcttt tgcaaagttt tgtttcggct acggtgaaga actggatact    720
tgttgtgtct tctgtgtatt tttgtggcaa caagaggcca gagacaatct attcaaacac    780
caagcttgct cttttgagct acaagaacct gtggggtata tatctagagt tgtgaagtcg    840
gtaatcccgc tgtatagtaa tacgagtcgc atctaaatac tccgaagctg ctgcgaaccc    900
ggagaatcga gatgtgctgg aaagcttcta gcgagcggct aaattagcat gaaaggctat    960
gagaaattct ggagacggct tgttaatca tggcgttcca ttcttcgaca agcaaagcgt   1020
tccgtcgcag tagcaggcac tcattcccga aaaaactcgg agattcctaa gtagcgatgg   1080
aaccggaata atataatagg caatacattg agttgcctcg acggttgcaa tgcaggggta   1140
ctgagcttgg ataactgt tccgtacccc acctcttctc aacctttggc gtttccctga    1200
ttcagcgtac ccgtacaagt cgtaatcact attaacccag actgaccgga cgtgttttgc   1260
ccttcatttg gagaaataat gtcattgcga tgtgtaattt gcctgcttga ccgactgggg   1320
ctgttcgaag cccgaatgta ggattgttat ccgaactctg ctcgtagagg catgttgtga   1380
atctgtgtcg ggcaggacac gccctcgaagg ttcacggcaa gggaaaccac cgatagcagt   1440
gtctagtagc aacctgtaaa gccgcaatgc agcatcactg gaaaatacaa accaatggct   1500
aaaagtacat aagttaatgc ctaaagaagt catataccag cggctaataa ttgtacaatc   1560
aagtggctaa acgtaccgta atttgccaac ggcttgtggg gttgcagaag caacggcaaa   1620
gccccacttc cccacgtttg tttcttcact cagtccaatc tcagctggtg atccccaat   1680 tgggtcgctt gtttgttccg gtgaagtgaa agaagacaga ggtaagaatg tctgactcgg   1740
agcgttttgc atacaaccaa gggcagtgat ggaagacagt gaaatgttga cattcaagga   1800
gtatttagcc agggatgctt gagtgtatcg tgtaaggagg tttgtctgcc gatacgacga   1860
atactgtata gtcacttctg atgaagtggt ccatattgaa atgtaagtcg gcactgaaca   1920
ggcaaaagat tgagttgaaa ctgcctaaga tctcgggccc tcgggccttc ggcctttggg   1980
tgtacatgtt tgtgctccgg gcaaatgcaa agtgtggtag gatcgaacac actgctgcct   2040
ttaccaagca gctgagggta tgtgataggc aaatgttcag gggccactgc atggtttcga   2100
atagaaagag aagcttagcc aagaacaata gccgataaag atagcctcat taaacggaat   2160
gagctagtag gcaaagtcag cgaatgtgta tatataaagg ttcgaggtcc gtgcctccct   2220
catgctctcc ccatctactc atcaactcag atcctccagg agacttgtac accatctttt   2280
gaggcacaga aacccaatag tcaaccgcgg actgcgcatc atgtatcgga agttggccgt   2340
catctcggcc ttcttggcca cacctcgtgc tagactaggc gcgccgcgcg ccagctccgt   2400
gcgaaagcct gacgcaccgg tagattcttg gtgagcccgt atcatgacgg cggcgggagc   2460
tacatggccc cgggtgattt attttttttg tatctacttc tgaccctttt caaatatacg   2520
gtcaactcat cttcactgg agatgcggcc tgcttggtat tgcgatgttg tcagcttggc    2580
aaattgtggc tttcgaaaac acaaaacgat tccttagtag ccatgcattt taagataacg   2640
gaatagaaga aagaggaaat taaaaaaaaa aaaaaacaa acatcccgtt cataacccgt   2700
agaatcgccc tcttcgtgt atcccagtac cagtttattt tgaatagctc gcccgctgga   2760
gagcatcctg aatgcaagta acaaccgtag aggctgacac ggcaggtgtt gctagggagc   2820
gtcgtgttct acaaggccag acgtcttcgc ggttgatata tatgtatgtt tgactgcagg   2880
ctgctcagcg acgacagtca agttcgccct cgctgcttgt gcaataatcg cagtgggaa   2940 gccacaccgt gactcccatc tttcagtaaa gctctgttgg tgtttatcag caatacacgt   3000
```

```
aatttaaact cgttagcatg gggctgatag cttaattacc gtttaccagt gccatggttc    3060
tgcagctttc cttggcccgt aaaattcggc gaagccagcc aatcaccagc taggcaccag    3120
ctaaacccta taattagtct cttatcaaca ccatccgctc ccccgggatc aatgaggaga    3180 atgagggga tgcggggcta aagaagccta cataaccctc atgccaactc ccagtttaca    3240
ctcgtcgagc caacatcctg actataagct aacacagaat gcctcaatcc tgggaagaac    3300
tggccgctga taagcgcgcc cgcctcgcaa aaaccatccc tgatgaatgg aaagtccaga    3360
cgctgcctgc ggaagacagc gttattgatt cccaaagaa atcggggatc ctttcagagg     3420
ccgaactgaa gatcacagag gcctccgctg cagatcttgt gtccaagctg gcggccggag    3480
agttgacctc ggtggaagtt acgctagcat tctgtaaacg ggcagcaatc gcccagcagt    3540
tagtagggtc ccctctacct ctcagggaga tgtaacaacg ccaccttatg ggactatcaa    3600
gctgacgctg gcttctgtgc agacaaactg cgcccacgag ttcttccctg acgccgctct    3660
cgcgcaggca agggaactcg atgaatacta cgcaaagcac aagagacccg ttggtccact    3720
ccatggcctc cccatctctc tcaaagacca gcttcgagtc aaggtacacc gttgccccta    3780
agtcgttaga tgtcccttt tgtcagctaa catatgccac cagggctacg aaacatcaat     3840
gggctacatc tcatggctaa acaagtacga cgaaggggac tcggttctga caaccatgct    3900
ccgcaaagcc ggtgccgtct tctacgtcaa gacctctgtc ccgcagaccc tgatggtctg    3960
cgagacagtc aacaacatca tcgggcgcac cgtcaaccca cgcaacaaga actggtcgtg    4020
cggcggcagt tctggtggtg agggtgcgat cgttgggatt cgtggtggcg tcatcggtgt    4080
aggaacggat atcggtggct cgattcgagt gccggccgcg ttcaacttcc tgtacggtct    4140
aaggccgagt catgggcggc tgccgtatgc aaagatggcg aacagcatgg agggtcagga    4200
gacggtgcac agcgttgtcg ggccgattac gcactctgtt gagggtgagt ccttcgcctc    4260
ttccttcttt tcctgctcta taccaggcct ccactgtcct cctttcttgc tttttatact    4320
atatacgaga ccggcagtca ctgatgaagt atgttagacc tccgcctctt caccaaatcc    4380
gtcctcggtc aggagccatg gaaatacgac tccaaggtca tccccatgcc ctggcgccag    4440
tccgagtcgg acattattgc ctccaagatc aagaacggcg ggctcaatat cggctactac    4500
aacttcgacg gcaatgtcct tccacaccct cctatcctgc gcggcgtgga accaccgtc     4560 gccgcactcg ccaaagccgg tcacaccgtg accccgtgga cgcctacaa gcacgatttc     4620 ggccacgatc tcatctccca tatctacgcg gctgacggca gcgccgacgt aatgcgcgat    4680
atcagtgcat ccggcgagcc ggcgattcca aatatcaaag acctactgaa cccgaacatc    4740
aaagctgtta acatgaacga gctctgggac acgcatctcc agaagtggaa ttaccagatg    4800
gagtaccttg agaaatggcg ggaggctgaa gaaaaggccg ggaaggaact ggacgccatc    4860
atcgcgccga ttacgcctac cgctgcggta cggcatgacc agttccggta ctatgggtat    4920
gcctctgtga tcaacctgct ggatttcacg agcgtggttg ttccggttac ctttgcggat    4980
aagaacatcg ataagaagaa tgagagtttc aaggcggtta gtgagcttga tgccctcgtg    5040
caggaagagt atgatccgga ggcgtaccat ggggcaccgg ttgcagtgca ggttatcgga    5100
cggagactca gtgaagagag gacgttggcg attgcagagg aagtggggaa gttgctggga    5160
aatgtggtga ctccatagct aataagtgtc agatagcaat ttgcacaaga aatcaatacc    5220
agcaactgta aataagcgct gaagtgacca tgccatgcta cgaaagagca gaaaaaaacc    5280
tgccgtagaa ccgaagagat atgacacgct tccatctctc aaaggaagaa tcccttcagg    5340
```

```
gttgcgtttc cagtctagac acgtataacg gcacaagtgt ctctcaccaa atgggttata    5400
tctcaaatgt gatctaagga tggaaagccc agaatatcga tcgcgcgcag atccatatat    5460
agggcccggg ttataattac ctcaggtcga cgtcccatgg ccattcgaat tcgtaatcat    5520
ggtcatagct gtttcctgtg tgaaattgtt atccgctcac aattccacac aacatacgag    5580
ccggaagcat aaagtgtaaa gcctggggtg cctaatgagt gagctaactc acattaattg    5640
cgttgcgctc actgcccgct ttccagtcgg gaaacctgtc gtgccagctg cattaatgaa    5700
tcggccaacg cgcggggaga ggcggtttgc gtattgggcg ctcttccgct tcctcgctca    5760
ctgactcgct gcgctcggtc gttcggctgc ggcgagcggt atcagctcac tcaaaggcgg    5820
taatacggtt atccacagaa tcaggggata acgcaggaaa gaacatgtga gcaaaaggcc    5880
agcaaaaggc caggaaccgt aaaaaggccg cgttgctggc gttttccat aggctccgcc     5940 cccctgacga gcatcacaaa aatcgacgct caagtcagag gtggcgaaac ccgacaggac    6000
tataaagata ccaggcgttt ccccctggaa gctccctcgt gcgctctcct gttccgaccc    6060
tgccgcttac cggatacctg tccgcctttc tcccttcggg aagcgtggcg ctttctcata    6120
gctcacgctg taggtatctc agttcggtgt aggtcgttcg ctccaagctg ggctgtgtgc    6180 acgaacccc cgttcagccc gaccgctgcg ccttatccgg taactatcgt cttgagtcca    6240
acccggtaag acacgactta tcgccactgg cagcagccac tggtaacagg attagcagag    6300
cgaggtatgt aggcggtgct acagagttct tgaagtggtg gcctaactac ggctacacta    6360
gaagaacagt atttggtatc tgcgctctgc tgaagccagt taccttcgga aaaagagttg    6420
gtagctcttg atccggcaaa caaaccaccg ctggtagcgg tggttttttt gtttgcaagc    6480
agcagattac gcgcagaaaa aaaggatctc aagaagatcc tttgatcttt tctacggggt    6540
ctgacgctca gtggaacgaa aactcacgtt aagggatttt ggtcatgaga ttatcaaaaa    6600
ggatcttcac ctagatcctt ttaaattaaa aatgaagttt taaatcaatc taaagtatat    6660
atgagtaaac ttggtctgac agttaccaat gcttaatcag tgaggcacct atctcagcga    6720
tctgtctatt tcgttcatcc atagttgcct gactccccgt cgtgtagata actacgatac    6780
gggagggctt accatctggc cccagtgctg caatgatacc gcgagaccca cgctcaccgg    6840
ctccagattt atcagcaata aaccagccag ccggaagggc cgagcgcaga agtggtcctg    6900
caactttatc cgcctccatc cagtctatta attgttgccg ggaagctaga gtaagtagtt    6960
cgccagttaa tagtttgcgc aacgttgttg ccattgctac aggcatcgtg gtgtcacgct    7020
cgtcgtttgg tatggcttca ttcagctccg gttcccaacg atcaaggcga gttacatgat    7080 ccccccatgtt gtgcaaaaaa gcggttagct ccttcggtcc tccgatcgtt gtcagaagta    7140
agttggccgc agtgttatca ctcatggtta tggcagcact gcataattct cttactgtca    7200
tgccatccgt aagatgcttt tctgtgactg gtgagtactc aaccaagtca ttctgagaat    7260
agtgtatgcg gcgaccgagt tgctcttgcc cggcgtcaat acgggataat accgcgccac    7320
atagcagaac tttaaaagtg ctcatcattg gaaaacgttc ttcggggcga aaactctcaa    7380
ggatcttacc gctgttgaga tccagttcga tgtaacccac tcgtgcaccc aactgatctt    7440
cagcatcttt tactttcacc agcgtttctg ggtgagcaaa aacaggaagg caaaatgccg    7500
caaaaaaggg aataagggcg acacggaaat gttgaatact catactcttc cttttcaat     7560 attattgaag catttatcag ggttattgtc tcatgagcgg atacatattt gaatgtattt    7620
agaaaaataa acaaataggg gttccgcgca catttccccg aaaagtgcca cctgacgtct    7680
aagaaaccat tattatcatg acattaacct ataaaaatag gcgtatcacg aggccctttc    7740
```

```
gtctcgcgcg tttcggtgat gacggtgaaa acctctgaca catgcagctc ccggagacgg    7800
tcacagcttg tctgtaagcg gatgccggga gcagacaagc ccgtcagggc gcgtcagcgg    7860
gtgttggcgg gtgtcggggc tggcttaact atgcggcatc agagcagatt gtactgagag    7920
tgcaccataa aattgtaaac gttaatattt tgttaaaatt cgcgttaaat ttttgttaaa    7980
tcagctcatt ttttaaccaa taggccgaaa tcggcaaaat cccttataaa tcaaaagaat    8040
agcccgagat agggttgagt gttgttccag tttggaacaa gagtccacta ttaaagaacg    8100
tggactccaa cgtcaaaggg cgaaaaaccg tctatcaggg cgatggccca ctacgtgaac    8160
catcacccaa atcaagtttt ttggggtcga ggtgccgtaa agcactaaat cggaaccccta   8220 aagggagccc ccgatttaga gcttgacggg gaaagccggc gaacgtggcg agaaaggaag    8280
ggaagaaagc gaaaggagcg ggcgctaggg cgctggcaag tgtagcggtc acgctgcgcg    8340
taaccaccac acccgccgcg cttaatgcgc cgctacaggg cgcgtactat ggttgctttg    8400
acgtatgcgg tgtgaaatac cgcacagatg cgtaaggaga aaataccgca tcaggcgcca    8460
ttcgccattc aggctgcgca actgttggga agggcgatcg gtgcgggcct cttcgctatt    8520
acgccagctg gcgaaagggg gatgtgctgc aaggcgatta agttgggtaa cgccagggtt    8580
ttcccagtca cgacgttgta aaacgacggc cagtgc                             8616

<210> SEQ ID NO 10
<211> LENGTH: 1772
<212> TYPE: PRT
<213> ORGANISM: Lactococcus reuteri

<400> SEQUENCE: 10

Met Glu Ile Lys Lys His Phe Lys Leu Tyr Lys Ser Gly Lys Gln Trp
1               5                   10                  15

Val Thr Ala Ala Val Ala Thr Val Ala Val Ser Thr Ala Leu Leu Tyr
            20                  25                  30

Gly Gly Val Ala His Ala Asp Gln Gln Val Gln Ser Ser Thr Thr Gln
        35                  40                  45

Glu Gln Thr Ser Thr Val Asn Ala Asp Thr Thr Lys Thr Val Asn Leu
    50                  55                  60

Asp Thr Asn Thr Asp Gln Pro Ala Gln Thr Thr Asp Lys Asn Gln Val
65                  70                  75                  80

Ala Asn Asp Thr Thr Thr Asn Gln Ser Lys Thr Asp Ser Thr Ser Thr
                85                  90                  95

Thr Val Lys Asn Pro Thr Phe Ile Pro Val Ser Thr Leu Ser Ser Ser
            100                 105                 110

Asp Asn Glu Lys Gln Ser Gln Asn Tyr Asn Lys Pro Asp Asn Gly Asn
        115                 120                 125

Tyr Gly Asn Val Asp Ala Ala Tyr Phe Asn Asn Gln Leu His Ile
    130                 135                 140

Ser Gly Trp His Ala Thr Asn Ala Ser Gln Gly Thr Asp Ser Arg Gln
145                 150                 155                 160

Val Ile Val Arg Asp Ile Thr Thr Lys Thr Glu Leu Gly Arg Thr Asn
                165                 170                 175

Val Thr Asn Asn Val Leu Arg Pro Asp Val Lys Asn Val His Asn Val
            180                 185                 190

Tyr Asn Ala Asp Asn Ser Gly Phe Asp Val Asn Ile Asn Ile Asp Phe
        195                 200                 205

Ser Lys Met Lys Asp Tyr Arg Asp Ser Ile Glu Ile Val Ser Arg Tyr
```

-continued

```
                210                 215                 220
Ser Gly Asn Gly Lys Ser Val Asp Trp Trp Ser Gln Pro Ile Thr Phe
225                 230                 235                 240

Asp Lys Asn Asn Tyr Ala Tyr Leu Asp Thr Phe Glu Val Lys Asn Gly
                245                 250                 255

Glu Leu His Ala Thr Gly Trp Asn Ala Thr Asn Lys Ala Ile Asn Tyr
                260                 265                 270

Asn His His Phe Val Ile Leu Phe Asp Arg Thr Asn Gly Lys Glu Val
                275                 280                 285

Thr Arg Gln Glu Val Arg Asp Gly Gln Ser Arg Pro Asp Val Ala Lys
                290                 295                 300

Val Tyr Pro Gln Val Val Gly Ala Asn Asn Ser Gly Phe Asp Val Thr
305                 310                 315                 320

Phe Asn Ile Gly Asp Leu Asp Tyr Thr His Gln Tyr Gln Ile Leu Ser
                325                 330                 335

Arg Tyr Ser Asn Ala Asp Asn Gly Glu Gly Asp Tyr Val Thr Tyr Trp
                340                 345                 350

Phe Ala Pro Gln Ser Ile Ala Pro Ala Asn Gln Ser Asn Gln Gly Tyr
                355                 360                 365

Leu Asp Ser Phe Asp Ile Ser Lys Asn Gly Glu Val Thr Val Thr Gly
                370                 375                 380

Trp Asn Ala Thr Asp Leu Ser Glu Leu Gln Thr Asn His Tyr Val Ile
385                 390                 395                 400

Leu Phe Asp Gln Thr Ala Gly Gln Gln Val Ala Ser Ala Lys Val Asp
                405                 410                 415

Leu Ile Ser Arg Pro Asp Val Ala Lys Ala Tyr Pro Thr Val Lys Thr
                420                 425                 430

Ala Glu Thr Ser Gly Phe Lys Val Thr Phe Lys Val Ser Asn Leu Gln
                435                 440                 445

Pro Gly His Gln Tyr Ser Val Val Ser Arg Phe Ser Ala Asp Glu Asn
                450                 455                 460

Gly Asn Gly Asn Asp Lys Arg His Thr Asp Tyr Trp Tyr Ser Pro Val
465                 470                 475                 480

Thr Leu Asn Gln Thr Ala Ser Asn Ile Asp Thr Ile Thr Met Thr Ser
                485                 490                 495

Asn Gly Leu His Ile Thr Gly Trp Met Ala Ser Asp Asn Ser Ile Asn
                500                 505                 510

Glu Ala Thr Pro Tyr Ala Ile Ile Leu Asn Asn Gly Arg Glu Val Thr
                515                 520                 525

Arg Gln Lys Leu Thr Leu Ile Ala Arg Pro Asp Val Ala Ala Val Tyr
                530                 535                 540

Pro Ser Leu Tyr Asn Ser Ala Val Ser Gly Phe Asp Thr Thr Ile Lys
545                 550                 555                 560

Leu Thr Asn Ala Gln Tyr Gln Ala Leu Asn Gly Gln Leu Gln Val Leu
                565                 570                 575

Leu Arg Phe Ser Lys Ala Val Asp Gly Asn Pro Asn Gly Thr Asn Thr
                580                 585                 590

Val Thr Asp Gln Phe Ser Lys Asn Tyr Ala Thr Thr Gly Gly Asn Phe
                595                 600                 605

Asp Tyr Val Lys Val Asn Gly Asn Gln Ile Glu Phe Ser Gly Trp His
                610                 615                 620

Ala Thr Asn Gln Ser Asn Asp Lys Asn Ser Gln Trp Ile Ile Val Leu
625                 630                 635                 640
```

```
Val Asn Gly Lys Glu Val Lys Arg Gln Leu Val Asn Asp Thr Lys Asp
                645                 650                 655

Gly Ala Ala Gly Phe Asn Arg Asn Asp Val Tyr Lys Val Asn Pro Ala
        660                 665                 670

Ile Glu Asn Ser Ile Met Ser Gly Phe Gln Gly Ile Ile Thr Leu Pro
            675                 680                 685

Val Thr Val Lys Asp Glu Asn Val Gln Leu Val His Arg Phe Ser Asn
        690                 695                 700

Asp Ala Lys Thr Gly Glu Gly Asn Tyr Val Asp Phe Trp Ser Glu Val
705                 710                 715                 720

Met Ser Val Lys Asp Ser Phe Gln Lys Gly Asn Gly Pro Leu Asn Gln
            725                 730                 735

Phe Gly Leu Gln Thr Ile Asn Gly Gln Gln Tyr Tyr Ile Asp Pro Thr
                740                 745                 750

Thr Gly Gln Pro Arg Lys Asn Phe Leu Leu Gln Asn Gly Asn Asp Trp
        755                 760                 765

Ile Tyr Phe Asp Lys Asp Thr Gly Ala Gly Thr Asn Ala Leu Lys Leu
            770                 775                 780

Gln Phe Asp Lys Gly Thr Ile Ser Ala Asp Glu Gln Tyr Arg Arg Gly
785                 790                 795                 800

Asn Glu Ala Tyr Ser Tyr Asp Asp Lys Ser Ile Glu Asn Val Asn Gly
                805                 810                 815

Tyr Leu Thr Ala Asp Thr Trp Tyr Arg Pro Lys Gln Ile Leu Lys Asp
        820                 825                 830

Gly Thr Thr Trp Thr Asp Ser Lys Glu Thr Asp Met Arg Pro Ile Leu
            835                 840                 845

Met Val Trp Trp Pro Asn Thr Val Thr Gln Ala Tyr Tyr Leu Asn Tyr
850                 855                 860

Met Lys Gln Tyr Gly Asn Leu Leu Pro Ala Ser Leu Pro Ser Phe Ser
865                 870                 875                 880

Thr Asp Ala Asp Ser Ala Glu Leu Asn His Tyr Ser Glu Leu Val Gln
                885                 890                 895

Gln Asn Ile Glu Lys Arg Ile Ser Glu Thr Gly Ser Thr Asp Trp Leu
        900                 905                 910

Arg Thr Leu Met His Glu Phe Val Thr Lys Asn Ser Met Trp Asn Lys
            915                 920                 925

Asp Ser Glu Asn Val Asp Tyr Gly Gly Leu Gln Leu Gln Gly Gly Phe
930                 935                 940

Leu Lys Tyr Val Asn Ser Asp Leu Thr Lys Tyr Ala Asn Ser Asp Trp
945                 950                 955                 960

Arg Leu Met Asn Arg Thr Ala Thr Asn Ile Asp Gly Lys Asn Tyr Gly
                965                 970                 975

Gly Ala Glu Phe Leu Leu Ala Asn Asp Ile Asp Asn Ser Asn Pro Val
        980                 985                 990

Val Gln Ala Glu Glu Leu Asn Trp Leu Tyr Tyr Leu Met Asn Phe Gly
            995                 1000                1005

Thr Ile Thr Gly Asn Asn Pro Glu Ala Asn Phe Asp Gly Ile Arg
        1010                1015                1020

Val Asp Ala Val Asp Asn Val Asp Val Asp Leu Leu Ser Ile Ala
        1025                1030                1035

Arg Asp Tyr Phe Asn Ala Ala Tyr Asn Met Glu Gln Ser Asp Ala
        1040                1045                1050
```

-continued

```
Ser Ala Asn Lys His Ile Asn Ile Leu Glu Asp Trp Gly Trp Asp
    1055                1060                1065

Asp Pro Ala Tyr Val Asn Lys Ile Gly Asn Pro Gln Leu Thr Met
    1070                1075                1080

Asp Asp Arg Leu Arg Asn Ala Ile Met Asp Thr Leu Ser Gly Ala
    1085                1090                1095

Pro Asp Lys Asn Gln Ala Leu Asn Lys Leu Ile Thr Gln Ser Leu
    1100                1105                1110

Val Asn Arg Ala Asn Asp Asn Thr Glu Asn Ala Val Ile Pro Ser
    1115                1120                1125

Tyr Asn Phe Val Arg Ala His Asp Ser Asn Ala Gln Asp Gln Ile
    1130                1135                1140

Arg Gln Ala Ile Gln Ala Ala Thr Gly Lys Pro Tyr Gly Glu Phe
    1145                1150                1155

Asn Leu Asp Asp Glu Lys Lys Gly Met Glu Ala Tyr Ile Asn Asp
    1160                1165                1170

Gln Asn Ser Thr Asn Lys Lys Trp Asn Leu Tyr Asn Met Pro Ser
    1175                1180                1185

Ala Tyr Thr Ile Leu Leu Thr Asn Lys Asp Ser Val Pro Arg Val
    1190                1195                1200

Tyr Tyr Gly Asp Leu Tyr Gln Asp Gly Gly Gln Tyr Met Glu His
    1205                1210                1215

Lys Thr Arg Tyr Phe Asp Thr Ile Thr Asn Leu Leu Lys Thr Arg
    1220                1225                1230

Val Lys Tyr Val Ala Gly Gly Gln Thr Met Ser Val Asp Lys Asn
    1235                1240                1245

Gly Ile Leu Thr Asn Val Arg Phe Gly Lys Gly Ala Met Asn Ala
    1250                1255                1260

Thr Asp Thr Gly Thr Asp Glu Thr Arg Thr Glu Gly Ile Gly Val
    1265                1270                1275

Val Ile Ser Asn Asn Thr Asn Leu Lys Leu Asn Asp Gly Glu Ser
    1280                1285                1290

Val Val Leu His Met Gly Ala Ala His Lys Asn Gln Lys Tyr Arg
    1295                1300                1305

Ala Val Ile Leu Thr Thr Glu Asp Gly Val Lys Asn Tyr Thr Asn
    1310                1315                1320

Asp Thr Asp Ala Pro Val Ala Tyr Thr Asp Ala Asn Gly Asp Leu
    1325                1330                1335

His Phe Thr Asn Thr Asn Leu Asp Gly Gln Gln Tyr Thr Ala Val
    1340                1345                1350

Arg Gly Tyr Ala Asn Pro Asp Val Thr Gly Tyr Leu Ala Val Trp
    1355                1360                1365

Val Pro Ala Gly Ala Ala Asp Asp Gln Asp Ala Arg Thr Ala Pro
    1370                1375                1380

Ser Asp Glu Ala His Thr Thr Lys Thr Ala Tyr Arg Ser Asn Ala
    1385                1390                1395

Ala Leu Asp Ser Asn Val Ile Tyr Glu Gly Phe Ser Asn Phe Ile
    1400                1405                1410

Tyr Trp Pro Thr Thr Glu Ser Glu Arg Thr Asn Val Arg Ile Ala
    1415                1420                1425

Gln Asn Ala Asp Leu Phe Lys Ser Trp Gly Ile Thr Thr Phe Glu
    1430                1435                1440

Leu Ala Pro Gln Tyr Asn Ser Ser Lys Asp Gly Thr Phe Leu Asp
```

Ser Ile Ile Asp Asn Gly Tyr Ala Phe Thr Asp Arg Tyr Asp Leu
1460                 1465                 1470

Gly Met Ser Thr Pro Asn Lys Tyr Gly Ser Asp Glu Asp Leu Arg
1475                 1480                 1485

Asn Ala Leu Gln Ala Leu His Lys Ala Gly Leu Gln Ala Ile Ala
1490                 1495                 1500

Asp Trp Val Pro Asp Gln Ile Tyr Asn Leu Pro Gly Lys Glu Ala
1505                 1510                 1515

Val Thr Val Thr Arg Ser Asp Asp His Gly Thr Thr Trp Glu Val
1520                 1525                 1530

Ser Pro Ile Lys Asn Val Val Tyr Ile Thr Asn Thr Ile Gly Gly
1535                 1540                 1545

Gly Glu Tyr Gln Lys Lys Tyr Gly Gly Glu Phe Leu Asp Thr Leu
1550                 1555                 1560

Gln Lys Glu Tyr Pro Gln Leu Phe Ser Gln Val Tyr Pro Val Thr
1565                 1570                 1575

Gln Thr Thr Ile Asp Pro Ser Val Lys Ile Lys Glu Trp Ser Ala
1580                 1585                 1590

Lys Tyr Phe Asn Gly Thr Asn Ile Leu His Arg Gly Ala Gly Tyr
1595                 1600                 1605

Val Leu Arg Ser Asn Asp Gly Lys Tyr Tyr Asn Leu Gly Thr Ser
1610                 1615                 1620

Thr Gln Gln Phe Leu Pro Ser Gln Leu Ser Val Gln Asp Asn Glu
1625                 1630                 1635

Gly Tyr Gly Phe Val Lys Glu Gly Asn Asn Tyr His Tyr Tyr Asp
1640                 1645                 1650

Glu Asn Lys Gln Met Val Lys Asp Ala Phe Ile Gln Asp Ser Val
1655                 1660                 1665

Gly Asn Trp Tyr Tyr Phe Asp Lys Asn Gly Asn Met Val Ala Asn
1670                 1675                 1680

Gln Ser Pro Val Glu Ile Ser Asn Gly Ala Ser Gly Thr Tyr
1685                 1690                 1695

Leu Phe Leu Asn Asn Gly Thr Ser Phe Arg Ser Gly Leu Val Lys
1700                 1705                 1710

Thr Asp Ala Gly Thr Tyr Tyr Tyr Asp Gly Asp Gly Arg Met Val
1715                 1720                 1725

Arg Asn Gln Thr Val Ser Asp Gly Ala Met Thr Tyr Val Leu Asp
1730                 1735                 1740

Glu Asn Gly Lys Leu Val Ser Glu Ser Phe Asp Ser Ser Ala Thr
1745                 1750                 1755

Glu Ala His Pro Leu Lys Pro Gly Asp Leu Asn Gly Gln Lys
1760                 1765                 1770

<210> SEQ ID NO 11
<211> LENGTH: 5208
<212> TYPE: DNA
<213> ORGANISM: Lactobacillus reuteri

<400> SEQUENCE: 11
atggatcagc aagtacaaag cagcaccacc caggagcaga cgagcacggt taacgcggac     60
acgactaaaa ccgtcaatct ggataccaac actgaccagc cggctcagac gaccgataag    120
aatcaggtcg cgaatgatac caccaccaac caaagcaaga cggacagcac cagcacgacg    180

```
gttaagaatc cgacgtttat tcctgttagc actttgtcca gctccgataa cgaaaagcag    240
agccagaatt acaataaacc agataacggt aattacggta atgttgatgc ggcctacttc    300
aataacaatc agctgcacat tagcggttgg cacgcaacca acgcgagcca gggtacggat    360
agccgccaag taatcgtacg cgacattacc accaagaccg agctgggtcg tactaatgtg    420
accaacaatg ttctgcgtcc ggacgtgaaa aatgttcaca acgtctacaa cgctgacaac    480
agcggctttg atgtgaatat caatattgat ttcagcaaga tgaaagacta tcgtgacagc    540
atcgagatcg tttctcgtta tagcggcaac ggcaagagcg ttgactggtg gtcgcagccg    600
atcacgtttg acaaaaacaa ttatgcttat ctggacactt tcgaggtgaa gaacggtgaa    660
ctgcatgcaa cgggctggaa tgccaccaac aaggctatca attacaatca ccacttcgtt    720
attctgtttg atcgtacgaa tggcaaagaa gtcacccgcc aagaggtgcg tgatggtcaa    780
agccgtccgg atgtggcgaa ggtatacccg caagtcgttg gcgcgaacaa tagcggtttt    840
gacgttacgt ttaacattgg tgatttggac tacacccatc agtaccagat cctgtctcgt    900
tacagcaacg cagacaacgg tgaaggcgat tatgtgacct attggtttgc gccgcagagc    960
atcgctccgg cgaatcaaag caaccaaggt tacctggaca gcttcgatat ttcgaaaaac   1020
ggtgaggtga ccgtgacggg ttggaatgcg acggatctga gcgagttgca aacgaatcac   1080
tacgtgatcc tgtttgatca gacggcgggt caacaggttg catccgctaa ggtcgacctg   1140
atcagccgtc cagacgtcgc gaaggcgtac cctaccgtta aaacggcaga aacctccggt   1200
ttcaaggtca cgtttaaggt tagcaatctg caaccgggcc accaatacag cgtcgttagc   1260
cgctttagcg ccgatgaaaa cggtaatggc aacgacaaac gccacacgga ctactggtac   1320
tctccggtta ccctgaacca aacggctagc aacattgaca ctatcaccat gacttccaac   1380
ggtctgcaca tcaccggctg gatggcgagc gataatagca ttaacgaagc gaccccgtac   1440
gcgattatcc tgaacaacgg tcgcgaggtg acgcgccaga aactgaccct gatcgcgcgt   1500
ccggatgttg cggcagtgta tccgagcctg tacaatagcg cggttagcgg cttcgacacc   1560
accatcaagc tgactaacgc gcaatatcaa gcattgaacg gccagctgca agtgctgctg   1620
cgctttagca aggcggtgga cggtaacccg aatggtacca ataccgtcac ggatcaattt   1680
agcaaaaact acgcaacgac cggtggtaat ttcgattacg tcaaggttaa tggtaaccaa   1740
attgagtttt ctggctggca cgcgacgaat cagagcaatg ataagaacag ccaatggatt   1800
atcgtcttgg ttaacggtaa agaggtcaaa cgccagctgg tcaatgacac gaaagacggc   1860
gcagccggct tcaatcgtaa tgatgtgtat aaagtgaacc cagcgatcga aaatagcatt   1920
atgtctggct tccagggcat tatcacgttg ccggttacgg tgaaagacga aaacgtgcag   1980
ctggtgcacc gcttctccaa tgacgcaaaa acgggtgagg gcaattatgt cgatttctgg   2040
agcgaggtga tgtctgtgaa ggactctttc caaaagggta atggtccgct gaaccagttt   2100
ggcctgcaaa ccatcaacgg ccaacaatac tatattgacc cgacgaccgg ccagccgcgt   2160 aagaattttcc tgctgcaaaa cggcaacgat tggatttact tcgacaaaga cactggcgca   2220
ggcaccaacg cgctgaaatt gcagtttgat aagggcacga ttagcgctga cgaacaatac   2280
cgtcgcggca acgaggcgta ctcctacgat gataagagca ttgaaaatgt caacggttac   2340
ttgacggcgg acacgtggta ccgcccgaag cagatcctga aggatggcac cacttggacc   2400
gattccaaag aaaccgatat gcgtccgatc ttgatggtct ggtggccaaa cacggtgact   2460
caggcgtact atctgaacta catgaaacaa tatggcaatc tgctgccggc gagcctgccg   2520
agctttagca ccgacgccga tagcgcggag ttgaatcatt attccgagct ggtccaacag   2580
```

```
aatatcgaga aacgtattag cgagactggt agcactgatt ggctgcgtac cctgatgcac   2640
gagttcgtga cgaagaatag catgtggaac aaagatagcg agaacgttga ctacggtggc   2700
ctgcaactgc aaggtggttt cctgaagtac gttaacagcg acctgacgaa gtacgcaaac   2760
tctgattggc gtctgatgaa ccgtaccgcg acgaacattg acggtaagaa ttacggtggt   2820
gccgagtttc tgctggcgaa tgacatcgac aactctaacc cggtggtgca ggccgaagaa   2880
ttgaattggc tgtattatct gatgaacttc ggtaccatca ccggtaacaa cccagaagct   2940
aacttcgacg gcatccgtgt cgacgcggtc gataatgtgg atgttgatct gctgagcatt   3000
gcccgtgact actttaatgc agcgtataac atggaacaaa gcgatgctag cgcgaataag   3060
cacatcaata ttctggaaga ttggggctgg gacgatccgg cgtacgtgaa caaaatcggc   3120
aatccacagt tgaccatgga tgaccgcctg cgtaatgcaa ttatggacac cctgagcggt   3180
gcgccggata agaaccaagc gctgaacaag ctgattactc agtctctggt gaatcgcgca   3240
aatgataata ctgaaaacgc ggtgatccct tcctacaact tgtccgcgc tcatgacagc   3300 aatgcccagg accagatccg tcaagcgatc caggcggcaa ccggcaaacc ttatggcgag   3360
ttcaacttgg atgatgagaa aaagggtatg gaggcttaca tcaatgacca aaatagcacc   3420
aataagaaat ggaacctgta caacatgccg agcgcatata ccatcctgct gacgaataag   3480
gactcggtcc cgcgtgtcta ctatggcgac ttgtaccagg atggtggcca gtacatggaa   3540
cacaaaactc gttactttga caccatcacg aatctgctga aaacccgcgt caagtatgtc   3600
gcaggcggcc agaccatgtc tgtggataag aatggcattt tgactaatgt ccgtttcggt   3660
aagggtgcga tgaacgcaac tgacacgggt accgatgaaa cccgcaccga aggtatcggc   3720
gttgttatca gcaacaatac gaatttgaaa ctgaatgacg gcgaaagcgt tgtgctgcac   3780
atgggcgctg cccataagaa tcagaagtat cgtgcagtga tcctgaccac ggaggacggt   3840
gtgaagaatt acaccaacga caccgatgcg ccggtcgcat acaccgacgc gaacggcgat   3900
ttgcatttca ccaatactaa cctggacggt cagcaatata ccgccgttcg tggctacgca   3960
aacccggacg ttacgggtta tctggccgtc tgggttcctg ctggtgccgc cgatgaccaa   4020
gacgcacgta ccgctccgag cgacgaggcc cacaccacga aaacggcgta tcgttccaat   4080
gcggcattgg actccaacgt catctacgaa ggcttttcga actttatcta ttggccgacg   4140
accgagagcg agcgcacgaa tgtccgcatc gcgcagaacg cggatctgtt caatcgtgg   4200 ggtatcacca ccttcgagct ggcgccacag tacaatagca gcaaggacgg tacgtttctg   4260
gattcgatca ttgacaatgg ttacgcgttt accgatcgtt atgacctggg tatgtctacc   4320
ccgaacaagt acggtagcga tgaggatctg cgtaacgccc tgcaagcact gcacaaggcc   4380
ggtctgcaag ccatcgcaga ttgggttccg gaccaaatct acaatctgcc gggcaaagag   4440
gctgtcacgg ttactcgtag cgatgaccac ggcactacct gggaggttag cccgatcaag   4500
aatgtggtgt atatcactaa taccatcggt ggtggcgaat accagaaaaa gtatggtggt   4560
gaatttctgg acaccttgca aaaagaatat ccgcagctgt ttagccaagt ttacccggtg   4620
acccaaacga cgattgaccc tagcgttaag attaaagagt ggtccgcgaa gtacttcaat   4680
ggtactaata tcctgcatcg cggtgcgggt tacgtcctgc gtagcaatga tggtaagtat   4740
tacaacctgg gtactagcac ccagcagttc ctgccgagcc agctgagcgt tcaagataat   4800
gagggttacg gtttcgttaa agagggtaac aactatcact attatgacga gaacaaacaa   4860
atggttaagg acgcgtttat ccaggatagc gtcggcaatt ggtactattt tgataagaac   4920
```

-continued

```
ggcaatatgg ttgcaaacca agcccggtt gaaatcagca gcaacggtgc gagcggcacc      4980
tacttgtttt tgaataatgg taccagcttc cgcagcggcc tggtcaaaac ggatgcaggc      5040
acctattact acgatggtga cggtcgcatg gttcgtaatc aaacggtttc tgacggtgcc      5100
atgacgtacg ttctggacga aaatggtaaa ctggtcagcg aatcttttga tagcagcgcg      5160
accgaggccc atccgctgaa accgggcgat ctgaacggtc aaaagtaa                   5208
```

<210> SEQ ID NO 12
<211> LENGTH: 1735
<212> TYPE: PRT
<213> ORGANISM: Lactobacillus reuteri

<400> SEQUENCE: 12

```
Met Asp Gln Gln Val Gln Ser Ser Thr Thr Gln Glu Gln Thr Ser Thr
1               5                   10                  15

Val Asn Ala Asp Thr Thr Lys Thr Val Asn Leu Asp Thr Asn Thr Asp
                20                  25                  30

Gln Pro Ala Gln Thr Thr Asp Lys Asn Gln Val Ala Asn Asp Thr Thr
            35                  40                  45

Thr Asn Gln Ser Lys Thr Asp Ser Thr Ser Thr Val Lys Asn Pro
        50                  55                  60

Thr Phe Ile Pro Val Ser Thr Leu Ser Ser Ser Asp Asn Glu Lys Gln
65                  70                  75                  80

Ser Gln Asn Tyr Asn Lys Pro Asp Asn Gly Asn Tyr Gly Asn Val Asp
                85                  90                  95

Ala Ala Tyr Phe Asn Asn Asn Gln Leu His Ile Ser Gly Trp His Ala
            100                 105                 110

Thr Asn Ala Ser Gln Gly Thr Asp Ser Arg Gln Val Ile Val Arg Asp
        115                 120                 125

Ile Thr Thr Lys Thr Glu Leu Gly Arg Thr Asn Val Thr Asn Asn Val
130                 135                 140

Leu Arg Pro Asp Val Lys Asn Val His Asn Val Tyr Asn Ala Asp Asn
145                 150                 155                 160

Ser Gly Phe Asp Val Asn Ile Asn Ile Asp Phe Ser Lys Met Lys Asp
                165                 170                 175

Tyr Arg Asp Ser Ile Glu Ile Val Ser Arg Tyr Ser Gly Asn Gly Lys
            180                 185                 190

Ser Val Asp Trp Trp Ser Gln Pro Ile Thr Phe Asp Lys Asn Asn Tyr
        195                 200                 205

Ala Tyr Leu Asp Thr Phe Glu Val Lys Asn Gly Glu Leu His Ala Thr
    210                 215                 220

Gly Trp Asn Ala Thr Asn Lys Ala Ile Asn Tyr Asn His His Phe Val
225                 230                 235                 240

Ile Leu Phe Asp Arg Thr Asn Gly Lys Glu Val Thr Arg Gln Glu Val
                245                 250                 255

Arg Asp Gly Gln Ser Arg Pro Asp Val Ala Lys Val Tyr Pro Gln Val
            260                 265                 270

Val Gly Ala Asn Asn Ser Gly Phe Asp Val Thr Phe Asn Ile Gly Asp
        275                 280                 285

Leu Asp Tyr Thr His Gln Tyr Gln Ile Leu Ser Arg Tyr Ser Asn Ala
    290                 295                 300

Asp Asn Gly Glu Gly Asp Tyr Val Thr Tyr Trp Phe Ala Pro Gln Ser
305                 310                 315                 320

Ile Ala Pro Ala Asn Gln Ser Asn Gln Gly Tyr Leu Asp Ser Phe Asp
```

```
                325                 330                 335
Ile Ser Lys Asn Gly Glu Val Thr Val Thr Gly Trp Asn Ala Thr Asp
            340                 345                 350
Leu Ser Glu Leu Gln Thr Asn His Tyr Val Ile Leu Phe Asp Gln Thr
            355                 360                 365
Ala Gly Gln Gln Val Ala Ser Ala Lys Val Asp Leu Ile Ser Arg Pro
        370                 375                 380
Asp Val Ala Lys Ala Tyr Pro Thr Val Lys Thr Ala Glu Thr Ser Gly
385                 390                 395                 400
Phe Lys Val Thr Phe Lys Val Ser Asn Leu Gln Pro Gly His Gln Tyr
                405                 410                 415
Ser Val Val Ser Arg Phe Ser Ala Asp Glu Asn Gly Asn Gly Asn Asp
                420                 425                 430
Lys Arg His Thr Asp Tyr Trp Tyr Ser Pro Val Thr Leu Asn Gln Thr
            435                 440                 445
Ala Ser Asn Ile Asp Thr Ile Thr Met Thr Ser Asn Gly Leu His Ile
        450                 455                 460
Thr Gly Trp Met Ala Ser Asp Asn Ser Ile Asn Glu Ala Thr Pro Tyr
465                 470                 475                 480
Ala Ile Ile Leu Asn Asn Gly Arg Glu Val Thr Arg Gln Lys Leu Thr
                485                 490                 495
Leu Ile Ala Arg Pro Asp Val Ala Ala Val Tyr Pro Ser Leu Tyr Asn
            500                 505                 510
Ser Ala Val Ser Gly Phe Asp Thr Thr Ile Lys Leu Thr Asn Ala Gln
            515                 520                 525
Tyr Gln Ala Leu Asn Gly Gln Leu Gln Val Leu Leu Arg Phe Ser Lys
        530                 535                 540
Ala Val Asp Gly Asn Pro Asn Gly Thr Asn Thr Val Thr Asp Gln Phe
545                 550                 555                 560
Ser Lys Asn Tyr Ala Thr Thr Gly Gly Asn Phe Asp Tyr Val Lys Val
                565                 570                 575
Asn Gly Asn Gln Ile Glu Phe Ser Gly Trp His Ala Thr Asn Gln Ser
            580                 585                 590
Asn Asp Lys Asn Ser Gln Trp Ile Ile Val Leu Val Asn Gly Lys Glu
        595                 600                 605
Val Lys Arg Gln Leu Val Asn Asp Thr Lys Asp Gly Ala Ala Gly Phe
        610                 615                 620
Asn Arg Asn Asp Val Tyr Lys Val Asn Pro Ala Ile Glu Asn Ser Ile
625                 630                 635                 640
Met Ser Gly Phe Gln Gly Ile Ile Thr Leu Pro Val Thr Val Lys Asp
                645                 650                 655
Glu Asn Val Gln Leu Val His Arg Phe Ser Asn Asp Ala Lys Thr Gly
            660                 665                 670
Glu Gly Asn Tyr Val Asp Phe Trp Ser Glu Val Met Ser Val Lys Asp
            675                 680                 685
Ser Phe Gln Lys Gly Asn Gly Pro Leu Asn Gln Phe Gly Leu Gln Thr
        690                 695                 700
Ile Asn Gly Gln Gln Tyr Tyr Ile Asp Pro Thr Thr Gly Gln Pro Arg
705                 710                 715                 720
Lys Asn Phe Leu Leu Gln Asn Gly Asn Asp Trp Ile Tyr Phe Asp Lys
                725                 730                 735
Asp Thr Gly Ala Gly Thr Asn Ala Leu Lys Leu Gln Phe Asp Lys Gly
            740                 745                 750
```

```
Thr Ile Ser Ala Asp Glu Gln Tyr Arg Arg Gly Asn Glu Ala Tyr Ser
            755                 760                 765

Tyr Asp Asp Lys Ser Ile Glu Asn Val Asn Gly Tyr Leu Thr Ala Asp
770                 775                 780

Thr Trp Tyr Arg Pro Lys Gln Ile Leu Lys Asp Gly Thr Thr Trp Thr
785                 790                 795                 800

Asp Ser Lys Glu Thr Asp Met Arg Pro Ile Leu Met Val Trp Trp Pro
                805                 810                 815

Asn Thr Val Thr Gln Ala Tyr Tyr Leu Asn Tyr Met Lys Gln Tyr Gly
            820                 825                 830

Asn Leu Leu Pro Ala Ser Leu Pro Ser Phe Ser Thr Asp Ala Asp Ser
                835                 840                 845

Ala Glu Leu Asn His Tyr Ser Glu Leu Val Gln Gln Asn Ile Glu Lys
        850                 855                 860

Arg Ile Ser Glu Thr Gly Ser Thr Asp Trp Leu Arg Thr Leu Met His
865                 870                 875                 880

Glu Phe Val Thr Lys Asn Ser Met Trp Asn Lys Asp Ser Glu Asn Val
                885                 890                 895

Asp Tyr Gly Gly Leu Gln Leu Gln Gly Gly Phe Leu Lys Tyr Val Asn
            900                 905                 910

Ser Asp Leu Thr Lys Tyr Ala Asn Ser Asp Trp Arg Leu Met Asn Arg
        915                 920                 925

Thr Ala Thr Asn Ile Asp Gly Lys Asn Tyr Gly Gly Ala Glu Phe Leu
930                 935                 940

Leu Ala Asn Asp Ile Asp Asn Ser Asn Pro Val Gln Ala Glu Glu
945                 950                 955                 960

Leu Asn Trp Leu Tyr Tyr Leu Met Asn Phe Gly Thr Ile Thr Gly Asn
            965                 970                 975

Asn Pro Glu Ala Asn Phe Asp Gly Ile Arg Val Asp Ala Val Asp Asn
            980                 985                 990

Val Asp Val Asp Leu Leu Ser Ile Ala Arg Asp Tyr Phe Asn Ala Ala
        995                 1000                1005

Tyr Asn Met Glu Gln Ser Asp Ala Ser Ala Asn Lys His Ile Asn
    1010                1015                1020

Ile Leu Glu Asp Trp Gly Trp Asp Asp Pro Ala Tyr Val Asn Lys
    1025                1030                1035

Ile Gly Asn Pro Gln Leu Thr Met Asp Asp Arg Leu Arg Asn Ala
    1040                1045                1050

Ile Met Asp Thr Leu Ser Gly Ala Pro Asp Lys Asn Gln Ala Leu
    1055                1060                1065

Asn Lys Leu Ile Thr Gln Ser Leu Val Asn Arg Ala Asn Asp Asn
    1070                1075                1080

Thr Glu Asn Ala Val Ile Pro Ser Tyr Asn Phe Val Arg Ala His
    1085                1090                1095

Asp Ser Asn Ala Gln Asp Gln Ile Arg Gln Ala Ile Gln Ala Ala
    1100                1105                1110

Thr Gly Lys Pro Tyr Gly Glu Phe Asn Leu Asp Asp Glu Lys Lys
    1115                1120                1125

Gly Met Glu Ala Tyr Ile Asn Asp Gln Asn Ser Thr Asn Lys Lys
    1130                1135                1140

Trp Asn Leu Tyr Asn Met Pro Ser Ala Tyr Thr Ile Leu Leu Thr
    1145                1150                1155
```

```
Asn Lys Asp Ser Val Pro Arg Val Tyr Tyr Gly Asp Leu Tyr Gln
1160                 1165                1170

Asp Gly Gly Gln Tyr Met Glu His Lys Thr Arg Tyr Phe Asp Thr
1175                 1180                1185

Ile Thr Asn Leu Leu Lys Thr Arg Val Lys Tyr Val Ala Gly Gly
1190                 1195                1200

Gln Thr Met Ser Val Asp Lys Asn Gly Ile Leu Thr Asn Val Arg
1205                 1210                1215

Phe Gly Lys Gly Ala Met Asn Ala Thr Asp Thr Gly Thr Asp Glu
1220                 1225                1230

Thr Arg Thr Glu Gly Ile Gly Val Val Ile Ser Asn Asn Thr Asn
1235                 1240                1245

Leu Lys Leu Asn Asp Gly Glu Ser Val Val Leu His Met Gly Ala
1250                 1255                1260

Ala His Lys Asn Gln Lys Tyr Arg Ala Val Ile Leu Thr Thr Glu
1265                 1270                1275

Asp Gly Val Lys Asn Tyr Thr Asn Asp Thr Asp Ala Pro Val Ala
1280                 1285                1290

Tyr Thr Asp Ala Asn Gly Asp Leu His Phe Thr Asn Thr Asn Leu
1295                 1300                1305

Asp Gly Gln Gln Tyr Thr Ala Val Arg Gly Tyr Ala Asn Pro Asp
1310                 1315                1320

Val Thr Gly Tyr Leu Ala Val Trp Val Pro Ala Gly Ala Ala Asp
1325                 1330                1335

Asp Gln Asp Ala Arg Thr Ala Pro Ser Asp Glu Ala His Thr Thr
1340                 1345                1350

Lys Thr Ala Tyr Arg Ser Asn Ala Ala Leu Asp Ser Asn Val Ile
1355                 1360                1365

Tyr Glu Gly Phe Ser Asn Phe Ile Tyr Trp Pro Thr Thr Glu Ser
1370                 1375                1380

Glu Arg Thr Asn Val Arg Ile Ala Gln Asn Ala Asp Leu Phe Lys
1385                 1390                1395

Ser Trp Gly Ile Thr Thr Phe Glu Leu Ala Pro Gln Tyr Asn Ser
1400                 1405                1410

Ser Lys Asp Gly Thr Phe Leu Asp Ser Ile Ile Asp Asn Gly Tyr
1415                 1420                1425

Ala Phe Thr Asp Arg Tyr Asp Leu Gly Met Ser Thr Pro Asn Lys
1430                 1435                1440

Tyr Gly Ser Asp Glu Asp Leu Arg Asn Ala Leu Gln Ala Leu His
1445                 1450                1455

Lys Ala Gly Leu Gln Ala Ile Ala Asp Trp Val Pro Asp Gln Ile
1460                 1465                1470

Tyr Asn Leu Pro Gly Lys Glu Ala Val Thr Val Thr Arg Ser Asp
1475                 1480                1485

Asp His Gly Thr Thr Trp Glu Val Ser Pro Ile Lys Asn Val Val
1490                 1495                1500

Tyr Ile Thr Asn Thr Ile Gly Gly Gly Glu Tyr Gln Lys Lys Tyr
1505                 1510                1515

Gly Gly Glu Phe Leu Asp Thr Leu Gln Lys Glu Tyr Pro Gln Leu
1520                 1525                1530

Phe Ser Gln Val Tyr Pro Val Thr Gln Thr Thr Ile Asp Pro Ser
1535                 1540                1545

Val Lys Ile Lys Glu Trp Ser Ala Lys Tyr Phe Asn Gly Thr Asn
```

```
                    1550                1555                1560
Ile Leu His Arg Gly Ala Gly Tyr Val Leu Arg Ser Asn Asp Gly
    1565                1570                1575

Lys Tyr Tyr Asn Leu Gly Thr Ser Thr Gln Gln Phe Leu Pro Ser
    1580                1585                1590

Gln Leu Ser Val Gln Asp Asn Glu Gly Tyr Gly Phe Val Lys Glu
    1595                1600                1605

Gly Asn Asn Tyr His Tyr Tyr Asp Glu Asn Lys Gln Met Val Lys
    1610                1615                1620

Asp Ala Phe Ile Gln Asp Ser Val Gly Asn Trp Tyr Tyr Phe Asp
    1625                1630                1635

Lys Asn Gly Asn Met Val Ala Asn Gln Ser Pro Val Glu Ile Ser
    1640                1645                1650

Ser Asn Gly Ala Ser Gly Thr Tyr Leu Phe Leu Asn Asn Gly Thr
    1655                1660                1665

Ser Phe Arg Ser Gly Leu Val Lys Thr Asp Ala Gly Thr Tyr Tyr
    1670                1675                1680

Tyr Asp Gly Asp Gly Arg Met Val Arg Asn Gln Thr Val Ser Asp
    1685                1690                1695

Gly Ala Met Thr Tyr Val Leu Asp Glu Asn Gly Lys Leu Val Ser
    1700                1705                1710

Glu Ser Phe Asp Ser Ser Ala Thr Glu Ala His Pro Leu Lys Pro
    1715                1720                1725

Gly Asp Leu Asn Gly Gln Lys
    1730                1735

<210> SEQ ID NO 13
<211> LENGTH: 36
<212> TYPE: DNA
<213> ORGANISM: artificial sequence
<220> FEATURE:
<223> OTHER INFORMATION: synthetic construct

<400> SEQUENCE: 13
ataaaaaacg ctcggttgcc gccgggcgtt ttttat                        36

<210> SEQ ID NO 14
<211> LENGTH: 21
<212> TYPE: DNA
<213> ORGANISM: artificial sequence
<220> FEATURE:
<223> OTHER INFORMATION: synthetic construct

<400> SEQUENCE: 14
ggatcctgac tgcctgagct t                                        21
```